(12) United States Patent  
Agrawal et al.

(10) Patent No.: US 12,212,351 B2
(45) Date of Patent: Jan. 28, 2025

(54) COMMUNICATION DEVICE

(71) Applicant: Intel Corporation, Santa Clara, CA (US)

(72) Inventors: Abhishek Agrawal, Portland, OR (US); Ritesh A. Bhat, Hillsboro, OR (US); Steven Callender, Portland, OR (US); Brent R. Carlton, Portland, OR (US); Christopher D. Hull, Portland, OR (US); Stefano Pellerano, Beaverton, OR (US); Mustafijur Rahman, Hillsboro, OR (US); Peter Sagazio, Portland, OR (US); Woorim Shin, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 886 days.

(21) Appl. No.: 17/131,872

(22) Filed: Dec. 23, 2020

(65) Prior Publication Data
US 2022/0200642 A1 Jun. 23, 2022

(51) Int. Cl.
H04B 1/04 (2006.01)
(52) U.S. Cl.
CPC ......... H04B 1/0458 (2013.01); H04B 1/0483 (2013.01); H04B 2001/0416 (2013.01); H04B 2001/0433 (2013.01); H04B 2001/045 (2013.01)
(58) Field of Classification Search
None
See application file for complete search history.

(56) References Cited

U.S. PATENT DOCUMENTS 6,201,234 B1 * 3/2001 Chow .................. H04N 25/772
            348/E3.018
6,404,281 B1 * 6/2002 Kobayashi .............. H03F 3/087
            330/85
6,504,429 B2 * 1/2003 Kobayashi ........... H03G 3/3036
            330/85

(Continued)

FOREIGN PATENT DOCUMENTS

CA      2425647 C  *  6/2006  ......... H03F 3/45085
CN   103248330 A  *  8/2013

(Continued)

OTHER PUBLICATIONS

D. G. Rahn et al., "A fully integrated multiband MIMO WLAN transceiver RFIC," in IEEE Journal of Solid-State Circuits, vol. 40, No. 8, pp. 1629-1641, Aug. 2005, (Year: 2005).*

(Continued)

Primary Examiner — Berhanu Tadese
(74) Attorney, Agent, or Firm — Viering, Jentschura & Partner mbB

(57) ABSTRACT

Various aspects provide a transceiver and a communication device including the transceiver. In an example, the transceiver includes an amplifier circuit including an amplifier stage with an adjustable degeneration component, the amplifier stage configured to amplify a received input signal with an adjustable gain, an adjustable feedback component coupled to the amplifier stage; and a controller coupled to the amplifier stage and to the adjustable feedback component and configured to adjust the adjustable feedback component based on an adjustment of the adjustable degeneration component.

12 Claims, 37 Drawing Sheets

(56) References Cited

U.S. PATENT DOCUMENTS

| | | | | |
|---|---|---|---|---|
| 6,870,425 | B2* | 3/2005 | Leifso | H03G 1/0023 330/254 |
| 7,088,179 | B2* | 8/2006 | Gilbert | H03F 3/45094 330/254 |
| 7,495,511 | B2* | 2/2009 | Gilbert | H03F 3/45484 330/254 |
| 7,545,856 | B2* | 6/2009 | Behzad | H04L 27/362 710/1 |
| 7,692,495 | B2* | 4/2010 | Uehara | H03F 3/45197 330/306 |
| 7,990,217 | B2* | 8/2011 | Gilbert | H03F 3/45484 330/254 |
| 8,130,035 | B2* | 3/2012 | Weigandt | H03F 3/45475 330/261 |
| 9,456,285 | B2* | 9/2016 | Bymaster | H04R 25/356 |
| 9,935,584 | B1* | 4/2018 | Turner | H03F 1/56 |
| 10,063,194 | B1* | 8/2018 | Quan | H03F 1/30 |
| 10,879,869 | B2* | 12/2020 | Elsayad | H03H 3/0072 |
| 11,128,262 | B2* | 9/2021 | Quan | H03F 3/02 |
| 2002/0140506 | A1* | 10/2002 | Kobayashi | H03F 3/087 330/85 |
| 2006/0238254 | A1* | 10/2006 | Gilbert | H03F 3/45278 330/254 |
| 2006/0284670 | A1* | 12/2006 | Eid | H03F 3/45183 327/563 |
| 2007/0058703 | A1* | 3/2007 | Behzad | H03F 3/45188 375/219 |
| 2014/0300417 | A1* | 10/2014 | Xu | H03F 3/45179 330/278 |
| 2018/0062690 | A1* | 3/2018 | Hageraats | H04B 7/0882 |
| 2022/0200642 | A1* | 6/2022 | Agrawal | H04B 1/0483 |

FOREIGN PATENT DOCUMENTS

| | | | | |
|---|---|---|---|---|
| CN | 103248330 B | * | 10/2015 | |
| CN | 106456021 A | * | 2/2017 | A61B 5/02427 |
| CN | 104956599 B | * | 6/2018 | H03F 1/14 |
| CN | 108988799 A | * | 12/2018 | H03F 1/301 |
| CN | 109412615 A | * | 3/2019 | H04B 1/04 |
| CN | 108988799 B | * | 3/2022 | H03F 1/301 |
| EP | 0652635 A1 | | 5/1995 | |
| EP | 1306970 A2 | * | 5/2003 | H03F 1/14 |
| EP | 1306970 B1 | | 5/2003 | |
| EP | 2898705 B1 | * | 8/2017 | H04R 25/30 |
| EP | 2878079 B1 | * | 12/2017 | H03F 1/523 |
| WO | WO-2005029711 A2 | * | 3/2005 | H03F 1/26 |
| WO | WO-2009123583 A1 | * | 10/2009 | H03F 3/45197 |
| WO | WO-2013077932 A1 | * | 5/2013 | H04R 25/30 |
| WO | WO-2022139911 A1 | * | 6/2022 | H04B 1/0458 |

OTHER PUBLICATIONS

Common Emitter Amplifier, Retrieved from https://en.wikipedia.org/w/index.php?title=Common_emitter&oldid=1190607768, on Sep. 2024 (Year: 2024).*

International Search Report issued for the corresponding international patent application No. PCT/US2021/051397, dated Feb. 23, 2022, 4 pages (for informational purposes only).

* cited by examiner

COMMUNICATION DEVICE

TECHNICAL FIELD

Various aspects of this disclosure generally relate to communication devices.

BACKGROUND

The complexity of communication systems continues to increase in order to meet the requirements of the market and the users in terms of many aspects, including speed, reliability, energy efficiency, coverage, and scalability. Recent communication systems may require many inter-related components, blocks, or functions working together in order to perform improvements to such aspects in communication elements such as receivers, transmitters, or alternatively transceivers for devices that may transmit and receive communication signals. One of the exemplary reasons for the recent challenges in communication systems may be considered as the recent implementation of communication using signals having frequencies over one gigahertz. The communication may generally take the form of radio communication at such frequencies, however other forms of transmission mediums may also be used, such as wired communication, satellite communication, or optical communication.

To support increases in data traffic, transceivers need to support wider bandwidths (BW) and higher-order modulations schemes. Furthermore, it is also desired that the transceivers would spend energy efficiently and have reduced complexity. Various aspects related to communication devices including transceivers, or alternatively transmitters and receivers, that include portions such as the circuits of the transceivers in general, amplifier circuits, and demodulators may be subject to developments.

BRIEF DESCRIPTION OF THE EXEMPLARY DRAWINGS

In the drawings, like reference characters generally refer to the same parts throughout the different views. The drawings are not necessarily to scale, emphasis instead generally being placed upon illustrating the exemplary principles of the disclosure. In the following description, various aspects of the disclosure are described with reference to the following drawings, in which:

FIG. 1 exemplarily shows schematically a block diagram of a communication device including a transceiver;

FIG. 2 exemplarily illustrates schematically a block diagram of a transceiver in accordance with various aspects of the present disclosure;

FIG. 3 shows schematically an exemplary illustration of a plurality of communication devices that may communicate with each other;

FIG. 4 exemplarily shows schematically a radiofrequency (RF) front end portion that may be implemented in a transceiver;

FIG. 5 shows exemplarily a block diagram of a transceiver in accordance with various aspects of this disclosure apart from an RF front end;

FIG. 6 exemplarily shows schematically a transceiver in accordance with various aspects of this disclosure.

Figure 10:
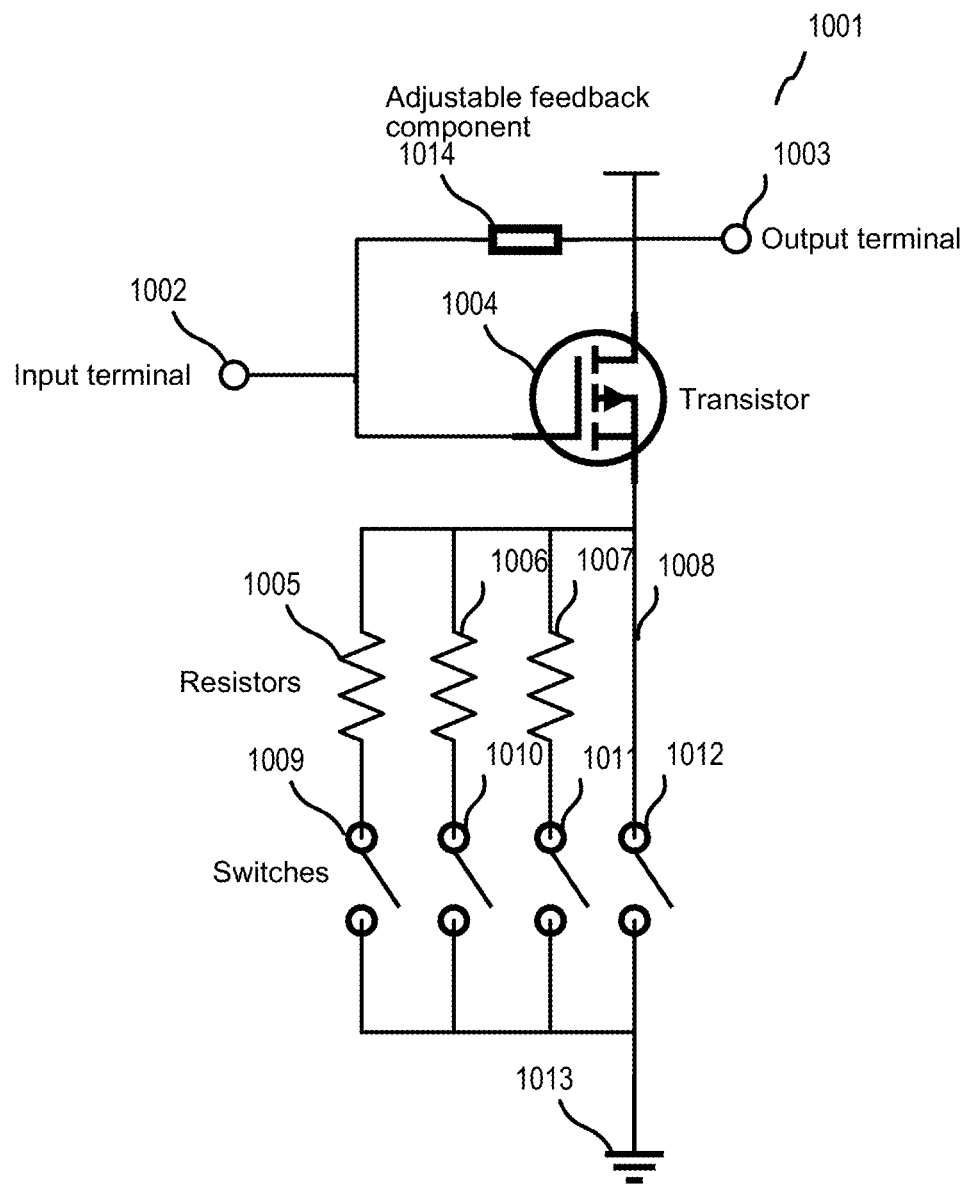
Figure 11:
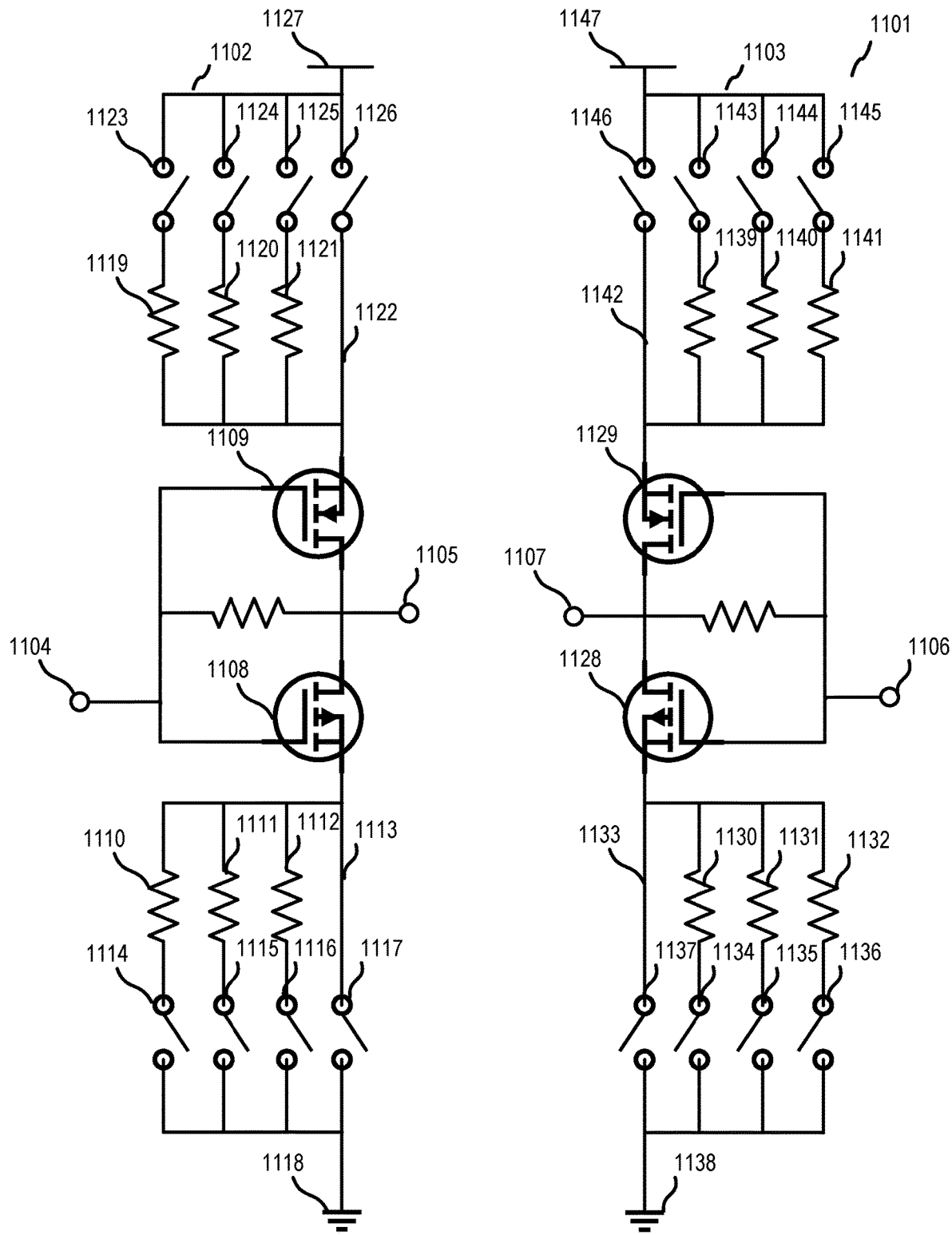
Figure 12:
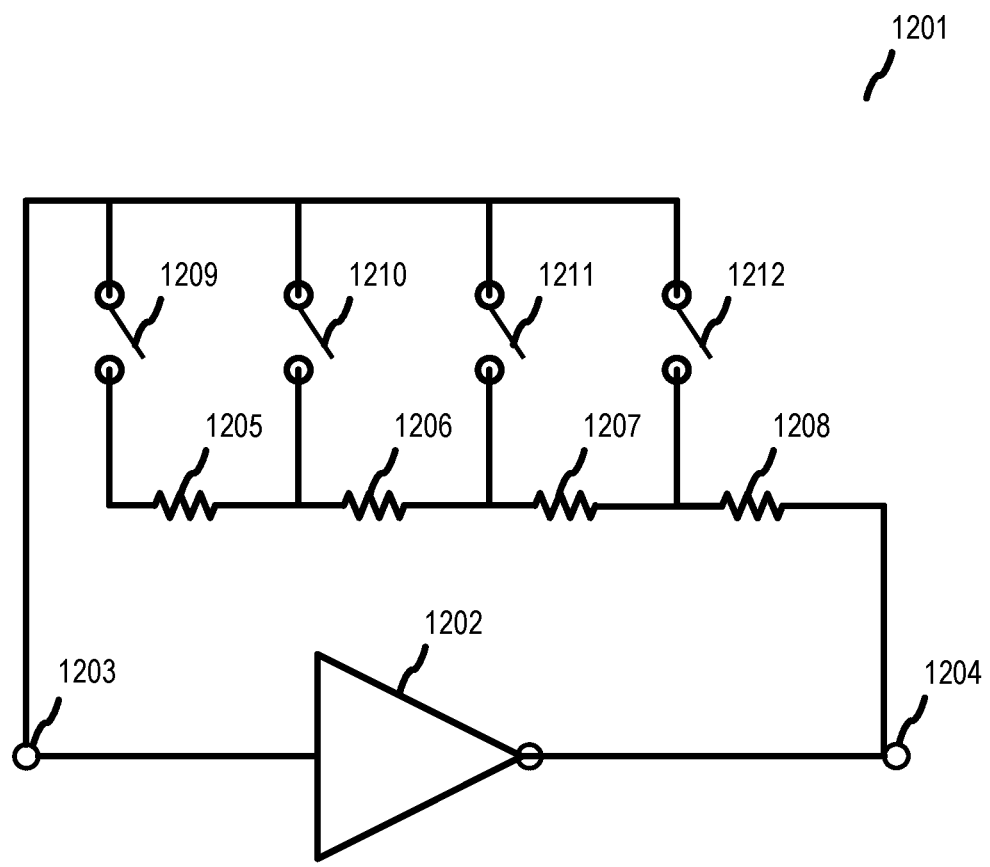
Figure 13:
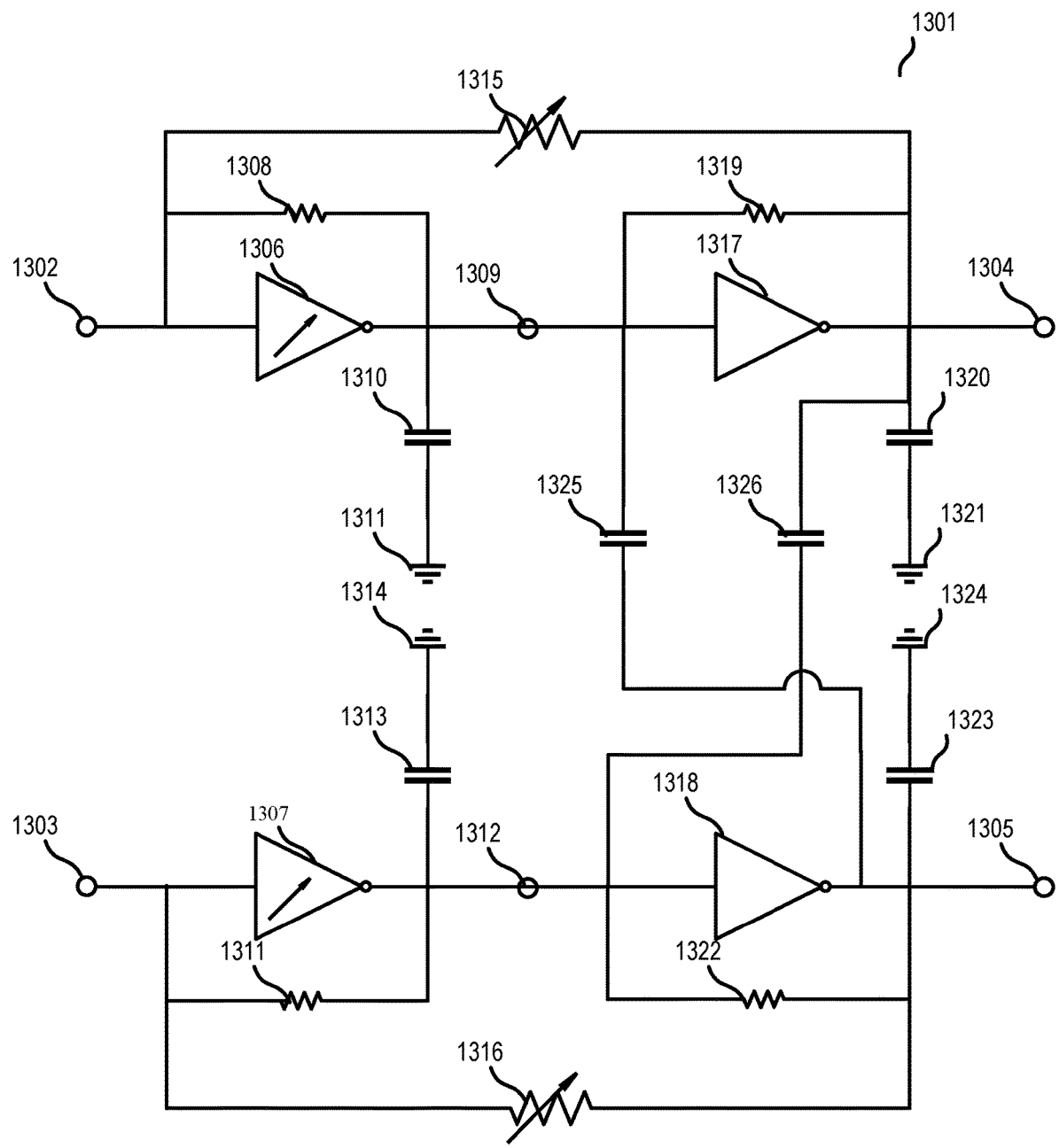
Figure 14:
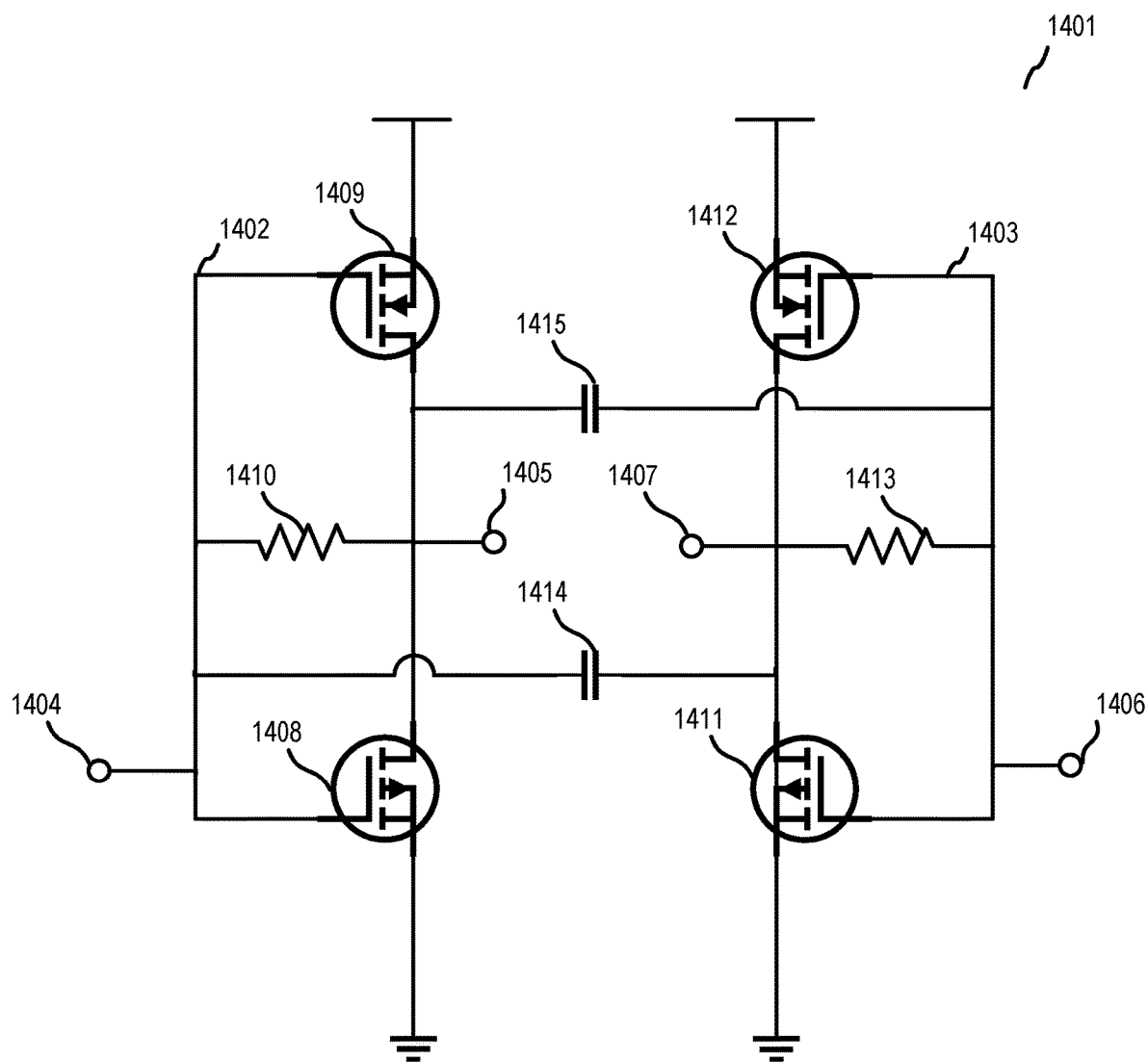
Figure 15:
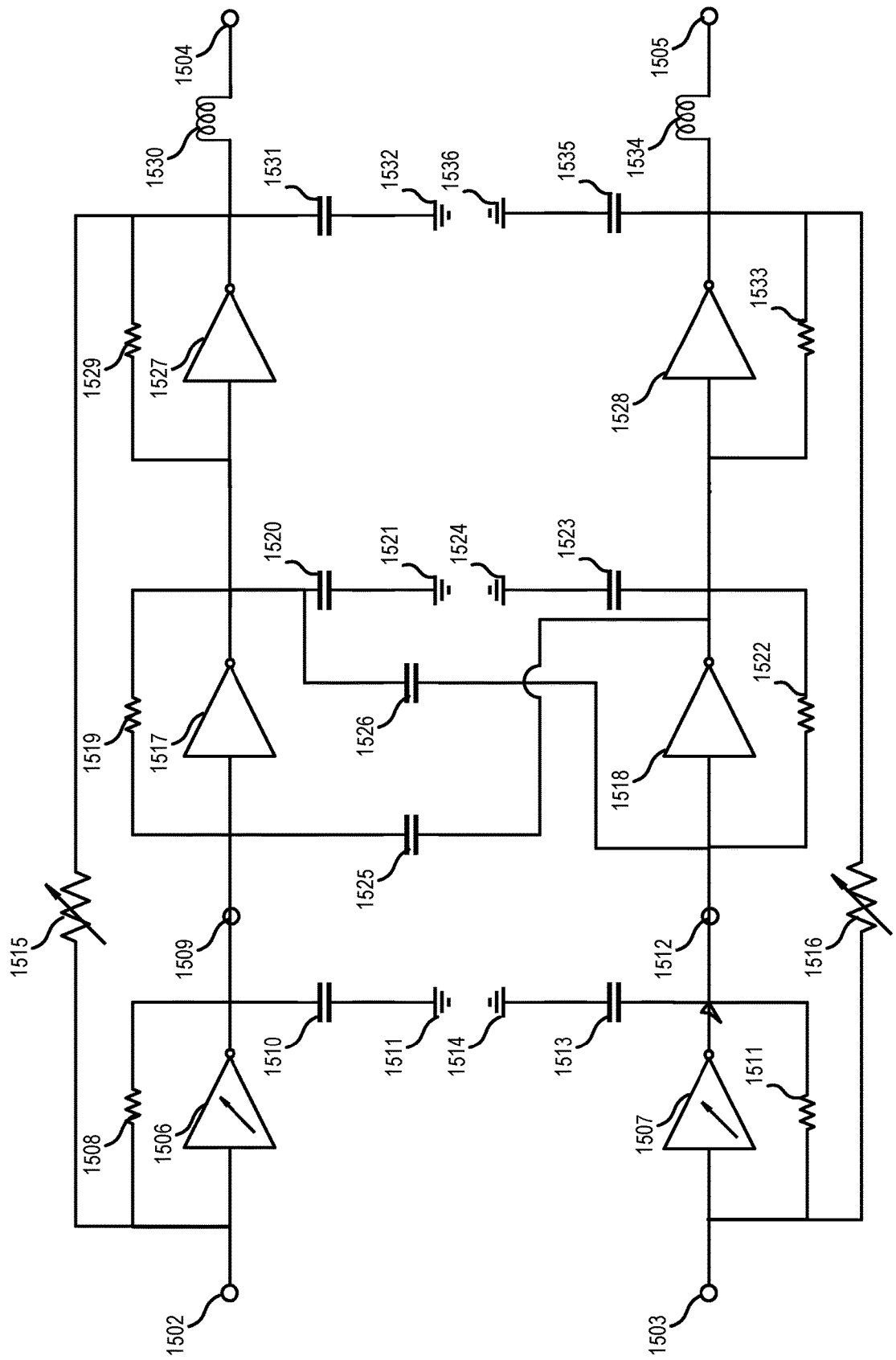
Figure 16:
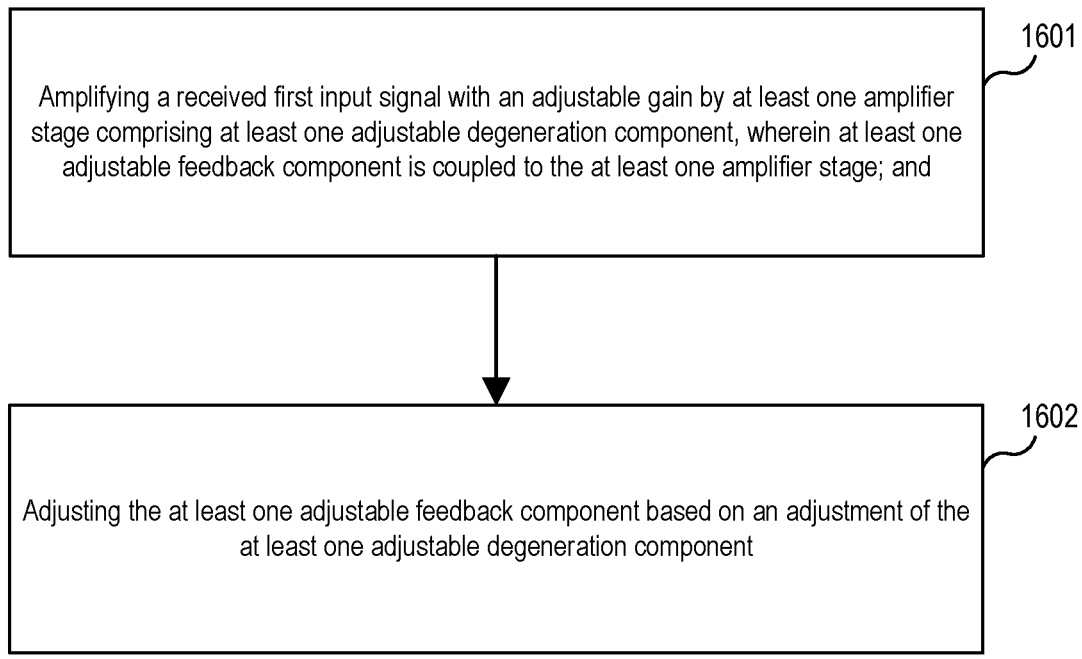
Figure 17:
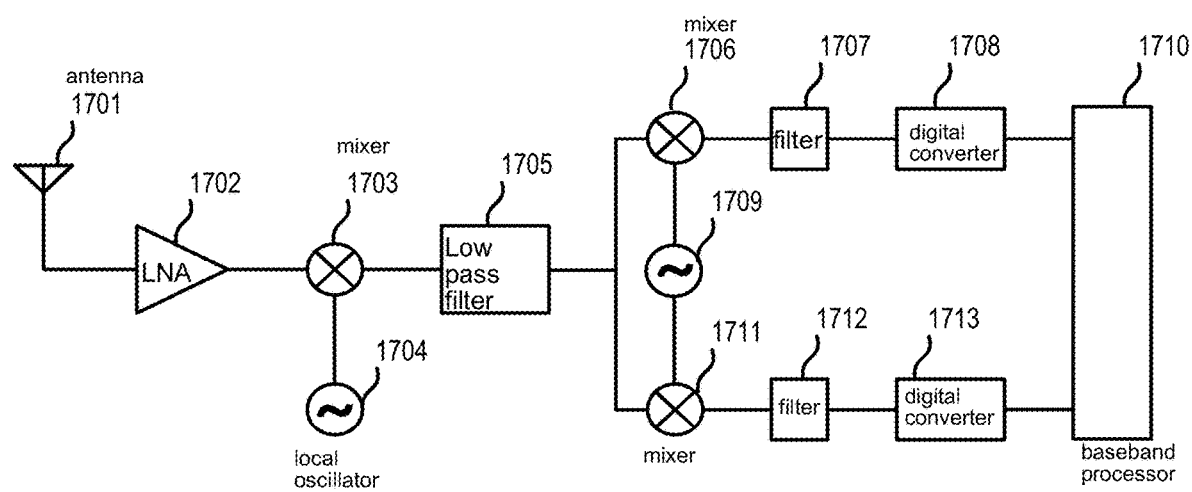
Figure 18:
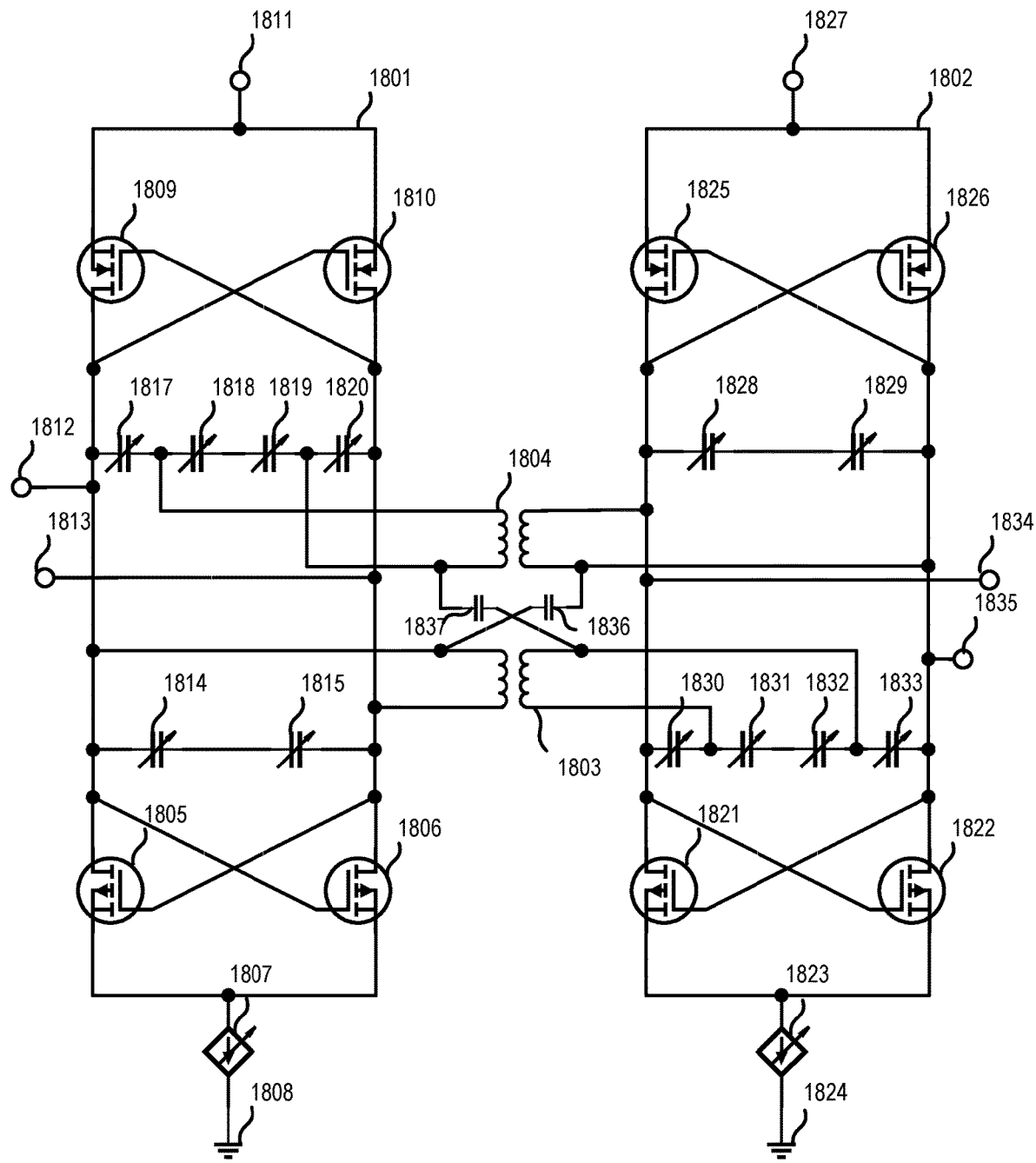
Figure 19:
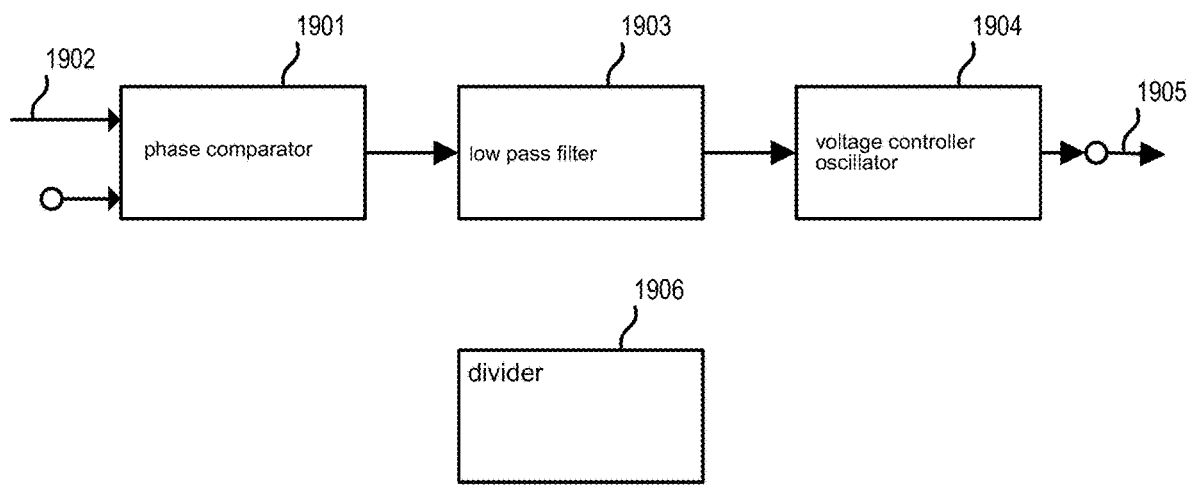
Figure 20:
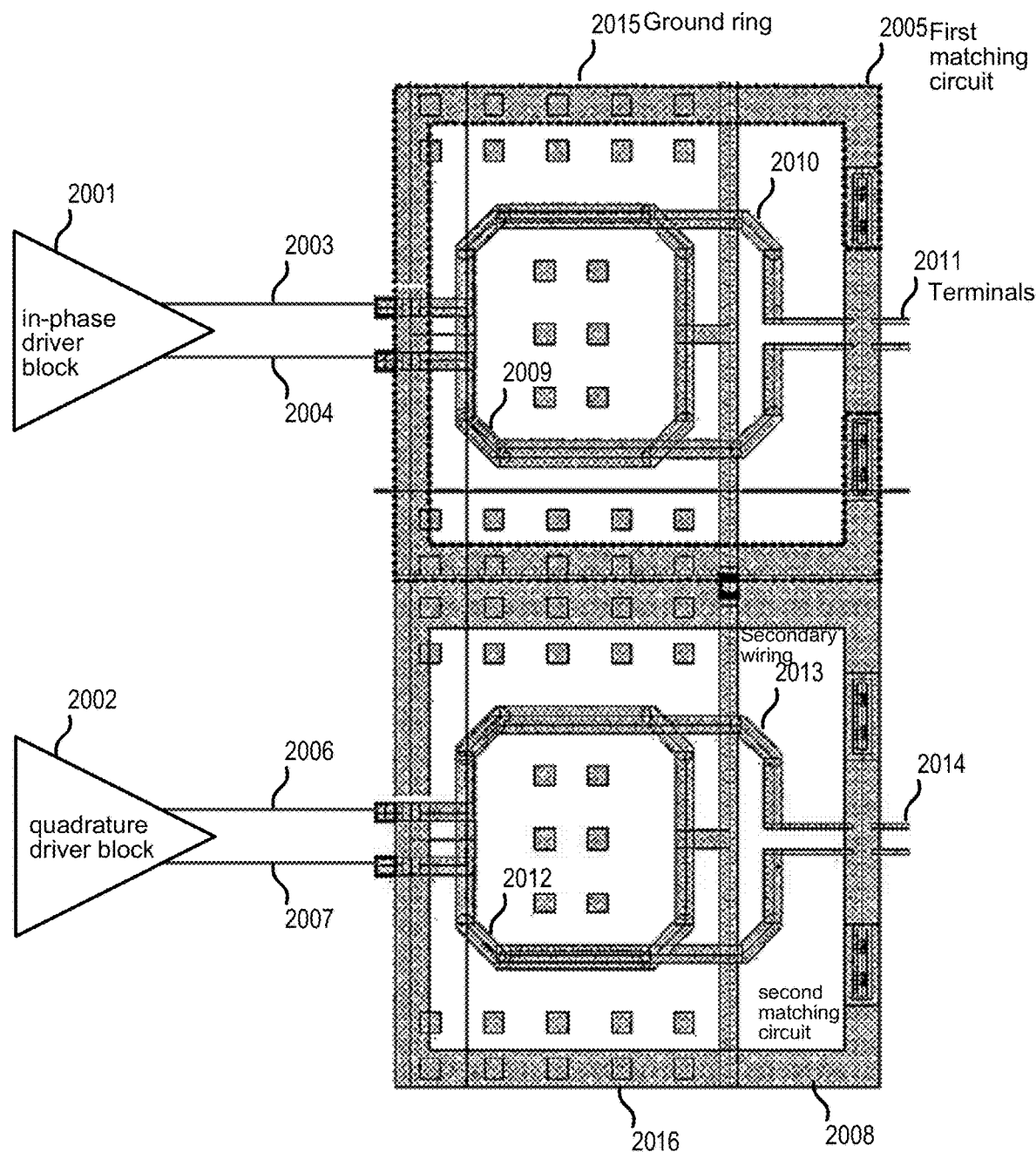
Figure 21:
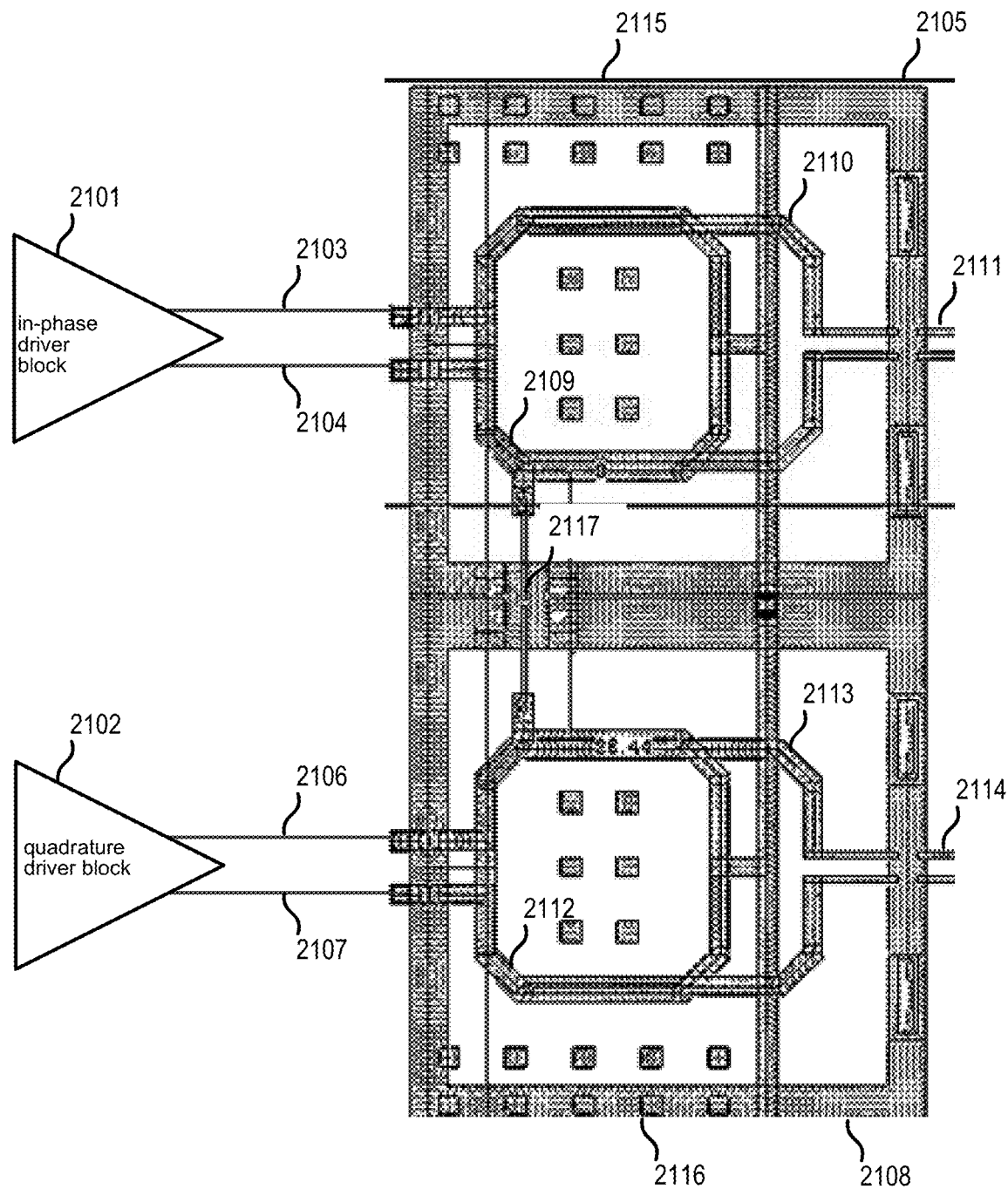
Figure 22:
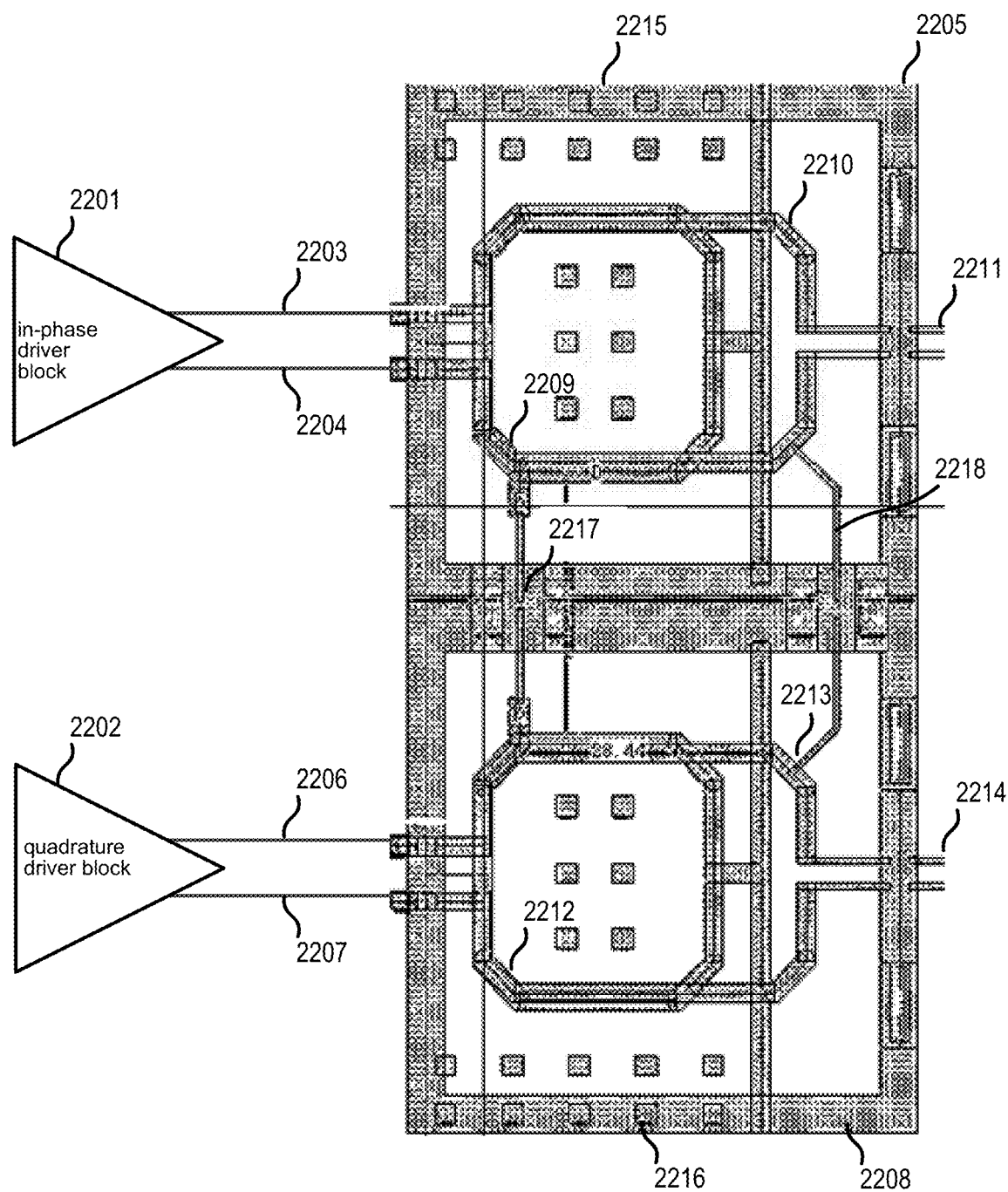
Figure 23:
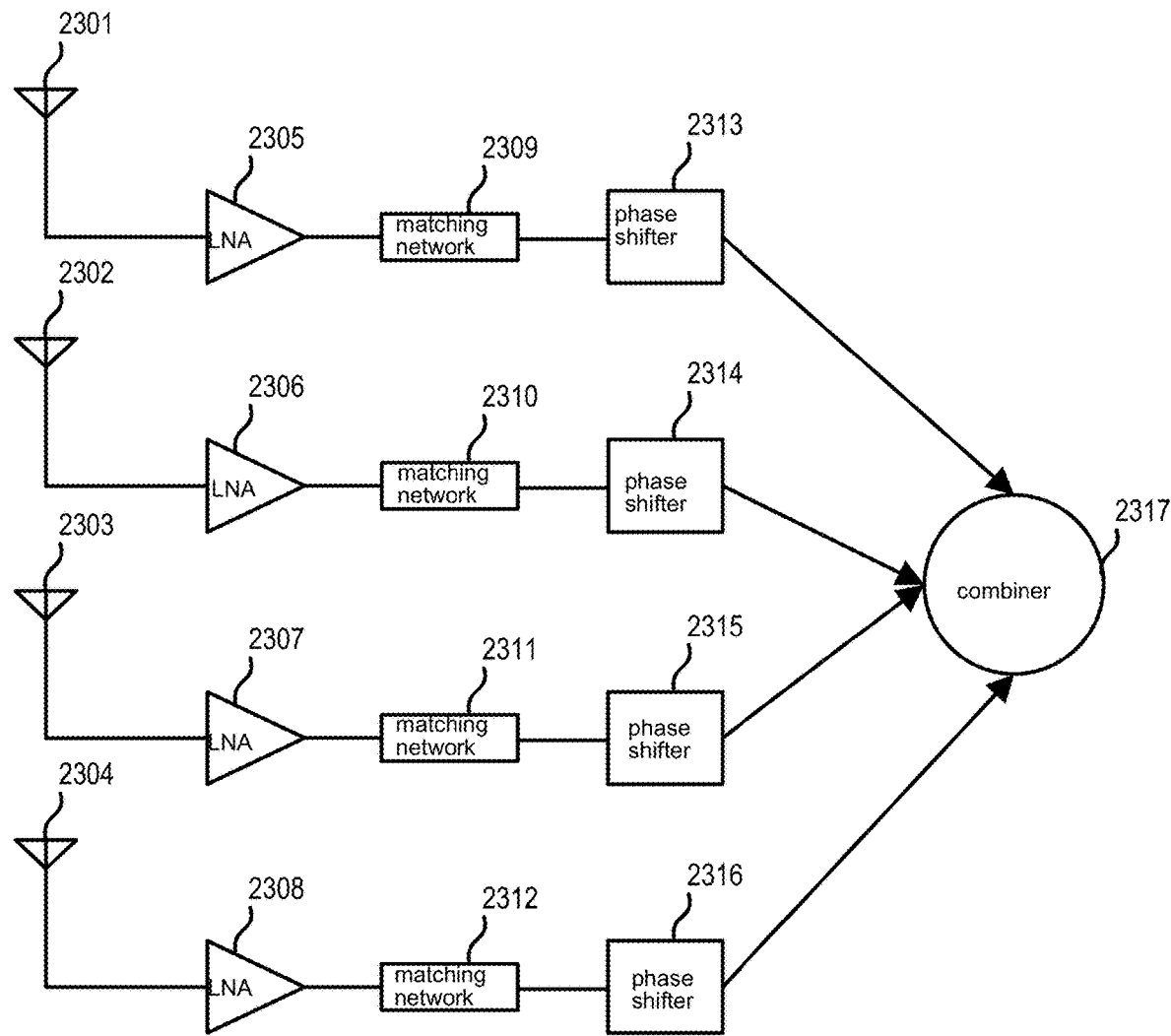
Figure 24:
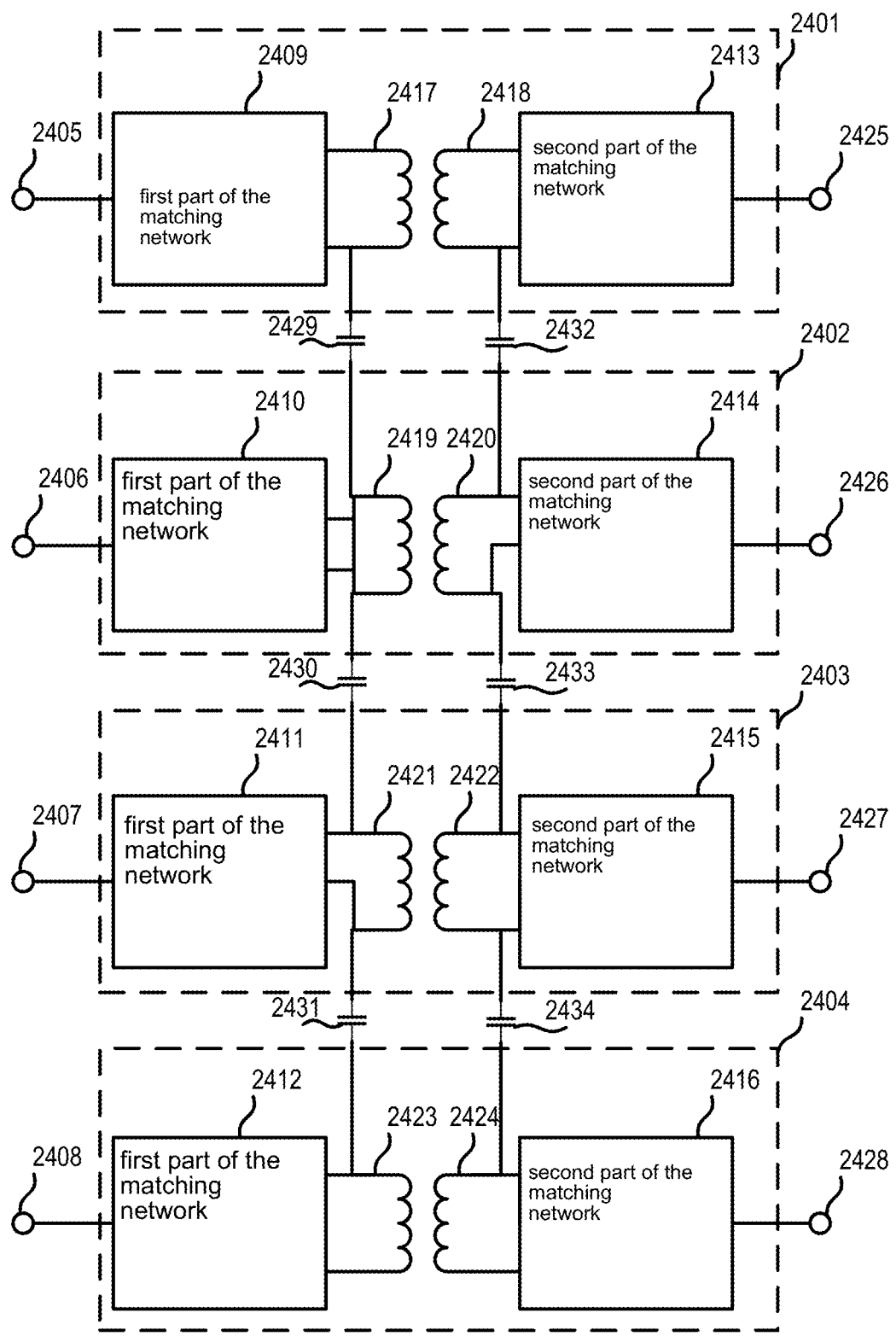
Figure 25:
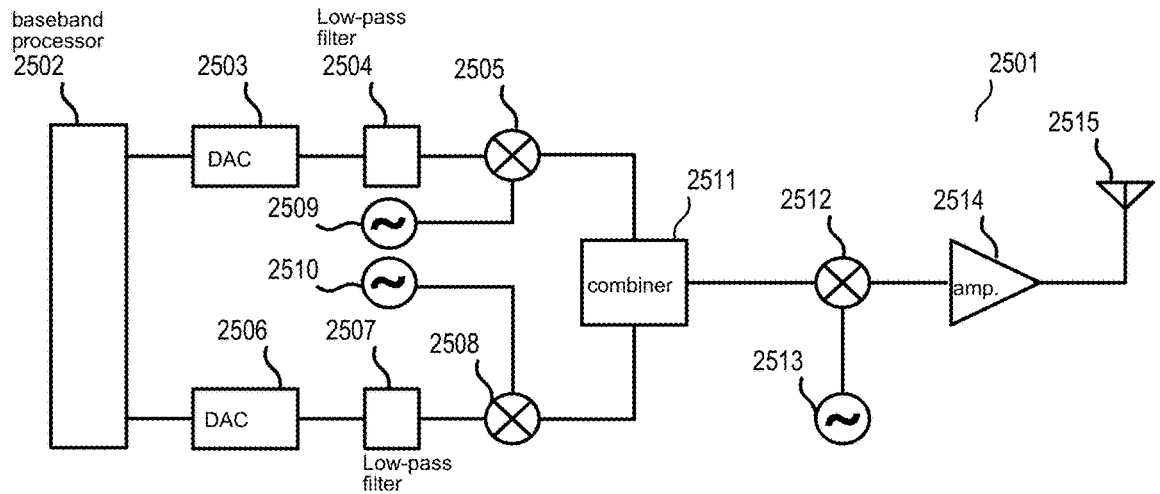
Figure 26:
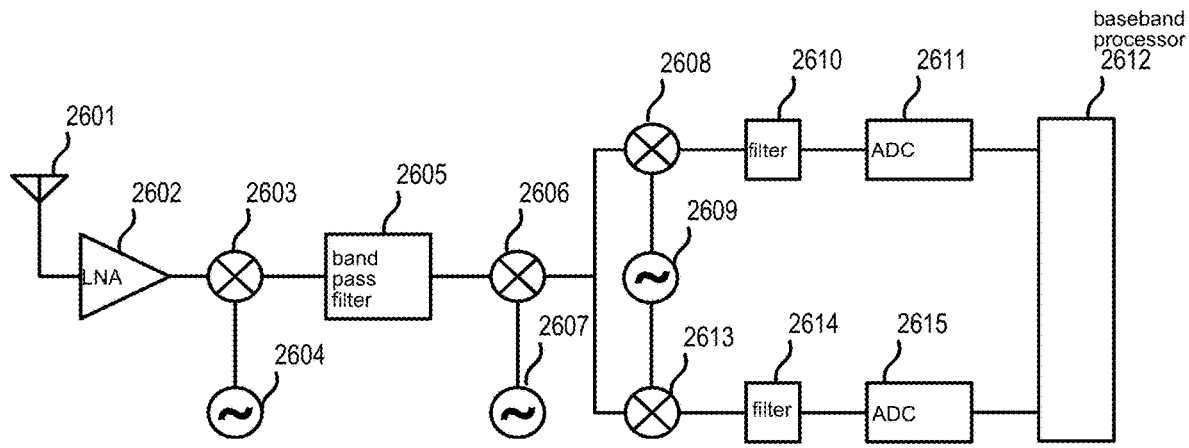
Figure 27:
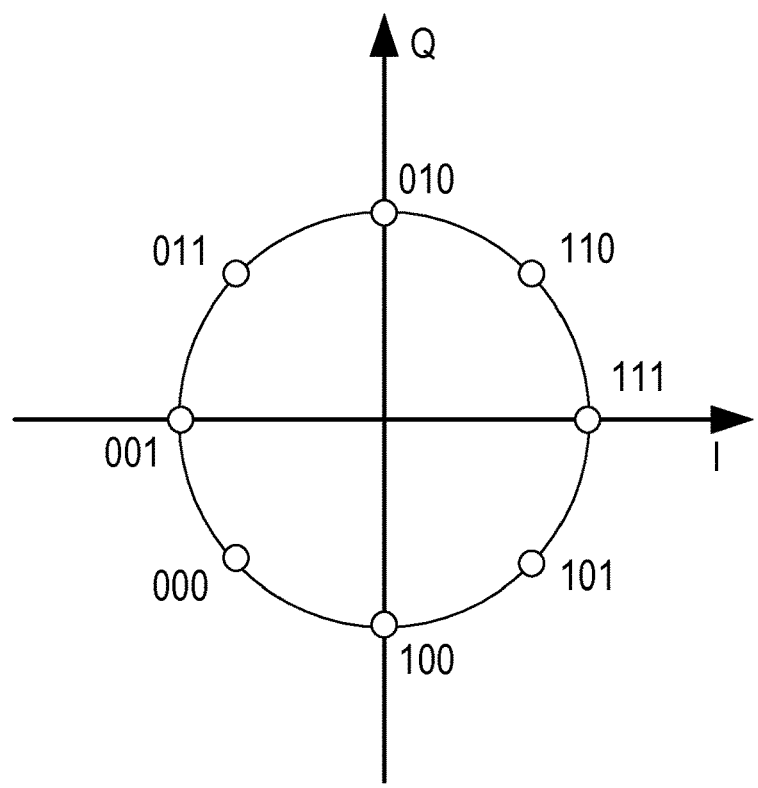
Figure 28:
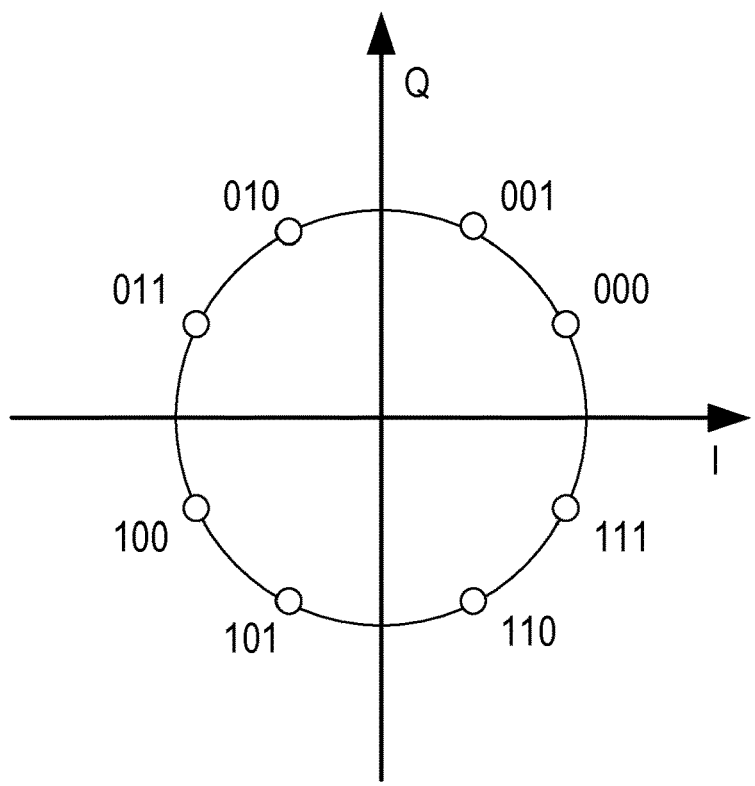
Figure 29:
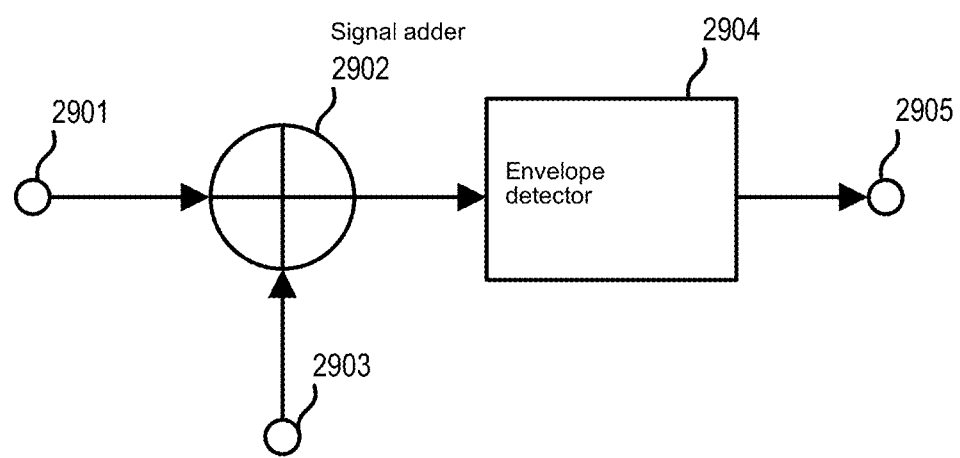
Figure 30:
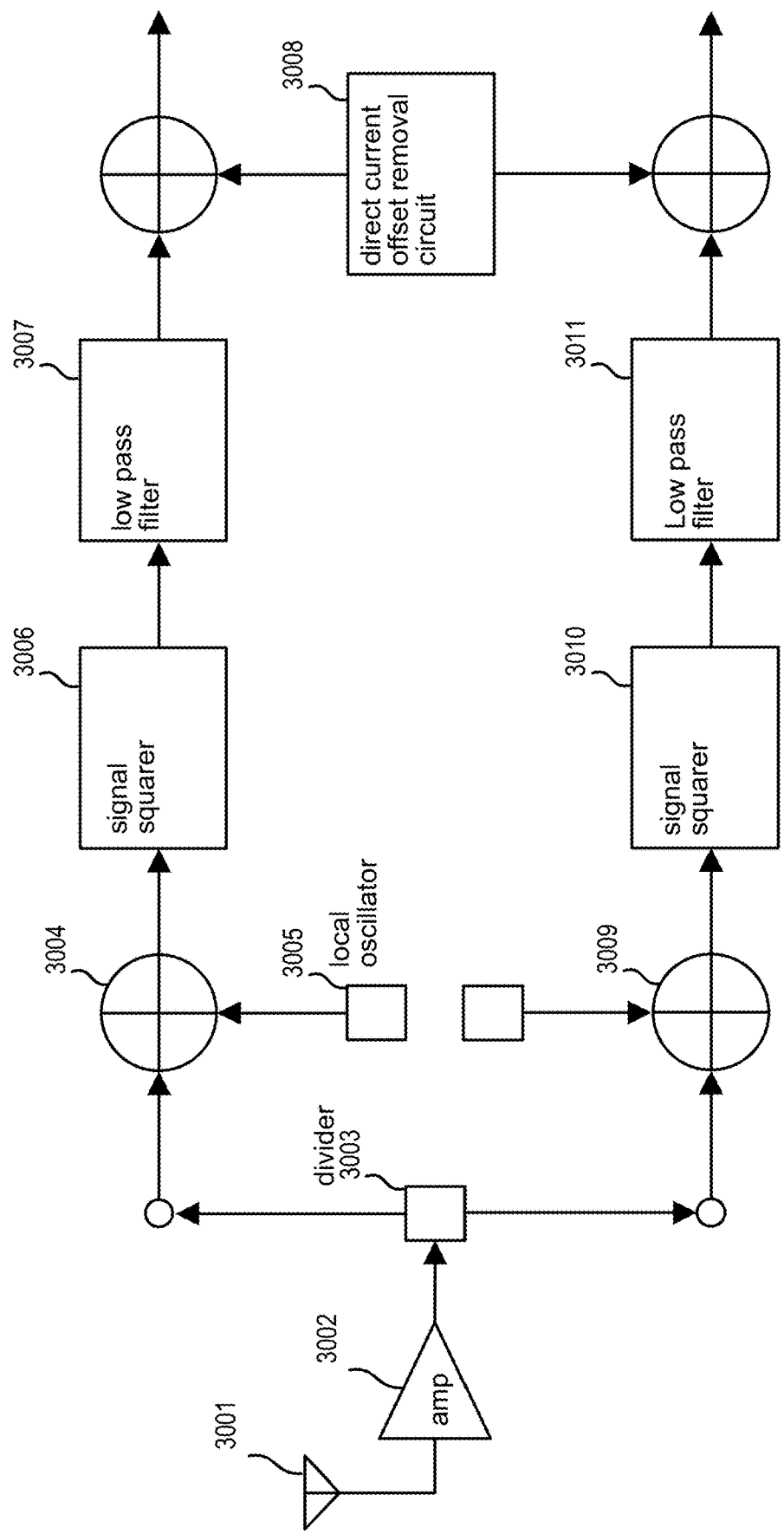
Figure 31:
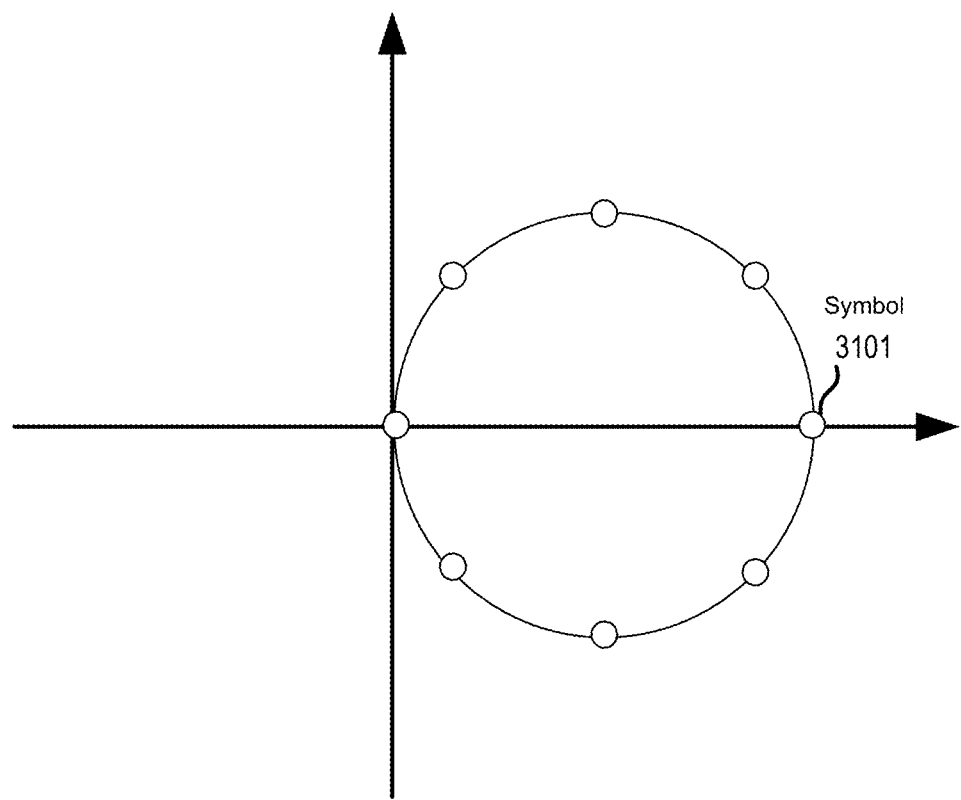
Figure 33:
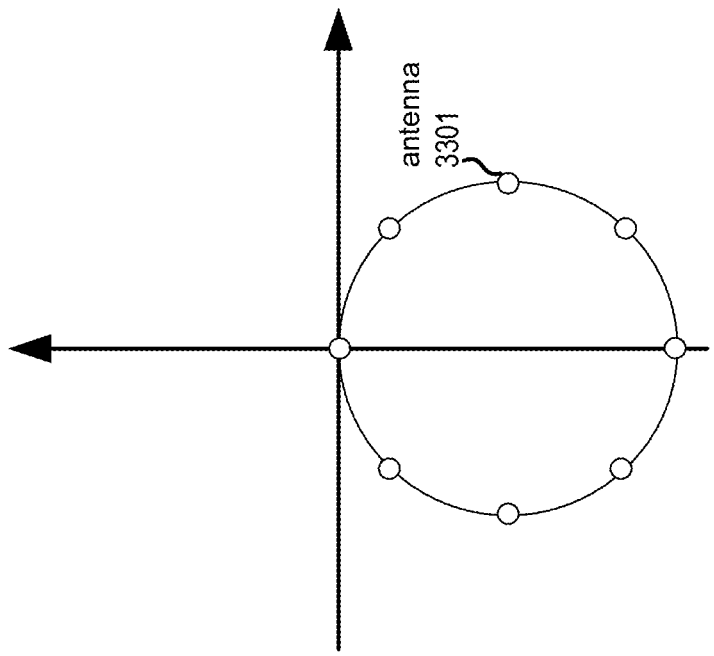
Figure 32:
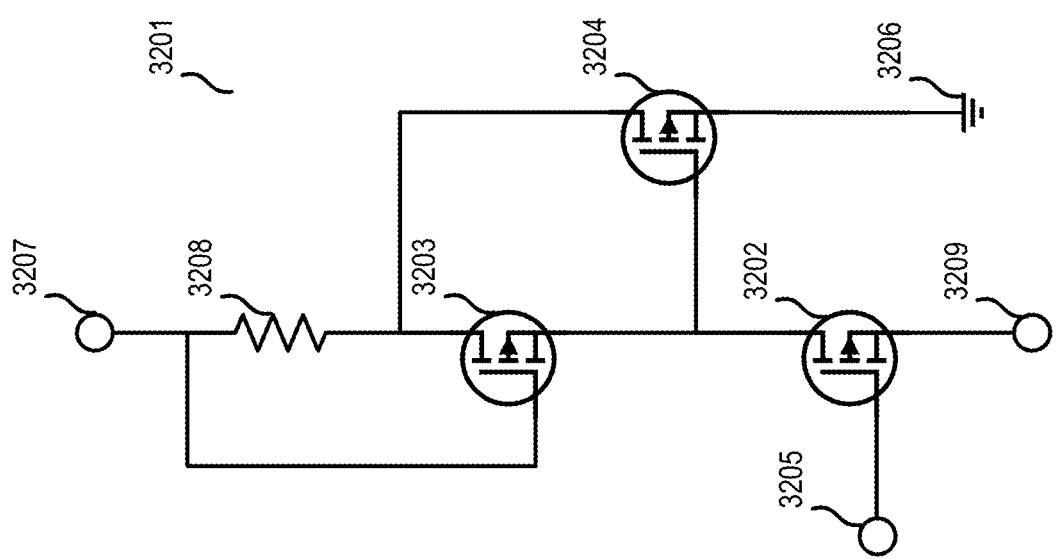
Figure 34:
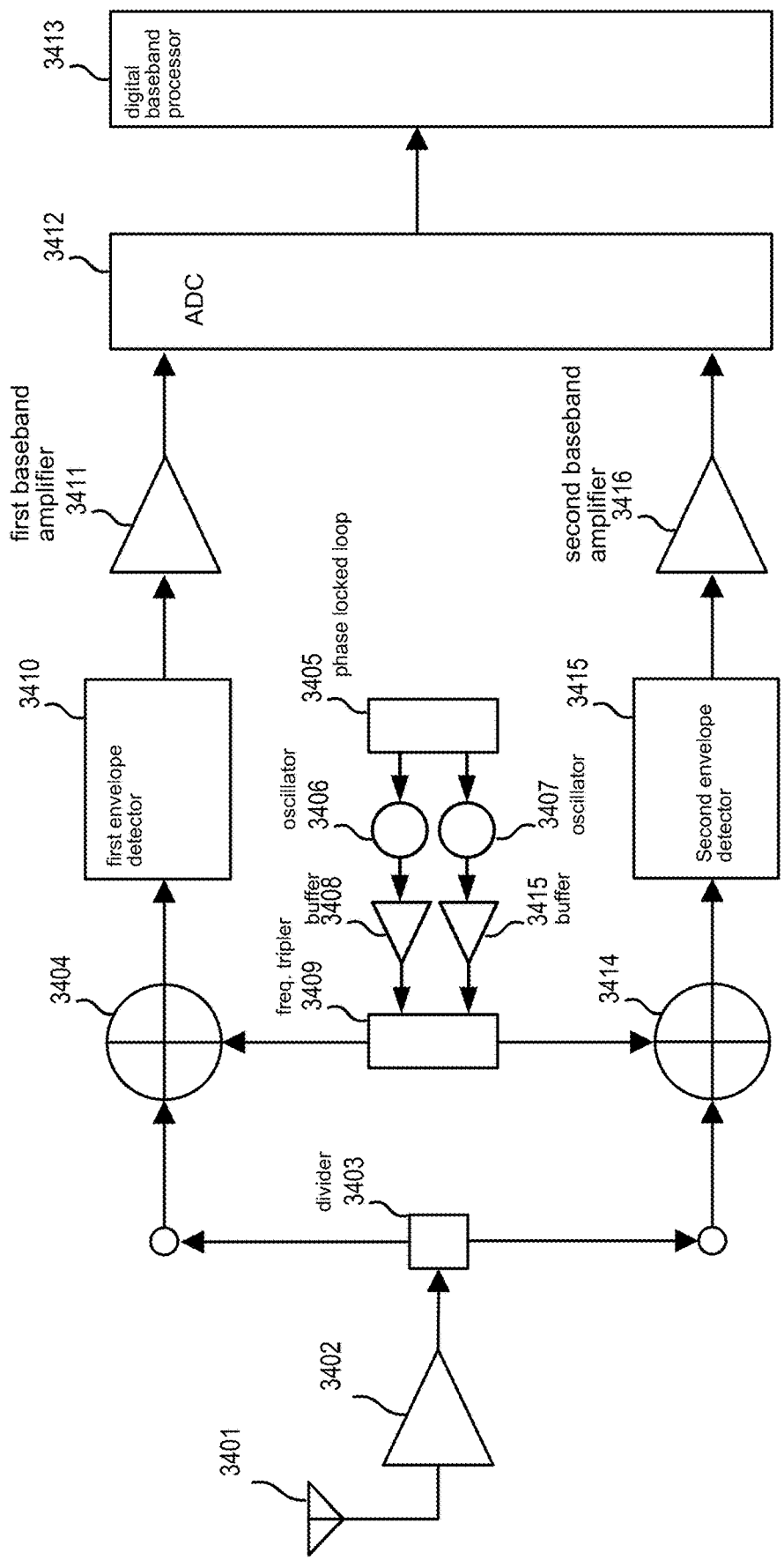
Figure 35:
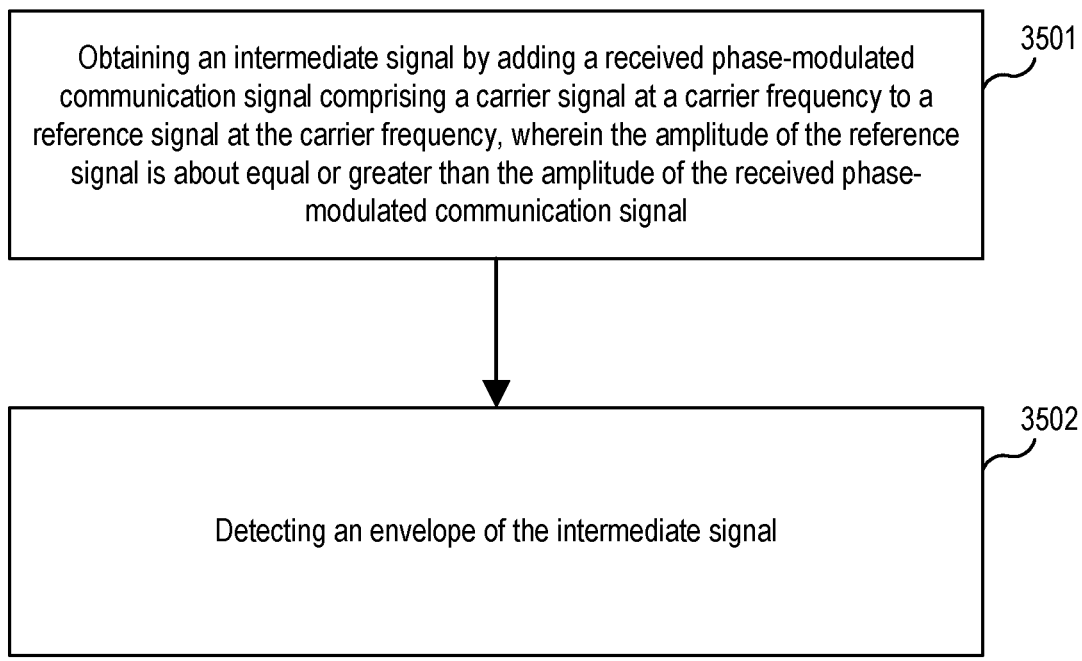
Figure 36:
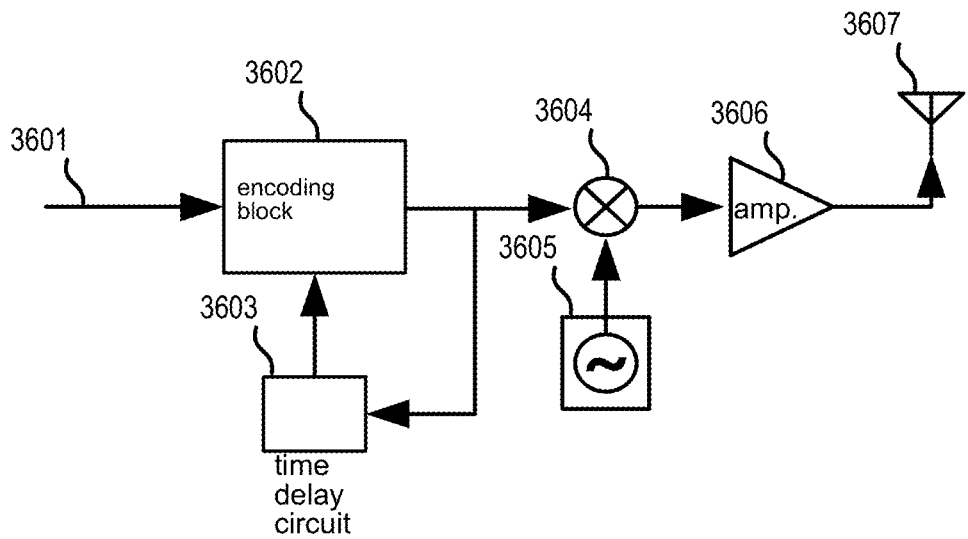
Figure 37:
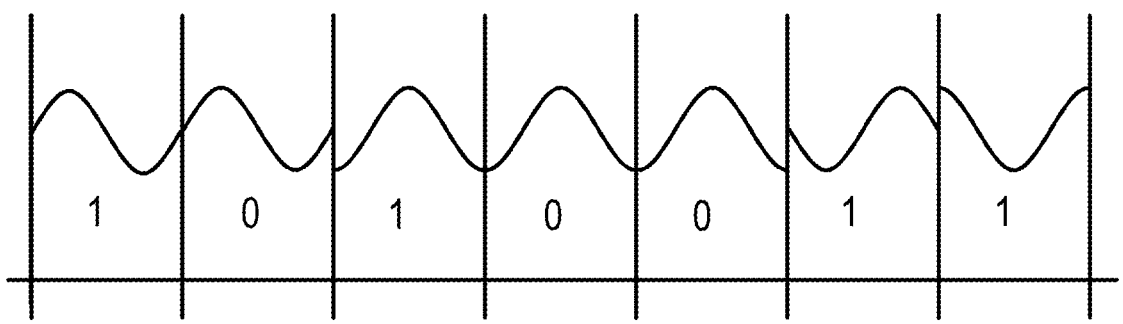
Figure 38:
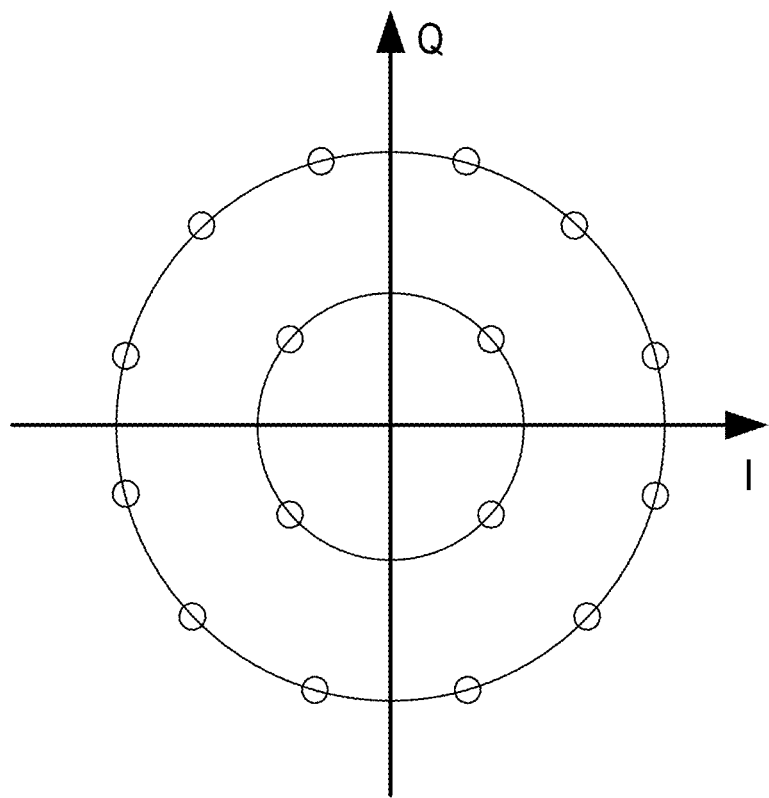
Figure 39:
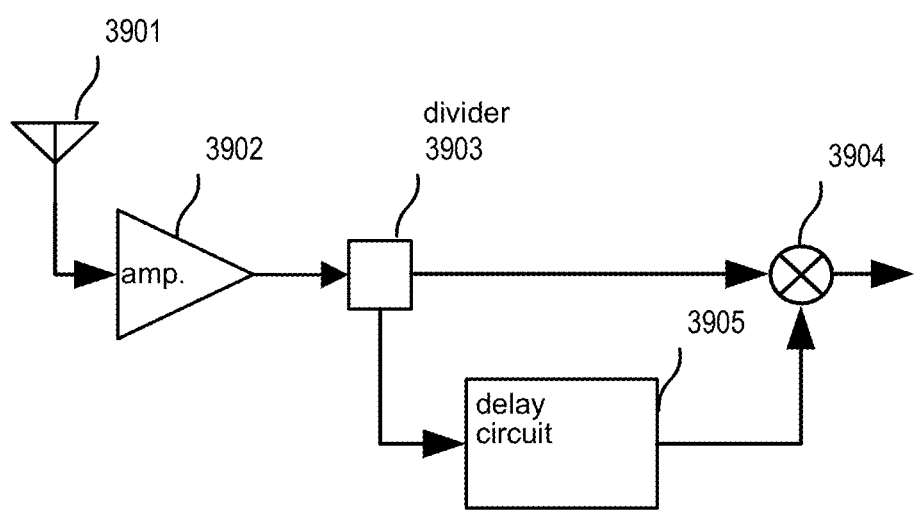
Figure 40:
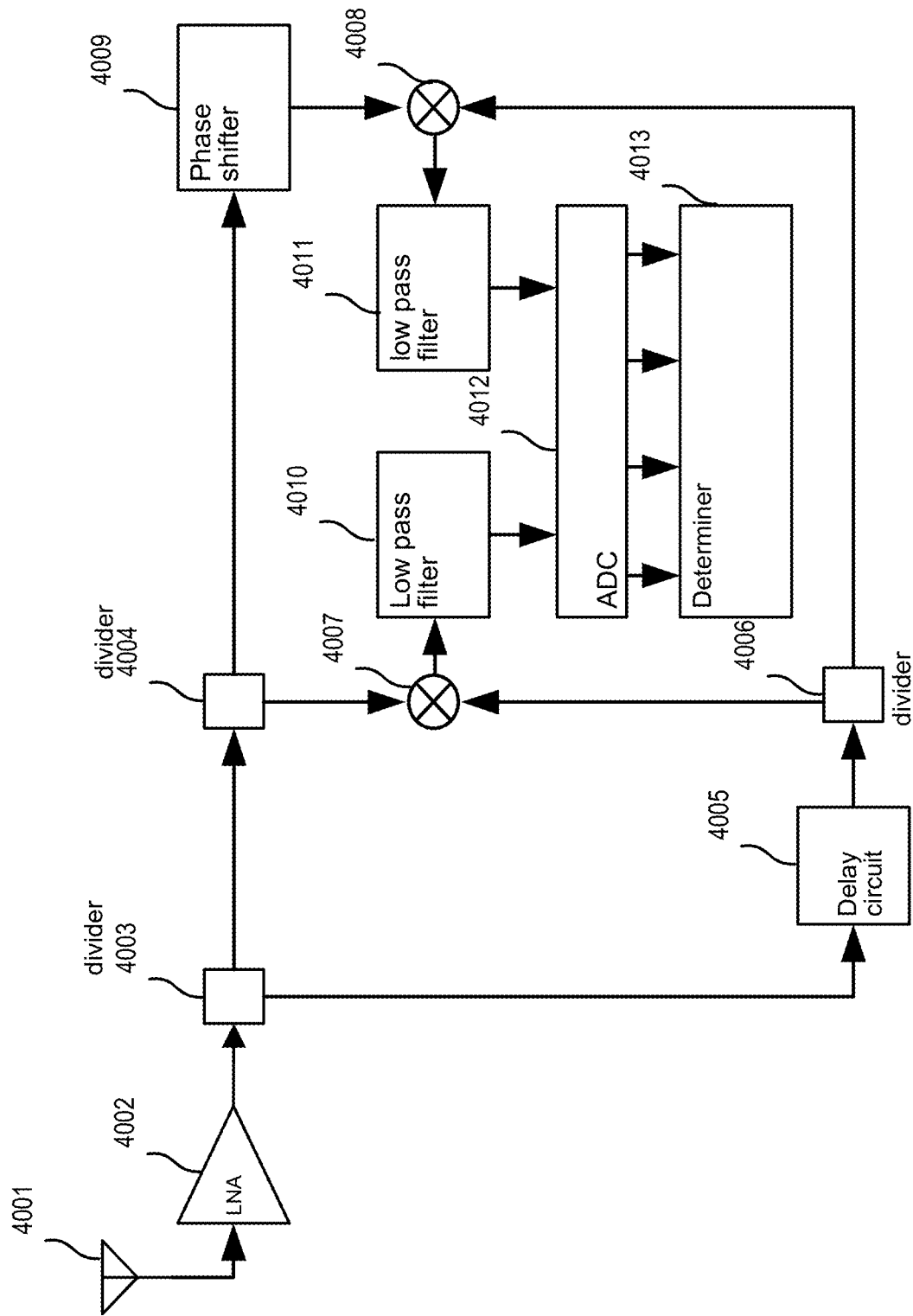
Figure 41:
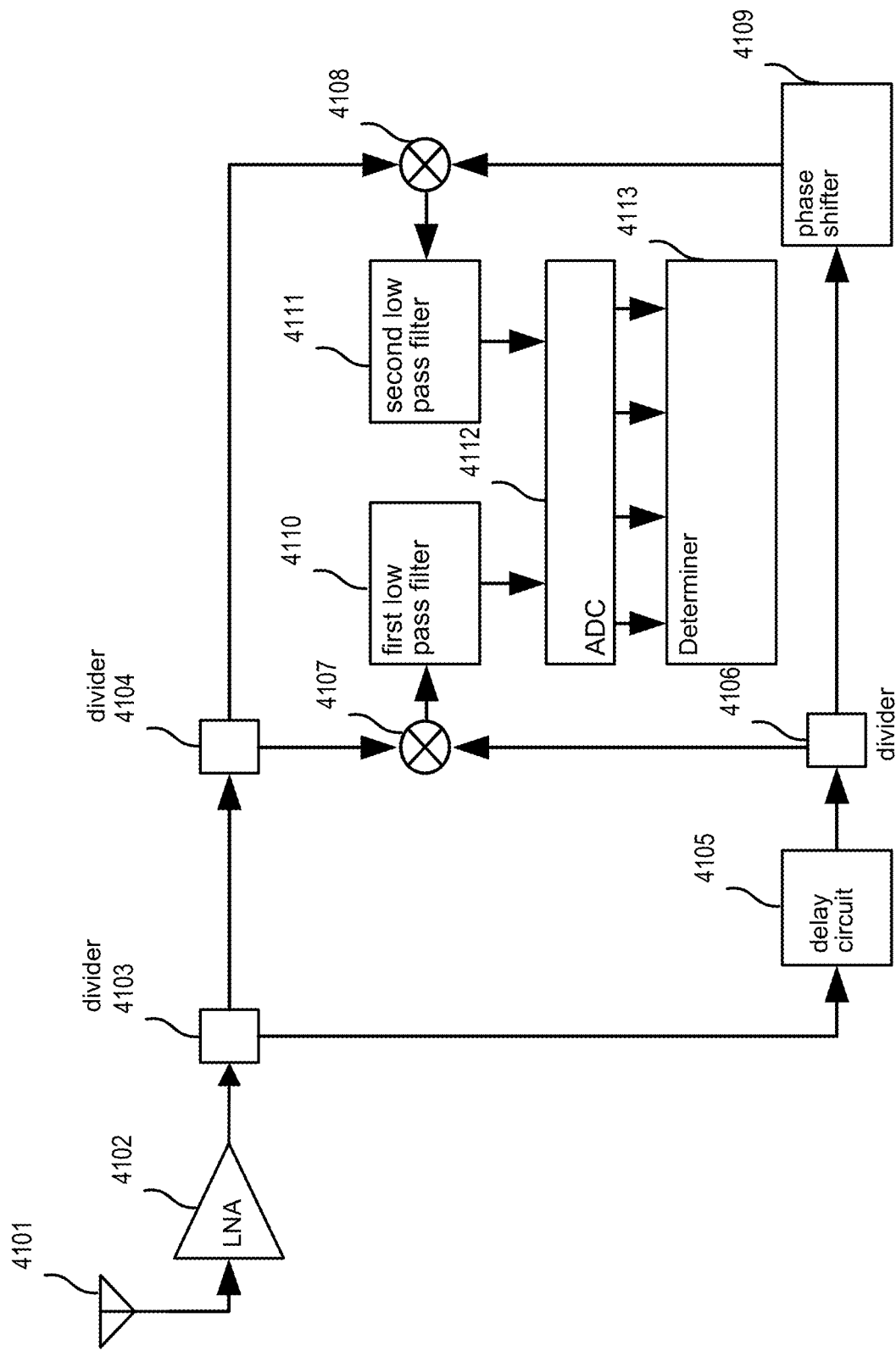
Figure 42:
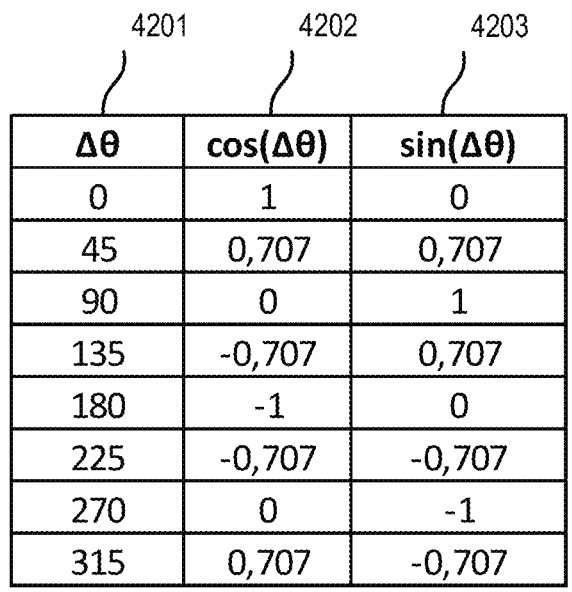
Figure 43:
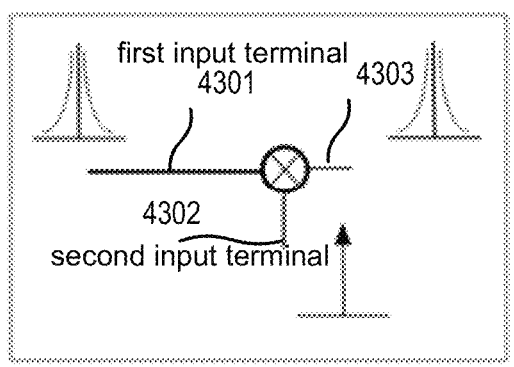
Figure 44:
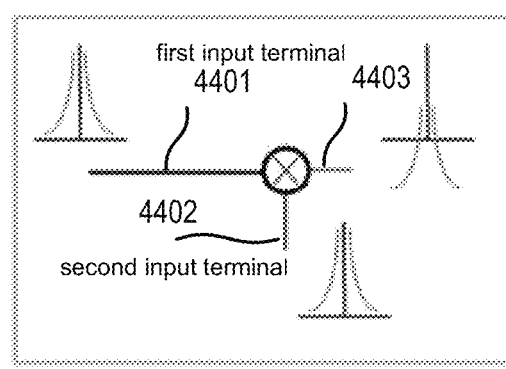
Figure 45:
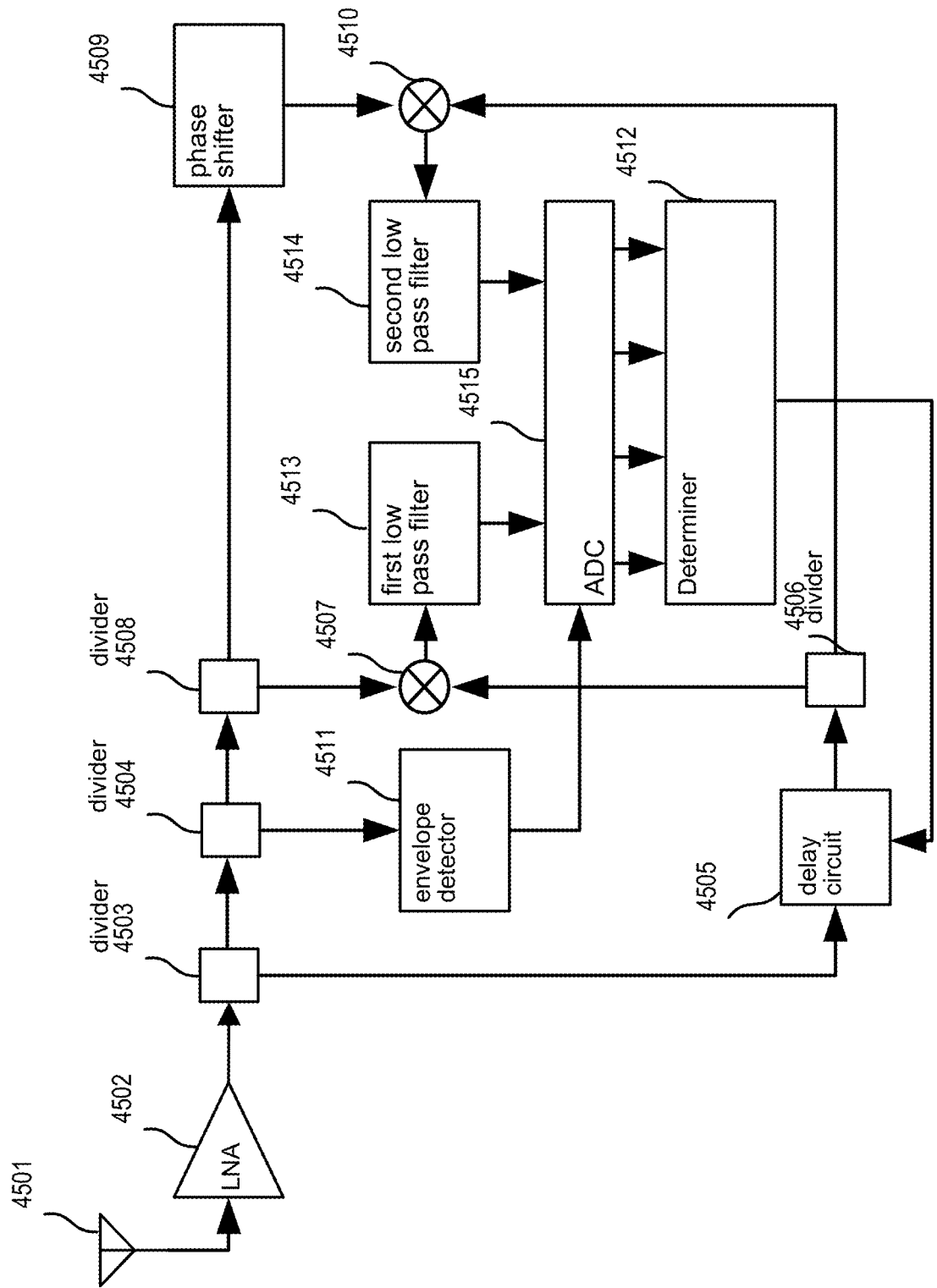

FIG. 10 exemplarily shows schematically a wideband amplifier in accordance with various aspects of this disclosure;

FIG. 11 shows schematically an example of a wideband amplifier in accordance with various aspects of the disclosure, including an amplifier stage and adjustable degeneration components;

FIG. 12 shows schematically an example of an amplifier in accordance with various aspects of this disclosure;

FIG. 13 shows schematically an example of an amplifier in accordance with various aspects in this disclosure;

FIG. 14 exemplarily shows schematically a capacitively neutralized amplifier stage with complex pole peaking;

FIG. 15 shows schematically an example of an amplifier in accordance with various aspects in this disclosure;

FIG. 16 shows schematically an exemplary flow diagram illustration of a method in accordance with various aspects;

FIG. 17 exemplarily shows schematically an aspect of a communication device including transceiver with a local oscillator;

FIG. 18 exemplarily shows a schematic diagram illustrating a local oscillator for I-Q demodulation in accordance with various aspects of this disclosure;

FIG. 19 exemplarily shows schematically a block diagram of a phase-locked loop;

FIG. 20 exemplarily shows schematically an on-chip network implementation for local oscillator signal drivers in accordance with various aspects of this disclosure;

FIG. 21 exemplarily shows schematically an on-chip network implementation for local oscillator signal drivers in accordance with various aspects of this disclosure;

FIG. 22 exemplarily shows schematically an on-chip network implementation for local oscillator signal drivers in accordance with various aspects of this disclosure;

FIG. 23 schematically shows an example of a phased array in accordance with various aspects of this disclosure;

FIG. 24 schematically shows an aspect of the matching networks of a phased array in accordance with various aspects of this disclosure;

FIG. 25 exemplarily shows a transmitting part of a transceiver in accordance with various aspects of this disclosure;

FIG. 26 exemplarily shows a block diagram of a superheterodyne receiver;

FIG. 27 shows schematically an example of a constellation diagram for 8 phase-shift keying (8-PSK) modulation;

FIG. 28 shows schematically another example of a constellation diagram for 8 phase-shift keying (8-PSK) modulation;

FIG. 29 shows schematically an example of a block diagram of a part of a transceiver in accordance with various aspects of this disclosure;

FIG. 30 shows schematically an exemplary receiver in accordance with various aspects of this disclosure;

FIG. 31 shows schematically an example of the representation of a constellation diagram of the amplitude for the output signal of a signal adder in accordance with various aspects of this disclosure;

FIG. 32 shows schematically an example of a signal squarer circuit;

FIG. 33 shows schematically another example of the representation of a constellation diagram of the amplitude for the output signal of a signal adder in accordance with various aspects of this disclosure;

FIG. 34 shows schematically an exemplary receiver in accordance with various aspects of this disclosure;

FIG. 35 shows schematically an example of method steps in accordance with various aspects of this disclosure;

FIG. 36 shows schematically an example of a transmitting part of a transceiver which uses differential phase-shift keying modulation;

FIG. 37 shows schematically an example of a modulated differential binary phase-shift keying signal;

FIG. 38 shows schematically an example of a constellation diagram of 16 amplitude and phase-shift keying (16-APSK) modulation scheme;

FIG. 39 shows schematically an example of a receiving part of a transceiver in accordance with various aspects of this disclosure;

FIG. 40 shows schematically an example of a transceiver in accordance with various aspects of this disclosure;

FIG. 41 shows schematically an example of a transceiver in accordance with various aspects of this disclosure;

FIG. 42 shows exemplarily a look-up table in accordance with various aspects of this disclosure;

FIG. 43 shows schematically an exemplary representation of the spectrum related to the effect of the multiplication of a communication signal including phase noise and a reference signal without a phase noise;

FIG. 44 shows schematically an exemplary representation of the spectrum related to the effect of the multiplication of a communication signal and another communication signal;

FIG. 45 shows schematically an example of a transceiver in accordance with various aspects of this disclosure.

DESCRIPTION

The following detailed description refers to the accompanying drawings that show, by way of illustration, exemplary details and aspects in which aspects of the present disclosure may be practiced.

As demand for data traffic increases, communication devices may require transceivers (e.g., multiple-input multiple-output (MIMO) technology, distributed input/distributed output (DIDO) networks, and/or multi-radio systems) to support wider bandwidths (BW), e.g., a BW of 320 MHz or more, and/or higher-order modulations schemes, e.g., 4 k Quadrature Amplitude Modulation (QAM) or Phase Shift Keying (PSK), reliability, energy efficiency, coverage, and scalability.

However, conventional implementations of the transceiver circuit and antenna and conventional cable connectivity schemes offer limited integration abilities due to cable losses, interference, thermal issues, and power consumption limitations. For example, in current wireless communication devices, such as those devices compliant with Wireless Fidelity (WiFi), Bluetooth (BT), Global System for Mobile Communications (GSM), Code Division Multiple Access (CDMA), Universal Mobile Telecommunications System (UMTS), Long Term Evolution (LTE), or Fifth Generation (5G) or subsequent communication standards, the transceiver circuit may be separate and remote from the antenna.

In general, a transceiver can be considered as a device or circuitry for transmitting or receiving information to other devices or networks through a transmission medium. A transceiver, as a transmitter can convert a digital signal to RF analog signal and amplify the converted signal to a desire power level so that an antenna connected to the transmitter radiates the RF signal. A transceiver as a receiver, can receive an RF signal from the antenna and then amplify the RF signal and further convert it back to a digital signal.

Therefore, a transceiver may be considered as a combination of a receiver and a transmitter in a single package. According to this disclosure, there may be various aspects that may relate to the receiving part of the transceiver, and there may be various aspects that may relate to the transmitting part of the transceiver. A skilled person would be aware that the part of the disclosure which relates to the receiving part of the transceiver may also be implemented by a receiver, or the part of the disclosure which relates to the transmitting part of the transceiver may also be implemented by a transmitter.

Many large scale networks for communication, such as the networks found in large data centers, can be thought of as including both a "data plane" and a "control plane." The data plane is used for communicating data packets between network hosts or between a host in the network and an external gateway (or vice versa), via a set of switches, routers, hubs, etc. (collectively referred to as "switches"). The term data plane is used to describe the physical components, such as hardware, software, and cabling, of the network that provides this functionality (such as forwarding, routing, error checking, etc.) as well as the functionality itself. In contrast, the control plane is used for communications between switches and their respective controllers. Such communications can convey routing and other configuration data, switch software updates, operational instructions (such as start-up, shut down, reset commands, etc.). The term control plane is used to describe the physical network components used for control plane communications, as well as the functionality provided by such communications.

Figure 1:
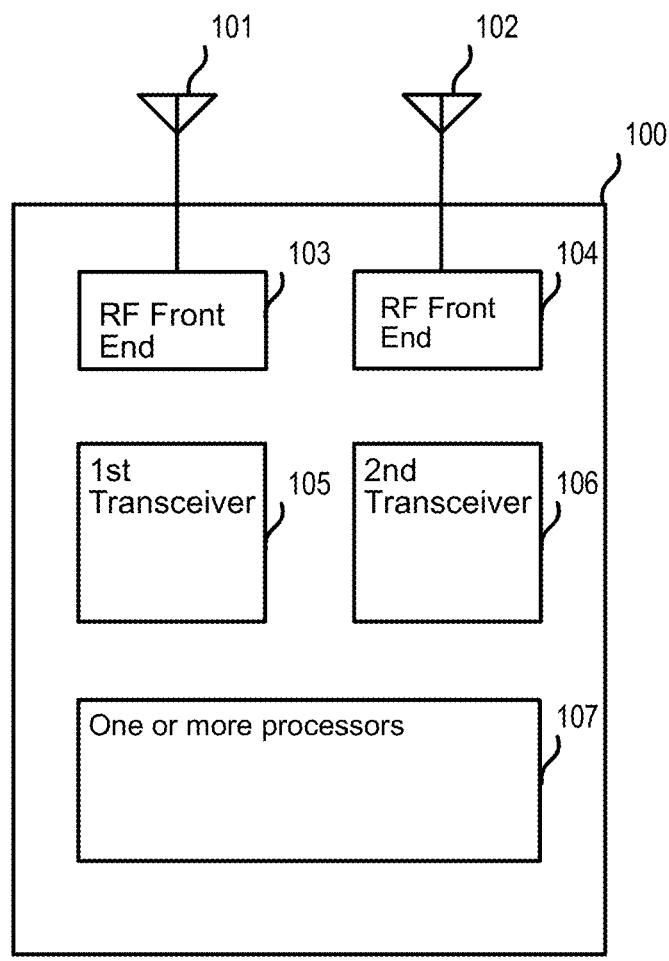

FIG. 1 exemplarily shows schematically a block diagram of a communication device including a transceiver. Referring to FIG. 1, the communication device 100 includes one or more antennas 101, 102 for receiving a wireless communication signal, and one or more RF front end portion 103, 104 for processing a received RF signal. In this example, the first antenna 101 is connected to a first RF front end portion 103, and a second antenna 102 is connected to a second RF front end portion 104. The communication device 100 further includes a first transceiver 105 for transmitting and receiving a signal using the first antenna 101, and a second transceiver 106 for transmitting and receiving a signal using the second antenna 102. The communication device 100 further includes one or more processors 107 for processing.

In an example, the communication device 100 may further include a plurality of separate transceivers for receiving and/or transmitting intermediate signals, that may be connected to the first transceiver 105 and the second transceiver 106. The first transceiver 105 and the second transceiver 106 may bring the received RF signal to an intermediate frequency. In an example, the first antenna 101 and the second antenna 102 may be suitable for the same wireless communication technology, such as 3GPP 5G, 3GPP 6G, IEEE 802.11, IEEE 802.15 working around the same or close frequencies, including an antenna supporting a Multiple Input Multiple Output (MIMO) architectures. In another example, the first antenna 101 and the second antenna 102 may receive different wireless communication technologies. In an example the antennas 101, 102 may include a single antenna for transmission and reception. In another example, antennas 101, 102 may include multiple transmit antennas in the form of a transmit antenna array and multiple receive antennas in the form of a receive antenna array. In other cases, antennas 101, 102 may be one or more antennas to be used as transmit and receive antennas.

A skilled person would appreciate that the transceiver may include an IF module, but an IF module may not be required for every transceiver. It is also possible to convert an RF signal directly to a baseband signal as well. In an example at least one of the portions may include an amplifier. In an example, the communication device 100 may include a plurality of the transceivers, or a plurality of the RF front end portions, a plurality of the IF portions, and/or a plurality of the baseband portions. Further, the skilled person would appreciate that only one module (e.g. a transceiver or transceiver module) may be used to include, for example, the first RF front end portion 103, and the first transceiver 105 as one component. In an example, the first antenna 101 may also be an integrated part of such a transceiver or transceiver module. In another example, such a transceiver or transceiver module may include the second RF front end portion 104, and the second transceiver 106 as well. In another example, the first transceiver 105 and the second transceiver 106 may be the integrated part of a module.

The communication device 100 may be any type of hardware that is capable of transmitting or receiving information, such as a mobile communication device, a wireless network interface card which may be connected to another device, a chip, or an integrated circuit (IC) which may transmit or receive information using radio frequency (RF) signal utilizing a chip-to-chip communication. The chip-to-chip (C2C) communication may use a Mobile Industry Processor Interface MIPI Alliance standard, a device using any telecommunication standard such as 3GPP 5G, 3GPP 6G, any generation of IEEE 802.11, IEEE 802.15, or any device in automotive contexts, including for self-driving cars and vehicle networks (e.g., vehicle-to-anything—V2X). It would also be appreciated by a skilled person that the communication device 100 may include reception elements other than the antennas, or even instead of antennas to be used with a transceiver, such as a wire input, a coaxial cable input, a fiber optic cable input, or a waveguide input.

As the working frequency range and the operating bandwidth parallel to the working frequency range over the electromagnetic spectrum for providing communication increase, the complexity of a communication device may increase, and the energy efficiency of a communication device may decrease. The use of traditional receivers, transmitters, and/or transceivers may present increased complexity, spectral inefficiency, and/or increased power consumption For example, incompatible usage of an amplifier in a transceiver may result in reduced gain over one unit of power. Similarly, such an amplifier may not be able to use the electromagnetic spectrum very well, which may increase the complexity of the transceiver, and/or reduce the energy efficiency. Such an amplifier may also add amplification noise, which may increase the bit error rate and the error vector magnitude.

For example, the linearity of an amplifier may become an issue when processing the analog communication signal, as the bandwidth of the signal may increase with increased frequency of the carrier signal proportionally.

For example, the frequency response of an amplifier in general may become an issue when processing the analog communication signal, because the increased bandwidth may require the amplifier to provide a stable response all over the processed bandwidth.

For example, due to the increased frequency of the signals which flow in the circuits of the transceiver, the magnetic coupling may increase.

For example, the decreasing trend with respect to the form factor of the transceivers, and applications such as chip-to-chip communication may require the circuit paths which carry high-frequency signals, or the inductive elements which conduct the high-frequency signals may cause further magnetic coupling.

For example, radio frequency mixers which are commonly used to down-convert a received communication signal may also cause linearity issues considering the increased bandwidth of the received communication signal.

For example, radio frequency mixers which are used in a receiver may increase the power consumption of a transceiver due to their starvation.

For example, radio frequency mixers may require relatively high local oscillator power which generates the reference signal for the radio frequency mixers to demodulate the received communication signal.

For example, the local oscillators themselves may also increase the power consumption of a transceiver due to the need to generate a high-frequency signals, especially for the down-conversion of the communication signals over GHz levels.

For example, the local oscillators may also introduce magnetic coupling issues in the transceiver considering their tasks related to demodulate the communication signals which may be at various frequency bands.

Figure 2:
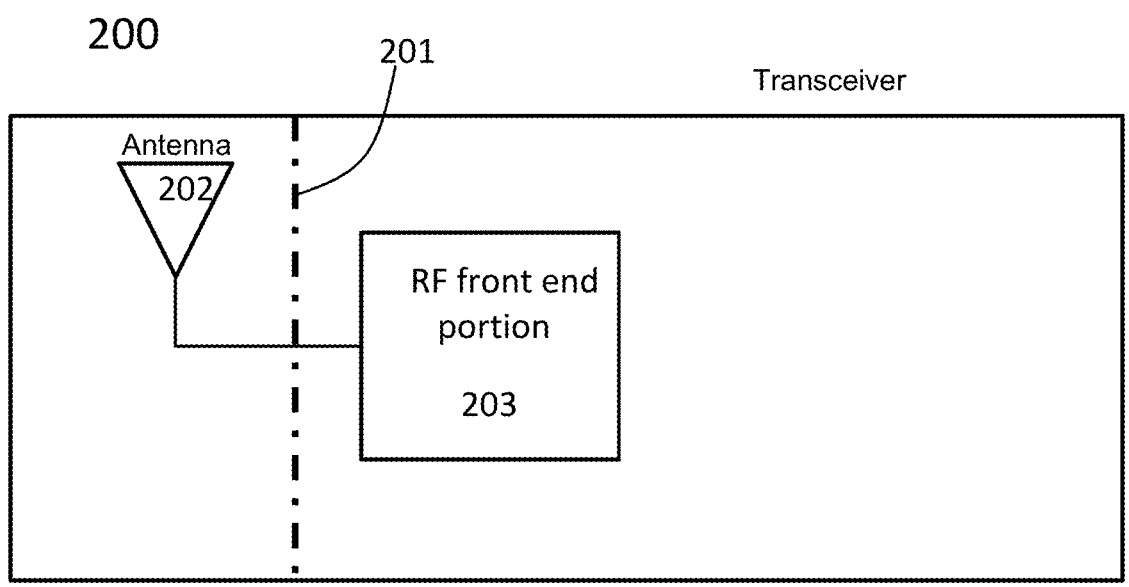

FIG. 2 exemplarily illustrates schematically a block diagram of a transceiver 200 in accordance with various aspects of the present disclosure. The transceiver 200 of FIG. 2 includes an RF front end portion, among other things incorporated into a compact design. The dashed line 201 indicates that an antenna 202 may be connected or part of the transceiver 200 by a connection means, such as a detachable connector. In other cases, the antenna may be integrated within the transceiver 200 by other means. The transceiver 200 may be used with any type of hardware that is capable of transmitting or receiving information, such as a mobile communication device, a wireless network interface card which may be connected to another device, a chip or an integrated circuit (IC) which may transmit or receive information by an RF signal utilizing a chip-to-chip communication, a device using any telecommunication standard such as 5G, any generation of IEEE 802.11, IEEE 802.15, IEE802.16 or any device in automotive contexts, including for self-driving cars and vehicle networks (e.g., V2X). The transceiver 200 may include an RF front end portion 203.

Figure 3:
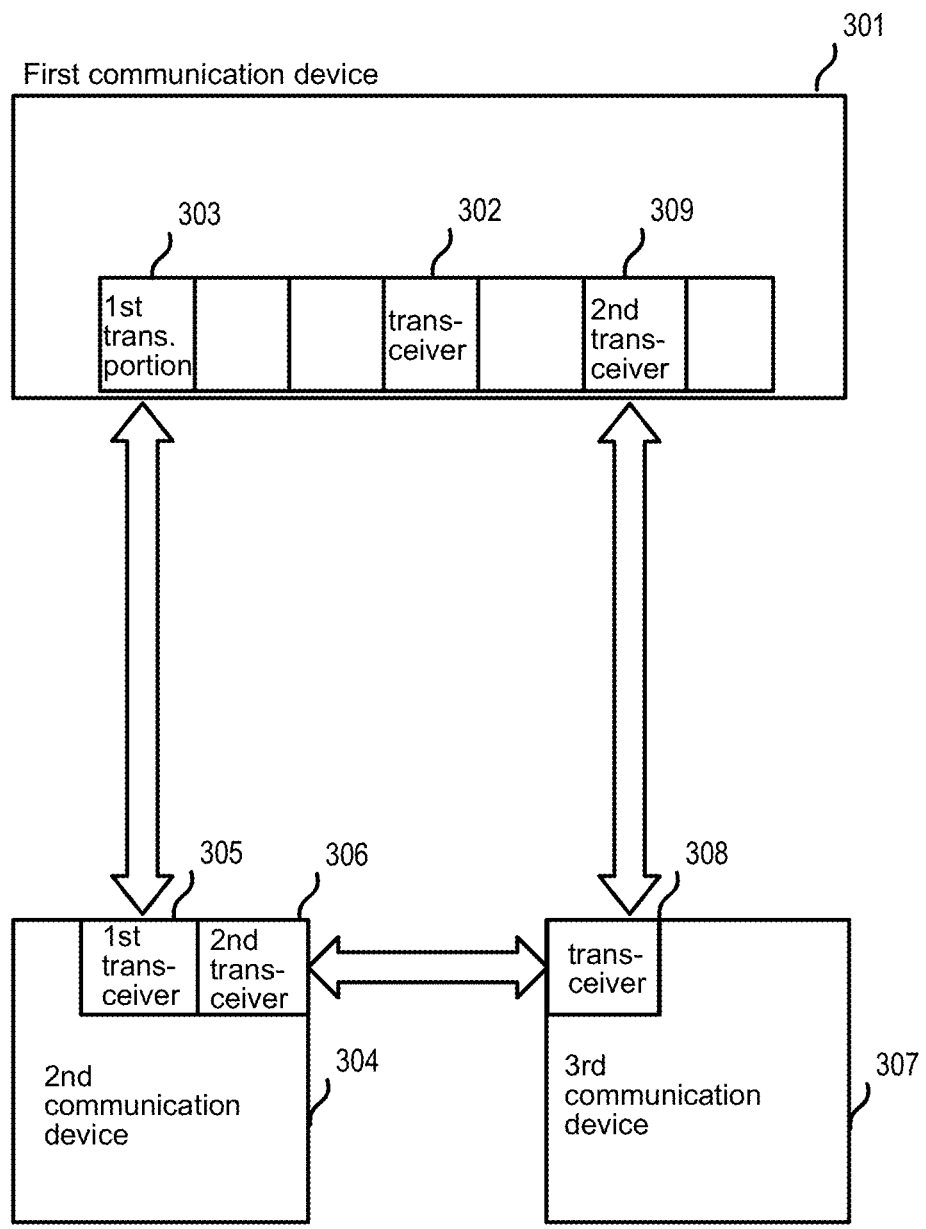

FIG. 3 shows schematically an exemplary illustration of a plurality of communication devices that may communicate with each other. A first communication device 301 includes a transceiver, or a transceiver module, 302 which may transmit and receive multiple signals at the same time. In an example, the transceiver module 302 may connect to an antenna, or a plurality of antennas for providing radio communication. In another example, the transceiver 302 may be used for wired communication. In an example, the transceiver 302 includes a first transceiver portion 303 for transmitting and receiving communication signals to/from another communication device. In this example, the first transceiver portion 303 communicates with a second communication device 304. The second communication device 304 may include separate transceivers.

The second communication device 304 includes a first transceiver 305 which may transmit and receive signals to/from the first communication device 301. The second communication device 304 may include a second transceiver 306. The second transceiver 306 of the second communication device 304 may also communicate the first communication device 301 to increase the bit rate. In this example, the second transceiver 306 of the second communication device 304 communicates with a third communication device 307. The third communication device 307 may include a transceiver 308. The transceiver 308 of the third communication device 307 may transmit and send signals to/from the second communication device 304.

Furthermore, the third communication device 307 may also communicate with a second transceiver 309 of the first communication device 301. In this aspect, the transceiver 308 of the third communication device 307 may communicate with the second communication device 304 and the first communication device 301 at the same time. In an alternative example, the transceiver 308 of the third communication device 307 may communicate with the second communication device 304 and the first communication device 301 in turns.

Figure 4:
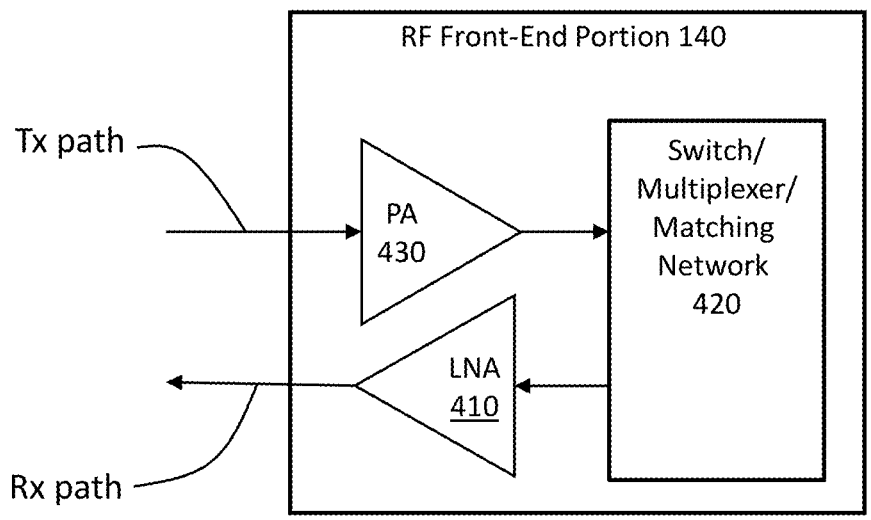

FIG. 4 exemplarily shows schematically an RF front end portion 203 that may be implemented in a transceiver. A receive signal path (Rx path) of the RF front end 203 of FIG. 4 includes an LNA (low noise amplifier) 410 for amplifying received RF signals and provides the amplified received RF signals as an output. A transmit signal path (Tx path) of the RF front end 203 of FIG. 4 includes a PA (power amplifier) 430 for amplifying input RF signals. One or more filters may be included for generating suitable RF signals for transmission and reception. In addition, the RF front ends 140 of FIG. 4 may include other components 420 or circuit, such as, for example, a tuner or matching network, switches, multiplexers, and/or other circuits for coupling the RF front end 203 to the antenna 130. In addition, other components may be included to support both transmit and receive modes.

The RF front end 203 may include a millimeter-wave and/or one or more sub-millimeter wave radio frequency integrated circuits (RFICs). In some implementations, the one or more sub-millimeter wave RFICs may be physically separated from the millimeter-wave RFICs.

Figure 5:
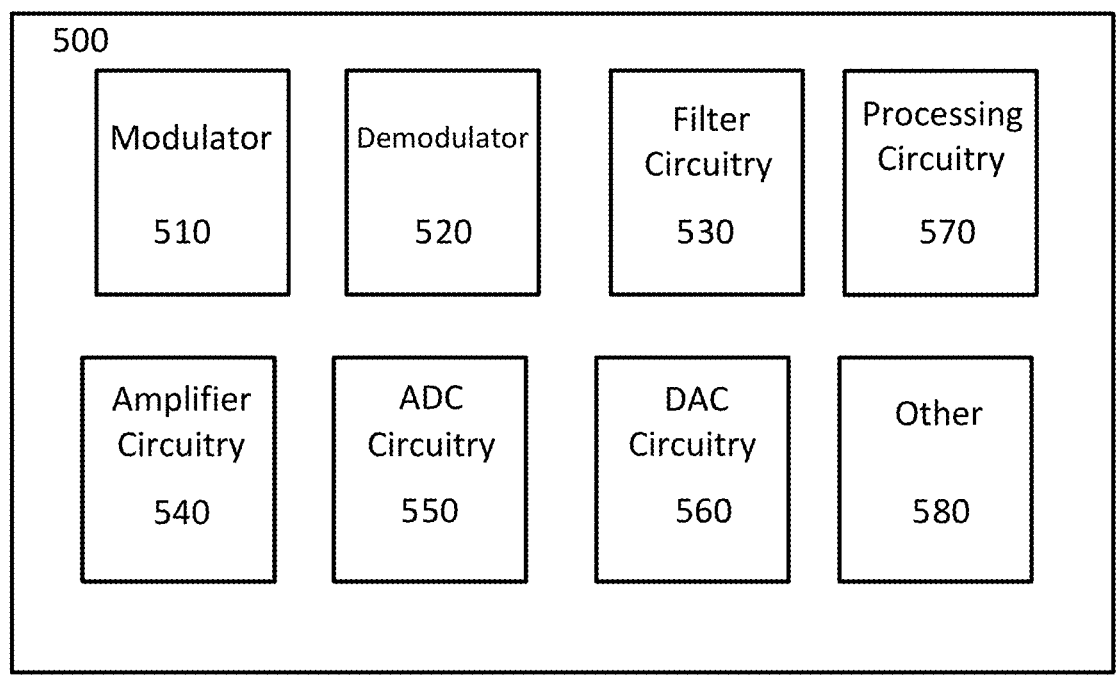

FIG. 5 shows exemplarily a block diagram of a transceiver in accordance with various aspects of this disclosure apart from an RF front end. As shown, the transceiver 500 can include components such as a modulator 510, demodulator 520 (e.g., local oscillator), filter circuit 530 (e.g., baseband filter), amplifier circuit 540, analog-to-digital converter (ADC) circuit 550, digital-to-analog (DAC) circuit 560, processing circuit 570, and other suitable digital front end (DFE) components 580, to name a few. The processing circuit 570 may include a processor, such as a time-domain and/or frequency domain processor(s)/components in at least one example.

The other components 580 may include logic components, further modulation/demodulation elements, and an interface circuit for interfacing with another component, e.g., an SoC, or a modem. In at least one example, such an interface may be a digital interface, such as, e.g., a Common Public Radio Interface (CPRI). In an example, the other components 580 may include one or more processors.

DFE (digital front end) components may include any suitable number and/or type of components configured to perform functions known to be associated with digital front ends. This may include a digital processing circuit, portions of processing circuitry, one or more portions of an on-board chip having dedicated digital front end functionality (e.g., a digital signal processor), etc. The DFE components may selectively perform specific functions based upon the operating mode of the transceiver 500 and, for example, may facilitate beamforming. Digital front end components may also include other components associated with data transmission such as, for instance, transmitter impairment correction such as LO correction, DC offset correction, IQ imbalance correction, and ADC skew, digital pre-distortion (DPD) calculation, correction factor (CF) calculation, and pre-emphasis (pre. emp.) calculation. To provide additional examples, the digital front end components may facilitate or perform receiver or transmitter digital gain control (DGC), up-sampling, down-sampling, zero crossing detection algorithms, phase modulation, perform beam management, digital blocker cancellation, received signal strength indicator (RSSI) measurements, DPD and calibration accelerators, test signal generation, etc.

In at least one example, the transceiver 500 may include a receive signal path which may include demodulator 520, amplifier circuit 540, and filter circuit 530. In some aspects, the transmit signal path of the transceiver 500 may include filter circuit 530 and modulator 510. In an example, the transceiver 500 may also include a synthesizer circuit for synthesizing a frequency signal for use by a mixer circuit in the demodulator 520 of the receive signal path, and the synthesizer circuit and the mixer circuit may also be included by the modulator 510 in the transmit signal path. In some aspects, the demodulator 520 of the receive signal path may be configured to down-convert RF signals received from the RF front end 203 based on the synthesized frequency provided by the synthesizer circuit. In some aspects, the modulator 510 of the transmit signal path may be configured to up-convert RF signals received from the filter circuit 530, or the processing circuit 570. In some aspects, the output baseband signals and the input baseband signals may be digital baseband signals. In such aspects, the transceiver 500 may include analog-to-digital converter (ADC) 550 and digital-to-analog converter (DAC) circuit 560.

In at least one example, the transceiver 500 may also include a transmit signal path (Tx path) which may include a circuit to up-convert baseband signals provided by one or more processors and provide RF output signals to the RF front end 203 for transmission. In some aspects, the receive signal path of the transceiver 500 may include demodulator 520, amplifier circuit 540, and filter circuit 530. In some aspects, the transmit signal path of the transceiver 500 may include filter circuit 530 and modulator 510. The transceiver 500 may include a synthesizer circuit for synthesizing a frequency signal for use by the demodulator 520 of the receive signal path and the modulator 510 of the transmit signal path. The demodulator 520 of the receive signal path may be configured to down-convert RF signals received from the RF front end 203 based on the synthesized frequency provided by the synthesizer circuit.

In various aspects, amplifier circuit 540 may be configured to amplify the down-converted signals and filter circuit may be a low-pass filter (LPF) or band-pass filter (BPF) configured to remove unwanted signals from the down-converted signals to generate output baseband signals. Output baseband signals may be provided to another component, e.g., a modem, one or more processors which may be coupled to the transceiver 500, or the processing circuit 570 including one or more processors for further processing. In some aspects, the output baseband signals may be zero-frequency baseband signals, although this is not a requirement.

The demodulator 520 for a receive signal path may include passive mixers, although the scope of this disclosure is not limited in this respect. In some aspects, the modulator 510 for a transmit signal path may be configured to up-convert input baseband signals based on the synthesized frequency provided by the synthesizer circuit to generate RF output signals for the RF front end 203. A modem, one or more processors that may be coupled to the transceiver 500, or the processing circuitry 570 including one or more processors may provide the baseband signals and the filter circuit 540 may filter the baseband signals.

In some aspects, the demodulator 520 of the receive signal path and the modulator 510 of the transmit signal path may include two or more mixers and may be arranged for quadrature down-conversion and up-conversion, respectively. In some aspects, the demodulator 520 of the receive signal path and the modulator 510 of the transmit signal path may include two or more mixers and may be arranged for image rejection (e.g., Hartley image rejection). In some aspects, the demodulator 520 of the receive signal path and the modulator 510 may be arranged for direct down-conversion and direct up-conversion, respectively. In some aspects, the demodulator 520 of the receive signal path and the modulator 510 of the transmit signal path may be configured for super-heterodyne operation.

In some dual-mode aspects, a separate radio IC circuit may be provided for processing signals for each spectrum, although the scope of this disclosure is not limited in this respect.

In some aspects, the synthesizer circuit may be a fractional-N synthesizer or a fractional N/N+1 synthesizer, although the scope of the aspects is not limited in this respect as other types of frequency synthesizers may be suitable. For example, synthesizer circuit may be a delta-sigma synthesizer, a frequency multiplier, or a synthesizer including a phase-locked loop with a frequency divider.

The synthesizer circuit may be configured to synthesize an output frequency for use by the modulator 510 or by the demodulator 520 based on a frequency input and a divider control input. In some aspects, the synthesizer circuit may be a fractional N/N+1 synthesizer. According to various aspects of this disclosure, there may be a plurality of synthesizer circuits.

In some aspects, frequency input may be provided by a voltage-controlled oscillator (VCO), although that is not a requirement. In various aspects, divider control input may be provided by a processing circuitry 570, or may be provided by any suitable component, such as an external component like a modem, or one or more processors which may be coupled to the transceiver 500. For example, the modem or one or more processors which may be coupled to the transceiver 500 may provide a divider control input depending on the desired output frequency. In some aspects, a divider control input (e.g., N) may be determined from a look-up table based on a channel indicated by external component.

In some aspects, the synthesizer circuit may include a divider, a delay-locked loop (DLL), a multiplexer, and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some aspects, the DLL may include a set of cascaded, tunable, delay elements, a phase detector, a charge pump, and a D-type flip-flop. The delay elements may be configured to break a VCO period up into No equal packets of phase, where Nd is the number of delay elements in the delay line. In this way, the DLL provides negative feedback to help ensure that the total delay through the delay line is one VCO cycle.

In some aspects, the synthesizer circuit may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuit to generate multiple signals at the carrier frequency with multiple different phases with respect to each other. In some aspects, the output frequency may be a LO frequency (fLO). In some aspects, the RF circuit 506 may include an IQ/polar converter.

While the transceivers described herein include traditional super-heterodyning schemes or architectures, other types of transceiver or transmitter architectures and schemes may be used. In some aspects, the transceiver 500 may include components so as to implement a near zero IF scheme, a Direct Conversion scheme, or a digital transmission schemes, such as, for example, a Digital IQ transmission, a Digital Polar transmission, and the like.

In one example, the transceiver 500 may include a transmit path that includes or implements a direct digital transmitter (DDT). That is, in one simple example, a DDT may include a digital signal processor, a RF digital-to-analog converter (RFDAC), a RF filter/antenna coupler. Further, a DDT may be implemented with or without an IQ-mixer. In general, a RF-DAC may be included on a RFIC to convert digital input into a RF signal. A DDT may include other digital components such as numerically controlled oscillator (NCO) and digital mixers for shifting an input signal to desired frequency. The use of a DDT can reduce the number of analog components needed in the transmitter or transmit path. For example, an analog LOs, analog filters, analog mixers, and etc., may be eliminated from the RFIC when a direct digital transmitter such as DDT is employed. Further, the use of a digital transmitter or digital transmission schemes such may bring energy savings and efficiencies.

Figure 6:
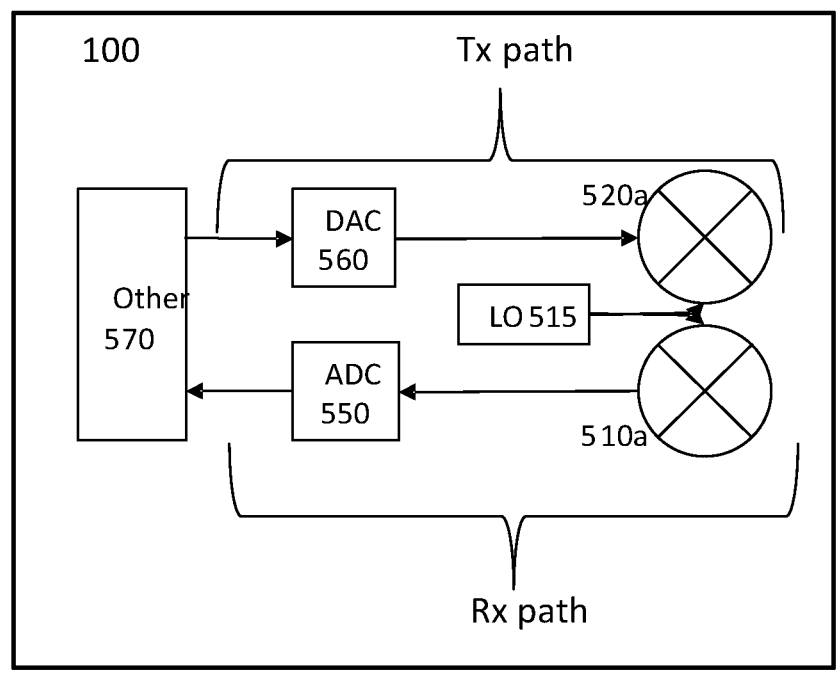

FIG. 6 exemplarily shows schematically a transceiver in accordance with various aspects of this disclosure. The receive signal path (Rx path) circuit down-converts RF signals received from the RF front end 203 and provides baseband signals. Specifically, the receive signal path may include a mixer 520a and an ADC 550. The transmit signal path (Tx path) circuitry up-converts baseband signals provided by, e.g., a modem, or one or more processors which may be coupled to the transceiver 500, and provides RF output signals to the RF front end 203 for transmission. Specifically, the transmit signal path may include a DAC 560 and a mixer 510a. The transceiver chain shown in FIG. 6 includes a synthesizer circuit, specifically, at least one local oscillator (LO) 515 which may be a part of both the modulator 510 and the demodulator 520 to generate reference signals for the mixers 510a and 510b.

Figure 7:
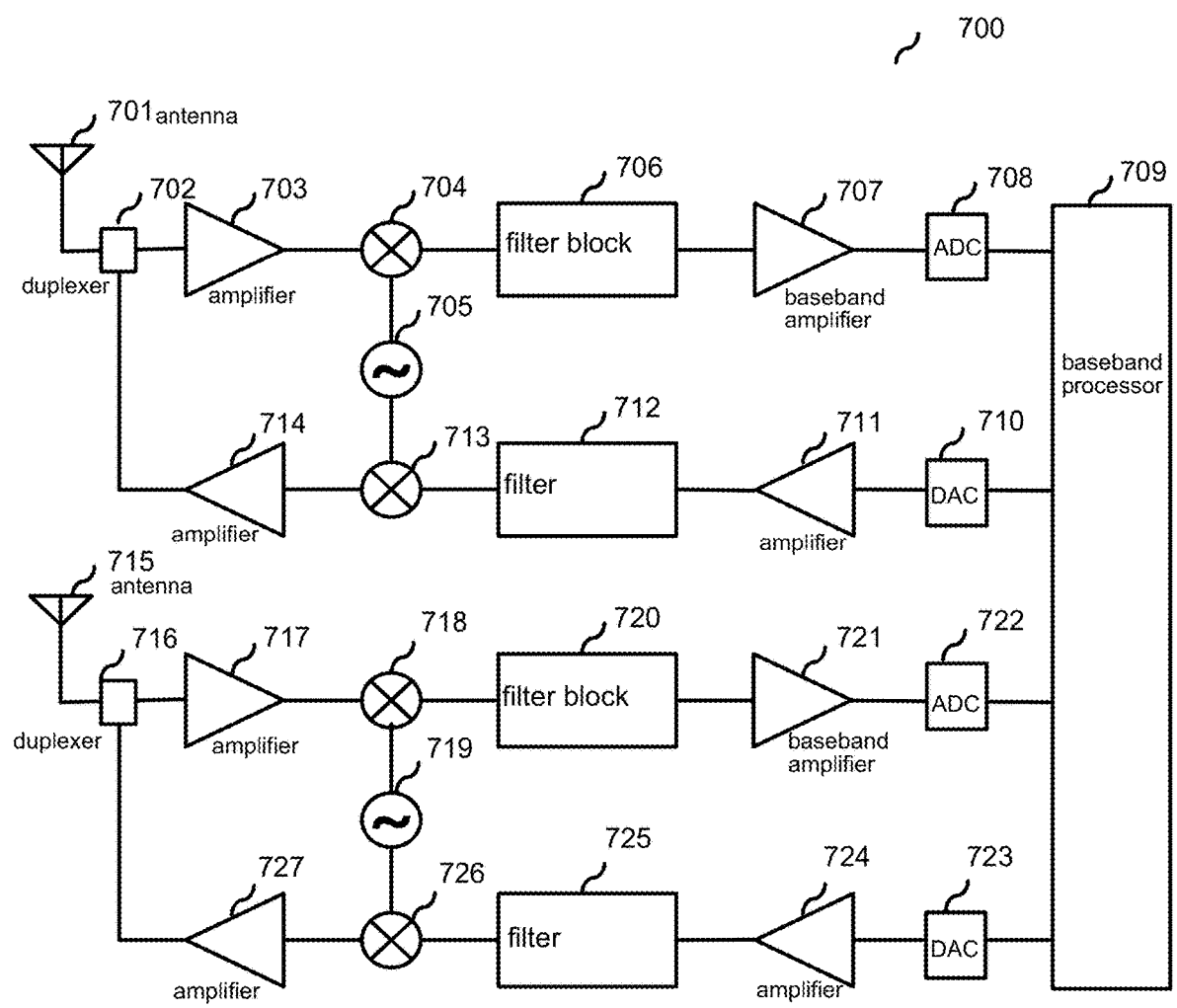
FIG. 7 shows a block diagram of an exemplary design of a portion of a communication device including a transceiver and a baseband processor in accordance with various aspects of this disclosure.

FIG. 7 shows a block diagram of an exemplary design of a portion of a communication device including a transceiver and a baseband processor in accordance with various aspects of this disclosure. The transceiver 700 includes at least one antenna 701 for receiving and/or transmitting a signal. In this example, the same antenna 701 is used during both receiving and transmitting modes of the transceiver 700. For this purpose, a duplexer 702 may isolate the transmitting path and the receiving path, while both the transmitting mode and the receiving mode uses the same antenna 701. In this example, the transceiver includes an amplifier 703 for amplifying a received signal, and a mixer 704 for down-converting the signal. A local oscillator 705 may generate a reference signal for the mixer 704. The transceiver 700 may further include a filter block 706 for filtering the output of the mixer 704, a baseband amplifier 707, and an analog-to-digital converter 708 for providing a digital signal to at least baseband processor 709 for processing the baseband signal. The baseband processor 709 may be a part of the transceiver 700, or in an example the baseband processor 709 may be an external part provided in a communication device and coupled to the transceiver 700.

The transceiver 700 may further include a transmitting path for transmitting a signal. The baseband processor 709 may provide the signal to be transmitted. The transceiver 701 may include a digital-to-analog converter 710 for converting the digital signal to be transmitted provided by the baseband processor to an analog signal, an amplifier 711, and a filter 712 for filtering the signal to be transmitted, a mixer 713 for up-converting the signal to be transmitted. In this example, the mixer 713 receives a reference signal from the local oscillator 705. The local oscillator 705 may also send a reference signal to the mixer 704 on the receiving path. In an example, the mixer 709 may receive a reference signal from another local oscillator. Further, the transceiver 700 may also include another amplifier 714 for amplifying the signal to be transmitted. In this example, the antenna 701 transmits the amplified signal to be transmitted. The antenna 701 may be the same antenna of the receiving path. The duplexer 702 may provide the switching between the transmitting path and the receiving path. In an example, another antenna may transmit the signal to be transmitted.

In this example, the transceiver 700 further includes a second antenna 715 for receiving and/or transmitting a second signal. The second signal may include the signal received by the antenna 701, or it may be another signal. In this example, the same antenna 715 is configured for both receiving and transmitting modes of the transceiver 700. For this purpose, a duplexer 716 may be configured to isolate the transmitting path and the receiving path from each other, while both the transmitting mode and the receiving mode uses the same antenna 715. In this example, the transceiver 700 includes an amplifier 717 for amplifying a received signal, and a mixer 718 for down-converting the signal. A local oscillator 719 may generate a reference signal for the mixer 718. The transceiver 700 may further include a filter block 720 for filtering the output of the mixer 718, a baseband amplifier 721, and an analog-to-digital converter 722 for providing a digital signal to the at least one baseband processor 709 for processing the baseband signal.

The transceiver 700 may further include a transmitting path for transmitting a second signal. The baseband processor 709 provides the second signal to be transmitted. The transceiver 700 may include a digital-to-analog converter 723 for converting the digital signal to be transmitted provided by the baseband processor to an analog signal, an amplifier 724, and a filter 725 for filtering the signal to be transmitted, a mixer 726 for up-converting the signal to be transmitted. In this example, the mixer 726 receives a second reference signal from the local oscillator 719. The same local oscillator 719 may also provide a reference signal to the receiving path. In an example, the mixer 726 may receive a second reference signal from another local oscillator. Further, the transceiver 700 may also include another amplifier 727 for amplifying the signal to be transmitted. In this example, the antenna 715 transmits the amplified signal to be transmitted. The same antenna 715 may also transmit the signal for the receiving path. The duplexer 716 may provide the required switching between the transmitting path and the receiving path. In an example, another antenna transmits the signal to be transmitted as well.

It is evident for a skilled person that the transceiver 700 may further include a plurality of such signal paths as provided in FIG. 7, for example for supporting a multiple-input multiple-output (MIMO) architecture. Accordingly, the transceiver 700 may include any further components and blocks which would support the transceiver architecture, especially which would support a MIMO architecture. In another example, a plurality of transceivers provides the transmission and reception for each pair of the transmitting and receiving paths provided as an example in FIG. 7 in a communication device. The transceiver 700 can have a compact design by integrating various of its components on a single platform, e.g., die or structure. More cost savings can be realized by the reduction or elimination of cable connections (e.g., coax cables). This may help realize a lower bill of materials cost, a reduction in production costs, and thus allowing for lower cost devices.

In addition to physical costs, elimination or reduction of physical components (e.g., cables and cable connections) in the transceiver 700 can provide power savings. These power savings or lower energy consumption further leads to an increase in the life time of the components, a longer battery life, and overall lower operational and maintenance costs.

The baseband processor 709 may include a modem, or one or more processors which may be coupled to the transceiver 700 for processing the received baseband signal. The modem, or one or more processors which may be coupled to the transceiver 700, may include components, for receiving signals (e.g., digital baseband signals) from each of the transceivers. In at least one example, the modem, or one or more processors which may be coupled to the transceiver 700, may include, or may be implemented, partially or entirely, by circuit and/or logic, e.g., one or more processors including circuit and/or logic, memory circuit and/or logic, Media-Access Control (MAC) circuit and/or logic, Physical Layer (PHY) circuit and/or logic, baseband (BB) circuit and/or logic, a BB processor, a BB memory, Application Processor (AP) circuit and/or logic, an AP processor, an AP memory, and/or any other circuit and/or logic. By way of example, the modem, or one or more processors which may be coupled to the transceiver 700, can perform baseband processing on the digital baseband signals to recover data included in wireless data transmissions. The modem or one or more processors which may be coupled to the transceiver 700, for example may include a processor circuit for controlling and/or arbitrating transmit and/or receive functions of the transceiver 700, performing one or more baseband processing functions (e.g., media access control (MAC), encoding/decoding, modulation/demodulation, data symbol mapping, error correction, etc.). In one or more aspects, the modem, or one or more processors which may be coupled to the transceiver 700, may include one or more processors to perform PHY frequency domain (FD) and/or PHY time domain (TD) processing, e.g., of signals.

In aspects, functions of the modem, or one or more processors which may be coupled to the transceiver 700, can be implemented in software and/or firmware executing on one or more suitable programmable processors, and may be implemented, for example, in a field programmable gate array (FPGA), application specific integrated circuit (ASIC), etc.

In one example, the modem, or one or more processors which may be coupled to the transceiver 700, may include a processor configured to generate a message, for example, in the form of a frame, field, information element and/or protocol data unit, for example, a MAC Protocol Data Unit (MPDU); and/or configured to convert the message into a PHY Protocol Data Unit (PPDU), e.g., a PHY Layer Convergence Procedure (PLOP) PDU, for example, by processing the message generated, e.g., by encoding the message, modulating the message and/or performing any other additional or alternative processing of the message. In other aspects, a processor of the modem, or one or more processors which may be coupled to the transceiver 700, may be configured to perform any other additional or alternative functionality and/or may include any other additional or alternative components to generate and/or process a message to be transmitted.

A modem, or one or more processors may be coupled to each respective transceivers via any suitable type of communication link or links. In at least one aspect, the communications links are digital links. The use of digital links can reduce expenses by eliminating the need for cable and connectors while performance can also be improved. Cables and connectors can add cost to designs and can impose physical design constraints in devices. The use of digital links or a digital link interface between the modem or one or more processors, and one or more transceivers can facilitate high data transfer rates. That is, the digital links 160a-160n may include a high speed digital I/O, e.g., a STEP interface or any other interface. The cable or link for the digital links may be much less sensitive to length, e.g., cost and performance wise, and, accordingly, the transceivers may be placed at practically any distance from the modem or one or more processors which may be coupled to the transceiver 700, for example, at lower cost. Further, the use or inclusion of a digital signal and control interface to the transmitter allows fulfillment of a key requirement for modular regulatory certification.

In some cases, the modem or one or more processors which may be coupled to the transceiver 700, and the transceivers of the communication device may be placed closed together or integrated compactly. This may be necessary to optimize performance for certain classes of devices, such as IoT 4.0 type devices.

In some cases, the modem or one or more processors which may be coupled to the transceiver 700, may communicate with a network, such as, a core network. Further, as shown, the communication device can wireless communicate with the nodes which may be an access point, base station, or the like.

Figure 8:
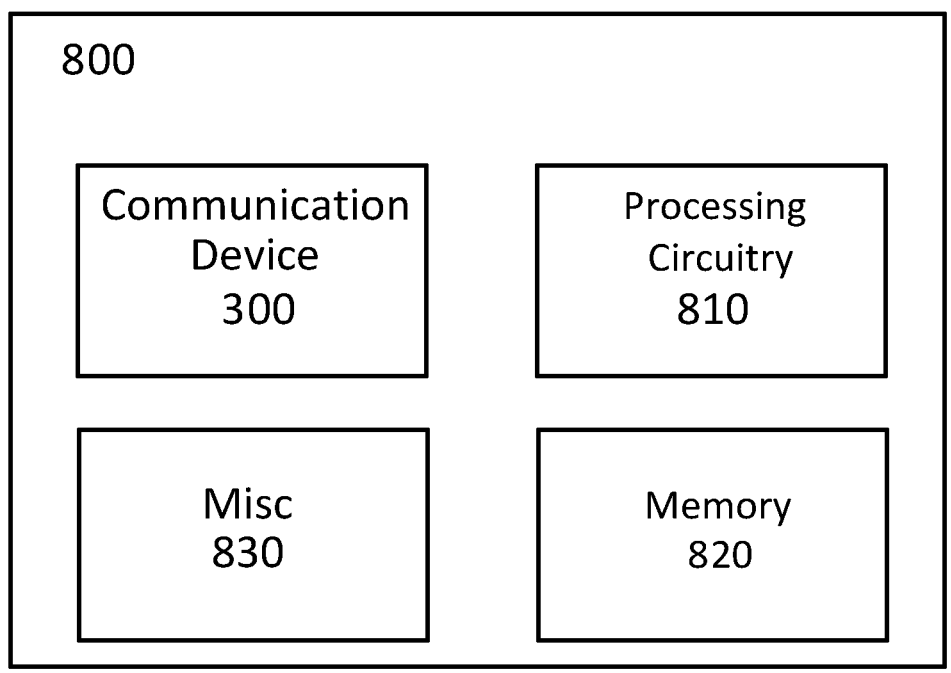
FIG. 8 illustrates a block diagram of an exemplary device or system in accordance with an aspect of the disclosure.

FIG. 8 illustrates a block diagram of an exemplary device or system in accordance with an aspect of the disclosure. The components of the device 800 are provided for ease of explanation, and in other cases, the device 800 can include additional, less, or alternative components as those shown in FIG. 8.

As shown in the example of FIG. 8, the device 800 can include processing circuit 810, a memory 820, and can include a communication device, such as the communication device 300, including a plurality of transceivers 100. As explained, the communication device 300 can implement or support a DRS. The device 800 can also include a modem, or one or more processors, or SoC connected to the transceivers. For example, device 800 may include one or more power sources, display interfaces, peripheral devices, ports (e.g., input, output), etc.

The device 800 may be used for products involving 5G, Wifi, BT, UWB, or any suitable wireless network products. The device 800 may also be used for any device supporting data-intensive applications, including streaming video (e.g., 4K, 8K video) or augmented/virtual reality (ARNR) devices. The device 800 may also be used for vehicles, e.g., to help support a self-driving car and/or to be used as vehicle network. For example, the device 800 may be used for Vehicle-to-everything (V2X) which includes vehicle-to-vehicle (V2V) and vehicle-to-infrastructure (V2I). The global automotive V2X market size is expected to reach USD 10,318.3 Million by 2027.

The processing circuit 810 may include any suitable number and/or type of computer processors, such as, for facilitating control of the device/system 800. In some cases, the processing circuit 810 may include a baseband processor (or suitable portions thereof) implemented by the device 800. In other cases, the processing circuit 800 may include one or more processors that are separate from the baseband processor (e.g., one or more digital signal processors. Additionally, or alternatively, other examples may include various functions discussed herein by the processing circuit 800.

The processing circuit 810 may be configured to carry out instructions to perform arithmetical, logical, and/or input/output (I/O) operations, and/or to control the operation of one or more components of the device. For example, the processing circuit 810 can include one or more microprocessors, memory registers, buffers, clocks, etc. Moreover, aspects include processing circuit 810 communicating with and/or controlling functions associated with the memory 820 and/or functions of the radio.

The memory 820 may store data and/or instructions such that, when the instructions are executed by the processing circuit 810, the processing circuit 810 performs the various functions described herein. The memory 820 may be implemented as a non-transitory computer readable medium storing one or more executable instructions such as, for example, logic, algorithms, code, etc. Instructions, logic, code, etc., stored in the memory 820 may enable the aspects disclosed herein to be functionally realized.

In various aspects, the device 800 may be implemented as any suitable type of device configured to transmit and/or receive wireless signals in accordance with any suitable number and/or type of communication protocols. Further, the device 800 may be implemented as a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet-of-Things (IoT) device, a wearable device, a handheld device an off-board device, a hybrid device, a vehicular device, a non-vehicular device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like. In other examples, the device 800 may be implemented as an access point or base station. The device 800 may implement one or more aspects as described herein to facilitate transmitting wireless signals in accordance with a particular frequency or band of frequencies, such as mm-wave frequencies, for example, as further described herein. The prolonged lifetime (e.g., the extended battery life) that is associated with the reduced power consumption, in combination with the high data rate, make the transceivers 100 particularly attractive for portable devices (e.g., smartphones, tablets, laptops) and also for installation in electrical vehicles (e.g., self-driving cars or remotely controllable drones).

Transceivers may provide flexibility in terms of antennas to be implemented with vendor specific antennas. For example, this flexibility can be advantageous for cases where the wireless devices 800 are being made for with a large number different types of laptops, which each can include different constraints on antenna design and antenna placement.

In other cases, other devices may have form-factor constraints that are suitable for transceivers or the communication device 300 including such transceivers. For example, the antenna area of some PCs can more design, physical, and other constraints than even smartphones, such as PCs having 5 mm think display side. By contrast current smartphones are rarely thinner than 7 mm. As such, the use of the communication device 300 with the flexibility of transceivers in terms of scalability and placement location is advantageous to work with such PC constraints.

It is generally a problem for transceivers to be able to work efficiently for a wide portion of the electromagnetic spectrum. An ideal transceiver may be able to use a very wide portion of the spectrum and it may be able to adaptively choose its portions in accordance with its settings. In modern communication systems, the communication systems are expected to be interference-limited, and accordingly one of the challenges of a transceiver covering a very wide bandwidth is that the transceiver may need to process spectra having very weak signals from a distant source mixed in with strong signals from nearby sources. The nonlinearities in current transceivers may also separate such signals from each other. For adaptability purposes, transceivers may typically avoid fixed filters at their input and immediately use a low noise amplifier or active mixers to raise the signal level above the noise introduced by subsequent digital filtering, or use amplifiers just before the baseband processing. Therefore, there is a need for a transceiver that may mitigate the challenges imposed by nonlinear components for bandwidth expansion.

Furthermore, the adaptation of mm-wave technology has recently become very popular, and employing communication signals at an extremely high-frequency rate has increased the data rate of such communication signals. The technology related to antennas were able to follow the increase of the center frequency of the communication signals and the development of antennas which are capable of using similar fractional bandwidths than the earlier technologies has resulted in the need to process signals in order to transmit or receive the baseband signals at an increased wideband.

In accordance with various aspects of this disclosure, a transceiver may include at least one amplifier for amplifying a received signal. Essentially, an amplifier is used in order to increase the power level of an input signal without otherwise altering the content of the input signal. There are many aspects that may affect the performance of the amplifier, such as input impedance, supply voltage, load impedance, and such. Therefore, it is important to design an amplifier by considering the required aspects of the application for which the amplifier is going to be used.

In terms of communication systems, the aspect of linearity is considered to be one of the important aspects for an amplifier. The term linearity for an amplifier refers to the relationship of the input power of the amplifier to the output power of the amplifier. For an ideal amplifier in communication systems, the gain response of the amplifier would be expected to be the same all over the frequency range of the amplifier, so the amplifier would not amplify the input signals of different frequencies with different gains. The design of such an amplifier is challenging for many reasons and even in very limited frequency ranges, such an amplifier would need complex circuitry in order to provide the required linearity. With the above-mentioned increase of the bandwidth of the baseband signal may require an amplifier with acceptable linearity in order to satisfy certain requirements related to error vector magnitude and bit-error rate. One of the objects of this disclosure is to improve at least one of the aspects of an amplifier that would affect the performance of the amplifier.

Figure 9:
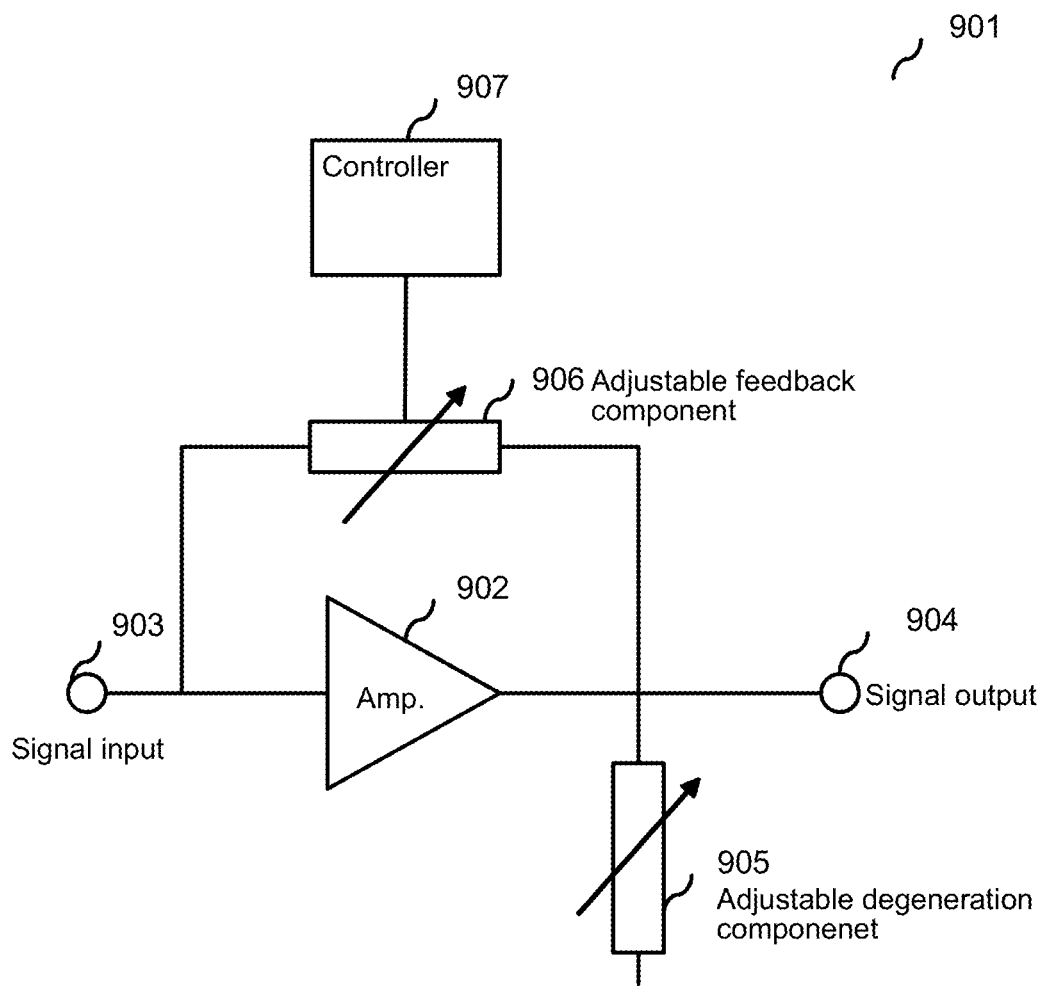
FIG. 9 shows an exemplary aspect of a wideband amplifier which a transceiver may include in accordance with various aspects of this disclosure.

FIG. 9 shows an exemplary aspect of a wideband amplifier which a transceiver may include in accordance with various aspects of this disclosure. The wideband amplifier 901 includes at least one amplifier stage 902 for amplifying an input signal with a gain, a signal input 903 to receive the input signal, and a signal output 904 adapted to output the signal amplified by the amplifier stage 902. The wideband amplifier 901 may further include an adjustable degeneration component 905 for providing degeneration to the amplifier stage 902, thereby adjusting the gain of the amplifier stage 902 which results to an adjustment of the gain of the wideband amplifier 901.

In an example, the adjustable degeneration component 905 may provide emitter degeneration for providing degeneration to the amplifier stage 902 which may include a bipolar transistor. In another example, the adjustable degeneration component 905 may provide source degeneration for providing degeneration to the amplifier stage 902 which may include a field-effect transistor. In an example, the adjustable degeneration component 905 may include a circuit having an adjustable impedance. In an example, the adjustable degeneration component 905 may include at least one resistor. In an example, the adjustable degeneration component 905 may include at least one inductor, or at least one capacitor. In an example, the adjustable degeneration component 905 may include at least one transistor. In an example, the adjustable degeneration component 905 may include a resistive ladder network, or a digital-to-analog converter (DAC). In an example, the adjustable degeneration component 905 may include at least one transistor coupled to at least one resistor.

The wideband amplifier 901 may further include an adjustable feedback component 906. The adjustable feedback component 906 may be coupled to the amplifier stage 902, for example, may be coupled to the signal input 903 and the signal output 904 of the wideband amplifier 901 for providing feedback. In an example, the adjustable feedback component 906 may include a resistor. In an example, the adjustable feedback component 906 may include at least one inductor or at least one capacitor. In an example, the adjustable feedback component 906 may include at least one transistor. In an example, the adjustable feedback component 906 may include a resistive ladder network, or a digital-to-analog converter (DAC). In an example, the adjustable feedback component 906 may include at least one transistor coupled to at least one resistor.

In an example, the wideband amplifier 901 may include a controller 907 coupled to the adjustable feedback component 906 for controlling the adjustable feedback component 906. The controller 907 may control the adjustable feedback component 906 by adjusting the impedance of the feedback component 906. In an example, the controller 907 may control the adjustable feedback component 906 by adjusting the resistance of the feedback component 906. The controller 907 may be configured to adjust the adjustable feedback component 906 based on an adjustment of the adjustable degeneration component 905.

In an example, the controller 907 includes one or more processors. In an example, functions of the controller 907 can be implemented in software and/or firmware executing on one or more suitable programmable processors, and may be implemented, for example, in a field programmable gate array (FPGA), application specific integrated circuit (ASIC), etc. In an example, the controller 907 may be a controller circuit which may receive information or a signal from one or more processors, or from another circuit, and the controller 907 may be configured to adjust the adjustable feedback component 906 based on the information or signal received by the controller 907.

The wideband amplifier 901 may adjust the gain of the amplifier stage 902 by adjusting the adjustable degeneration component 905. In an example, the controller 907 may control the adjustable degeneration component 905 for adjusting the degeneration provided to the amplifier stage 902. In another example, the wideband amplifier 901 may include a second controller for adjusting the degeneration provided to the amplifier stage 902. In an example, the second controller may be adjusted manually. In an example, one or more processors that may be coupled to the wideband amplifier 901 may adjust the gain of the amplifier stage 902.

In an example, the controller 907 may control the adjustable degeneration component 905 by increasing the degeneration provided to the amplifier stage 902 by the adjustable degeneration component 905, and this may result to an increase at the bandwidth of the wideband amplifier 901. In an example, increasing the degeneration provided by the adjustable degeneration component 905 to the amplifier stage 902 decreases the gain of the amplifier stage 902 provided to the input signal.

In an example, the controller 907 may control the adjustable degeneration component 905 by decreasing the degeneration provided to the amplifier stage 902 by the adjustable degeneration component 905, in order to decrease the bandwidth of the wideband amplifier 901. In an example, decreasing the degeneration provided by the adjustable degeneration component 905 to the amplifier stage 902 may increase the gain of the amplifier stage 902 provided to the input signal.

In an example, the controller 907 may receive information from one or more processors indicating to decrease the degeneration provided to the amplifier stage 902 by the adjustable degeneration component 905. In an example, the controller 907 may receive information from one or more processors indicating to increase the degeneration provided to the amplifier stage 902 by the adjustable degeneration component 905. In an example the one or more processors may monitor the signal received by a transceiver, and provide the indication based on the signal quality of the signal received by the transceiver. In an example, the one or more processors provide the indication based on the bit error rate of the signal. In an example, the one or more processors provide the indication based on the error vector magnitude of the signal.

In an example, one or more processors may provide the indication to adjust the degeneration component 905, for increasing or decreasing the degeneration provided to the amplifier stage 902 based on the selection of the communication channel. In an example, in case the bandwidth of the input signal received, or to be received, by the wideband amplifier 901 increases, the controller 907 may adjust the adjustable degeneration component 905 for increasing the degeneration provided to the amplifier stage 902. Alternatively, in case the bandwidth of the input signal received, or to be received, by the sideband amplifier 901 decreases, the controller may 907 may adjust the adjustable degeneration component 905 for decreasing the degeneration provided to the amplifier stage 902, which may result to increase at the gain of the amplifier stage 902.

Accordingly, the controller 907 may adjust the frequency response of the wideband amplifier 901 by adjusting the adjustable degeneration component 905. In an example, the controller 907 may adjust the frequency response of the wideband amplifier 901 by adjusting the adjustable degeneration component 905 in accordance with the need of the transceiver to communicate effectively using the communication channel. In an example, the controller 907 may adjust the frequency response of the wideband amplifier 901 adaptively based on the signal quality of the input signal. In an example, the signal quality may include at least one of the following: reference signal received power (RSRP, Reference Signal Received Power), signal to interference plus noise ratio (SINR, Signal to Interference plus Noise Ratio), and Receive Signal Strength Indicator (RSSI, Received Signal Strength Indicator), Reference Signal Received Quality (RSRQ, Reference Signal Received Quality). There may also be further reference values for evaluating signal quality.

The controller 907 may adjust the adjustable feedback component 906 based on the adjustment provided to the adjustable degeneration component 905. In an example, the controller 907 may adjust the adjustable degeneration component 905 and the adjustable feedback component 906. In an example, the controller 907 receives an indication from one or more processors for adjusting the adjustable feedback component 906 based on the adjustment provided by one or more processors for adjusting the adjustable degeneration component 905. In an example, controller 907 may receive indication including information related to how the controller 907 should adjust the adjustable feedback component 906. In an example, the indication may include information related to the amount of the adjustment to be made to the adjustable feedback component 906.

In an example, the controller 907 may adjust the adjustable feedback component 906 such that the gain of the amplifier stage 902 increases. In an example, the adjustable feedback component 906 includes a resistor, and the controller 907 may increase the resistance of the adjustable feedback component 906 to increase the gain of the amplifier stage 902. In an example, the controller 907 may adjust the adjustable feedback component 906, such that the gain of the amplifier stage 902 decreases. In an example, the adjustable feedback component 906 includes a resistor, and the controller 907 may decrease the resistance of the adjustable feedback component 906 to decrease the gain of the amplifier stage 902.

In accordance with various aspects of this disclosure, the controller 907 may increase the resistance of the adjustable feedback component 906, in case the controller 907 detects an increase to the gain of the amplifier stage 902. The controller 907 may detect the increase to the gain of the amplifier stage 902 by detecting an increase at the signal output 904. The controller 907 may detect the increase at the signal output 904, and the controller 907 may determine whether the increase at the signal output is a result of the increase to the gain of the amplifier stage by applying a threshold for the increased signal value. In response to an increase to the gain of the amplifier stage 902, the controller 907 may increase the resistance of the adjustable feedback component 906.

Further, the controller 907 may also determine the amount of the increase of the resistance of the adjustable feedback component 906. In an example, the controller 907 may determine the amount of the increase of the adjustable feedback component 906 based on the increase to the gain of the amplifier stage 902. In an example, the controller 907 may determine the amount of the increase by using a look-up table including a plurality of amounts of increase to the gain of the amplifier stage 902 and a corresponding plurality of amounts of increase to the resistance of the adjustable feedback component 906. In another example, the controller 907 may perform calculations based on a predetermined relationship between the increase to the gain of the amplifier stage 902 and the increase to the resistance of the adjustable feedback component 906.

In an example, the controller 907 may increase the resistance of the adjustable feedback component 906 by selecting a resistance from a plurality of resistance options. In an example, the controller 907 may select a resistor from a plurality of resistors to increase the resistance of the adjustable feedback component 906. In an example, the adjustable feedback component 906 may include a resistor ladder network, or an analog-to-digital converter, and the controller 907 may switch a resistor having a higher resistance to be coupled to the signal input 903 and the signal output 904 to increase the resistance of the adjustable feedback component 906.

In accordance with various aspects of this disclosure, the controller 907 may decrease the resistance of the adjustable feedback component 906, in case the controller 907 detects a decrease to the gain of the amplifier stage 902. The controller 907 may detect the decrease to the gain of the amplifier stage 902 by detecting a decrease at the signal output 904. The controller 907 may detect the decrease at the signal output 904, and the controller 907 may determine whether the decrease at the signal output is a result of the decrease to the gain of the amplifier stage by applying a threshold for the decreased signal value. In response to a decrease in the gain of the amplifier stage 902, the controller 907 may decrease the resistance of the adjustable feedback component 906.

Further, the controller 907 may also determine the amount of the decrease of the resistance of the adjustable feedback component 906. In an example, the controller 907 may determine the amount of the decrease of the adjustable feedback component 906 based on the decrease to the gain of the amplifier stage 902. In an example, the controller 907 may determine the amount of the decrease by using a look-up table including a plurality of amounts of decrease to the gain of the amplifier stage 902 and a corresponding plurality of amounts of decrease to the resistance of the adjustable feedback component 906. In another example, the controller 907 may perform calculations based on a predetermined relationship between the decrease to the gain of the amplifier stage 902 and the decrease to the resistance of the adjustable feedback component 906.

In an example, the controller 902 may decrease the resistance of the adjustable feedback component 906 by selecting a resistance from a plurality of resistance options. In an example, the controller 902 may select a resistor from a plurality of resistors to decrease the resistance of the adjustable feedback component 906. In an example, the adjustable feedback component 906 may include a resistor ladder network or an analog-to-digital converter, and the controller 902 may switch a resistor having a lower resistance to be coupled to the signal input 903 and the signal output 904 to decrease the resistance of the adjustable feedback component 906.

In accordance with various aspects of this disclosure, the controller 907 may increase the resistance of the adjustable feedback component 906 based on an adjustment of the adjustable degeneration component 905. The controller 907 may detect the adjustment of the adjustable degeneration component 905 causing degeneration to the amplifier stage 902. The controller 907 may detect the increase at the signal output 904, and the controller 907 may determine whether the increase at the signal output is a result of an adjustment to the adjustable degeneration component 905 by applying a threshold for the increased signal value. In response to an adjustment to the adjustable degeneration component 905, the controller 907 may increase the resistance of the adjustable feedback component 906. In an example, the controller 907 may detect the decrease at the resistance of the adjustable degeneration component 905.

In an example, the controller 907 may determine the amount of the increase of the adjustable feedback component 906 based on the amount of the adjustment of the adjustable degeneration component 905. The controller 907 may determine the amount of the increase of the adjustable feedback component 906, based on the amount of a decrease to the resistance of the adjustable degeneration component 905. In an example, the controller 907 may determine the amount of the increase by using a look-up table including a plurality of amounts of decrease of the resistance of the adjustable degeneration component 905 and a corresponding plurality of amounts of increase to the resistance of the adjustable feedback component 906. In another example, the controller 907 may perform calculations based on a predetermined relationship between the adjustment of the resistance of the adjustable degeneration component 905 and the adjustment to the resistance of the adjustable feedback component 906.

In an example, the controller 907 may adjust the adjustable degeneration component 905 by decreasing the resistance of the adjustable degeneration component 905 for decreasing the degeneration provided to the amplifier stage 902. In an example, the controller 907 may adjust the adjustable degeneration component 905, and the adjustable feedback component 906 by predetermined steps for increasing and decreasing their resistance. In an example, the controller 907 may adjust the adjustable degeneration component 905 by decreasing the resistance of the adjustable degeneration component 905 with n-amount of steps, and the controller 907 may adjust the adjustable feedback component 906 by increasing the resistance of the adjustable feedback component 906 with the same n-amount of steps.

In accordance with various aspects of this disclosure, the controller 907 may decrease the resistance of the adjustable feedback component 906 based on an adjustment of the adjustable degeneration component 905. The controller 907 may detect the adjustment of the adjustable degeneration component 905 causing degeneration to the amplifier stage 902. The controller 907 may detect the decrease at the signal output 904, and the controller 907 may determine whether the decrease at the signal output is a result of the adjustment of the adjustable degeneration component 905 by applying a threshold for the decreased signal value. In response to an adjustment to the adjustable degeneration component 905, the controller 907 may decrease the resistance of the adjustable feedback component 906. In an example, the controller 907 may detect the increase at the resistance of the adjustable degeneration component 905.

In an example, the controller 907 may determine the amount of the decrease of the adjustable feedback component 906 based on the amount of the adjustment of the adjustable degeneration component 905. The controller 907 may determine the amount of the decrease of the adjustable feedback component 906, based on the amount of an increase to the resistance of the adjustable degeneration component 905. In an example, the controller 907 may determine the amount of the decrease by using a look-up table including a plurality of amounts of increase of the resistance of the adjustable degeneration component 905 and a corresponding plurality of amounts of decrease to the resistance of the adjustable feedback component 906. In another example, the controller 907 may perform calculations based on a predetermined relationship between the adjustment of the resistance of the adjustable degeneration component 905 and the adjustment to the resistance of the adjustable feedback component 906.

In an example, the controller 907 may adjust the adjustable degeneration component 905 by increasing the resistance of the adjustable degeneration component 905 for increasing the degeneration provided to the amplifier stage 902. In an example, the controller 907 may adjust the adjustable degeneration component 905, and the adjustable feedback component 906 by predetermined steps for increasing and decreasing their resistance. In an example, the controller 907 may adjust the adjustable degeneration component 905 by increasing the resistance of the adjustable degeneration component 905 with n-amount of steps, and the controller 907 may adjust the adjustable feedback component 906 by decreasing the resistance of the adjustable feedback component 906 with the same n-amount of steps.

In an example, the controller 907 may adjust the adjustable feedback component 906 based on an adjustment to the adjustable degeneration component 905. As provided in accordance with various aspects of this disclosure, the controller 907, or one or more processors may change the adjustable degeneration component 905 for more effective communication, and in various examples, in response to the adjustment of the adjustable degeneration component 905, the controller 907 may adjust the adjustable feedback component 906 based on the adjustment of the adjustable degeneration component 905. In an example, the controller 907 may adjust the adjustable feedback component 906 based on an adjustment of the adjustment degeneration component 905 for keeping the input impedance at about the same level to the input impedance before the adjustment to the adjustable degeneration component 905 in order to reduce the effect of the impedance mismatch with the adjustment.

A skilled person would appreciate that keeping the input impedance at about the same level to a previous level includes keeping the input impedance constant, or in another expression, keeping the input impedance unchanged between before an adjustment to the adjustable degeneration component 905 and after the adjustment to the adjustable degeneration component 905. The skilled person would also be aware that an electronic circuit, such as an amplifier, includes components having certain tolerances and the electronic circuit is designed under the considerations of having such tolerances. Therefore, the skilled person would appreciate that keeping the input impedance at about the same level to a previous level would also include having different input impedances, as long as the difference is according to the toleration settings of the design of the electrical circuit.

In accordance with various aspects of this disclosure, the controller 907 may calculate the amount of the adjustment to the adjustable feedback component 906, based on an adjustment to the adjustable degeneration component 905, such that the input impedance stays at about the same level after the adjustment to the adjustable degeneration component 905. In an example, the controller 907 makes the adjustment to the adjustable degeneration component 905.

In an example, the controller 907 may determine the amount of the adjustment to the adjustable feedback component 906 based on the amount of the adjustment of the adjustable degeneration component 905. The controller 907 may determine the amount of the adjustment to the adjustable feedback component 906, based on the amount of an adjustment to the resistance of the adjustable degeneration component 905. In an example, the controller 907 may determine the amount of the adjustment by using a look-up table including a plurality of amounts of increase of the resistance of the adjustable degeneration component 905 and a corresponding plurality of amounts of decrease to the resistance of the adjustable feedback component 906 which would keep the input impedance at about the same level after the adjustment. In another example, the controller 907 may perform calculations based on a predetermined relationship between the input impedance and at least one of the adjustments of the resistance of the adjustable degeneration component 905 or the adjustment to the resistance of the adjustable feedback component 906.

It may also be common to have impedance matching in circuits according to the purpose of an amplifier. For example, the matching impedance is generally around 50 ohms or 60 ohms in amplifiers which may be used in communication circuits. Accordingly, in an example, the controller 907 may determine the amount of the adjustment to the adjustable feedback component 906 for keeping the input impedance at about 50 ohms or 60 ohms. In an example, the controller 907 may calculate the amount of adjustment to be made to the adjustable feedback component 906 to keep the input impedance at about 50 ohms or 60 ohms, in response to the adjustment to the adjustable degeneration component 905.

In an example, the controller 907 may determine the amount of adjustment to be made to the adjustable feedback component 906 to keep the input impedance at about 50 ohms or 60 ohms from a look-up table. The look-up table may include a plurality of adjustment values for the adjustable degeneration component 905, and corresponding a plurality of adjustment values for the adjustable feedback component 906 which would keep the input impedance at about 50 ohms or 60 ohms. In an example, the controller 907 may determine the resistance value to be made to the adjustable feedback component 906 to keep the input impedance at about 50 ohms or 60 ohms from a look-up table. In this example, the look-up table may include a plurality of resistance values for the adjustable degeneration component 905, and corresponding a plurality of resistance values for the adjustable feedback component 906 which would keep the input impedance at about 50 ohms or 60 ohms.

FIG. 10 exemplarily shows schematically a wideband amplifier in accordance with various aspects of this disclosure. The amplifier stage 1001 may include an input terminal 1002 for receiving an input signal, an output terminal 1003 for providing an output signal, at least one Metal Oxide Semiconductor Field Effect Transistor (MOSFET) transistor 1004 for amplifying the input signal received by the input terminal 1002. In this example, the transistor 1004 may be an n-type Metal Oxide Semiconductor Field Effect Transistor (NMOS) transistor. In an example, the transistor may be a p-type Metal Oxide Semiconductor Field Effect Transistor (PMOS) transistor. In another example, the transistor may be a BJT transistor.

In this example, the source terminal of the transistor 1004 is coupled to an adjustable degeneration component. Further in this example, the adjustable degeneration component includes parallel connected a plurality of resistors 1005, 1006, 1007, and a short circuit 1008 which are connected to a plurality of switches 1009, 1010, 1011, 1012 in series. Accordingly, the switches 1009, 1010, 1011, and 1012 may change the resistance coupled between the source terminal of the transistor 1004 and the ground 1013.

A controller may control the plurality of switches 1009, 1010, 1011, 1012 to adjust the gain of the amplification provided by the transistor 1004. In an example, the controller may be coupled to the plurality of switches 1009, 1010, 1011, 1012. The controller may control the plurality of switches to adjust the degeneration provided by the adjustable degeneration component. The controller may adjust the degeneration provided by the adjustable degeneration component to the transistor 1004 by changing the resistance which is coupled to the transistor 1004. In an example, the resistors 1005, 1006, 1007 may have different resistance values and the controller may simply choose the path which is coupled to the transistor 1004.

In an example, the resistance values of the resistors may have the order of $R_{1005} > R_{1006} > R_{1007}$ and the switch 1012 is closed, while other switches are open. Accordingly, no resistance is coupled to the source of the transistor 1004. In another terms, the adjustable degeneration component coupled to the transistor 1004 provides no degeneration to the transistor 1004 when no resistance is coupled to the source of the transistor 1004 by the adjustable degeneration component. In an example, the controller determines that the gain of the amplifier stage 1001 should decrease. In another example, one or more processors that are coupled to the controller determine that the gain of the amplifier stage 1001 should decrease. The one or more processors provide an indication to the controller to reduce the gain.

In order to reduce the gain based on the determination in accordance with various aspects of this disclosure, the controller may open the switch 1012 and close the switch 1010, which couples the resistor 1006 to the source of the transistor 1004. The determination of which switch will be closed/opened will be determined based on the amount of the degeneration to be provided to the transistor 1004 as provided in accordance with various aspects of this disclosure.

The amplifier stage 1001 may further include an adjustable feedback component 1014 for providing feedback to the input of the transistor 1004. The adjustable feedback component 1014 may be coupled to the amplifier stage 1001, and for example, the adjustable feedback component 1014 may be coupled to the signal input 1002 and the signal output 1003 of the wideband amplifier 1001 for providing feedback. In an example, the adjustable feedback component 1014 may include a resistor. In an example, the adjustable feedback component 1014 may include at least one inductor, or at least one capacitor. In an example, the adjustable feedback component 1014 may include at least one transistor. In an example, the adjustable feedback component 1014 may include a resistive ladder network, or a digital-to-analog converter (DAC). In an example, the adjustable feedback component 1014 may include at least one transistor coupled to at least one resistor.

In an example, the controller of the amplifier stage 1001 may be coupled to the adjustable feedback component 1014 for controlling the adjustable feedback component 1014. The controller may control the adjustable feedback component 1014 by adjusting the impedance of the feedback component 1014. In an example, the controller may control the adjustable feedback component 1014 by adjusting the resistance of the feedback component 1014. The controller may be configured to adjust the adjustable feedback component 1014 based on an adjustment of the adjustable degeneration component. In this example, the controller may adjust the adjustable feedback component 1014 based on the resistance of the adjustable degeneration component.

In an example, the controller includes one or more processors. In an example, functions of the controller can be implemented in software and/or firmware executing on one or more suitable programmable processors, and may be implemented, for example, in a field programmable gate array (FPGA), application specific integrated circuit (ASIC), etc. In an example, the controller may be a controller circuit which may receive information or a signal from one or more processors that may be coupled to the controller, or from another circuit, and the controller may be configured to adjust the adjustable feedback component 1014 based on the information or signal received by the controller.

FIG. 11 shows schematically an example of a wideband amplifier in accordance with various aspects of the disclosure, including an amplifier stage and adjustable degeneration components. In this example, the wideband amplifier 1101 is a differential amplifier which includes a differential pair provided at two branches, and the differential pairs include a Complementary Metal Oxide Semiconductor (CMOS) inverter. A skilled person would appreciate that the wideband amplifier 1101 including a differential amplifier may include other components as well. The wideband amplifier 1101 includes a first differential pair 1102 and a second differential pair 1103.

The first differential pair 1102 of the wideband amplifier 1101 may include an input terminal 1104 for receiving an input signal, and an output terminal 1105 for providing an output signal. The second differential pair 1103 of the wideband amplifier 1101 may include an input terminal 1106 for receiving an input signal, and an output terminal 1107 for providing an output signal. The input signals which the input terminal 1104 of the first differential pair receives, and the input terminal 1106 of the second differential pair may be differential input signals. The output signals which the first differential pair 1102 and the second differential pair 1103 provide from the output terminal 1105 of the first differential pair, and the output terminal 1106 of the second differential pair may be differential output signals.

The first differential pair 1102 further includes two Metal Oxide Semiconductor Field Effect Transistor (MOSFET) transistors 1108, 1109 for amplifying the input signal received by the first differential pair 1102. In more detail, one of the transistors is an n-type Metal Oxide Semiconductor Field Effect Transistor (NMOS) transistor 1108, and the other transistor is a p-type Metal Oxide Semiconductor Field Effect Transistor (PMOS) transistor 1109, and they are coupled to form a CMOS inverter. In this example, the source terminals of each of the transistors 1108, 1109 are coupled to an adjustable degeneration component. The adjustable degeneration component that is coupled to the source terminal of the NMOS transistor 1108 includes parallel connected a plurality of resistors 1110, 1111, 1112, and a short circuit 1113 which are connected to a plurality of switches 1114, 1115, 1116, 1117 in series respectively. Accordingly, the switches 1114, 1115, 1116, and 1117 can change the resistance connected to the source terminal of the transistor 1108.

The plurality of switches 1114, 1115, 1116, 1117 may be controlled by a controller for adjusting the gain of the amplification provided by the NMOS transistor 1108. In an example, the controller may be coupled to the plurality of switches 1114, 1115, 1116, 1117. The controller may control the plurality of switches for adjusting the degeneration provided by the adjustable degeneration component. The controller may adjust the degeneration provided by the adjustable degeneration component coupled to the NMOS transistor 1108 by changing the resistance which is coupled to the NMOS transistor 1108. In an example, the resistors 1110, 1111, and 1112 may have different resistance values and the controller may simply choose one of the resistors which is coupled to the NMOS transistor 1108.

In an example, the resistance values of the resistors may have the order of R1110>R1111>R1112 and the switch 1117 is closed, while other switches are open. Accordingly, no resistance is coupled to the source of the NMOS transistor 1108. Therefore, the adjustable degeneration component coupled to the NMOS transistor 1108 would provide no degeneration to the NMOS transistor 1108. In an example, the controller determines that the gain of the wideband amplifier 1101 should decrease. In another example, one or more processors which may be coupled to the controller determine that the gain of the wideband amplifier 1101 should decrease and provides an indication to the controller to reduce the gain.

In order to reduce the gain based on the determination according to various aspects of this disclosure, the controller may open the switch 1117 and close the switch 1115, which couples the resistor 1111 to the source of the NMOS transistor 1108. The determination of which switch will be closed/opened will be determined based on the amount of the degeneration to be provided to the transistor 1108 as provided in accordance with various aspects of this disclosure.

When the resistance coupled to the source of the transistor 1108 increases, the voltage applied between the input terminal 1104 including the voltage of the input signal, and the ground which the gate of the transistor 1108 is coupled would be divided between the gate-source terminals of the NMOS transistor 1108, and the resistor 1111 coupled to the source terminal of the NMOS transistor 1108 and the ground 1118. The amplitude changes of the input signal received by the input terminal 1104 used to directly change the voltage between the gate-source terminals of the NMOS transistor 1108 when no resistor is coupled, but when the resistor 1111 is coupled to the source terminal of the NMOS transistor 1108, the portion of the change at the amplitude of the input signal received by the input terminal 1104 will be divided by the resistor 1111 which is coupled to the source terminal of the NMOS transistor 1108.

Accordingly, the amount of the voltage which drops on the resistor 1111, will be equal to the multiplication of the resistance value of the resistor 1111 (R1111) and the current of the source of the NMOS transistor 1108. In accordance with the configuration above, the gain of the NMOS transistor 1108 decreases with the reduction of the voltage between the gate-source terminals of the NMOS transistor 1108, which the increased resistance of the adjustable degeneration component causes.

In an example, the controller may determine to increase the gain provided by the NMOS transistor 1108. In an example, the controller determines that the gain of the wideband amplifier 1101 should increase. In another example, one or more processors determine that the gain of the wideband amplifier 1101 should increase and provides an indication to the controller to increase the gain when the switch 1115 is closed, and other switches 1114, 1116, 1117 are open. In order to increase the gain, the controller may open the switch 1115 and close the switch 1116, which couples the resistor 1112 to the source of the NMOS transistor 1108. The determination of which switch will be closed/opened will be determined based on the amount of the degeneration to be provided to the NMOS transistor 1108, as provided in accordance with various aspects of this disclosure.

The decreased resistance of the adjustable degeneration component would result in a drop of the voltage of the resistor which is coupled to the source terminal of the NMOS transistor 1108. The dropped voltage between the source terminal of the NMOS transistor 1108 and the ground 1118 would result in an increase at the voltage between the gate-source terminals of the NMOS transistor 1108 increasing the gain of the NMOS transistor 1108.

A skilled person would appreciate that the differential pair of the wideband amplifier 1101 is a CMOS inverter in this example, and the PMOS transistor 1109 would have similar settings with the NMOS transistor 1108 in order to design the first differential pair 1102 of the wideband amplifier 1101 effectively. In this example, the adjustable degeneration component is coupled to the source terminal of the PMOS transistor 1109, the adjustable degeneration component for PMOS transistor 1109 may include parallel connected a plurality of resistors 1119, 1120, 1121, and a short circuit 1122 which are connected to a plurality of switches 1123, 1124, 1125, 1126 in series respectively. Accordingly, the switches 1123, 1124, 1125, and 1126 can change the resistance connected to the source terminal of the PMOS transistor 1109.

A controller may control the plurality of switches 1123, 1124, 1125, 1126 to adjust the gain of the amplification provided by the PMOS transistor 1109. In an example, the controller may be coupled to the plurality of switches 1123, 1124, 1125, 1126. The controller may control the plurality of switches to adjust the degeneration provided by the adjustable degeneration component. The controller may adjust the degeneration provided by the adjustable degeneration component coupled to the PMOS transistor 1109 by changing the resistance which is coupled to the PMOS transistor 1109. In an example, the resistors 1119, 1120, and 1121 may have different resistance values and the controller may simply choose the resistor which is coupled to the PMOS transistor 1109.

In an example, the resistance values of the resistors may have the order of R1123>R1124>R1125, and the switch 1126 is closed, while other switches 1123, 1124, 1125 are open. Accordingly, no resistance is coupled to the source of the PMOS transistor 1109, and the adjustable degeneration component coupled to the PMOS transistor 1109 would provide no degeneration to the PMOS transistor 1109. In an example, the controller determines that the gain of the wideband amplifier 1101 should decrease. In another example, one or more processors that may be coupled to the controller may determine that the gain of the wideband amplifier 1101 should decrease and provides an indication to the controller to reduce the gain.

In order to reduce the gain based on the determination in accordance with various aspects of this disclosure, the controller may open the switch 1126 and close the switch 1124, which couples the resistor 1120 to the source of the PMOS transistor 1109. The determination of which switch will be closed/opened will be determined based on the amount of the degeneration to be provided to the PMOS transistor 1109 as provided in accordance with various aspects of this disclosure.

A skilled person would appreciate that the mechanics similar to the NMOS transistor would apply to the PMOS transistor as well with respect to the adjustable degeneration component. Accordingly, in order to provide a more predictable and symmetric gain characteristic with a threshold voltage around the middle of the linear region of the gain response for the CMOS inverter differential amplifier stage shown in FIG. 11, the controller may control the adjustable degeneration component of the PMOS transistor 1109 similarly to the adjustable degeneration component of the NMOS transistor 1108.

The above-mentioned mechanics and analysis would also apply to the second differential pair 1103 of the wideband amplifier 1101. The second differential pair 1103 includes two MOSFET transistors 1128, 1129 for amplifying the input signal received by the second differential pair 1103. In more detail, one of the transistors is an NMOS transistor 1128, and the other transistor is a PMOS transistor 1129 coupled to form a CMOS inverter. In this example, the source terminals of each of the transistors 1128, 1129 are coupled to an adjustable degeneration component. In this example, the adjustable degeneration component coupled to the source terminal of the NMOS transistor 1128, the adjustable degeneration component includes parallel connected a plurality of resistors 1130, 1131, 1132, and a short circuit 1133 which are connected to a plurality of switches 1134, 1135, 1136, 1137 in series. Accordingly, the switches 1134, 1135, 1136, and 1137 can change the resistance connected to the source terminal of the transistor 1128.

A controller may control the plurality of switches 1134, 1135, 1136, 1137 for adjusting the gain of the amplification provided by the NMOS transistor 1128. In an example, the controller may be coupled to the plurality of switches 1134, 1135, 1136, 1137. The controller may control the plurality of switches for adjusting the degeneration provided by the adjustable degeneration component. The controller may adjust the degeneration provided by the adjustable degeneration component coupled to the NMOS transistor 1128 by changing the resistance which is coupled to the NMOS transistor 1128. In an example, the resistors 1130, 1131, and 1132 may have different resistance values and the controller may simply choose the path which is coupled to the NMOS transistor 1108.

A skilled person would appreciate that the second differential pair 1103 of the wideband amplifier 1101 is also a CMOS inverter in this example, and the PMOS transistor 1129 would have similar settings with the NMOS transistor 1128 in order to design a second differential pair 1103 of the wideband amplifier 1101 effectively. In this example, the adjustable degeneration component is coupled to the source terminal of the PMOS transistor 1129, the adjustable degeneration component for PMOS transistor 1129 may include parallel connected a plurality of resistors 1139, 1140, 1141, and a short circuit 1142 which are connected to a plurality of switches 1143, 1144, 1145, 1146 in series, coupled between the source terminal of the PMOS transistor 1129 and the voltage source 1147. Accordingly, the switches 1143, 1144, 1145, and 1146 can change the resistance connected to the source terminal of the PMOS transistor 1129.

A controller may control the plurality of switches for adjusting the gain of the amplification provided by the PMOS transistor 1129. In an example, the controller may be coupled to the plurality of switches 1143, 1144, 1145, 1146. The controller may control the plurality of switches for adjusting the degeneration provided by the adjustable degeneration component. The controller may adjust the degeneration provided by the adjustable degeneration component coupled to the PMOS transistor 1129 by changing the resistance which is coupled to the PMOS transistor 1129. In an example, the resistors 1139, 1140, and 1141 may have different resistance values and the controller may simply choose the path which is coupled to the PMOS transistor 1128.

In an example, the wideband amplifier 1101 may include bipolar-junction transistors (BJT). In an example, the wideband amplifier 1101 may include BJTs instead of MOSFETs. A skilled person would appreciate the differences and he or she would easily make necessary changes in accordance with various aspects of this disclosure, including providing degeneration using emitter degeneration instead of source degeneration.

In an example, an adjustable degeneration component of the wideband amplifier 1101 includes a resistive ladder network for adjusting the degeneration provided to at least one of the transistors 1108, 1109, 1128, 1129 of the wideband amplifier 1101. In an example, an adjustable degeneration component of the wideband amplifier 11 includes a digital-to-analog converter for adjusting the degeneration provided to at least one of the transistors 1108, 1109, 1128, 1129 of the wideband amplifier 1101.

In an example, an adjustable degeneration component of the wideband amplifier 1101 includes a transistor for adjusting the degeneration provided to at least one of the transistors 1108, 1109, 1128, 1129 of the wideband amplifier 1101. In an example, the respective adjustable feedback component may still include resistors and switches which adjusts the resistance of the adjustable feedback component in discrete values, and a further transistor coupled to the resistors for adjusting the resistance of the adjustable feedback component. In this example, the controller may adjust the voltage applied to the gate (or the base, according to the type of the transistor) of the transistor of the adjustable degeneration component for adjusting the resistance of the transistor between the drain and the source terminals (or the collector and the emitter, according to the type of the transistor) of the transistor in accordance with various aspects of this disclosure.

In accordance with various aspects of this disclosure and the wideband amplifier 1101 provided with FIG. 11, each of the transistors 1108, 1109, 1128, 1129 may be considered as an amplifier stage, contributing to the amplification provided by the wideband amplifier 1101. In parallel to that definition, the wideband amplifier 1101 may also be considered as an amplifier stage. In that example, the adjustable degeneration component of the wideband amplifier 1101 may include each of the components of the adjustable components which are coupled to the transistors 1108, 1109, 1128, 1129 respectively. It should be considered that each adjustable component which is coupled to the respective transistors 1108, 1109, 1128, 1129 of the wideband amplifier 1101 may adjust the degeneration of the respective transistors 1108, 1109, 1128, 1129, resulting to the degeneration of the wideband amplifier 1101.

FIG. 12 shows schematically an example of an amplifier in accordance with various aspects of this disclosure. The amplifier 1201 may include an amplifier stage with an adjustable degeneration component having an adjustable gain. In an example, the amplifier 1201 may include the amplifier stage 1001. In an example, the amplifier 1201 may include the wideband amplifier 1101. The amplifier 1201 includes an amplifier stage 1202 in accordance with various aspects of this disclosure, an input terminal 1203, and an output terminal 1204.

The amplifier 1201 includes an amplifier stage 1202. An adjustable feedback component is coupled to the amplifier stage 1202 for providing feedback to the amplifier stage 1202. The adjustable feedback component may include a resistor network. In this example, the adjustable feedback component may include resistors 1205, 1206, 1207, 1208, which are coupled in series to the switches 1209, 1210, 1211, 1212 respectively, and each resistor-switch pair is coupled in parallel to each other. The amplifier 1201 may include a controller for controlling the switches 1209, 1210, 1211, 1212. The controller may control the switches 1209, 1210, 1211, 1212 for changing the resistance between the input terminal 1203 and the output terminal 1204.

The controller may adjust the adjustable feedback component based on the gain of the amplifier 1201. In an example, the amplifier 1201 includes an adjustable degeneration component, which may change the gain of the amplifier 1201 by adjusting the degeneration provided by the adjustable degeneration component to the amplifier 1201. In an example, the controller may adjust the adjustable degeneration component of the amplifier 1201. In an example, the controller may adjust the adjustable feedback component based on an adjustment of the adjustable degeneration component. In an example, the controller receives an indication from one or more processors for adjusting the adjustable feedback component based on the adjustment of one or more processors for adjusting the adjustable degeneration component.

In an example, the controller may receive an indication including information related to how the controller should adjust the adjustable feedback component. In an example, the indication may include information related to the amount of the adjustment to be made to the adjustable feedback component. In an example, the indication may include information related to the positions of the switches 1209, 1210, 1211, 1212 for changing the resistance of the adjust, and/or which of the switches 1209, 1210, 1211, 1212 to be brought to an open position, and/or which of the switches 1209, 1210, 1211, 1212 to be brought to a close position.

In an example, each of the resistors 1205, 1206, 1207, 1208 may have the same resistance R. In this example the controller may adjust the resistance of the adjustable feedback component by simply closing only one of the switches 1209, 1210, 1211, 1212, and opening the other switches 1209, 1210, 1211, 1212. Accordingly, if the controller closes only 1212 and opens other switches 1209, 1210, 1211, the resistance coupled between the input terminal 1203, and the output terminal 1204 by the adjustable feedback component would be R.

In an example, the controller may adjust the gain of the amplifier 1201. The controller may adjust the adjustable degeneration component to increase the gain of the amplifier 1201. In an example, the controller may decrease the resistance of the adjustable degeneration component in order to increase the gain of the amplifier in accordance with various aspects of this disclosure. Based on the reduction at the gain of the amplifier, the controller may adjust the adjustable feedback component by controlling the switches 1209, 1210, 1211, 1212. In an example, the controller may increase the resistance of the adjustable degeneration component by opening the switch 1212 and closing the switch 1210. Accordingly, the resistance coupled between the input terminal 1203, and the output terminal 1204 increases from R to 3R with the resistances 1206, 1207, 1208, which provide the feedback.

Further, the controller may also determine the amount of the increase of the resistance of the adjustable feedback component. In an example, the controller may determine the amount of the increase of the resistance of the adjustable feedback component based on the increase to the gain of the amplifier stage 1201. In an example, the controller may determine the amount of the increase by using a look-up table including a plurality of amounts of increase to the gain of the amplifier 1201 and a corresponding plurality of amounts of increase to the resistance of the adjustable feedback component. In another example, the controller may perform calculations based on a predetermined relationship between the increase to the gain of the amplifier 1201 and the increase to the resistance of the adjustable feedback component.

In an example, the controller may increase the resistance of the adjustable feedback component by selecting a resistance from a plurality of resistance options. In an example, the controller may select a resistor from the resistors 1205, 1206, 1207, 1208 to increase the resistance of the adjustable feedback component. In an example, the adjustable feedback component may include a resistor ladder network, or an analog-to-digital converter, and the controller may switch a resistor having a higher resistance to be coupled to the signal input 1203 and the signal output 1204 to increase the resistance of the adjustable feedback component.

In an example, the controller may determine to increase the gain provided by the amplifier stage 1202. In an example, the controller determines that the gain of the amplifier stage 1202 should increase. In another example, one or more processors coupled to the controller may determine that the gain of the amplifier stage 1202 should increase and provides an indication to the controller to increase the gain when the switch 1210 is closed, and other switches 1209, 1211, 1212 are open. In order to increase the gain, the controller may open the switch 1210 and close the switch 1211, which couples the resistor 1207 to the amplifier stage 1202. The determination of which switch will be closed/opened will be determined based on the amount of the degeneration to be provided to the amplifier stage 1202 as provided in accordance with various aspects of this disclosure.

As provided in accordance with various aspects of this disclosure, the controller, or one or more processors may change the adjustable degeneration component for more effective communication, and in various examples, in response to the adjustment of the adjustable degeneration component, the controller may adjust the adjustable feedback component based on the adjustment of the adjustable degeneration component. In an example, the controller may control the switches 1209, 1210, 1211, 1212 of the adjustable feedback component based on an adjustment of the adjustment degeneration component for keeping the input impedance at about the same level to the input impedance before the adjustment to the adjustable degeneration component in order to reduce the effect of the impedance mismatch with the adjustment.

In an example, the amplifier 1201 includes an inverting voltage amplifier, or a transconductance amplifier. In general terms, the input impedance of an amplifier may be calculated under certain assumptions with the formula $Z_{in}=R_{feedback}/(1+A_v)$, where $Z_{in}$ is the input impedance, $R_{feedback}$ is the feedback resistance, and $A_v$ is the gain of the amplifier.

An increase at the gain of the amplifier 1201 would therefore result a decrease at the input impedance, and the controller of the amplifier 1201 may therefore increase the resistance of the adjustable feedback component in order to mitigate the increase at the gain of the amplifier for a more stable input impedance of the amplifier 1201.

In an example, the controller may control the switches 1209, 1210, 1211, 1212 of the adjustable feedback component based on an adjustment of the resistance of the adjustment degeneration component to keep the input impedance at about the same level to the input impedance before the adjustment to the adjustable degeneration component in order to reduce the effect of the impedance mismatch with the adjustment. In an example, the controller may calculate a resistance value for the adjustable feedback component based on the adjustment of the resistance of the adjustment degeneration component, and the controller may control the switches 1209, 1210, 1211, 1212 of the adjustable feedback component based on the calculation. In another example, another component, such as one or more processors which a transceiver includes or which is coupled to the transceiver may perform the calculations in accordance with various aspects of this disclosure, and the controller may control the switches 1209, 1210, 1211, 1212 of the adjustable feedback component according to that calculation.

In an example, the amplifier stage 1202 may include an adjustable degeneration component similar to the adjustable degeneration component of the amplifier stage 1001, including parallel connected a plurality of resistors, and a short circuit which are connected to a plurality of switches in series. Such combination may be configured to increase the degeneration provided by the adjustable degeneration component to the amplifier stage 1202 in predetermined steps, such as the controller controls the adjustable degeneration component to provide different levels of degeneration with predetermined discrete steps. In an example, the controller closing a first switch of the adjustable degeneration component while leaving other switches of the adjustable degeneration component open provides a first level of degeneration, and the controller closing a second switch of the adjustable degeneration component while leaving other switches of the adjustable degeneration component open provides a second level of degeneration.

In this example, assuming that only the resistance 1208 is coupled between the input terminal 1203 and the output terminal 1204 with a closed switch 1212, and the controller controls the adjustable degeneration component to decrease the resistance of the adjustable degeneration component with two predetermined discrete steps, the controller controls the adjustable feedback component to increase the resistance of the adjustable feedback component with two predetermined discrete steps. Accordingly, the controller opens the switch 1212 and closes the switch 1210, which would couple the resistances 1206, 1207, 1208, and resulting to a 3R resistance, which is a resistance increased with two predetermined discrete steps for this example.

A skilled person would appreciate that using predetermined discrete steps for the adjustable degeneration component and the adjustable feedback component may require a specific configuration in terms of the resistance values of the adjustable degeneration component for providing a predetermined amount of degeneration to an amplifier, and also of the resistance values of the adjustable feedback component for balancing the input impedance, for keeping the input impedance at about the same level to the input impedance before the adjustment to the adjustable degeneration component.

In an example, the amplifier 1201 may include a transistor for adjusting the resistance of the adjustable feedback component. In an example, the adjustable feedback component may include the resistors 1205, 1206, 1207, 1208, and the switches 1209, 1210, 1211, 1212 which adjusts the resistance of the adjustable feedback component in discrete values, and a further transistor coupled to the resistors for adjusting the resistance of the adjustable feedback component. In this example, the controller may adjust the voltage applied to the gate (or the base, according to the type of the transistor) of the transistor of the adjustable feedback component for adjusting the resistance of the transistor between the drain and the source terminals (or the collector and the emitter, according to the type of the transistor) of the transistor in accordance with various aspects of this disclosure.

In an example, the amplifier 1201 may receive an input signal from the input terminal 1203 including a signal with central frequency of above 100 GHz. In an example, at least one peaking inductor may be coupled to the output terminal 1204 of the amplifier 1201.

FIG. 13 shows schematically an example of an amplifier in accordance with various aspects in this disclosure. The amplifier 1301 may be a multi-stage differential amplifier. In an example, the amplifier 1301 may include a Cherry-Hooper amplifier. The amplifier 1301 may include two amplifier stages, and each of the amplifier stages may include two differential pair amplifiers. The amplifier 1301 includes two input terminals 1302, 1303 for receiving differential input signals, and two output terminals 1304, 1305 respectively for the first branch and for the second branch of the differential amplifier 1301.

In an example, the first amplifier stage may include an adjustable degeneration component in accordance with various aspects of this disclosure. The first amplifier stage may include a first amplifier 1306, and a second amplifier 1307 as a differential pair. The first amplifier 1306 of the first amplifier stage, and the second amplifier 1307 of the first amplifier stage may include an amplifier including an adjustable degeneration component for adjusting the gain of the first amplifier 1306 of the first amplifier stage and the second amplifier 1307 of the first amplifier stage respectively in accordance with various aspects of this disclosure.

The input of the first amplifier 1306 of the first amplifier stage may be coupled to the input terminal 1302, a feedback resistor 1308, which the feedback resistor 1308 is coupled to the output terminal 1309 of the first amplifier. The output 1309 of the first amplifier 1306 may also be coupled to a peaking capacitor 1310, and the peaking capacitor 1310 is coupled to the ground. The first amplifier 1306 is on the first branch of the differential amplifier 1301.

The input of the second amplifier 1307 of the second amplifier stage may be coupled to the input terminal 1303, a feedback resistor 1311, which the feedback resistor 1311 is coupled to the output terminal 1312 of the second amplifier. The output 1312 of the second amplifier 1307 may be coupled to a peaking capacitor 1313, and the peaking capacitor 1313 is coupled to the ground 1314. The second amplifier 1307 is on the second branch of the differential amplifier 1301.

Further, the amplifier 1301 may include an adjustable feedback component 1315, 1316 in accordance with various aspects of this disclosure for providing feedback from the output of the amplifier 1301. In this example, one of the adjustable feedback components is coupled to the input of the first amplifier of the first amplifier stage, and to the output terminal of the amplifier 1304 of the same branch, and one of the adjustable feedback components is coupled to the input of the second amplifier of the first amplifier stage, and to the output terminal of the amplifier 1305 of the same branch.

A skilled person would appreciate that the disclosures made with respect to the above-mentioned amplifiers referred with respect to the FIG. 9, FIG. 10, FIG. 11, FIG. 12 may be adapted or implemented by the first amplifier stage of the amplifier 1301.

The output of the first amplifier stage is coupled to a second amplifier stage. In this example, the output of the first amplifier 1306 of the first amplifier stage is coupled to the input of a first amplifier 1317 of the second amplifier stage at the terminal 1309, and the output of the second amplifier 1307 of the first amplifier stage is coupled to the input of a second amplifier 1318 of the second amplifier stage. In an example, the first amplifier stage may be a transconductance amplifier stage, and the second amplifier stage may be a transimpedance amplifier stage. In an example, the first amplifier stage and the second amplifier stage may include CMOS inverter stages.

The input of the first amplifier 1317 of the second amplifier stage may be coupled to the terminal 1309, the terminal 1309 couples the output of the first amplifier 1306 of the first amplifier stage and the peaking capacitor 1310 to the first amplifier 1317 of the second amplifier stage, a feedback resistor 1319, which the feedback resistor 1319 is coupled to the output terminal 1304 of the first branch. The output 1304 of the first amplifier 1317 of the second amplifier stage may also be coupled to another peaking capacitor 1320, and the peaking capacitor 1320 is coupled to the ground 1321.

The input of the second amplifier 1318 of the second amplifier stage may be coupled to the terminal 1312, the terminal 1312 couples the output of the second amplifier 1307 of the first amplifier stage and the peaking capacitor 1313 to the second amplifier 1318 of the second amplifier stage, a feedback resistor 1322, which the feedback resistor 1322 is coupled to the output terminal 1305 of the second branch. The output 1305 of the second amplifier 1318 of the second amplifier stage may also be coupled to another peaking capacitor 1323, and the peaking capacitor 1323 is coupled to the ground 1324.

In an example, the second amplifier stage may be capacitively neutralized. In an example, the second amplifier stage may include a first neutralizing capacitor 1325, and a second neutralizing capacitor 1326 for capacitively neutralizing the second amplifier stage. In an example, the first neutralizing capacitor 1325 is coupled to the input terminal of the first amplifier 1317 of the second amplifier stage of the amplifier 1301, and the output terminal of the second amplifier 1318 of the second amplifier stage. In an example, the second neutralizing capacitor 1326 is coupled to the output terminal of the first amplifier 1317 of the second amplifier stage, and the input terminal of the second amplifier 1318 of the second amplifier stage.

By capacitive coupling, the input terminal of the first amplifier 1317 of the second amplifier stage of the amplifier 1301, and the output terminal of the second amplifier 1318 of the second amplifier stage; and the output terminal of the first amplifier 1317 of the second amplifier stage, and the input terminal of the second amplifier 1318 of the second amplifier stage, the effect of intrinsic capacitance of the transistors are compensated. Accordingly, the maximum available gain to provide with the first amplifier 1317 and the second amplifier 1318 of the second amplifier stage may increase. Further, the unwanted interaction with the first amplifier stage, the feedthrough, and the parasitic capacitances are reduced. In an example, the neutralizing capacitors 1325, 1326 may be adjustable to adjust the neutralizing effect.

FIG. 14 exemplarily shows schematically a capacitively neutralized amplifier stage. In this example, the amplifier stage 1401 is a differential amplifier which includes a differential pair provided at two branches, and the differential pairs include a Complementary Metal Oxide Semiconductor (CMOS) inverter. A skilled person would appreciate that the amplifier stage 1401 including a differential amplifier may include other components as well. The amplifier stage 1401 includes a first differential pair 1402 and a second differential pair 1403.

The first differential pair 1402 of the amplifier stage 1401 may include an input terminal 1404 for receiving an input signal and an output terminal 1405 for providing an output signal. The second differential pair 1403 of the amplifier stage 1401 may include an input terminal 1406 for receiving an input signal and an output terminal 1407 for providing an output signal. The input signals the input terminal 1404 of the first differential pair receives, and the input terminal 1406 of the second differential pair may be differential input signals. The output signals which the first differential pair 1402 and the second differential pair 1403 provided from the output terminal 1405 of the first differential pair and the output terminal 1406 of the second differential pair may be differential output signals.

The first differential pair 1402 further includes two Metal Oxide Semiconductor Field Effect Transistor (MOSFET) transistors 1408, 1409 for amplifying the input signal received by the first differential pair 1402. In more detail, one of the transistors is an n-type Metal Oxide Semiconductor Field Effect Transistor (NMOS) transistor 1408, and the other transistor is a p-type Metal Oxide Semiconductor Field Effect Transistor (PMOS) transistor 1409, and they are coupled to form a CMOS inverter. The first differential pair 1402 further includes a feedback resistor 1410.

The second differential pair 1403 includes two Metal Oxide Semiconductor Field Effect Transistor (MOSFET) transistors 1411, 1412 for amplifying the input signal received by the second differential pair 1403. In more detail, one of the transistors is an n-type Metal Oxide Semiconductor Field Effect Transistor (NMOS) transistor 1411, and the other transistor is a p-type Metal Oxide Semiconductor Field Effect Transistor (PMOS) transistor 1412, and they are coupled to form a CMOS inverter. The second differential pair 1403 further includes a feedback resistor 1413

The amplifier stage 1401 includes a first neutralizing capacitor 1414 coupled to the input terminal 1404 of the first amplifier stage 1402, and to the output terminal 1407 of the second amplifier stage 1403, and a second neutralizing capacitor 1415 coupled to the input terminal 1406 of the second amplifier stage 1403, and to the output terminal 1405 of the first amplifier stage 1402.

Referring back to FIG. 13, the nature of the transimpedance of the second amplifier stage, and adjustable neutralizing capacitors further allows the peaking capacitors 1310, 1313, 1320, 1323 may be used to improve the bandwidth. In an example, the first peaking capacitor 1310 is coupled to the input terminal of the first amplifier 1317 of the second amplifier stage, and the second peaking capacitor 1310 is coupled to the output terminal of the first amplifier 1317 of the second amplifier stage. Due to the capacitive coupling in this example, a pair of complex poles are formed at the transfer function of the first amplifier 1317 of the second amplifier stage providing peaking at the output of the first amplifier 1317.

Similarly, in an example, the third peaking capacitor 1313 is coupled to the input terminal of the second amplifier 1318 of the second amplifier stage, and the fourth peaking capacitor 1323 is coupled to the output terminal of the second amplifier 1318 of the second amplifier stage. Due to the capacitive coupling in this example, a pair of complex poles are formed at the transfer function of the second amplifier 1318 of the second amplifier stage, providing peaking at the output of the second amplifier 1318.

In an example, the amplifier 1301 may be a Cherry-Hooper amplifier, as the first amplifier stage may be a transconductance amplifier, and the second amplifier stage may be a transimpedance amplifier. The first amplifier stage of the amplifier 1301 may receive the input signals from input terminals 1302 and 1303, and outputs a current proportional to the input signals. The second amplifier stage of the amplifier 1301 may receive the current which the first amplifier stage outputs, and amplifies the input current from the output of the first amplifier stage, outputting an amplified voltage proportional to the input current. The strong mismatch between the first amplifier stage and the second amplifier stage may contribute to the bandwidth of the amplifier 1301.

FIG. 15 shows schematically an example of an amplifier in accordance with various aspects in this disclosure. The amplifier 1501 may be a multi-stage differential amplifier. In this example, the amplifier 1501 may include three amplifier stages, and each of the amplifier stages may include two differential pair amplifiers. In an example, the amplifier 1501 may include the amplifier 1301 in accordance with various aspects in this disclosure. The amplifier 1501 includes two input terminals 1502, 1503 for receiving differential input signals, and two output terminals 1504, 1505 respectively for the first branch and the second branch of the differential amplifier 1501.

In an example, the first amplifier stage may include an adjustable degeneration component. The first amplifier stage may include a first amplifier 1506, and a second amplifier 1507 as a differential pair. Each of the first amplifier 1506 of the first amplifier stage and the second amplifier 1507 of the first amplifier stage may include an amplifier including an adjustable degeneration component for adjusting the gain of the first amplifier 1506 of the first amplifier stage and the second amplifier 1507 of the first amplifier stage in accordance with various aspects of this disclosure.

The input of the first amplifier 1506 of the first amplifier stage may be coupled to the input terminal 1502, a feedback resistor 1508, which the feedback resistor 1508 is coupled to the output terminal 1509 of the first amplifier. The output 1509 of the first amplifier 1506 may also be coupled to a peaking capacitor 1510, and the peaking capacitor 1510 is coupled to the ground. The first amplifier is on the first branch of the differential amplifier 1501.

The input of the second amplifier 1507 of the first amplifier stage may be coupled to the input terminal 1503, a feedback resistor 1511, which the feedback resistor 1511 is coupled to the output terminal 1512 of the second amplifier. The output 1512 of the second amplifier 1507 may also be coupled to a peaking capacitor 1513, and the peaking capacitor 1513 is coupled to the ground 1514. The second amplifier is on the second branch of the differential amplifier 1501.

Further, the amplifier 1501 may include an adjustable feedback component 1515, 1516 in accordance with various aspects of this disclosure. In this example, one of the adjustable feedback component is coupled to the input of the first amplifier of the first amplifier stage, and to the output terminal of the amplifier 1504 of the same branch but before the peaking inductor, and one of the adjustable feedback components is coupled to the input of the second amplifier of the first amplifier stage before a, and to the output terminal of the amplifier 1505 of the same branch but before the peaking inductor.

The output of the first amplifier stage is coupled to a second amplifier stage. In this example, the output of the first amplifier 1506 of the first amplifier stage is coupled to the input of a first amplifier 1517 of the second amplifier stage at the terminal 1509, and the output of the second amplifier 1507 of the first amplifier stage is coupled to the input of a second amplifier 1518 of the second amplifier stage. In an example, the first amplifier stage may be a transconductance amplifier stage, and the second amplifier stage may be a transimpedance amplifier stage. In an example, the first amplifier stage and the second amplifier stage may include CMOS inverter stages.

The input of the first amplifier 1517 of the second amplifier stage may be coupled to the terminal 1509, the terminal 1509 couples the output of the first amplifier 1506 of the first amplifier stage and the peaking capacitor 1510 to the first amplifier 1517 of the second amplifier stage, a feedback resistor 1519, which the feedback resistor 1519 is coupled to the output terminal 1504 of the first branch. The output 1504 of the first amplifier 1517 of the second amplifier stage may also be coupled to another peaking capacitor 1520, and the peaking capacitor 1520 is coupled to the ground 1521.

The input of the second amplifier 1518 of the second amplifier stage may be coupled to the terminal 1512, the terminal 1512 couples the output of the second amplifier 1507 of the first amplifier stage and the peaking capacitor 1513 to the second amplifier 1518 of the second amplifier stage, a feedback resistor 1522, which the feedback resistor 1522 is coupled to the output terminal 1505 of the second branch. The output 1505 of the second amplifier 1518 of the second amplifier stage may also be coupled to another peaking capacitor 1523, and the peaking capacitor 1523 is coupled to the ground 1524.

A skilled person would appreciate that the disclosures made with respect to the above-mentioned amplifiers referred with respect to the FIG. 9, FIG. 10, FIG. 11, FIG. 12 may be adapted or implemented by the first amplifier stage of the amplifier 1301.

In an example, the second amplifier stage may be capacitively neutralized. In an example, the second amplifier stage may include a first neutralizing capacitor 1525, and a second neutralizing capacitor 1526 for capacitively neutralizing the second amplifier stage. In an example, the first neutralizing capacitor 1525 is coupled to the input terminal of the first amplifier 1517 of the second amplifier stage of the amplifier 1501, and the output terminal of the second amplifier 1518 of the second amplifier stage. In an example, the second neutralizing capacitor 1526 is coupled to the output terminal of the first amplifier 1517 of the second amplifier stage, and the input terminal of the second amplifier 1518 of the second amplifier stage.

The nature of the transimpedance of the second amplifier stage, and adjustable neutralizing capacitors further allows the peaking capacitors 1510, 1513, 1520, 1523 may be used to improve the bandwidth. In an example, the first peaking capacitor 1510 is coupled to the input terminal of the first amplifier 1517 of the second amplifier stage, and the second peaking capacitor 1510 is coupled to the output terminal of the first amplifier 1517 of the second amplifier stage. Due to the capacitive coupling in this example, a pair of complex poles are formed at the transfer function of the first amplifier 1517 of the second amplifier stage providing peaking at the output of the first amplifier 1517.

Similarly, in an example, the third peaking capacitor 1513 is coupled to the input terminal of the second amplifier 1518 of the second amplifier stage, and the fourth peaking capacitor 1523 is coupled to the output terminal of the second amplifier 1518 of the second amplifier stage. Due to the capacitive coupling in this example, a pair of complex poles are formed at the transfer function of the second amplifier 1518 of the second amplifier stage, providing peaking at the output of the second amplifier 1518.

The output of the second amplifier stage is coupled to a third amplifier stage. In this example, the output of the first amplifier 1517 of the second amplifier stage is coupled to the input of a first amplifier 1527 of the third amplifier stage, and the output of the second amplifier 1518 of the second amplifier stage is coupled to the input of a second amplifier 1528 of the third amplifier stage. In an example, the first amplifier stage may include a transconductance amplifier stage, the second amplifier stage may include a transimpedance amplifier stage, and the third amplifier stage may include a buffer with an additional gain. In an example, the first amplifier stage, the second amplifier stage, and the third amplifier stage may include CMOS inverter stages.

The input of the first amplifier 1527 of the third amplifier stage may be coupled to the output of the first amplifier 1517 of the second amplifier stage and the peaking capacitor 1520 to the first amplifier 1527 of the third amplifier stage, a feedback resistor 1526, which the feedback resistor 1529 is coupled to a first peaking inductor 1530 which is coupled to the output terminal 1504 of the first branch. The output of the first amplifier 1527 of the third amplifier stage may also be coupled to another capacitor 1531, and the capacitor 1528 is coupled to the ground 1532.

The input of the second amplifier 1528 of the third amplifier stage may be coupled to the output of the second amplifier 1518 of the second amplifier stage and the peaking capacitor 1523 to the second amplifier 1528 of the third amplifier stage, a feedback resistor 1533, which the feedback resistor 1533 is coupled to a second peaking inductor 1534 which is coupled to the output terminal 1505 of the second branch. The output of the second amplifier 1528 of the third amplifier stage may also be coupled to another capacitor 1535, and the capacitor 1535 is coupled to the ground 1536.

In an example, the peaking inductor 1530 coupled to the output terminal 1504 of the first branch, and the peaking inductor 1533 coupled to the output terminal 1505 of the second branches as single ended. The series connected peaking inductors 1530, 1533 would introduce zeros at the response of the outputs of the amplifier 1501, reducing the frequency roll-off and thereby increasing the bandwidth. The inductors which are coupled to the differential outputs of the amplifier 1501 as singled ended would be incorporated as part of the resistance of the load of the amplifier 1501 to permit a large inductance to be realized with minimum capacitance. There would be also almost no additional power dissipation with the inductors 1530, 1533 coupled in series to the outputs of the amplifier 1501.

In an example, the amplifier 1501 may include a Cherry-Hooper amplifier, as the first amplifier stage may be a transconductance amplifier, and the second amplifier stage may be a transimpedance amplifier. The first amplifier stage of the amplifier 1501 may receive the input signals from input terminals 1502 and 1503, and outputs a current proportional to the input signals. The second amplifier stage of the amplifier 1501 may receive the current which the first amplifier stage outputs, and amplifies the input current from the output of the first amplifier stage, outputting an amplified voltage proportional to the input current. The strong mismatch between the first amplifier stage and the second amplifier stage may contribute to the bandwidth of the amplifier 1501.

FIG. 16 shows schematically an exemplary flow diagram illustration of a method 1600 in accordance with various aspects. The method may include:

Amplifying a received first input signal with an adjustable gain by at least one amplifier stage including at least one adjustable degeneration component, wherein at least one adjustable feedback component is coupled to the at least one amplifier stage 1601; and Adjusting the at least one adjustable feedback component based on an adjustment of the at least one adjustable degeneration component 1602.

In accordance with various aspects of this disclosure, a device, in particular, a communication device may include a memory, and one or more processors, such as processing circuitry 810 and memory 820 referring back to FIG. 8. The memory 820 may be implemented as one or more non-transitory computer-readable medium including one or more instructions that when executed on at least one processor cause an amplifying circuit to enable the aspects disclosed herein to be functionally realized, including but not limited to: to amplify a received first input signal with an adjustable gain by at least one amplifier stage including at least one adjustable degeneration component, wherein at least one adjustable feedback component is coupled to the at least one amplifier stage; and to adjust the at least one adjustable feedback component based on an adjustment of the at least one adjustable degeneration component.

There are also other challenges of the increased frequency of the communication signals, which may also result to a wide spectrum for the baseband signals. A transceiver may be able to receive and transmit signals having carrier frequencies at levels of tens or hundreds of Gigahertz, and conduct such signals, or baseband signals or intermediate signals which are using the electromagnetic spectrum proportional to the carrier frequencies. Considering that the transceivers may also support MIMO architecture, there may be multiple signals at hundreds of Gigahertz being conducted by the electronic circuit of the transceivers, which includes many inductive elements.

Furthermore, due to the advancement in communication technologies, e.g. wireless communication technology, and also semiconductor technology, a transceiver, or a transceiver module may be implemented on a single chip, or even on a single semiconductor die. The reduced space for the components of the transceiver, especially for the inductive components, may result to undesired interaction due to different types of mutual coupling interactions. Such interactions may lead to distortions at the response of the transceiver and the inclusion of unwanted frequencies in the electromagnetic spectrum.

One of the principal causes of such undesired couplings may be the local oscillators which may be used in, for example, synthesizer circuits for modulating and demodulating the signals received or transmitted by the transceiver. A transceiver may include multiple local oscillators, and such local oscillators may include large inductor structures. Alternatively, there are many inductive elements used in a transceiver, and such inductive elements may be located in signal paths which are close to each other, and which carry signals operating at high frequencies, thereby causing magnetic coupling between the inductive elements.

There have been already certain methods which are used to reduce the magnetic coupling between two inductive elements which are located in a proximity because it is important to prevent the effective magnetic coupling that may affect the circuits or signal paths coupled to, or close to the inductive elements. One of the effective methods is to provide a necessary distance between such inductive elements so that the effect of the magnetic coupling would not be able to provide any unwanted result. However, providing the necessary distance between elements would require space for the electronic circuits, resulting to an increased form factor for the transceiver. An increased form factor may not be tolerated due to market requirements for smaller communication devices. Therefore, one of the objects of this disclosure would be to overcome the challenges which may result to magnetic coupling between inductive elements of the electronic circuits.

FIG. 17 exemplarily shows schematically an aspect of a communication device including a transceiver with a local oscillator. The transceiver includes an antenna 1701 to receive a wireless communication signal. The wireless communication signal may be a wireless signal according to any technologies including Wi-Fi (IEEE 802.11 family), IEEE 802.15 family, WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless protocols that are designated as 3G, 4G, 5G, and beyond. The transceiver further includes a low noise amplifier (LNA) 1702. The low noise amplifier 1702 amplifies the wireless communication signal received by the antenna 1701. In an example, one or more processors provide the amplification properties of the low noise amplifier 1702 of the communication device, based on the received wireless communication signal.

The transceiver provides the output of the low noise amplifier 1702 to the input of a mixer 1703 to demodulate the received wireless communication signal. The mixer 1703 may receive the received wireless communication signal from one of its inputs. The transceiver may further include a local oscillator 1704 which may generate a reference signal to be received by another input of the mixer 1703. The mixer 1703 multiplies the received wireless communication signal with the reference signal generated by the local oscillator 1704. The transceiver may further include a low pass filter 1705 which may be coupled to the output of the mixer 1703, and the output of the mixer 1703 provides the output to the low pass filter 1705. Accordingly, the spectrum of the received wireless communication signal may translate into the baseband. In an alternative example, the spectrum of the received wireless communication signal may translate into an intermediate frequency.

In this example, the received wireless communication signal includes a signal modulated by IQ modulation. The output of the low pass filter 1705 is coupled to two signal paths, and each signal path receives a portion of the frequency translated signal. In an alternative example, the transceiver may include a direct conversion receiver, and in the example of the direct conversion receiver, the low noise amplifier 1702 may be coupled to the two signal paths without a prior frequency translation.

One of the signal paths, a first signal path, includes a mixer 1706, a filter 1707, and an analog to digital converter 1708. In an example, the mixer 1706 receives a first frequency-translated signal and multiplies the first frequency-translated signal with a first sinusoidal signal generated by a local oscillator 1709 to obtain the in-phase component included in the received wireless communication. The mixer 1706 provides its output to the filter 1707 which applies a low-pass filter to the multiplied signal. The filter 1707 may provide its output to the analog-digital converter 1708, which provides the in-phase component to a baseband processor 1710.

One of the signal paths, a second signal path includes a mixer 1711, a filter 1712, and an analog to digital converter 1713. In an example, the mixer 1711 receives the second frequency-translated signal and multiplies the second frequency-translated signal with a second sinusoidal signal generated by the local oscillator 1709 to obtain the quadrature component. The mixer 1711 provides its output to the filter 1712 which applies a low-pass filter to the multiplied signal. The filter 1712 may provide its output to the analog-digital converter 1713, which provides the quadrature component to the baseband processor 1710.

The local oscillator 1709 may include a voltage-controlled oscillator suitable for generating two orthogonal sinusoidal signals from its separate outputs to be provided to the mixer 1706 and the mixer 1711 respectively. In another example, the local oscillator 1709 may generate an output signal. A splitter may divide the output signal into two signal paths. In an alternative example, the local oscillator 1709 may have two outputs for outputting the same signals into two signal paths. One of the signal paths may include a phase shifter for shifting the phase of the input signal by 90 degrees. Accordingly, in an example, the local oscillator 1709 may provide a first signal to a first signal path which is coupled to the mixer 1706. The local oscillator 1709 may provide a second signal to a second signal path, and the second signal has the same phase characteristic as the first signal. The second signal path further includes a phase shifter to provide a 90 degrees phase difference to the second signal. The output of the phase shifter is coupled to the mixer 1711 through the second signal path.

Because of the reduced form factors of a transceiver, the signal paths which have been mentioned in accordance with various aspects of this disclosure may be close to each other. In an example, the first signal path may conduct a first signal, and a second signal path may conduct a second signal. In an example, the second signal may have a phase difference with the first signal. Accordingly, the second signal may include a signal that is delayed by a predefined phase difference related to the first signal. In another example, a second oscillator may generate the second signal which is not shown. In an example, the local oscillator may generate one signal for the first signal path and the second signal path. The second signal path may include a phase shifter which delays the signal by a predefined phase difference to obtain the second signal. In an example, especially with respect to I-Q modulation/demodulation, the predefined phase difference may be 90 degrees to provide orthogonal signals.

The first signal path may further be coupled to one or more inductive components including an inductor. In an example, the local oscillator which may be coupled to the first signal path may include one or more inductive components. In an example, the second signal path may further be coupled to one or more inductive components including an inductor. In an example, the local oscillator which may be coupled to the second signal path may include one or more inductive components. In an example, it may be the same oscillator which is coupled to the first signal path and the second signal path. The oscillator may include various inductive components, and a first inductor may be coupled to the first signal path, and a second inductor may be coupled to the second signal path. Due to size constraints, the first inductor and the second inductor may be located in a proximity, which may affect the electrical circuit of the local oscillator or other electrical circuits coupled to the first signal path and the second signal path.

In accordance with various aspects of this disclosure in order to reduce inductive coupling (magnetic coupling) between the first signal path and the second signal path, a portion of the first signal which is conducted by the first signal path may be introduced to the second signal path. In an example, a portion of the second signal which is conducted by the second signal path may be introduced to the first signal path. In an example, the circuitry may include a capacitor coupled to the first signal path and the second signal path to introduce a portion of the first signal from the first signal path into the second signal path. In an example, the circuitry may include a capacitor coupled to the first signal path and the second signal path to introduce a portion of the second signal from the second signal path into the first signal path. In an example, the capacitor may be configured to introduce a portion of the first signal from the first signal path into the second signal path and also to introduce a portion of the second signal from the second signal path into the first signal path.

A skilled person would appreciate that any of the examples referred with respect to the FIG. 17, or with respect to any other figures in accordance with various aspects of this disclosure, may also apply, as long as they are applicable, to a transmitting portion of the transceiver, or any portion of any circuit in accordance with various aspects of this disclosure.

FIG. 18 exemplarily shows a schematic diagram illustrating a local oscillator for I-Q demodulation in accordance with various aspects of this disclosure. The local oscillator may include a portion of the oscillator, in particular a first portion of the local oscillator 1801 and a second portion of the local oscillator 1802. The first portion of the local oscillator 1801 may output a first differential signal $V_{IN}$ as an in-phase component one of the output signals of the local oscillator. In an example, the first differential signal may be coupled via a first transformer 1803 as a feedback signal to the second portion of the local oscillator 1802. The second portion of the local oscillator 1802 may output a second differential signal $V_Q$ as the second output signal of the local oscillator. In an example, the second differential signal $V_Q$ includes the quadrature component with respect to the first differential signal. Similarly, the second differential signal may be coupled via a second transformer 1804 as a feedback signal to the first portion of the local oscillator 1801.

In an example, the first portion of the oscillator may include a pair of N-channel cross-coupled transistors 1805 and 1806 and a pair of P-channel cross-coupled transistors 1809 and 1810. In an example, the drain terminal of the first N-channel cross-coupled transistor 1805 may be coupled to the gate terminal of the second N-channel cross-coupled transistor 1806. Similarly, the drain terminal of second N-channel cross-coupled transistor 1806 may be coupled to the gate terminal of the first N-channel cross-coupled transistor 1805 in the pair of N-channel cross-coupled transistors. The source terminals of the pair of N-channel cross-coupled transistors may be together commonly coupled through a current source 1807 to a ground terminal 1808.

The drain terminal of the first P-channel cross-coupled transistor 1809 is coupled to the gate terminal of the second P-channel cross-coupled transistor 1810. In an example, the drain terminal of the second P-channel cross-coupled transistor 1810 is coupled to the gate terminal of the first P-channel cross-coupled transistor 1809. The source terminals of the pair of P-channel cross-coupled transistors may be together commonly coupled to a voltage source 1811. Accordingly, the portion of the oscillator generates the in-phase output signal $V_{IN}$ differentially at the commonly connected drain terminals of the first P-channel cross-coupled transistor 1809 and the first N-channel cross-coupled transistor 1805 and the commonly connected drain terminals of the second P-channel cross-coupled transistor 1810 and the second N-channel cross-coupled transistor 1806. Accordingly, terminals 1812 and 1813 outputs the in-phase output signal.

The first portion of the local oscillator 1801 of the local oscillator may include a tank circuit that may be tuned to a desired resonant frequency. In an example, the tank circuit may include variable reactance devices. In an example, a variable reactance device may include a varactor diode. In this example, a first set of variable reactance device may include two varactors 1814 and 1815. The two varactors 1814 and 1815 are coupled serially for forming the first variable reactance device. The local oscillator may further include a second set of variable reactance device. The second set of variable reactance devices may include varactors 1817, 1818, 1819, and 1820. The four varactors 1817, 1818, 1819, 1820 may be coupled serially for forming the second set of variable reactance device.

In an example, the first set of variable reactance devices and the second set of variable reactance may be coupled to the differential output of the first portion of the local oscillator 1801. In an example the first reactance device and the second reactance device may include further inductors and varactors.

The second portion of the local oscillator 1802 of the local may include a pair of N-channel cross-coupled transistors 1821 and 1822 and a pair of P-channel cross-coupled transistors 1825 and 1826. In an example, the drain terminal of the first N-channel cross-coupled transistor 1821 may be coupled to the gate terminal of the second N-channel cross-coupled transistor 1822. Similarly, the drain terminal of second N-channel cross-coupled transistor 1822 may be coupled to the gate terminal of the first N-channel cross-coupled transistor 1821 in the pair of N-channel cross-coupled transistors. The source terminals of the pair of N-channel cross-coupled transistors may be together commonly coupled through a current source 1823 to a ground terminal 1824.

The drain terminal of the first P-channel cross-coupled transistor 1825 is coupled to the gate terminal of the second P-channel cross-coupled transistor 1826. In an example, the drain terminal of the second P-channel cross-coupled transistor 1826 is coupled to the gate terminal of the first P-channel cross-coupled transistor 1825. The source terminals of the pair of P-channel cross-coupled transistors may be together commonly coupled to a voltage source 1827 The second portion of the oscillator generates a quadrature phase output signal $V_Q$ differentially at the commonly connected drain terminals of the first P-channel cross-coupled transistor 1825 and the first N-channel cross-coupled transistor 1821 and the commonly connected drain terminals of the second P-channel cross-coupled transistor 1826 and the second N-channel cross-coupled transistor 1822.

The second portion of the local oscillator 1802 of the local oscillator may also include a tank circuit that may tune to a desired resonant frequency. In an example, the tank circuit may include variable reactance devices. In an example, a variable reactance device may include a varactor diode. varactor diodes. In this example, a first set of variable reactance devices may include two varactors 1828 and 1829. The two varactors 1828 and 1829 are coupled serially for forming the first variable reactance devices. The local oscillator may further include a second set of variable reactance devices. The second set of variable reactance devices may include varactors 1830, 1831, 1832, and 1832. The four varactors 1830, 1831, 1832, 1832 may be coupled serially for forming the second set of variable reactance devices. Accordingly, the terminals 1834 and 1835 output the quadrature phase output signal $V_Q$.

In an example, the first set of variable reactance devices and the second set of variable reactance devices may be coupled to the differential output of the first portion of the local oscillator 1801 and the second portion of the local oscillator 1802 respectively. In an example, the first reactance device and the second reactance device may include further inductors and varactors.

In an example, the local oscillator may include a first transformer 1803 and a second transformer 1804. In an example, the first transformer 1803 and the second transformer 1804 may be on-chip transformers. In an example, the first transformer 1803 and the second transformer 1804 are configured to provide coupling between the first portion of the local oscillator 1801 and the second portion of the local oscillator 1802. In an example, each of the first transformer 1803 and the second transformer 1804 may include one primary winding and one secondary winding.

In an example, the first transformer 1803 may couple the primary winding of the first transformer 1803 to the output terminals of the first portion of the local oscillator 1801. The output terminals of the first portion of the oscillator provide an in-phase output signal. The first transformer 1803 may couple the secondary winding of the first transformer 1803 to the second portion of the local oscillator 1802. In an example, one terminal of the secondary winding of the first transformer 1803 may be coupled to the varactors 1830 and 1831. Other terminal of the secondary winding of the first transformer 1803 may be coupled to the varactors 1832 and 1833.

In an example, the second transformer 1804 may couple the primary winding of the second transformer 1804 to the output terminals of the second portion of the oscillator 1802. The output terminals of the second portion of the oscillator provide a quadrature phase output signal. The second transformer 1804 may couple the secondary winding of the second transformer 1804 to the first portion of the local oscillator 1801. In an example, one terminal of the secondary winding of the second transformer 1804 may be coupled to the varactors 1817 and 1818. Other terminal of the secondary winding of the second transformer 1804 may be coupled to the varactors 1819 and 1820.

The second transformer 1804 may couple with its primary windings the output terminals 1834 and 1835 of the second portion of the local oscillator 1802 for receiving the differential signal $V_Q$, with one terminal of the secondary winding coupled to varactors 1817 and 1818 and the other terminal of the secondary winding coupled to varactors 1819 and 1820 of the first portion of the local oscillator 1801. The first transformer 1803 may couple with its primary windings to the output terminals 1812 and 1813 of the first portion of the local oscillator 1801 for receiving the differential signal $V_{IN}$, with one terminal of the secondary winding coupled to varactors 1830 and 1831 and the other terminal of the secondary winding coupled to varactors 1832 and 1832 the second portion of the local oscillator 1802.

In an example, the first transformer 1803 and the second transformer 1804 may be on-chip transformers. In an example, the first transformer 1803 and the second transformer may be on-chip planar transformers that are fabricated on a semiconductor die. In an example, the first transformer 1803 and the second transformer 1804 may have a high Q factor for supporting a high Signal-to-Noise ratio.

Accordingly, the tank circuit of the first transformer 1803 may allow the generation of the in-phase signal at the output terminals of the first portion of the local oscillator 1801. The secondary winding of the second transformer 1804 may be coupled to the first set of variable reactance devices and the second transformer 1804 may conduct a signal which is the ninety degrees shifted version of the in-phase signal. Alternatively, the tank circuit of the second transformer 1804 may allow the generation of the version of the in-phase signal which is shifted by 90 degrees, which is the quadrature signal. The secondary winding of the first transformer 1803 which may be coupled to the second set of variable reactance devices would have a signal which is the ninety degrees shifted version of the quadrature signal.

In an example, a first capacitor 1836 may be coupled to the primary winding of the first transformer 1803 which is coupled to the first signal path, and the primary winding of the second transformer 1804 which is coupled to the second signal path. In accordance with various aspects of this disclosure, the first signal path and the second signal path may have magnetic coupling between the first signal path and the second signal path due to the inductor coupled to the signal paths, which the signal paths conduct two signals having a phase difference. In other words, the first signal path conducts a first signal, and the second signal path conducts a second signal which includes a signal delayed by a predefined phase difference related to the first signal.

In an example, the first capacitor 1836 which couples the primary winding of the first transformer 1803 and the primary winding of the second transformer 1804 may introduce a portion of the first signal, which is the signal flowing through the primary winding of the first transformer 1803, into the primary winding of the second transformer 1804. In an example, adjusting the capacitance value of the first capacitor 1836 may adjust the amount of the portion of the first signal which the first capacitor 1836 introduce from the primary winding of the first transformer 1803, into the primary winding of the second transformer 1804.

In an example, the first capacitor 1836 which couples the primary winding of the first transformer 1803 and the primary winding of the second transformer 1804 may introduce a portion of the second signal, which is the signal flowing through the primary winding of the second transformer 1804, into the primary winding of the first transformer 1803. In an example, adjusting the capacitance value of the first capacitor 1836 may adjust the amount of the portion of the second signal which the first capacitor 1836 introduces from the primary winding of the second transformer 1804, into the primary winding of the first transformer 1803.

In an example, a second capacitor 1837 may be coupled to the secondary winding of the first transformer 1803 which is coupled to a first signal path, and the secondary winding of the second transformer 1804 which is coupled to a second signal path. In accordance with various aspects of this disclosure, the first signal path and the second signal path may have magnetic coupling between the first signal path and the second signal path due to the inductor coupled to the signal paths, which the signal paths conduct two signals having a phase difference. In other words, the first signal path conducts a first signal, and the second signal path conducts a second signal which includes a signal delayed by a predefined phase difference related to the first signal.

In an example, the second capacitor 1837 which couples the secondary winding of the first transformer 1803 and the secondary winding of the second transformer 1804 may introduce a portion of the first signal, which is the signal flowing through the secondary winding of the first transformer 1803, into the secondary winding of the second transformer 1804. In an example, adjusting the capacitance value of the second capacitor 1837 may adjust the amount of the portion of the first signal which the secondary capacitor 1837 introduces from the secondary winding of the first transformer 1803, into the secondary winding of the second transformer 1804.

In an example, the second capacitor 1837 which couples the secondary winding of the first transformer 1803 and the secondary winding of the second transformer 1804 may introduce a portion of the second signal, which is the signal flowing through the secondary winding of the second transformer 1804, into the secondary winding of the first transformer 1803. In an example, adjusting the capacitance value of the second capacitor 1837 may adjust the amount of the portion of the second signal which the second capacitor 1837 introduces from the secondary winding of the second transformer 1804, into the secondary winding of the first transformer 1803.

FIG. 19 exemplarily shows schematically a block diagram of a phase-locked loop. In an example, the local oscillator in accordance with various aspects of this disclosure may further be realized by a phase-locked loop. A phase-locked loop is used in many applications, in many radio frequency related technologies including FM demodulation, AM demodulation, PM demodulation, in oscillator modules and in serial communication.

Generally, a phase-locked loop may include a phase comparator 1901 for comparing a feedback signal with a signal at a reference frequency 1902. In an example, a crystal or a temperature-controlled crystal oscillator may generate the reference signal. In an example, any frequency generator which may be stable and accurate enough to generate the signal at the reference frequency may be used. The phase comparator 1901 may include a phase frequency detector configured to detect the phase-error signal between two its two inputs. In an example, the phase frequency detector receives the signal at the reference frequency 1902 from one of its inputs, and the feedback signal which represents the output of a voltage-controlled oscillator.

Accordingly, the phase frequency detector may be configured to provide a phase-error signal by comparing the signal at the reference frequency with the feedback signal. The phase frequency detector may include a plurality of flip-flops and a delay circuit. The phase frequency detector may provide its output indicating the phase difference between the phase of the signal at the reference frequency and the phase of the feedback signal to a charge pump circuit. The charge pump circuit outputs an error signal which indicates the phase difference to the voltage-controlled oscillator. In an example, the phase-locked loop may include a low pass filter 1903 which filter out the high-frequency components from the error signal.

The phase-locked loop may also include a voltage-controlled oscillator 1904 which may provide its output 1905 to the elements coupled to the phase-locked loop. The voltage-controlled oscillator 1904 receives the filtered error signal from an input terminal, and it is configured to reduce the phase difference based on the error signal. A portion of the output of the voltage-controlled oscillator 1904 would also be provided to the input of the phase comparator 1901 by a divider 1906.

In accordance with various aspects of this disclosure, a phase-locked loop may be coupled to a first signal path for receiving the reference signal. The phase-locked loop may also be coupled to a second signal path for receiving the feedback signal. Due to the nature of a phase-locked loop, the reference signal which the first signal path conducts, and the feedback signal which the second signal path conducts may have a phase difference. In other words, the first signal path may conduct the reference signal, and the second signal path may conduct the feedback signal, which the feedback signal may include a signal that is delayed by a phase difference related to the reference signal.

In accordance with various aspects of this disclosure, a capacitor may be coupled to the first signal path which conducts the reference signal, and to the second signal path which conducts the feedback signal. In an example, the capacitor may introduce a portion of the reference signal into the second signal path. In an example, adjusting the capacitance value of the capacitor may adjust the amount of the portion of the first signal which the capacitor introduces from the first signal path, into the secondary signal path.

In an example, the capacitor may introduce a portion of the feedback signal into the second signal path. In an example, adjusting the capacitance value of the capacitor may adjust the amount of the portion of the feedback signal which the capacitor introduces from the second signal path, into the first signal path.

In accordance with various aspects of this disclosure, a skilled person would appreciate that this is based on a capacitive coupling which may be realized by a capacitance value in a range from about 8 fF to about 12 fF, e.g. at about 10 fF. The power consumption penalty is very low, and a possible implementation of such coupling would not require a considerable amount of area for a chip implementation.

FIG. 20 exemplarily shows schematically an on-chip network implementation for local oscillator signal drivers in accordance with various aspects of this disclosure. A first set of active circuitry of a local oscillator driver is represented with the triangular shaped block 2001. In an example, the first set of active circuitry of the local oscillator may be an in-phase driver block. The in-phase driver block 2001 may include the circuitry to generate an in-phase local oscillator signal. A second set of active circuitry of the local oscillator driver is represented with the triangular shaped block 2002. In an example, the second set of active circuitry of the local oscillator may be a quadrature driver block. The quadrature driver block 2002 may include the circuitry to generate a quadrature local oscillator signal, which includes a signal that is delayed by 90 degrees phase difference related to the in-phase signal.

The in-phase driver block 2001 may provide the in-phase signal using two signal paths 2003, 2004 to a first matching circuit 2005. The quadrature driver block 2002 may provide the quadrature signal using two signal paths 2006, 2007 to a second matching circuit 2008. The first matching circuit 2005 may include an on-chip transformer 2009, 2010, which may provide its output from the terminals 2011. The second matching circuit 2008 may include an on-chip transformer 2012, 2013, which may provide its output from the terminals 2014.

In an example, the on-chip transformer of the first matching circuit 2005 may include a primary winding 2009 and a secondary winding 2010. In an example, the primary winding 2009 and the secondary winding 2010 of the first matching circuit 2005 may be at a tapped structure. In an example, the primary winding 2009 and the secondary winding 2010 of the first matching circuit 2005 may be at an interleaved structure. In an example, the primary winding 2009 and the secondary winding 2010 of the first matching circuit 2005 may be at a stacked structure.

In an example, the on-chip transformer of the second matching circuit 2008 may include a primary winding 2012 and a secondary winding 2013. In an example, the primary winding 2012 and the secondary winding 2013 of the second matching circuit 2008 may be at a tapped structure. In an example, the primary winding 2012 and the secondary winding 2013 of the second matching circuit 2008 may be at an interleaved structure. In an example, the primary winding 2012 and the secondary winding 2013 of the second matching circuit 2008 may be at a stacked structure.

In an example, the first matching circuit 2005 may further include a ground ring 2015 around the on-chip transformer. In an example, the second matching circuit 2008 may further include a ground ring 2016 around the on-chip transformer. Although it is generally known that a ground ring may be an effective solution for magnetic coupling, because of the short proximity between the first matching circuit 2005 and the second matching circuit 2008, the magnetic coupling may still be high enough to create a phase error which may affect the output signals.

FIG. 21 exemplarily shows schematically an on-chip network implementation for local oscillator signal drivers in accordance with various aspects of this disclosure. A first set of active circuitry of a local oscillator driver is represented with the triangular shaped block 2101. In an example, the first set of active circuitry of the local oscillator may be an in-phase driver block. The in-phase driver block 2101 may include the circuitry to generate an in-phase local oscillator signal. A second set of active circuitry of the local oscillator driver is represented with the triangular shaped block 2102. In an example, the second set of active circuitry of the local oscillator may be a quadrature driver block. The quadrature driver block 2101 may include the circuitry to generate a quadrature local oscillator signal, which includes a signal that is delayed by 90 degrees phase difference related to the in-phase signal.

The in-phase driver block 2101 may provide the in-phase signal using two signal paths 2103, 2104 to a first matching circuit 2105. The quadrature driver block 2102 may provide the quadrature signal using two signal paths 2106, 2107 to a second matching circuit 2108. The first matching circuit 2105 may include an on-chip transformer 2109, 2110, which may provide its output from the terminals 2111. The second matching circuit 2108 may include an on-chip transformer 2112, 2113, which may provide its output from the terminals 2114.

In an example, the on-chip transformer of the first matching circuit 2105 may include a primary winding 2109 and a secondary winding 2110. In an example, the primary winding 2109 and the secondary winding 2110 of the first matching circuit 2105 may be at a tapped structure. In an example, the primary winding 2109 and the secondary winding 2110 of the first matching circuit 2105 may be at an interleaved structure. In an example, the primary winding 2109 and the secondary winding 2110 of the first matching circuit 2105 may be at a stacked structure.

In an example, the on-chip transformer of the second matching circuit 2108 may include a primary winding 2112 and a secondary winding 2113. In an example, the primary winding 2112 and the secondary winding 2113 of the second matching circuit 2108 may be at a tapped structure. In an example, the primary winding 2112 and the secondary winding 2113 of the second matching circuit 2108 may be at an interleaved structure. In an example, the primary winding 2112 and the secondary winding 2113 of the second matching circuit 2108 may be at a stacked structure.

In an example, the first matching circuit 2105 may further include a ground ring 2115 around the on-chip transformer. In an example, the second matching circuit 2108 may further include a ground ring 2116 around the on-chip transformer. Although it is generally known that a ground ring may be an effective solution for magnetic coupling, because of the short proximity between the first matching circuit 2105 and the second matching circuit 2108, the magnetic coupling may still be high enough to create a phase error which may affect the output signals.

In accordance with various aspects of this disclosure, the structure may include a capacitor 2117 configured to counteract the impairment caused by magnetic coupling. The capacitor 2117 may be coupled between the primary winding 2109 of the first matching circuit 2105 and the primary winding 2112 of the second matching circuit 2108. In an example, the capacitor 2117 may introduce a portion of the signal flowing through the primary winding 2109 of the first matching circuit 2105 into the primary winding 2112 of the second matching circuit 2108. In an example, adjusting the capacitance value of the capacitor 2117 may adjust the amount of the portion of the signal flowing through the primary winding 2109 of the first matching circuit 2105 into the primary winding 2112 of the second matching circuit 2108.

In an example, the capacitor 2117 may introduce a portion of the signal flowing through the primary winding 2112 of the second matching circuit 2108 into the primary winding 2109 of the first matching circuit 2105. In an example, adjusting the capacitance value of the capacitor 2117 may adjust the amount of the portion of the signal flowing through the primary winding 2112 of the second matching circuit 2108 into the primary winding 2109 of the first matching circuit 2105.

In an example, the capacitor 2117 may be generated by extending the metals of the primary winding 2109 of the first matching circuit 2105. In an example, the capacitor 2117 may be generated by extending the metals of the primary winding 2112 of the second matching circuit 2108. In an example, the capacitor 2117 may be generated by extending the metals of the primary winding 2109 of the first matching circuit 2105 and also the metals of the primary winding 2112 of the second matching circuit 2108.

In these examples, the metals extended from the primary winding 2109 of the first matching circuit 2105 may be a first metal plate of the capacitor 2117. The metals extended from the primary winding 2112 of the second matching circuit 2108 may be a second metal plate of the capacitor 2117. The capacitor 2117 may also include a dielectric material between the first metal plate and the second plate. In an example, the chip which the first matching circuit 2105 and the second matching circuit 2108 provides the dielectric material.

In an example, the primary winding 2109 of the first matching circuit 2105 may be a first type of metal, and the plate which extends from the primary winding 2109 of the first matching circuit 2105 may be another type of metal. In an example, the primary winding 2112 of the first matching circuit 2108 may be a first type of metal, and the plate which extends from the primary winding 2112 of the first matching circuit 2108 may be another type of metal.

FIG. 22 exemplarily shows schematically an on-chip network implementation for local oscillator signal drivers in accordance with various aspects of this disclosure. A first set of active circuitry of a local oscillator driver is represented with the triangular shaped block 2201. In an example, the first set of active circuitry of the local oscillator may be an in-phase driver block. The in-phase driver block 2201 may include the circuitry to generate an in-phase local oscillator signal. A second set of active circuitry of the local oscillator driver is represented with the triangular shaped block 2202. In an example, the second set of active circuitry of the local oscillator may be a quadrature driver block. The quadrature driver block 2202 may include the circuitry to generate a quadrature local oscillator signal, which includes a signal that is delayed by 90 degrees phase difference related to the in-phase signal.

The in-phase driver block 2201 may provide the in-phase signal using two signal paths 2203, 2204 to a first matching circuit 2205. The quadrature driver block 2202 may provide the quadrature signal using two signal paths 2206, 2207 to a second matching circuit 2208. The first matching circuit 2205 may include an on-chip transformer 2209, 2210, which may provide its output from the terminals 2211. The second matching circuit 2208 may include an on-chip transformer 2212, 2213, which may provide its output from the terminals 2214.

In an example, the on-chip transformer of the first matching circuit 2205 may include a primary winding 2209 and a secondary winding 2210. In an example, the primary winding 2209 and the secondary winding 2210 of the first matching circuit 2205 may be at a tapped structure. In an example, the primary winding 2209 and the secondary winding 2210 of the first matching circuit 2205 may be at an interleaved structure. In an example, the primary winding 2209 and the secondary winding 2210 of the first matching circuit 2205 may be at a stacked structure.

In an example, the on-chip transformer of the second matching circuit 2208 may include a primary winding 2212 and a secondary winding 2213. In an example, the primary winding 2212 and the secondary winding 2213 of the second matching circuit 2208 may be at a tapped structure. In an example, the primary winding 2212 and the secondary winding 2213 of the second matching circuit 2208 may be at an interleaved structure. In an example, the primary winding 2212 and the secondary winding 2213 of the second matching circuit 2208 may be at a stacked structure.

In an example, the first matching circuit 2205 may further include a ground ring 2215 around the on-chip transformer. In an example, the second matching circuit 2208 may further include a ground ring 2216 around the on-chip transformer. Although it is generally known that a ground ring may be an effective solution for magnetic coupling, because of the short proximity between the first matching circuit 2205 and the second matching circuit 2208, the magnetic coupling may still be high enough to create a phase error which may affect the output signals.

In accordance with various aspects of this disclosure, the structure may include a capacitor 2217 configured to counteract the impairment caused by magnetic coupling. The capacitor 2217 may be coupled between the primary winding 2209 of the first matching circuit 2205 and the primary winding 2212 of the second matching circuit 2208. In an example, the capacitor 2217 may introduce a portion of the signal flowing through the primary winding 2209 of the first matching circuit 2205 into the primary winding 2212 of the second matching circuit 2208. In an example, adjusting the capacitance value of the capacitor 2217 may adjust the amount of the portion of the signal flowing through the primary winding 2209 of the first matching circuit 2205 into the primary winding 2212 of the second matching circuit 2208.

In an example, the capacitor 2217 may introduce a portion of the signal flowing through the primary winding 2212 of the second matching circuit 2208 into the primary winding 2209 of the first matching circuit 2205. In an example, adjusting the capacitance value of the capacitor 2217 may adjust the amount of the portion of the signal flowing through the primary winding 2212 of the second matching circuit 2208 into the primary winding 2209 of the first matching circuit 2205.

In accordance with various aspects of this disclosure, the structure may include a capacitor 2218 configured to counteract the impairment caused by magnetic coupling. The capacitor 2218 may be coupled between the secondary winding 2210 of the first matching circuit 2205 and the secondary winding 2213 of the second matching circuit 2208. In an example, the capacitor 2218 may introduce a portion of the signal flowing through the secondary winding 2210 of the first matching circuit 2205 into the secondary winding 2213 of the second matching circuit 2208. In an example, adjusting the capacitance value of the capacitor 2218 may adjust the amount of the portion of the signal flowing through the secondary winding 2210 of the first matching circuit 2205 into the secondary winding 2213 of the second matching circuit 2208.

In an example, the capacitor 2218 may introduce a portion of the signal flowing through the secondary winding 2213 of the second matching circuit 2208 into the secondary winding 2210 of the first matching circuit 2205. In an example, adjusting the capacitance value of the capacitor 2218 may adjust the amount of the portion of the signal flowing through the secondary winding 2213 of the second matching circuit 2208 into the secondary winding 2210 of the first matching circuit 2205.

In accordance with various aspects of this disclosure, the structure may include a first capacitor 2217 and a second capacitor 2218 configured to counteract the impairment caused by magnetic coupling. The first capacitor 2217 may be coupled between the primary winding 2209 of the first matching circuit 2205 and the primary winding 2212 of the second matching circuit 2208. In an example, the first capacitor 2217 may introduce a portion of the signal flowing through the primary winding 2209 of the first matching circuit 2205 into the primary winding 2212 of the second matching circuit 2208. In an example, adjusting the capacitance value of the first capacitor 2217 may adjust the amount of the portion of the signal flowing through the primary winding 2209 of the first matching circuit 2205 into the primary winding 2212 of the second matching circuit 2208.

In an example, the first capacitor 2217 may introduce a portion of the signal flowing through the primary winding 2212 of the second matching circuit 2208 into the primary winding 2209 of the first matching circuit 2205. In an example, adjusting the capacitance value of the first capacitor 2217 may adjust the amount of the portion of the signal flowing through the primary winding 2212 of the second matching circuit 2208 into the primary winding 2209 of the first matching circuit 2205.

The second capacitor 2218 may be coupled between the secondary winding 2210 of the first matching circuit 2205 and the secondary winding 2213 of the second matching circuit 2208. In an example, the second capacitor 2218 may introduce a portion of the signal flowing through the secondary winding 2210 of the first matching circuit 2205 into the secondary winding 2213 of the second matching circuit 2208. In an example, adjusting the capacitance value of the second capacitor 2218 may adjust the amount of the portion of the signal flowing through the secondary winding 2210 of the first matching circuit 2205 into the secondary winding 2213 of the second matching circuit 2208.

In an example, the second capacitor 2218 may introduce a portion of the signal flowing through the secondary winding 2213 of the second matching circuit 2208 into the secondary winding 2210 of the first matching circuit 2205. In an example, adjusting the capacitance value of the second capacitor 2218 may adjust the amount of the portion of the signal flowing through the secondary winding 2213 of the second matching circuit 2208 into the secondary winding 2210 of the first matching circuit 2205.

In accordance with various aspects of this disclosure, a skilled person would appreciate that this is based on a capacitive coupling which may be realized by a capacitance value in a range from about 8 fF to about 12 fF, e.g. at about 10 fF. The power consumption penalty is very low, and possible implementation of such coupling would not require a considerable amount of area for a chip implementation.

In an example, the capacitor 2217 may be generated by extending the metals of the primary winding 2209 of the first matching circuit 2205. In an example, the capacitor 2217 may be generated by extending the metals of the primary winding 2212 of the second matching circuit 2208. In an example, the capacitor 2217 may be generated by extending the metals of the primary winding 2209 of the first matching circuit 2205 and also the metals of the primary winding 2212 of the second matching circuit 2208.

In an example, the capacitor 2218 may be generated by extending the metals of the secondary winding 2210 of the first matching circuit 2205. In an example, the capacitor 2218 may be generated by extending the metals of the secondary winding 2213 of the second matching circuit 2208. In an example, the capacitor 2218 may be generated by extending the metals of the secondary winding 2210 of the first matching circuit 2205 and also the metals of the secondary winding 2213 of the second matching circuit 2208.

In these examples, the metals extended from the primary winding 2209 of the first matching circuit 2205 may be a first metal plate of the capacitor 2217. The metals extended from the primary winding 2212 of the second matching circuit 2208 may be a second metal plate of the capacitor 2217. The capacitor 2217 may also include a dielectric material between the first metal plate and the second plate. In an example, the chip which the first matching circuit 2205 and the second matching circuit 2208 provides the dielectric material.

In these examples, the metals extended from the secondary winding 2210 of the first matching circuit 2205 may be a first metal plate of the capacitor 2218. The metals extended from the secondary winding 2213 of the second matching circuit 2208 may be a second metal plate of the capacitor 2218. The capacitor 2218 may also include a dielectric material between the first metal plate and the second plate. In an example, the chip which the first matching circuit 2205 and the second matching circuit 2208 provides the dielectric material.

In an example, the primary winding 2209 of the first matching circuit 2205 may be a first type of metal, and the plate which extends from the primary winding 2209 of the first matching circuit 2205 may be another type of metal. In an example, the primary winding 2212 of the first matching circuit 2205 may be a first type of metal, and the plate which extends from the primary winding 2212 of the first matching circuit 2205 may be another type of metal.

In an example, the secondary winding 2210 of the first matching circuit 2205 may be a first type of metal, and the plate which extends from the secondary winding 2210 of the first matching circuit 2205 may be another type of metal. In an example, the secondary winding 2213 of the first matching circuit 2205 may be a first type of metal, and the plate which extends from the secondary winding 2213 of the second matching circuit 2208 may be another type of metal.

FIG. 23 schematically shows an example of a phased array in accordance with various aspects of this disclosure. In an example, the phased array may be coupled to a transceiver as an antenna. A phased array may include an array of antennas which the transceiver may control, or one or more processors may control. The array of antennas may transmit and receive beams. In order to prevent the complexity of the figure, the transmitting part of the phased array which is used at the transmitting mode has been omitted, and references will be provided for FIG. 23 only for the receiving mode at a very brief extent. A skilled person would appreciate that a phased array, especially the phased array provided in FIG. 23 may include other blocks or components but they have been omitted to be able to obtain simplicity for the references.

A phased array includes a plurality of antennas to receive or transmit wireless communication signals. In an example, a phased array may be used to transmit or receive a beam of radiowaves which the transmission or the reception of the radio waves may be steered by applying different amplifier settings and phase shifts to a signal to be received or to be transmitted from/to each of the antennas of the plurality of antennas. There are different kinds of phased arrays, including passive electronically scanned arrays, active electronically scanned arrays, hybrid beam forming phased arrays and digital beam forming phased arrays.

In an example, the phase shifter of the phased array is configured such that, each signal which a signal path conducts of the phased array has a predefined phase difference φ with the signal in the consecutive signal path. Just for the purpose of giving an example, a first signal path may conduct a first signal. A second signal path may conduct a second signal having a predefined phase difference of φ according to the first signal. A third signal path may conduct a third signal having a predefined phase difference of φ according to the second signal. A fourth signal path may conduct a fourth signal having a predefined phase difference of φ according to the third signal.

Accordingly, the third signal would have a phase shift of 2φ according to the first signal, and the fourth signal would have a phase shift of 3φ according to the second signal. It continues like that for a phased array of having N+1 signal paths, the last signal of the last signal path would have N times of the predefined phase difference or phase shift (N×φ) according to the first signal of the first signal path.

In this example, the phased array includes four antennas 2301, 2302, 2303, 2304. It is also common to have phased arrays with more antennas such 8, 16, 32, 64 etc. antennas. The phased array includes a low-noise amplifier 2305, 2306, 2307, 2308 which are provided for each of the antennas. The phased array may further include a matching network 2309, 2310, 2311, 2312 for each of the signal paths coupled to each of the respective antennas 2301, 2302, 2303, 2304. The phased array may further include a phase shifter 2313, 2314, 2315, 2316 coupled to the each of the signal paths coupled to each of the respective antennas 2301, 2302, 2303, 2304. The phased array may include a combiner 2317.

Accordingly, the first antenna 2301 may be coupled to the first low noise amplifier 2305. The first low noise amplifier 2305 may be coupled to the first matching network 2309, and to the phase shifter 2313. The phase shifter 2313 may be coupled to the combiner 2317. A wireless communication signal received by the first antenna 2301 follows the first signal path to the combiner 2317.

Accordingly, the second antenna 2302 may be coupled to the second low noise amplifier 2306. The second low noise amplifier 2306 may be coupled to the second matching network 2310, and to the phase shifter 2314. The phase shifter 2314 may be coupled to the combiner 2317. A wireless communication signal received by the second antenna 2302 follows the second signal path to the combiner 2317.

Accordingly, the third antenna 2303 may be coupled to the third low noise amplifier 2307. The third low noise amplifier 2307 may be coupled to the third matching network 23011, and to the phase shifter 2315. The phase shifter 2315 may be coupled to the combiner 2317. A wireless communication signal received by the third antenna 2303 follows the third signal path to the combiner 2317.

Accordingly, the fourth antenna 2304 may be coupled to the fourth low noise amplifier 2308. The fourth low noise amplifier 2308 may be coupled to the fourth matching network 23012, and to the phase shifter 2316. The phase shifter 2316 may be coupled to the combiner 2317. A wireless communication signal received by the fourth antenna 2304 follows the fourth signal path to the combiner 2317.

In order to provide a small form factor for such phased arrays, each of the signal path and the components and blocks which are coupled to the signal path may be located very close on a circuit. Considering that there may be many inductive elements, such as inductors, transformers, or baluns which are located along the respective signal paths, which may be part of the low noise amplifiers 2305, 2306, 2307, 2308, or the matching networks 2309, 2310, 2311, 2312, many methods may be used to counteract the impairment caused by magnetic coupling between the inductive elements.

Furthermore, the blocks of the phased array provided in accordance with FIG. 18 only include some of them. A phased array may include a complete RF Front End for each of the antennas of the phased array. It may also be possible to include a transceiver for each of the antennas of the phased array. Such implementations would also introduce many inductive elements along the signal paths starting from each of the antennas of the phased array. Therefore, a phased array may also include a plurality of mixers, a plurality of local oscillators, a plurality of converter circuits, or any blocks which may be used commonly in telecommunication systems up to a baseband processor. In accordance with various aspects of this disclosure, each of the matching networks 2309, 2310, 2311, 2312 may include a transformer FIG. 24 schematically shows an aspect of the matching networks of a phased array. In an example, the phased array may be the phased array referred in FIG. 23. In an example, the phased array includes four antennas. Each of the antennas is coupled to a low noise amplifier. Four matching networks 2401, 2402, 2403, 2404 are coupled to the four low noise amplifiers from their input terminals 2405, 2406, 2407, 2408. Each of the matching networks 2401, 2402, 2403, 2404 includes a first part of the matching network 2409, 2410, 2411, 2412, a second part of the matching network 2413, 2414, 2415, 2416, and a transformer 2417, 2418, 2419, 2420, 2421, 2422, 2423, 2424, coupling the first part of the matching network to the second part of the matching network.

In an example, each of the first part and the second part of the matching networks may include resonant networks to match the impedance between input terminals and output terminals respectively. In an example, the matching networks may be coupled to another block, such as a phase shifter from the output terminals 2425, 2426, 2427, 2428.

The first matching network 2401 may be coupled to an input terminal 2405, and includes a first part of the matching network 2409 and a second part of the matching network 2413 which are coupled with a first transformer. The first transformer may include a primary winding 2417 and a secondary winding 2418. Accordingly, the signal which the input terminal 2405 provides may flow through a first signal path by following the first part of the matching network 2409, the primary winding 2417 and the secondary winding 2418 of the first transformer, the second part of the matching network 2413 and the output terminal 2425.

The second matching network 2402 may be coupled to an input terminal 2406, and includes a first part of the matching network 2410 and a second part of the matching network 2414 which are coupled with a second transformer. The second transformer may include a primary winding 2419 and a secondary winding 2420. Accordingly, the signal which the input terminal 2406 provides may flow through a second signal path by following the first part of the matching network 2410, the primary winding 2419 and the secondary winding 2420 of the second transformer, the second part of the matching network 2414 and the output terminal 2426.

The third matching network 2403 may be coupled to an input terminal 2407, and includes a first part of the matching network 2411 and a second part of the matching network 2415 which are coupled with a third transformer. The third transformer may include a primary winding 2421 and a secondary winding 2422. Accordingly, the signal which the input terminal 2407 provides may flow through a third signal path by following the first part of the matching network 2411, the primary winding 2421 and the secondary winding 2422 of the third transformer, the second part of the matching network 2415 and the output terminal 2427.

The fourth matching network 2404 may be coupled to an input terminal 2408, and includes a first part of the matching network 2412 and a second part of the matching network 2416 which are coupled with a fourth transformer. The fourth transformer may include a primary winding 2423 and a secondary winding 2424. Accordingly, the signal which the input terminal 2408 provides may flow through a fourth signal path by following the first part of the matching network 2412, the primary winding 2423 and the secondary winding 2424 of the fourth transformer, the second part of the matching network 2416 and the output terminal 2428.

In accordance with various aspects of this disclosure, the phased array may include capacitors which are configured to provide capacitive coupling between the first signal path, the second signal path, the third signal path and the fourth signal path. The capacitors may be configured to introduce a portion of the signal which a signal path conducts and coupled to one terminal of the capacitor to another terminal of the capacitor which another signal path conducts a signal.

In this example, a first capacitor 2429 is coupled between the primary winding 2417 of the first transformer and the primary winding 2419 of the second transformer. In an example, the first capacitor 2429 may introduce a portion of the signal flowing through the primary winding 2417 of the first transformer into the primary winding 2419 of the second transformer. The first capacitor 2429 may also introduce a portion of the signal flowing through the primary winding 2419 of the second transformer into the primary winding 2417 of the first transformer. In an example, adjusting the capacitance value of the first capacitor 2429 may adjust the amount of the portion of the signal.

In this example, a second capacitor 2430 is coupled between the primary winding 2419 of the second transformer and the primary winding 2421 of the third transformer. In an example, the second capacitor 2430 may introduce a portion of the signal flowing through the primary winding 2419 of the second transformer into the primary winding 2421 of the third transformer. The second capacitor 2430 may also introduce a portion of the signal flowing through the primary winding 2421 of the third transformer into the primary winding 2419 of the second transformer. In an example, adjusting the capacitance value of the second capacitor 2430 may adjust the amount of the portion of the signal.

In this example, a third capacitor 2431 is coupled between the primary winding 2421 of the third transformer and the primary winding 2423 of the fourth transformer. In an example, the third capacitor 2431 may introduce a portion of the signal flowing through the primary winding 2421 of the third transformer into the primary winding 2423 of the fourth transformer. The third capacitor 2431 may also introduce a portion of the signal flowing through the primary winding 2423 of the fourth transformer into the primary winding 2421 of the third transformer. In an example, adjusting the capacitance value of the third capacitor 2431 may adjust the amount of the portion of the signal.

In accordance with various aspects of the disclosure it may also be possible to couple the secondary windings of the matching networks with capacitors as well. In that example a fourth capacitor 2432 is coupled between the secondary winding 2418 of the first transformer and the secondary winding 2420 of the second transformer. In an example, the fourth capacitor 2432 may introduce a portion of the signal flowing through the secondary winding 2418 of the first transformer into the secondary winding 2420 of the second transformer. The fourth capacitor 2432 may also introduce a portion of the signal flowing through the secondary winding 2420 of the second transformer into the secondary winding 2418 of the first transformer. In an example, adjusting the capacitance value of the fourth capacitor 2432 may adjust the amount of the portion of the signal.

Further, a fifth capacitor 2433 may be coupled between the secondary winding 2420 of the second transformer and the secondary winding 2422 of the third transformer. In an example, the fifth capacitor 2433 may introduce a portion of the signal flowing through the secondary winding 2420 of the second transformer into the secondary winding 2422 of the third transformer. The fifth capacitor 2433 may also introduce a portion of the signal flowing through the secondary winding 2422 of the third transformer into the secondary winding 2420 of the second transformer. In an example, adjusting the capacitance value of the fifth capacitor 2433 may adjust the amount of the portion of the signal.

In this example, a sixth capacitor 2434 may be coupled between the secondary winding 2422 of the third transformer and the secondary winding 2424 of the fourth transformer. In an example, the sixth capacitor 2434 may introduce a portion of the signal flowing through the secondary winding 2422 of the third transformer into the secondary winding 2424 of the fourth transformer. The sixth capacitor 2434 may also introduce a portion of the signal flowing through the secondary winding 2424 of the fourth transformer into the secondary winding 2422 of the third transformer. In an example, adjusting the capacitance value of the sixth capacitor 2434 may adjust the amount of the portion of the signal.

In an example, the capacitors 2429, 2430, 2431, 2432, 2433, 2434 may be generated by extending the metals of the windings of the transformer which each of the capacitors 2429, 2430, 2431, 2432, 2433, 2434 are coupled to. For example, the capacitor 2429 may be formed by extending the metals of the primary winding 2417 of the first transformer, and the primary winding 2419 of the second transformer. It is clear that other capacitors may be formed similarly by extending the metals of the windings of the respective transformers which each of the capacitors is coupled to.

In these examples, the metals extended from one winding which one of the capacitors 2429, 2430, 2431, 2432, 2433, 2434 is coupled to may be a first metal plate of the respective capacitor and the metals extended from other winding which the respective capacitor from one of the capacitors 2429, 2430, 2431, 2432, 2433, 2434 is coupled to may be a second metal plate of the respective capacitor. The respective capacitor may also include a dielectric material between the first metal plate and the second plate. In an example, the matching network or the phased array may provide the dielectric material.

In accordance with various aspects of the disclosure, it is also clear for the skilled person that the phased array may include matching networks for more than four antennas which was exemplified in FIG. 24. In any event, there may be a plurality of signal paths which may include matching networks similar to the one referred in FIG. 24. In an example, each of the matching networks, or alternatively other components which are coupled to the signal path may include inductors, including transformers. In an example, a plurality of capacitors may be coupled to the plurality of signal paths, and the plurality of capacitors may be configured to introduce a portion of a signal from one terminal of each of the capacitor which is coupled to a signal path, to the other terminal of each of the capacitor which is coupled to another signal path.

In accordance with various aspects of this disclosure, a skilled person would appreciate that this is based on a capacitive coupling which may be realized by a capacitance value in a range from about 8 fF to about 12 fF, e.g. at about 10 fF. The power consumption penalty is very low, and a possible implementation of such coupling would not require a considerable amount of area for a chip implementation. FIG. 16 shows schematically an exemplary flow diagram illustration of a method 1600 in accordance with various aspects. The method may include:

In accordance with various aspects of this disclosure, a device, in particular, a communication device may include a memory, and one or more processors, such as processing circuitry 810 and memory 820 referring back to FIG. 8. The memory 820 may be implemented as one or more non-transitory computer-readable medium including one or more instructions that when executed on at least one processor cause a circuitry to capacitively couple a first signal path and a second signal path by at least one of introducing a portion of the first signal conducted by the first signal path into the second signal path or introducing a portion of a second signal conducted by the second signal path into the first signal path.

In accordance with various aspects of this disclosure, a method of coupling a first signal path and a second signal may be provided. The method of coupling the first signal path and the second signal path may include at least one of introducing a portion of the first signal conducted by the first signal path into the second signal path, or introducing a portion of a second signal conducted by the second signal path into the first signal path.

Superheterodyne and heterodyne receivers are commonly used in modern telecommunication to receive a communication signal over a carrier frequency and to remove the carrier part from the communication signal. Heterodyne receivers commonly use a single radio frequency mixer. The radio frequency mixer converts the radio frequency power at one frequency into power at another frequency. The single radio frequency mixer of a heterodyne receiver brings the modulated radio frequency signal to a modulated communication signal at an intermediate frequency. Then, an I/Q demodulator may receive the signal at the intermediate frequency and brings the signal to the baseband.

A superheterodyne receiver may commonly use at least two mixers to transform the modulated radio frequency signal to a modulated intermediate frequency signal. Generally, a first mixer receives the received modulated communication signal and brings the signal to a first intermediate frequency. A band pass filter which is specifically designed for the first intermediate frequency may receive the signal at the first intermediate frequency to improve the quality of the signal by applying a filter specifically designed at the first intermediate frequency. Then, another mixer may receive the signal at the first intermediate frequency which brings the signal to a second intermediate frequency. An I/Q demodulator then receives the signal at the second intermediate frequency and provide the baseband signal from its output.

FIG. 25 exemplarily shows a transmitting part of a transceiver in accordance with various aspects of this disclosure. In this example the transceiver 2501 includes a baseband processor 2502 to process the baseband signals. In another example, the transceiver may not include a baseband processor, but the transceiver may be coupled to a baseband processor with an interface. The baseband processor 2502 may provide the binary data to be transmitted from its two outputs. In an example the baseband processor 2502 may provide the binary data sequentially from its two outputs. The baseband processor 2502 may provide its first output to a first digital to analog converter 2503. The first digital to analog converter 2503 may convert the signal which the baseband processor 2502 provides, to an analog signal from its output to a low pass filter 2504. The low pass filter 2504 removes the high-frequency components which might have occur during the conversion and outputs the filtered signal to a first mixer 2505.

The baseband processor 2502 may provide its first output to a second digital to analog converter 2506. The second digital to analog converter 2506 may convert the signal which the baseband processor 2502 provides, to an analog signal from its output to a low pass filter 2507. The low pass filter 2507 removes the high-frequency components which might have occur during the conversion and outputs the filtered signal to a second mixer 2508.

Accordingly, the first mixer 2505 receives a first analog signal corresponding to the first digital signal which the baseband processor 2502 provides, and the first mixer 2505 multiplies the first analog signal with a signal which a first local oscillator 2509 provides. The first local oscillator 2509 may provide a cosine signal with a frequency. The first mixer 2505 accordingly provides an in-phase component of the signal to be transmitted. Similarly, the second mixer 2508 receives a second analog signal corresponding to the second digital signal which the baseband processor 2502 provides, and the second mixer 2508 multiplies the second analog signal with a signal which a second local oscillator 2510 provides.

In an example, the second local oscillator 2510 may provide a sine signal with the same frequency to the second mixer 2508. In an example, it is the first local oscillator 2509 which provides the signal to the second mixer 2508 but in this example, there may be a phase shifter between the local oscillator 2509 and the second mixer which delays the same signal which the local oscillator 2509 provides to the first mixer 2505 for 90 degrees. The second mixer 2508 receives the reference signal which is delayed for 90 degrees related to the reference signal provided to the first mixer 2505 and accordingly provides a quadrature component of the signal to be transmitted. In other words, the phase of the signal which the first mixer 2505 provides and the phase of the signal which the second mixer 2508 provides have a phase difference of 90 degrees.

The first mixer 2505 provides the in-phase component, and second mixer 2508 provides the quadrature component to a combiner 2511 which combines the in-phase component and the quadrature component into one signal. The combiner 2511 provides its output to a third mixer 2512. The third mixer 2512 is also coupled to a third local oscillator 2513. The third oscillator 2513 generates a reference carrier signal. The third mixer 2512 multiplies the signal with the reference carrier signal which the third oscillator 2513 generates and provides the multiplied signal, which is a sinusoidal signal at a carrier frequency, to a power amplifier. The carrier frequency is the frequency which the reference carrier signal is at. The power amplifier 2514 amplifies the signal and provides an amplified signal to an antenna 2515 which transmits the signal.

FIG. 26 exemplarily shows a block diagram of a superheterodyne receiver. The superheterodyne receiver includes an antenna 2601 coupled to a low noise amplifier (LNA) 2602. The low noise amplifier 2602 amplifies the wireless communication signal received by the antenna. In an example, the low noise amplifier 2602 provides the amplified signal to the input of a first mixer 2603 to demodulate the received wireless communication signal. The first mixer 2603 may receive the amplified signal by one of its input. The superheterodyne receiver may also include a first local oscillator 2604 which may generate a reference signal at a first intermediate frequency. The first local oscillator 2604 provides the reference signal to another input of the first mixer 2603. The first mixer 2603 multiplies the amplified signal with the reference signal which the first local oscillator 2604 generates.

Accordingly, the first mixer 2603 brings the received communication signal to the first intermediate frequency by multiplying the received signal with the reference signal at the first intermediate frequency. The output of the first mixer 2603 is coupled to a band pass filter 2605. The band pass filter 2605 is configured to pass the signals at the first intermediate frequency. The band pass filter 2605 provides its output to a second mixer 2606. The second mixer 2606 is coupled to a second local oscillator 2607 which generates a second signal at a second intermediate frequency. The second mixer 2606 also receives the second reference signal at the second intermediate frequency. The second mixer 2606 multiplies the signal at the first intermediate frequency and the reference signal at the second intermediate frequency to bring the signal at the first intermediate frequency to the second intermediate frequency.

In this example, the received wireless communication signal includes a signal modulated by I/Q modulation. A divider may divide the output signal of the second mixer 2606 into two signal paths for I/Q demodulation. In an example, a third mixer 2608 receives the first divided signal and multiplies the first divided signal with a first sinusoidal IQ signal to obtain the in-phase component included in the received wireless communication. A third local oscillator 2609 may generate the first sinusoidal IQ signal. The third mixer 2608 provides its output to a filter 2610 which applies low-pass filter to the multiplied signal. The filter 2610 may provide its output to the analog-digital converter 2611, which provides the in-phase component to a baseband processor 2612.

Other signal path includes a fourth mixer 2613 which receives the second divided signal and multiplies the second divided signal with a second sinusoidal IQ signal to obtain the quadrature component. In an example, the third local oscillator 2609 generates the second sinusoidal IQ signal, and the second sinusoidal IQ signal has a phase difference of 90 degrees with the first sinusoidal IQ signal. The fourth mixer 2613 provides its output to a filter 2614 which applies low-pass filter to the multiplied signal. The filter 2614 may provide its output to an analog-digital converter 2615, which provides the quadrature component to the baseband processor 2612.

The third local oscillator 2609 may include a voltage-controlled oscillator suitable for generating two orthogonal sinusoidal signals from its separate outputs to be provided to the third mixer 2608 and the fourth mixer 2613 respectively. In another example, the third local oscillator 2609 may generate an output signal. A splitter may divide the output signal into two signal paths. In an alternative example, the third local oscillator 2609 may have two outputs for outputting the same signals into two signal paths. One of the signal paths may include a phase shifter for shifting the phase of the input signal by 90 degrees. Accordingly, in an example, the third local oscillator 2609 may provide a first signal to a first signal path which is coupled to the third mixer 2608. The local oscillator 2609 may provide a second signal to a second signal path, and the second signal has the same phase characteristic with the first signal. The second signal path further includes a phase shifter to provide a 90 degrees phase difference to the second signal relative to the first signal. The output of the phase shifter is coupled to the fourth mixer 2613 through the second signal path.

Using many radio frequency mixers in a transceiver to demodulate a received signal may be costly. Eventually, each radio frequency mixer has certain characteristics, such as conversion gain and conversion loss, linearity of the frequency mixer between its inputs and output, noise figure which the radio frequency mixer introduces to the system etc., which may need a further consideration with each introduction of a radio frequency mixer into a transceiver. Further, radio frequency mixers may consume a considerable amount of power, especially due to the fact that the communication frequency is at gigahertz levels.

In general, radio frequency mixers include relatively lossy circuits, and a radio frequency mixer, especially a passive mixer, may cause dramatic losses over the received signal at a level of more than 10 dB, and the loss of the radio frequency mixer increases with the bandwidth of the received signal. The loss of the radio frequency mixer is inverse-proportional to the amplitude of the local oscillator which provides the reference signal to the radio frequency mixer. Accordingly, it is common to use a local oscillator to provide reference signals at least 10 dB greater than the largest received signal which results to a need of using local oscillators of a greater power especially at higher frequencies and wider bandwidths.

The alternative of increasing the power of the local oscillator may be to use an active radio frequency mixer which includes an active amplifier, however, using active amplifiers integrated with a radio frequency mixer may introduce additional problems due to its complexity resulting to the introduction of noise to the received signal. Additionally, linearity provided by the active amplifier of the radio frequency mixer may be an issue and it may introduce distortion to the received signal. It is also to be considered that the active radio frequency mixer may also need a considerable amount of power.

Further, a radio frequency mixer generally includes a network of switches which includes switches switched by the local oscillator. In order to keep the resistance of the switches low, a large amplitude is required at the respective gates of the switches, which results to another need to increase the power of the local oscillator that provides the reference signal to the radio frequency mixer. As the need to increase power also increases with the increased frequency, it may become another issue for high-frequency signals. One of the aspects of this disclosure is to address at least one of the issues above.

Phase modulation is a very commonly used way of modulating communication signals. The communicated messages are encoded in a manner that is related to the phase variations and differences of the signals. Phase modulation has been widely used in telecommunications, especially in very widely used technologies such as Wireless Local Area Network (IEEE 802.11), Global System for Mobile Communication (GSM) and satellite television. Some of the commonly used examples which employ the mechanics of phase modulation and digital modulation processes which exploit the modulating signals with phase information are phase-shift keying (PSK), amplitude and phase-shift keying (APSK), minimum-shift keying (MSK), and quadrature amplitude modulation (QAM).

FIG. 27 shows schematically an example of a constellation diagram for 8 phase-shift keying (8-PSK) modulation. The constellation diagram exemplarily illustrates a representation of signals modulated according to the 8-PSK modulation. They represent eight symbols which are modulated according to the 8-PSK modulation, and the corresponding in-phase and quadrature amplitudes of the symbols with their three-bit representation. The constellation of the 8-PSK modulation of FIG. 27 may be formulated as $x[n] = Ae^{j(\pi/4)l}$, where l is an integer between 0 and 7. FIG. 28 shows schematically another example of a constellation diagram for 8 phase-shift keying (8-PSK) modulation.

A phase-shift keying (PSK) modulation encodes the information to be encoded within the information of the difference of the phase according to another signal. One of the most used methods is to use a reference signal to be used for calculating the phase difference. Both the modulator and demodulator would have the reference signals which are at the same phase. Accordingly, the modulator modulates the signal to be transmitted with a phase difference relative to the reference signal at the modulator so that the demodulator can demodulate the signal by calculating the phase difference with the reference signal at the demodulator. Another method of phase-shift keying modulation is to modulate the signal with respect to the phase of a previous symbol. This method is referred to as differential phase-shift keying.

FIG. 29 shows schematically an example of a block diagram of a part of a transceiver in accordance with various aspects of this disclosure. An input terminal 2901 receives a modulated communication signal. The modulated communication signal may be a phase-modulated communication signal. A modulator may have modulated a transmitted information signal by employing mechanisms of phase modulation. In an example, the modulated communication signal may be a phase-shift keying signal. In an example, the modulated communication signal may be an 8 phase-shift keying signal. In an example, an antenna may have received the signal, a low noise amplifier may have amplified the signal and the low noise amplifier may have provided the modulated communication signal to the input terminal 2901 of a signal adder 2902.

The signal adder 2902 is a circuit for summing a plurality of analog input signals. In an example, the signal adder 2902 may include an amplifier. In an example, the signal adder 2902 may include an operational amplifier. In an example, the signal adder 2902 may include a rat-race coupler. The signal adder 2902 may have two input terminals 2901, 2903 to receive the signals to be summed, and the signal adder 2902 may have one output to provide the output signal which is the sum of signals which the signal adder 2902 receives from its two input terminals 2901, 2903.

The signal adder 2902 receives the modulated communication signal from one of its input terminals. The modulated communication signal may be expressed ideally (e.g. without noise content) with the formulation of $x(t)=A\cos(\omega t+2\pi l/m)$, where m is an integer related to the degree of the phase-shift keying modulation, and l is an integer between zero and m. A is the amplitude of the modulated communication signal, and $\omega$ is the carrier frequency. In an example, the modulated communication signal is a binary phase-shift keying (BPSK) signal, and the modulated communication signal may be formulated as $x(t)=A\cos(\omega t+\pi l)$, where l is an integer between zero and one based on the symbol of the modulated communication signal, which may be 0 or 1 for the binary phase-shift keying (BPSK) signal.

The signal adder 2902 may also receive a reference signal from another input terminal 2903. In an example, a local oscillator may provide the reference signal. In an example, the local oscillator may include a phase-locked loop (PLL). The phase-locked loop is configured to generate the reference signal whose phase is related to the phase of a signal which inputs to the phase-locked loop, possibly from a stable oscillating component, such as a quartz crystal. The reference signal which the another input terminal 2903 receives may include a cosine signal at the same carrier frequency with the modulated communication signal having an amplitude of at least the amplitude A of the modulated communication signal.

In another expression, the amplitude of the reference signal may be about equal or greater than the amplitude of the modulated communication signal. In an example, the reference signal may have the same amplitude A as the modulated communication signal. In an example, the reference signal may be formulated as $r(t)=A\cos(\omega t)$, assuming that there is no phase difference between the reference signal and the modulated communication signal, in another expression, the modulated communication signal is in-phase with the reference signal. In an example, the local oscillator may generate the reference signal with an amplitude that is in a range from about the amplitude of the modulated communication signal to about five times the amplitude of the modulated communication signal.

The signal adder 2902 sums the modulated communication signal, which the signal adder 2902 receives from the first input terminal 2901, and the reference signal, which the signal adder 2902 receives from the second input terminal 2903 to obtain an intermediate signal. Ideally, the intermediate signal may be formulated as $i(t)=x(t)+r(t)$ resulting to $i(t)=A\cos(\omega t+\pi l)+A\cos(\omega t)$. From the resulting mathematical expression, it is seen that for l=0, i(t) becomes i(t)=0, and for l=1, i(t) becomes $i(t)=2A\cos(\omega t)$. Considering that there would also be at least the noise signal n(t), an envelope detector 2904 receives the intermediate signal.

The envelope detector 2904 receives an input signal and provides an output which is related to the envelope of the input signal. In this example, the envelope detector 2904 receives the intermediate signal and provides the envelope of the intermediate signal to its output terminal 2905. In an example, the envelope detector may provide an envelope detected signal. Accordingly, it is possible to detect the symbol of the modulated communication signal from the output terminal 2905 of the envelope detector 2904 based on the amplitude of the output signal which the envelope detector 2904 provides.

In an example, the envelope detector 2904 may include a diode detector. In an example, the envelope detector 2904 may include a signal squarer which is configured to receive an input signal and output a square of the input signal. In this example, the signal squarer may receive the intermediate signal, and output the square of the intermediate signal. In an example, the envelope detector 2904 may include a differential non-linear voltage-controlled current source coupled to a resistive load. In an example, the envelope detector 2904 may include a low pass filter to filter the high-frequency components of a signal. In an example, the low pass filter may receive the output signal which the signal squarer provides to remove the high-frequency component which the signal squarer may introduce. In an example, the envelope detector 2904 may be coupled to a direct current offset removal circuit to remove the direct current component from the output signal.

FIG. 30 shows schematically an exemplary receiver in accordance with various aspects of this disclosure. In an example, the receiver refers to the receiving part of a transceiver. In an example, the receiver is configured to demodulate a received wireless communication signal. In an example, the wireless communication signal is a phase modulated communication signal. In this example, the wireless communication signal is a phase-shift keying signal. In particular, the wireless communication signal is an 8 phase-shift keying (8-PSK) signal. In an example, a modulator may modulate the wireless communication signal with 8 phase-shift keying (8-PSK) modulation by employing in-phase and quarter components over a carrier signal at a carrier frequency.

The receiver may include an antenna 3001 to receive the wireless communication signal. The antenna 3001 may be coupled to a low noise amplifier 3002, and the low noise amplifier 3002 may amplify the wireless communication signal which the antenna 3001 receives. The low noise amplifier 3002 may provide the amplified signal to a demodulator which includes a divider 3003 to divide the wireless communication signal for two signal paths. In an example, the divider 3003 may include a wilkinson divider in order to provide coupling for the input terminals and the output terminals of the divider 3003.

One of the output terminals of the divider 3003 may be coupled to a first signal path, and the other one of the output terminals of the divider 3003 may be coupled to a second signal path. Accordingly, the divider 3003 of the demodulator provides the first received wireless communication signal to the first signal path and the second received wireless communication signal to the second signal path. The first signal path may include a first signal adder 3004. The first signal adder 3004 receives the first modulated communication signal which the divider 3003 provides to the first signal path, from one of its input terminals.

In an example, the first signal adder 3004 may include an amplifier. In an example, the first signal adder 3004 may include an operational amplifier. In an example, the first signal adder 3004 may include a rat-race coupler. In an example, the first signal adder 3004 may include a resistive adder circuit. The first signal adder 3004 may have two input terminals to receive the signals to be summed, and the first signal adder 3004 may have one output to provide the output signal which is the sum of signals which the first signal adder 3004 receives from its two input terminals. The first signal adder 3004 also receives a reference signal from another input as the signal to add to the first received modulated communication signal.

The demodulator may include a first local oscillator 3005 to generate the reference signal and to provide the reference signal which the first local oscillator 3005 generates to the other input of the first signal adder 3004. In an example, the first local oscillator 3005 may include a voltage-controlled oscillator suitable for generating two orthogonal sinusoidal signals from its separate outputs, and the voltage-controlled oscillator may provide one of its output to the first signal adder 3004. In another example, the first local oscillator 3005 may generate one output signal. A divider may divide the output signal into two signal paths.

In an alternative example, the first local oscillator 3005 may have two outputs for outputting the same sinusoidal signals into two signal paths, and one of these signal paths is coupled to the first signal path, and the other signal path which the first local oscillator 3005 provides its output may include a phase shifter for shifting the phase of the output of the local oscillator by 90 degrees. Accordingly, in an example, the first local oscillator 3005 may provide a first signal to the first signal path which is coupled to the first signal adder 3004. The first local oscillator 3005 may provide a second signal to the second signal path, and the second signal may have the same phase characteristic as the first signal. The second signal path further includes a phase shifter to provide a 90 degrees phase difference to the second signal.

In this example, the demodulator has two local oscillators, and a first oscillator provides a first reference signal to the first signal adder 3004. In an example, the local oscillator may include a phase-locked loop (PLL). The first reference signal may include a cosine signal at the same carrier frequency with the first received modulated communication signal having an amplitude of at least the amplitude A of the first received modulated communication signal. In an example, the first local oscillator 3005 may generate the first reference signal with an amplitude that is in a range from about the amplitude of the first received modulated communication signal to about five times of the amplitude of the first received modulated communication signal.

Accordingly, the first received modulated communication signal may be formulated as $x_1(t)=A\cos(\omega t+\pi l/4)$ with the assumptions similar to the examples provided in this disclosure, where l is an integer between 0 and 7 for an 8 phase-shift keying (8-PSK) signal. A is the amplitude of the first received modulated communication signal, and ω refers to the carrier frequency, and the first reference signal may be formulated as $r_1(t)=A\cos(\omega t+\theta)$. θ may refer to the phase difference between the first reference signal and the first received modulated communication signal. A skilled person would recognize that the formulations are provided only for demonstration purposes, and they exclude any effect which the transfer function of the communication medium may provide, any noise component, or such effects.

The first signal adder 3004 sums the first received modulated communication signal, which the first signal adder 3004 receives from its first input terminal, and the first reference signal, which the first signal adder 3004 receives from its second input terminal to obtain a first intermediate signal. Ideally, the first intermediate signal may be formulated following to the formulation above as $i_1(t)=x_1(t)+r_1(t)$ resulting to $i_1(t)=A\cos(\omega t+\pi l/4)+A\cos(\omega t+\theta)$. The first signal adder 3004 may provide the first intermediate signal to a first envelope detector.

FIG. 31 shows schematically an example of the representation of a constellation diagram of the amplitude for the output signal of a signal adder in accordance with various aspects of this disclosure. This constellation diagram simply represents an ideal representation of the first intermediate signal in which the amplitudes of the first received modulated communication signal and the first reference signal would be equal. Each of the symbols 3101 represents an ideal amplitude of the first intermediate signal based on each of the symbols modulated in the first received modulated communication signal.

Referring back to FIG. 30, in an example, the first envelope detector may include a diode detector. The diode detector may include a diode between the input terminal of the first envelope detector and the output terminal of the first envelope detector, in which the diode may be coupled to a resistor and a capacitor in parallel form. In an example, the first envelope detector may include a signal squarer 3006 which is configured to receive an input signal and output a square of the input signal. In this example, the signal squarer 3006 may receive the first intermediate signal, and output the square of the first intermediate signal. In an example, the first envelope detector may include a differential non-linear voltage-controlled current source coupled to a resistive load.

Due to the nature of the constellation of the phase-shift keying signals, in case of a usage of a differential non-linear voltage-controlled source for the signal squarer 3006, the odd order nonlinearities of the voltage-controlled source do not affect the constellation. In this case, the signal squarer 3006 cancels out the fundamental and odd harmonics at its output due to its differential configuration. Even order non-linearities may be subject to an amplitude sensitivity, however, the constellation is not distorted because of the second order amplitude sensitivity.

In this example, the first envelope detector includes a signal squarer 3006 which is configured to receive the first intermediate signal and output the square of the first intermediate signal. The first envelope detector may also include a low pass filter 3007 to filter out the high-frequency components of the square of the first intermediate signal. Accordingly, the signal squarer 3006 of the first envelope detector may receive the first intermediate signal and outputs the square of the first intermediate signal.

In an example, the signal squarer 3006 may include a CMOS squaring circuit. In an example, the signal squarer 3006 may include a cascade multiple pairs of transistors which are connected with a linear dependence of transconductance. The gates of the transistors for each of the pair of the multiple pairs may be coupled. In an example, the signal squarer 3006 may include a current-mode squarer circuit.

FIG. 32 shows schematically an example of a signal squarer circuit. The signal squarer circuit may include a first transistor 3202 as a Metal Oxide Semiconductor Field Effect Transistor (MOSFET), a second transistor 3203 as a Metal Oxide Semiconductor Field Effect Transistor (MOSFET), and a third transistor 3204 as a Metal Oxide Semiconductor Field Effect Transistor (MOSFET). In this example, all of the first transistor 3202, the second transistor 3203, and the third transistor 3204 may be n-type Metal Oxide Semiconductor Field Effect Transistor (NMOS) transistor.

The signal squarer circuit receives the input signal from an input terminal 3205 which is coupled to the gate terminal of the first transistor 3202. The drain terminal of the first transistor 3202 is coupled to the gate terminal of the third transistor 3204. The source terminal of the third transistor is coupled to a ground terminal 3206. The drain terminal of the first transistor 3202 is also coupled to the source terminal of the second transistor 3203. The second transistor receives an input voltage from a power supply terminal 3207 by its gate terminal. The drain terminal of the second transistor 3203 is also coupled to the power supply terminal 3207 through a resistor 3208 coupled between the drain terminal of the second transistor 3203 and the power supply terminal 3207 in series.

The drain terminal of the second transistor 3203 is further coupled to the drain terminal of the third transistor 3204. Accordingly, the second transistor 3203 and the third transistor 3204 may operate to reverse a signal. The current which flows from the drain terminal and the source terminal of the second transistor 3203 would be equal to the current which enters the drain terminal of the third transistor 3204. The signal squarer provides its output from its output terminal 3209.

Referring back to FIG. 30, the signal squarer 3006 may output the square of the first intermediate signal and provides the square of the first intermediate signal to a low pass filter 3007. Ideally, the square of the first intermediate signal may become $i_1^2(t)=[A\cos(\omega t+\pi l/4)+A\cos(\omega t+\theta)]^2$ which may be interpreted mathematically to have frequency components which are clustered around the carrier frequency, two times of the carrier frequency and the baseband. The low pass filter 3007 may filter the square of the first intermediate signal and outputs a filtered signal which includes the portion of the first intermediate signal which is at the baseband. Accordingly, the filtered square of the first intermediate signal includes a first envelope detected signal. Ideally, the first envelope detected signal may be formulated as $x_{1,BB}(t)=A^2[1+\cos(\pi l/4-\theta)]$.

In an example, the demodulator may include a direct current offset removal circuit 3008 which may be coupled to the output of the low pass filter 3007. The low pass filter 3007 may provide the first envelope detected signal to the direct current offset removal circuit 3008. The direct current offset removal circuit 3008 may receive the first envelope detected signal and remove the direct current portion of the first envelope detected signal. Accordingly, the direct current offset removal circuit 3008 may provide an output signal, which is the direct current portion removed first envelope detected signal. Ideally, the signal may be formulated as $A^2 \cos(\pi l/4-\theta)$.

Similarly, for the second signal path, the divider 3003 of the demodulator provides the second received wireless communication signal to the second signal path. The second signal path may include a second signal adder 3009. The second signal adder 3009 receives the second modulated communication signal which the divider 3003 provides to the second signal path, from one of its input terminals.

In an example, the second signal adder 3009 may also include an amplifier. In an example, the second signal adder 3009 may include an operational amplifier. In an example, the second signal adder 3009 may include a rat-race coupler. In an example, the second signal adder 3009 may include a resistive adder circuit. The second signal adder 3009 may have two input terminals to receive the signals to be summed, and the second signal adder 3009 may have one output to provide the output signal which is the sum of signals which the second signal adder 3009 receives from its two input terminals. In this example, the second signal adder 3009 also receives a second reference signal from another input as the signal to add to the second received modulated communication signal.

In this example, the demodulator has a second oscillator, and the second oscillator provides a second reference signal to the second signal adder 3009. In an example, the second oscillator may include a phase-locked loop (PLL). The second reference signal may include a sine signal at the same carrier frequency with the second received modulated communication signal having an amplitude of at least the amplitude A of the second received modulated communication signal. In an example, the second local oscillator may generate the second reference signal with an amplitude that is in a range from about the amplitude of the second received modulated communication signal to about five times of the amplitude of the second received modulated communication signal.

Accordingly, the second received modulated communication signal may be formulated as $x_2(t)=A\cos(\omega t+\pi l/4))$ with the assumptions similar to the examples provided in this disclosure, where l is an integer between 0 and 7. A is the amplitude of the second received modulated communication signal, and ω refers to the carrier frequency, and the second reference signal may be formulated as $r_2(t)=A\sin(\omega t+\theta)$. θ may refer to the phase difference between the second reference signal and the second received modulated communication signal. A skilled person would recognize that the formulations are provided only for demonstration purposes, and they exclude any effect which the transfer function of the communication medium may provide, any noise component, or such effects.

The second signal adder 3009 sums the second received modulated communication signal, which the second signal adder 3009 receives from its first input terminal, and the second reference signal, which the second signal adder 3009 receives from its second input terminal to obtain a second intermediate signal. Ideally, the second intermediate signal may be formulated following to the formulation above as $i_2(t)=x_2(t)+r_2(t)$ resulting to $i_2(t)=A\cos(\omega t+\pi l/4)+A\sin(\omega t+\theta)$. The second signal adder 3009 may provide the second intermediate signal to a second envelope detector.

FIG. 33 shows schematically another example of the representation of a constellation diagram of the amplitude for the output signal of a signal adder in accordance with various aspects of this disclosure. This constellation diagram simply represents an ideal representation of the second intermediate signal in which the amplitudes of the second received modulated communication signal and the second reference signal would be equal. Each of the symbols 3301 represents an ideal amplitude of the second intermediate signal based on each of the symbols modulated in the second received modulated communication signal.

Referring back to FIG. 30, in an example, the second envelope detector may include a diode detector. The diode detector may include a diode between the input terminal of the second envelope detector and the output terminal of the second envelope detector, in which the diode may be coupled to a resistor and a capacitor in parallel form. In an example, the second envelope detector may include a signal squarer 3010 which is configured to receive an input signal and output a square of the input signal. In this example, the signal squarer 3010 may receive the second intermediate signal, and output the square of the second intermediate signal. In an example, the second envelope detector may include a differential non-linear voltage-controlled current source coupled to a resistive load.

Due to the nature of the constellation of the phase-shift keying signals, in case of a usage of a differential non-linear voltage-controlled source for the signal squarer 3010, the odd order non-linearities of the voltage-controlled source does not affect the constellation. In this case, the signal squarer 3010 cancels out the fundamental and odd harmonics at its output due to its differential configuration. Even order non-linearities may be subject to an amplitude sensitivity, however, the constellation is not distorted because of the second order amplitude sensitivity.

In this example, the second envelope detector includes a signal squarer 3010 which is configured to receive the second intermediate signal and output the square of the second intermediate signal. The second envelope detector may also include a low pass filter 3011 to filter out the high-frequency components of the square of the second intermediate signal. Accordingly, the signal squarer 3010 of the second envelope detector may receive the second intermediate signal and outputs the square of the second intermediate signal.

In an example, the signal squarer 3010 may include a CMOS squaring circuit. In an example, the signal squarer 3010 may include a cascade multiple pairs of transistors that are connected with a linear dependence of transconductance. The gates of the transistors for each of the pair of the multiple pairs may be coupled. In an example, the signal squarer 3010 may include a current-mode squarer circuit.

The signal squarer 3010 may output the square of the second intermediate signal and provides the square of the second intermediate signal to a low pass filter 3011. Ideally, the square of the second intermediate signal may become $i_1^2(t)=[A\cos(\omega t+\pi l/4)+A\sin(\omega t+\theta)]^2$ which may be interpreted mathematically to have frequency components which are clustered around the carrier frequency, two times of the carrier frequency and the baseband. The low pass filter 3011 may filter the square of the second intermediate signal, and outputs a filtered signal which includes the portion of the second intermediate signal which is at the baseband. Accordingly, the filtered square of the second intermediate signal includes a second envelope detected signal. Ideally, the second envelope detected signal may be formulated as $x_{2,BB}(t)=A^2[1+\sin(\pi l/4-\theta)]$.

In an example, the demodulator may include a direct current offset removal circuit 3008 which may be coupled to the output of the low pass filter 3011. The low pass filter 3011 may provide the second envelope detected signal to the direct current offset removal circuit 3008. The direct current offset removal circuit 3008 may receive the second envelope detected signal and remove the direct current portion of the second envelope detected signal. Accordingly, the direct current offset removal circuit 3008 may provide an output signal, which is the direct current portion removed second envelope detected signal. Ideally, the signal may be formulated as $A^2 \sin(\pi l/4-\theta)$.

Accordingly, the demodulator may output an in-phase component of the signal from its first signal path, and a quadrature component from its second signal path. The in-phase component and the quadrature component represent the symbols that the modulator has modulated by using an 8 phase-shift keying demodulation. It can be seen from the formulations of the output of the direct current offset removal circuit 3008 for the first signal path, and for the second signal path may be used to obtain the baseband signal $X_{BB}(t)=A^2 \cos(\pi l/4-\theta)+jA^2 \sin(\pi l/4-\theta)$. By another expression, $X_{BB}(t)=A^2 e^{j(\pi l/4)} * e^{-j\theta}$.

In an example, the demodulator may include a first analog-to-digital converter to convert the in-phase component to a digital baseband communication signal. The first analog-to-digital converter may receive the in-phase component and convert the in-phase component to a digital signal. In an example, the first analog-to-digital converter may include a sample and hold circuit. In an example, the first analog-to-digital converter may include a mixed signal equalizer. Accordingly, the first analog-to-digital converter may output a digital in-phase component.

In an example, the demodulator may include a second analog-to-digital converter to convert the quadrature component to a digital baseband communication signal. The second analog-to-digital converter may receive the quadrature component and convert the quadrature component to a digital signal. In an example, the second analog-to-digital converter may include a sample and hold circuit. In an example, the second analog-to-digital converter may include a mixed signal equalizer. Accordingly, the second analog-to-digital converter may output a digital quadrature component.

In an example, the demodulator may provide the digital in-phase component and the digital quadrature component to a baseband processor. The baseband processor may process the digital in-phase component and the digital quadrature component in order to convert the received communication signal to a bitstream.

In an example, the baseband processor may include a determiner to determine the symbols of the received modulated communication signal. In an example, the baseband processor may include a symbol mapper. The symbol mapper may receive the digital in-phase component from the first analog-to-digital converter. The symbol mapper may receive the digital quadrature component from the second analog-to-digital converter. The symbol mapper may determine the encoded symbol according to the digital in-phase component and the digital quadrature component based on a lookup table.

In an example, the lookup table may include a plurality of symbol information, wherein each of the plurality of symbol information corresponds to a digital in-phase component and digital quadrature component pair. The symbol mapper may identify the encoded symbol by comparing the digital in-phase component and the digital quadrature component with the lookup table to identify the symbol. Accordingly, the symbol mapper may determine the symbol received with the received modulated communication signal.

In an example, the determiner may implement a coordinate rotation digital computer (CORDIC) function to determine the symbol based on the in-phase component and the quadrature component. The determiner may apply the CORDIC function to convert the in-phase component and the quadrature component to the information related to the symbol received with the received modulated communication signal.

FIG. 34 shows schematically an exemplary receiver in accordance with various aspects of this disclosure. In an example, the receiver refers to the receiving part of a transceiver. In an example, the receiver is configured to demodulate a received wireless communication signal. In an example, the wireless communication signal is a phase modulated communication signal. In this example, the wireless communication signal is a phase-shift keying signal.

The receiver may include an antenna 3401 to receive a wireless communication signal. The antenna 3401 may be coupled to a low noise amplifier 3402, and the low noise amplifier 3402 may amplify the wireless communication signal which the antenna 3401 receives. The low noise amplifier 3402 may provide the amplified signal to a demodulator which includes a divider 3403 to divide the wireless communication signal for two signal paths. In this example the divider 3403 includes a wilkinson divider in order to provide coupling for the input terminals and the output terminals of the divider 3403.

One of the output terminals of the divider 3403 may be coupled to a first signal path, and the other one of the output terminals of the divider 3403 may be coupled to a second signal path. Accordingly, the divider 3403 of the demodulator provides a first received wireless communication signal to the first signal path and a second received wireless communication signal to the second signal path. The first signal path may include a first rat-race coupler 3404. The first rat-race coupler 3404 receives the first modulated communication signal which the divider 3403 provides to the first signal path, from one of its input terminals.

The demodulator may include a phase-locked loop 3405 to lock the frequency of the generated signal by oscillators. The phase-locked loop may be coupled to a quadrature voltage-controlled oscillator which includes a first voltage-controlled oscillator 3406 and a second voltage-controlled oscillator 3407. In an example, the first voltage-controlled oscillator 3406 and the second voltage-controlled oscillator 3407 may provide a sinusoidal signal having a frequency at 46.7 GHz. The sinusoidal signal which the second voltage-controlled oscillator 3407 generates has a 90 degrees phase difference related to the sinusoidal signal which the first voltage-controlled oscillator 3406 generates.

The first voltage-controlled oscillator 3406 is coupled to a first voltage-controlled oscillator buffer 3408. The first voltage-controlled oscillator buffer 3408 is coupled to a mixer-based frequency tripler 3409 which triples the frequency of the sinusoidal signal which the first voltage-controlled oscillator provides. Hence, the first rat-race coupler 3404 may receive a first sinusoidal signal as the first reference signal at about 140 GHz. In an example, the first reference signal may include a cosine signal at the same carrier frequency with the first received modulated communication signal having an amplitude of at least the amplitude A of the first received modulated communication signal. In an example, the first voltage-controlled oscillator 3406 may generate the first reference signal with an amplitude that is in a range from about the amplitude of the first received modulated communication signal to about five times of the amplitude of the first received modulated communication signal.

The first rat-race coupler 3404 sums the first received modulated communication signal, which the first rat-race coupler 3404 receives from its first input terminal, and the first reference signal, which the first rat-race coupler 3404 receives from its second input terminal to obtain a first intermediate signal. The first rat-race coupler 3404 may provide the first intermediate signal to a first envelope detector 3410. In this example, the first envelope detector 3410 may include a diode detector. The diode detector may include a diode between the input terminal of the first envelope detector 3410 and the output terminal of the first envelope detector 3410, which the diode may be coupled to a resistor and a capacitor in parallel form.

In an example, the demodulator may include a first baseband amplifier 3411 to amplify at the first signal path. The first envelope detector 3410 may provide a first envelope detected signal to the first baseband amplifier 3411. The first baseband amplifier 3411 may receive the first envelope detected signal, and provide a first amplified baseband signal to an analog-to-digital converter 3412 as an in-phase component.

In an example, the demodulator may include the analog-to-digital converter 3412 to convert the in-phase component to a digital baseband communication signal. The analog-to-digital converter 3412 may receive the in-phase component and convert the in-phase component to a digital signal. In an example, the analog-to-digital converter 3412 may include a sample and hold circuit. In an example, the analog-to-digital converter 3412 may include a mixed signal equalizer. Accordingly, the analog-to-digital converter 3412 may output a digital in-phase component to a digital baseband processor 3413.

Similarly, for the second signal path, the divider 3403 of the demodulator provides the second received wireless communication signal to the second signal path. The second signal path may include a second rat-race coupler 3414. The second signal rat-race coupler 3414 receives the second modulated communication signal which the divider 3403 provides to the second signal path, from one of its input terminals.

The second rat-race coupler 3414 may have two input terminals to receive the signals to be summed, and the second rat-race coupler 3414 may have one output to provide the output signal which is the sum of signals which the second rat-race coupler 3414 receives from its two input terminals. The fourth terminal of the rat race coupler may be coupled to a second resistor. The second rat-race coupler 3414 also receives a second reference signal from another input as the signal to add to the second received modulated communication signal.

The phase-locked loop 3405 of the demodulator is coupled to the second voltage-controlled oscillator 3407. The second voltage-controlled oscillator 3407 may provide a sinusoidal signal having a frequency at 46.7 GHz. The sinusoidal signal which the second voltage-controlled oscillator 3407 generates has 90 degrees phase difference related to the sinusoidal signal which the first voltage-controlled oscillator 3406 generates.

The second voltage-controlled oscillator 3407 is coupled to a second voltage-controlled oscillator buffer 3415. The second voltage-controlled oscillator buffer 3415 is coupled to the mixer-based frequency tripler 3409 which triples the frequency of the sinusoidal signal which the second voltage-controlled oscillator 3407 provides. Hence, the second rat-race coupler 3414 may receive a second sinusoidal signal as the second reference signal at about 140 GHz. In an example, the second reference signal may include a sine signal at the same carrier frequency with the second received modulated communication signal having an amplitude of at least the amplitude A of the second received modulated communication signal. In an example, the second voltage-controlled oscillator 3407 may generate the second reference signal with an amplitude that is in a range from about the amplitude of the second received modulated communication signal to about five times of the amplitude of the second received modulated communication signal.

The second rat-race coupler 3414 sums the second received modulated communication signal, which the second rat-race coupler 3414 receives from its first input terminal, and the second reference signal, which the second rat-race coupler 3414 receives from its second input terminal to obtain a second intermediate signal. The second rat-race coupler 3414 may provide the second intermediate signal to a second envelope detector 3415. In this example, the second envelope detector 3415 may include a diode detector. The diode detector may include a diode between the input terminal of the second envelope detector 3415 and the output terminal of the first envelope detector 3415, in which the diode may be coupled to a resistor and a capacitor in parallel form.

In an example, the demodulator may include a second baseband amplifier 3416 to amplify at the second signal path. The second envelope detector 3415 may provide a second envelope detected signal to the second baseband amplifier 3416. The second baseband amplifier 3416 may receive the second envelope detected signal, and provide a second amplified baseband signal to the analog-to-digital converter 3412 as an in-phase component.

In an example, the analog-to-digital converter 3412 converts the quadrature component to a digital baseband communication signal. The analog-to-digital converter 3412 may receive the quadrature component and convert the quadrature component to a digital signal. In an example, the analog-to-digital converter 3412 may include a sample and hold circuit. In an example, the analog-to-digital converter 3412 may include a mixed signal equalizer. Accordingly, the analog-to-digital converter 3412 may output a digital quadrature component to the digital baseband processor 3413.

In an example, the demodulator may include a memory storing instructions and one or more processors configured to execute the instructions to obtain an intermediate signal by adding a received phase-modulated communication signal including a carrier signal at a carrier frequency to a reference signal at the carrier frequency, wherein the amplitude of the reference signal is about equal or greater than the amplitude of the received phase-modulated communication signal; and to detect an envelope of the intermediate signal.

In accordance with various aspects of this disclosure, a device, in particular, a communication device may include a memory, and one or more processors, such as processing circuitry 810 and memory 820 referring back to FIG. 8. The memory 820 may be implemented as one or more non-transitory computer-readable medium including one or more instructions that when executed on at least one processor cause a demodulator to obtain an intermediate signal by adding a received phase-modulated communication signal including a carrier signal at a carrier frequency to a reference signal at the carrier frequency, wherein the amplitude of the reference signal is about equal or greater than the amplitude of the received phase-modulated communication signal; and to detect an envelope of the intermediate signal.

FIG. 35 shows schematically an example of method steps in accordance with various aspects of this disclosure. The method may include obtaining an intermediate signal by adding a received phase-modulated communication signal including a carrier signal at a carrier frequency to a reference signal at the carrier frequency, wherein the amplitude of the reference signal is about equal or greater than the amplitude of the received phase-modulated communication signal; and detecting an envelope of the intermediate signal.

Another circuit that may affect the power consumption of a transceiver may be the local oscillator. As provided in accordance with various examples of this disclosure, there are many functions that may include the presence of a local oscillator in a transceiver. In many examples, at least one oscillator may be needed to change the frequency of a signal as a part of the heterodyne process which many receivers use for a long time. In these examples, the local oscillator may complimentarily work with a mixer to increase or decrease the frequency of a signal. In certain examples, the local oscillator and mixer combination may be provided to the transceiver as one module which is called a converter.

The heterodyne process which uses a local oscillator, which is also used in superheterodyne receivers has many applications in modern communication systems. Many modern communication technologies work in harmony with superheterodyne receivers, which may include radio frequency receiver circuits, modems, television broadcast transmitters and television receivers, many frequency division multiplexing systems, and almost all of the wireless communication systems and signals in accordance with this disclosure.

However, as provided in many examples, the implementation of local oscillators in transceivers is a complex process. As provided in some of the examples, a transceiver may employ a plurality of local oscillators for different parts of the modulation and/or demodulation processes. For example, the transmitting part of the transceiver may use a local oscillator to bring the signal to be transmitted to a carrier frequency, or the receiving part of the transceiver may use another local oscillator to bring the received signal which is on a carrier frequency to an intermediate frequency. An I/Q demodulator may use at least one local oscillator in order to provide phase-shifted sinusoidal signals as provided in various examples in this disclosure. Another local oscillator may be employed to convert the signal at the intermediate frequency to a baseband signal.

It should also be considered that the transceiver or a communication device including at least one transceiver may also employ a plurality of antennas that support receiving and transmitting signals at the same time. In such systems, the transceiver may employ at least one local oscillator for each of the plurality of antennas, so that the wireless communication signals may be modulated and/or demodulated at the same time. An example of such a communication device may include a communication system that supports Multiple Input Multiple Output (MIMO) technology.

Apart from their power consumption needs, the integration of a local oscillator in a transceiver is also a complex process which may be very demanding. In many communication technologies the transceiver should be able to change the frequency of the signal based on the communication channel which the transceiver selects, or alternatively is allowed, to use. In order to integrate a local oscillator which may be adjusted in order to change the communication channel may require further care to ensure that no unwanted interference is provided to the transceiver by the local oscillator.

Accordingly, there are certain performance requirements that may be provided when implementing a local oscillator. Such performance requirements may include that a local oscillator should provide a stable frequency by minimizing the harmonics introduced in the signal as much as possible, and also by keeping the phase noise at minimum. There are certain mechanics that may affect the performance of a local oscillator such as the temperature of the environment, the fluctuations of the supply voltage, and the effects of these mechanics on a local oscillator should be kept at minimum. One of the objects of this disclosure is to address at least one of the aspects which may be introduced to a transceiver by a local oscillator, especially for a modulated communication signal by using phase modulation.

One of such modulated communication signal types by using phase modulation may include a phase-shift keying (PSK) signal. In phase-shift keying, the information to be transmitted is conveyed by changing the phase of a carrier signal with a constant frequency. For demodulation, the term phase refers to the phase difference between a reference signal and a received communication signal. In many examples, a local oscillator may generate the reference signal for a modulator or a demodulator. The data to be transmitted is modulated to a communication signal according to the phase difference related to the reference signal. Therefore, a demodulator identifies the phase difference of the received communication signal related to the reference signal in order to obtain the data.

There is also another way of modulating with a phase-shift keying signal which is non-coherent. Instead of modulating the data to be transmitted according to the phase difference related to a separate reference signal, the phase difference related to the previous symbol may be used. Accordingly, a modulator may provide the phase shift of each symbol with respect to the phase of the previous symbol. The symbols are accordingly encoded in the difference of phase between each successive sample. This type of phase-shift keying is called differential phase-shift keying (DPSK).

FIG. 36 shows schematically an example of a transmitting part of a transceiver that uses differential phase-shift keying modulation. In an example, a baseband processor may provide a binary data 3601 to an encoding block 3602. The encoding block 3602 may receive the binary data 3601 from one of its input terminals and provides an analog signal from its output. A time delay circuit 3603 may receive the output signal which the encoding block 3602 provides. The time delay circuit 3603 may delay the output signal of the encoding block 3602 by one symbol duration. In this example, the signal will be modulated to a differential binary phase-shift keying signal, and the time delay circuit 3603 delays the output signal of the encoding block 3602 according to one bit.

The time delay circuit 3603 provides the delayed output signal of the encoding block 3602 back to the encoding block 3602. The encoding block 3602 receives the delayed output signal from another input and provides its output signal based on its delayed output signal and the binary data 3601 provided by the baseband processor. In an example, the baseband processor may include the encoding block 3602. In an example, the encoding block 3602 may include a digital-to-analog converter. Further, the encoding block 3602 may include a logic to provide its output signal as above. In an example, the encoding block 3602 may include an XNOR gate.

A radio frequency mixer 3604 may receive the output signal which the encoding block 3602 provides from one of its inputs. Another input of the radio frequency mixer 3604 may be coupled to a local oscillator 3605. The local oscillator 3605 may include a phase-locked loop in order to provide a signal with a locked phase. The local oscillator 3605 may provide a carrier signal at a carrier frequency to the radio frequency mixer 3604. The radio frequency mixer 3604 receives the carrier signal from its other input and multiply the output signal which the encoding block 3602 provides with the carrier signal which the local oscillator 3605 provides. Accordingly, the radio frequency mixer 3604 may provide an RF signal which may include the carrier signal with a phase difference. The output signal which the encoding block 3602 provides may provide the phase difference of the carrier signal by a sinusoidal signal.

The radio frequency mixer 3604 may provide the RF signal to a power amplifier 3606. The power amplifier 3606 may receive the RF signal which the radio frequency mixer 3604 provides and amplify the RF signal based on its configuration. In an example, the power amplifier 3606 provides the amplified RF signal to an antenna 3607. The antenna 3607 may receive the amplified RF signal and emits the RF signal based on its configuration.

FIG. 37 shows schematically an example of a modulated differential binary phase-shift keying signal. In this example, each bit is represented by the corresponding signal which is shown. Each of the signals is separated by the symbol duration. The symbol duration is the duration of one transmitted/received symbol.

In FIG. 37, the bits are modulated according to a differential binary phase-shift keying. In this example, in order to transmit bit 0, an encoding block provides an output without any phase difference with respect to a previous signal. Alternatively, the encoding block provides an output with 90 degrees phase difference with respect to the previous signal, in order to transmit bit 1. As long as the modulator and the demodulator are adapted, it is possible to change the encoding scheme. In an example, the encoding block may provide an output with 180 degrees phase difference with respect to the previous signal. In another example, the encoding block may not provide a phase difference for bit 1, but it may provide the phase difference for bit 0.

Accordingly, both the phase-shift keying and the differential phase-shift keying modulation schemes allow encoding symbols in the phase of the communication signal. As explained in various aspects of this disclosure, it is the phase of the modulated communication signal which conveys the data. There are also other modulation schemes in which the symbols are encoded in the phase of the communication signal. One of such modulation schemes is amplitude and phase-shift keying, or asymmetric phase-shift keying (APSK), which employs both conveying data with phase and amplitude of the communication signal.

Amplitude and phase-shift keying (APSK), or in other expressions asymmetric phase-shift keying is a digital modulation scheme to provide data by modulating both amplitude and phase of a carrier signal. The amplitude and phase-shift keying (APSK) scheme may be considered as a combination of amplitude shift keying and phase-shift keying. For example, a 16 differential amplitude and phase-shift keying (16-DAPSK) may be considered as a combination of 8 differential phase-shift keying (8-DPSK) and 2 differential amplitude shift keying (2-ASK).

FIG. 38 shows schematically an example of a constellation diagram of 16 amplitude and phase-shift keying (16-APSK) modulation scheme. A skilled person would realize that the modulation is very similar to the modulation of a phase-shift keying modulation scheme with an addition to modulating the amplitude of the carrier signal. A demodulator may receive two different amplitude levels for the carrier signal, and it includes the determination of the encoded symbol based on the phase and the amplitude of the received modulated communication signal.

FIG. 39 shows schematically an example of a receiving part of a transceiver in accordance with various aspects of this disclosure. In this example, the transceiver may include an antenna 3901. In an example, the transceiver may be a transceiver for wired communication technology, and the transceiver may include a socket to provide a connection with the wire to be used for wired communication. In another example, the transceiver may include an antenna interface to connect the transceiver to an antenna, but the transceiver may not include the antenna. In an example, the transceiver may include a plurality of antennas which may be used to transmit and to receive the communication signals at the same time.

The transceiver may receive a wireless communication signal via the antenna 3901. In an example, the wireless communication signal may include a wireless communication symbol which includes a type of phase modulation. In an example, the data encoded in the wireless communication signal may be conveyed at least using the phase of the wireless communication signal. In an example, the wireless communication signal includes at least a first symbol which is encoded in the phase of the first part of the wireless communication signal and a second symbol which is encoded in the phase of the second part of the wireless communication signal.

In an example, the wireless communication signal may include a phase-shift keying signal. In an example, the wireless communication signal may include an amplitude and phase-shift keying signal. In an example, the wireless communication signal may include a differential phase-shift keying signal. In the example of a differential phase-shift keying signal, the wireless communication signal may include a first symbol which a modulator encoded with a phase difference between a first part and a second part of the wireless communication signal. In an example, the temporal difference between the first part of the wireless communication signal and the second part of the wireless communication signal is one symbol duration. Accordingly, the first symbol and the second symbol may be a first symbol and a second consecutive symbol. In this example, the wireless communication signal includes a differential binary phase-shift keying signal.

The antenna 3901 may be coupled to a low noise amplifier 3902. The low noise amplifier 3902 may be configured to receive the wireless communication signal and provide amplification based on an amplifier configuration. In an example, one or more processors which the transceiver may include, or may be coupled to, may provide the amplifier configuration to the low noise amplifier 3902. The low noise amplifier 3902 may amplify the wireless communication signal based on the amplifier configuration and provides the amplified signal to a demodulator. In an example, the demodulator may already include the low noise amplifier 3902. In an example, the demodulator may include the antenna 3901 or any other connection to a communication medium which includes the communication signal.

The demodulator may include a divider 3903 to divide the amplified signal. The divider 3903 may receive the amplified signal from an input terminal and provide divided amplified signals from its two outputs for two signal paths. At a first path, the divider 3903 provides the modulated communication signal to a radio frequency mixer 3904. At a second path, the divider 3903 may provide a copy of the modulated communication signal to a delay circuit 3905.

The delay circuit 3905 may receive the modulated communication signal which the divider 3903 may provide. The delay circuit 3905 may provide a delay to the received modulated communication signal. In an example, the received modulated communication signal includes a first symbol encoded in the phase of the first part of the received modulated communication signal and a second symbol encoded in the phase of the second part of the received modulated communication symbol. In an example, the temporal difference between the first symbol and the second symbol in one symbol duration. In an example, the delay circuit 3905 may provide a delay of one symbol duration to the received modulated communication signal.

Accordingly, the delay circuit 3905 may provide a delayed modulated communication signal from its output. The delay circuit 3905 is coupled to the radio frequency mixer 3904. The delay circuit 3905 provides its output which includes the delayed modulated communication signal to the radio frequency mixer 3904. The radio frequency mixer 3904 receives the modulated communication signal, which the divider 3903 provides from one of its input terminals and the delayed modulated communication signal which the delay circuit 3905 provides from another of its input terminals. The radio frequency mixer 3904 multiplies the received modulated communication signal and the delayed modulated communication signal. The radio frequency mixer 3904 may provide its output for the multiplication as a first mixed signal.

Accordingly, the radio frequency mixer 3904 provides its output as the first mixed signal and the first mixed signal includes a high-frequency component and a low frequency component, similar to the output of a mixer in a heterodyne process which multiplies the received signal with a reference signal which a local oscillator generates. In this example, the transceiver employs multiplying the received signal with its delayed version to demodulate the signal and obtain a component of the signal which is at the baseband. Due to the multiplication of the signal with its delayed version, two noisy signals are multiplied which have a correlated noise, and therefore the phase noise may be reduced compared to a heterodyne process with a reference signal.

In an example, the received modulated communication signal includes a differential binary phase-shift keying modulated signal which includes a first symbol and a second symbol, wherein the temporal difference between the first symbol and the second symbol is one symbol duration. Further, the delay circuit 3905 delays the received modulated communication signal for one symbol duration to obtain the delayed modulated communication signal. In this example, the demodulator directly obtains the encoded symbol without introducing more complexity to the transceiver.

In the example of the received modulated communication signal including a differential binary phase-shift keying modulated signal, the received modulated communication signal may be formulated as $x_1(t)=A\cos(\omega t+\theta_1)$ for the first part of the received modulated communication signal, where is the phase of the received modulated communication signal, A is the amplitude of the modulated communication signal, and w is the carrier frequency, and the second part of the received modulated signal may be formulated as $x_2(t)=A\cos(\omega t+\theta_2)$. Accordingly, the output of the multiplication will include The transceiver may receive the second part of the communication signal which includes the second symbol information and the delay circuit 3905 may delay the second part of the communication signal for one symbol duration so that the first part of the communication signal which includes the first symbol information which the transceiver receives consecutive to the second part of the communication signal are multiplied in the radio frequency mixer 3904. The output of the radio frequency mixer 3904, therefore may include the phase difference between the second part of the communication signal and the first part of the communication signal, which relates to the first symbol according to a differential modulation scheme.

In an example, the demodulator may include a low pass filter coupled to the radio frequency mixer 3904. The low pass filter may receive the first mixed signal and filter out the high-frequency components of the first mixed signal to obtain a baseband output signal. In an example the demodulator may include a determiner to determine the encoded symbols which the modulated communication signal includes based on the baseband output signal.

In an example, the demodulator may include at least one analog-to-digital converter to convert the analog baseband output signal to a digital signal. In an example, the analog-to-digital converter may include a time-interleaved analog-to-digital converter. In an example, the at least one analog converter may include four time-interleaved analog-to-digital converters, and they are switched to output four symbols. In an example, at least one analog-to-digital converter may convert an analog signal to an N-bit digital representation of the analog signal, where N is an integer. In an example, N-bit digital representation includes 3-bit digital representation. In an example of a differential binary phase-shift keying (DPSK) signal, the analog-to-digital converter may convert the analog signal to a 1-bit digital representation.

FIG. 40 shows schematically an example of a transceiver in accordance with various aspects of this disclosure. In this example, the transceiver may include an antenna 4001 to receive a communication signal. In an example, the transceiver may be a transceiver for wired communication technology, and the transceiver may include a socket to provide a connection with the wire to be used for wired communication. In another example, the transceiver may include an antenna interface to connect the transceiver to an antenna, but the transceiver may not include the antenna. In an example, the transceiver may include a plurality of antennas which may be used to transmit and to receive the communication signals at the same time.

The transceiver may receive a wireless communication signal via the antenna 4001. In an example, the data encoded in the wireless communication signal may be conveyed at least using the phase of the wireless communication signal. In an example, the wireless communication signal includes at least a first symbol which is encoded in the phase of the first part of the wireless communication signal and a second symbol which is encoded in the phase of the second part of the wireless communication signal.

In an example, the wireless communication signal may include a phase-shift keying signal. In an example, the wireless communication signal may include an amplitude and phase-shift keying signal. In an example, the wireless communication signal may include a differential phase-shift keying signal. In the example of a differential phase-shift keying signal, the wireless communication signal may include a first symbol which a modulator encoded with a phase difference between a first part and a second part of the wireless communication signal. In an example, the temporal difference between the first part of the wireless communication signal and the second part of the wireless communication signal is one symbol duration. Accordingly, the transceiver may receive the first part of the wireless communication signal including a first symbol after the transceiver receives the second part of the wireless communication signal including a second symbol. In this example, the wireless communication signal includes a differential quadrature phase-shift keying signal.

The antenna 4001 may be coupled to a low noise amplifier 4002. The low noise amplifier 4002 may be configured to receive the wireless communication signal and provide amplification based on an amplifier configuration. In an example, one or more processors which the transceiver may include, or may be coupled to, may provide the amplifier configuration to the low noise amplifier 4002. The low noise amplifier 4002 may amplify the wireless communication signal based on the amplifier configuration and provides the amplified signal to a demodulator. In an example, the demodulator may already include the low noise amplifier 4002. In an example, the demodulator may include the antenna 4001 or any other connection to a communication medium which includes the communication signal.

The demodulator may include a first divider 4003 to divide the amplified signal, which the low noise amplifier 4002 provides. The first divider 4003 may receive the amplified signal from an input terminal and provide divided amplified signals from its two outputs for two signal paths. At a first output path of the first divider 4003, the first divider 4003 provides the modulated communication signal to a second divider 4004. At a second output path of the first divider 4003, the first divider 4003 may provide a copy of the modulated communication signal to a delay circuit 4005.

The delay circuit 4005 may receive the modulated communication signal which the first divider 4003 provides. The delay circuit 4005 may provide a delay to the received modulated communication signal. In an example, the received modulated communication signal includes a first symbol encoded in the phase of the first part of the received modulated communication signal and a second symbol encoded in the phase of the second part of the received modulated communication symbol. In an example, the temporal difference between the first symbol and the second symbol in one symbol duration. In an example, the delay circuit 4005 may provide a delay of one symbol duration to the received modulated communication signal.

Accordingly, the delay circuit 4005 may provide a delayed modulated communication signal from its output. The delay circuit 4005 is coupled to a third divider 4006. The delay circuit 4005 provides its output which includes the delayed modulated communication signal to the third divider 4006. The third divider 4006 may receive the delayed modulated communication signal from an input terminal and provide the delayed two copies of the modulated communication signal from its two outputs for two signal paths. At a first output path of the third divider 4006, the third divider 4006 provides the delayed modulated communication signal to a first radio frequency mixer 4007. At a second output path of the third divider 4006, the third divider 4006 may provide a copy of the delayed modulated communication signal to a second radio frequency mixer 4008.

The second divider 4004 may receive the modulated communication signal from an input terminal from the first divider 4003 and provide two copies of the received modulated communication signals from its two outputs for two signal paths. At a first output path of the second divider 4004, the second divider 4004 provides the received modulated communication signal to the first radio frequency mixer 4007. At a second output path of the second driver 4004, the second divider 4004 may provide the received modulated communication signal to a phase shifter 4009.

The phase shifter 4009 may receive the modulated communication signal which the second divider 4004 provides, and provide a predefined phase shift to the modulated communication signal which the phase shifter 4009 receives. In this example, the phase shifter 4009 provides a phase shift of 90 degrees to the received modulated communication signal and obtains a shifted received modulated communication signal. The phase shifter 4009 provides the shifted received modulated communication signal to the second radio frequency mixer 4008.

Accordingly, the first radio frequency mixer 4007 receives the modulated communication signal, which the second divider 4004 provides from one of its input terminals, and the delayed modulated communication signal which the third divider 4006 provides from another of its input terminals. The first radio frequency mixer 4007 multiplies the received modulated communication signal and the delayed modulated communication signal. In another expression, in an example the received modulated communication signal may include the first part of the received modulated communication signal, and the delayed modulated communication signal may include the second part of the received modulated communication signal. The transceiver receives the second part of the communication signal before the first part of the communication signal. The first radio frequency mixer 4007 may provide its output of the multiplication as a first mixed signal. In an example, the first mixed signal includes a sinusoidal signal including the cosine component of the phase difference between the modulated communication signal and the delayed modulated communication signal.

The second radio frequency mixer 4008 receives the shifted received modulated communication signal which the phase shifter 4009 provides from one of its input terminals and the delayed modulated communication signal which the third divider 4006 provides from another of its input terminals. The second radio frequency mixer 4008 multiplies the shifted received modulated communication signal and the delayed modulated communication signal. The second radio frequency mixer 4008 may provide its output of the multiplication as a second mixed signal. In an example, the second mixed signal includes a sinusoidal signal including the sine component of the phase difference between the modulated communication signal and the delayed modulated communication signal.

In an example, the demodulator may include a first low pass filter 4010 coupled to the first radio frequency mixer 4007. In an example, the first radio frequency mixer 4007 provides the first mixed signal to the first low pass filter 4010 to filter out the high-frequency components of the first mixed signal to obtain a first baseband output signal.

In an example, the demodulator may include a second low pass filter 4011 coupled to the second radio frequency mixer 4008. In an example, the second radio frequency mixer 4008 provides the second mixed signal to the second low pass filter 4011 to filter out the high-frequency components of the second mixed signal to obtain a second baseband output signal.

In an example, the demodulator may include the determiner 4013. In an example, the determiner 4013 may determine the symbols received from the modulated communication signal which the transceiver receives based on the baseband output signals. In an example, the determiner 4013 may determine the first symbol which corresponds to the first part of the received modulated communication signal, which the transceiver receives after the second part of the received modulated communication signal, based on the first baseband output signal and the second baseband output signal.

In an example, the determiner 4013 may determine the first symbol from a measurement which the determiner 4013 may perform on the first baseband output signal and the second baseband output signal. The determiner 4013 may measure the amplitude of the first baseband output signal and the second baseband output signal, and compare the amplitude of the first baseband output signal, and the amplitude of the second baseband output signal with an information related to a correspondence of a plurality of amplitude of the baseband signals with a plurality of symbols. In an example, a look-up table may include the information related to the correspondence of a plurality of amplitude of the baseband signals with a plurality of symbols.

In an example, the demodulator may include at least one analog-to-digital converter 4012 to convert the analog first baseband output signal and the second baseband output to a digital signal. In an example, the analog-to-digital converter 4012 may include a time-interleaved analog-to-digital converter. In an example, the at least one analog converter 4012 may include four time-interleaved analog-to-digital converters, and they are switched to output four symbols to achieve the high baud rate. In an example, the at least one analog-to-digital converter 4012 may convert an analog signal to an N-bit digital representation of the analog signal, where N is an integer. In an example, N-bit digital representation includes 3-bit digital representation. In the case of a differential quadrature phase-shift keying, the at least one analog-to-digital converter may convert the analog signal with a 2-bit digital representation.

In an example, the output of the first low pass filter 4010 and the second low pass filter 4011 may be coupled to the at least one analog-to-digital converter. The at least one analog-to-digital converter 4012 may receive the first baseband output signal which the first low pass filter 4010 provides, and the second baseband output signal which the second low pass filter 4011 provides. The at least one analog-to-digital converter 4012 may provide the output digital signals to a determiner 4013.

In an example, the determiner 4013 may include the baseband processor. In an example, the determiner 4013 may determine the symbols received from the modulated communication signal which the transceiver receives based on the baseband output signals. In an example, the determiner 4013 may determine the first symbol based on the digital signals which the at least one analog-to-digital converter 4012 provides.

In an example, the determiner 4013 may include a look up table including information related to a plurality of symbols and a plurality of baseband output signals, or alternatively a plurality of digital signals based on the representation of the at least one analog-to-digital converter 4012. Accordingly, the determiner may determine the first symbol based on the corresponding information related to the first baseband output signal and the second baseband output signal in the look-up table.

In case of the wireless communication signal may include a phase-shift keying signal, or an amplitude and phase-shift keying signal, at which a modulator provides a phase difference for each symbol with respect to a reference symbol, the determiner 4013 may further include a comparator to compare the first symbol with the reference symbol. In an example, a reference signal may include the reference symbol. In an example, the comparator may receive the baseband output signals and compare the baseband output signals with the reference symbol. In an example, the comparator may compare the first baseband output signal with a first portion of the reference symbol, and the comparator may compare the second baseband output signal with a second portion of the reference symbol. Accordingly, the comparator may obtain a first phase difference between the first baseband output signal and the reference signal, and further, the comparator may obtain a second phase difference between the second baseband output signal and the reference signal. Based on the comparison, the determiner 4013 may determine the first symbol.

In an example, the determiner 4013 may include one or more processors to implement a coordinate rotation digital computer (CORDIC) function to determine the first symbol based on the first baseband output signal and the second baseband output signal. The determiner 4013 may apply the CORDIC function to convert the information received with the first baseband output signal and the second baseband output signal to the information related to the first symbol and the second symbol. In another example, the determiner 4013 may include one or more processors to implement a Lagrange interpolation to convert the information received with the first baseband output signal and the second baseband output signal to the information related to the first symbol.

FIG. 41 shows schematically an example of a transceiver in accordance with various aspects of this disclosure. A skilled person would appreciate that the transceiver of FIG. 41 includes many similarities related to the transceiver of FIG. 40. Accordingly, most of the aspects may be interchanged. In this example, the transceiver may include an antenna 4101 to receive a communication signal. The transceiver may receive a wireless communication signal via the antenna 4101.

In an example, the wireless communication signal may include a phase-shift keying signal, or an amplitude and phase-shift keying signal, or a differential phase-shift keying signal, or a differential phase-shift keying signal. In an example, the temporal difference between the first part of the wireless communication signal and the second part of the wireless communication signal is one symbol duration. Accordingly, the transceiver may receive the first part of the wireless communication signal including a first symbol after the transceiver receives the second part of the wireless communication signal including a second symbol. In this example, the wireless communication signal includes a differential 8 phase-shift keying signal (8-PSK).

The antenna 4101 may be coupled to a low noise amplifier 4102. The low noise amplifier 4102 may receive the wireless communication signal and provide amplification based on an amplifier configuration. The demodulator may further include a first divider 4103 to divide the amplified signal. The first divider 4103 may receive the amplified signal from an input terminal and provide divided amplified signals from its two outputs for two signal paths. At a first output path of the first divider 4103, the first divider 4103 provides the modulated communication signal to a second divider 4104. At a second output path of the first divider 4103, the first divider 4103 may provide a copy of the modulated communication signal to a delay circuit 4105.

The delay circuit 4105 may receive the modulated communication signal and it may provide a delay to the received modulated communication signal. In an example, the received modulated communication signal includes a first symbol encoded in the phase of the first part of the received modulated communication signal and a second symbol encoded in the phase of the second part of the received modulated communication symbol. In an example, the temporal difference between the first symbol and the second symbol in one symbol duration. In an example, the delay circuit 4105 may provide a delay of one symbol duration to the received modulated communication signal.

Accordingly, the delay circuit 4105 may provide a delayed modulated communication signal from its output. The delay circuit 4105 is coupled to a third divider 4106. The delay circuit 4105 provides its output which includes the delayed modulated communication signal to the third divider 4106. The third divider 4106 may receive the delayed modulated communication signal from an input terminal and provide the two copies of the delayed modulated communication signal from its two outputs for two signal paths. At a first output path of the third divider 4106, the third divider 4106 provides the delayed modulated communication signal to a first radio frequency mixer 4107.

The second divider 4104 may receive the modulated communication signal from an input terminal from the first divider 4103 and provide two copies of the received modulated communication signals from its two outputs for two signal paths. At a first output path of the second divider 4104, the second divider 4104 provides the received modulated communication signal to the first radio frequency mixer 4107. At a second output path of the second divider 4105, the second divider 4105 may provide a copy of the received modulated communication signal to a second radio frequency mixer 4108.

Further, at a second output path of the third divider 4105, the third divider 4105 may provide the delayed modulated communication signal to a phase shifter 4109. The phase shifter 4109 may receive the delayed communication signal which the third divider 4105 provides, and provide a predefined phase shift to the delayed modulated communication signal which the phase shifter 4109 receives. In this example, the phase shifter 4109 provides a phase shift of 90 degrees to the delayed modulated communication signal and obtains a shifted delayed modulated communication signal. The phase shifter 4109 provides the shifted delayed modulated communication signal to the second radio frequency mixer 4108.

Accordingly, the first radio frequency mixer 4107 receives the modulated communication signal, which the second divider 4104 provides from one of its input terminals and the delayed modulated communication signal which the third divider 4106 provides from another of its input terminals. The first radio frequency mixer 4107 multiplies the received modulated communication signal and the delayed modulated communication signal. In another expression, in an example the received modulated communication signal may include the first part of the received modulated communication signal, and the delayed modulated communication signal may include the second part of the received modulated communication signal. The transceiver receives the second part of the communication signal before the first part of the communication signal. The first radio frequency mixer 4107 may provide its output of the multiplication as a first mixed signal. In an example, the first mixed signal includes a sinusoidal signal including the cosine component of the phase difference between the modulated communication signal and the delayed modulated communication signal.

The second radio frequency mixer 4108 receives the shifted delayed modulated communication signal which the phase shifter 4109 provides from one of its input terminals, and the received modulated communication signal which the second divider 4104 provides from another of its input terminals. The second radio frequency mixer 4108 multiplies the shifted delayed modulated communication signal and the received modulated communication signal. The second radio frequency mixer 4108 may provide its output of the multiplication as a second mixed signal. In an example, the second mixed signal includes a sinusoidal signal including the sine component of the phase difference between the modulated communication signal and the delayed modulated communication signal.

In an example, the demodulator may include a first low pass filter 4110 coupled to the first radio frequency mixer

4107. In an example, the first radio frequency mixer 4107 provides the first mixed signal to the first low pass filter 4110 to filter out the high-frequency components of the first mixed signal to obtain a first baseband output signal.

In an example, the demodulator may include a second low pass filter 4111 coupled to the second radio frequency mixer 4108. In an example, the second radio frequency mixer 4108 provides the second mixed signal to the second low pass filter 4111 to filter out the high-frequency components of the second mixed signal to obtain a second baseband output signal.

In an example, the demodulator may include the determiner 4113. In an example, the determiner 4113 may determine the symbols received from the modulated communication signal which the transceiver receives based on the baseband output signals. In an example, the determiner 4113 may determine the first symbol which corresponds to the first part of the received modulated communication signal, which the transceiver receives after the second part of the received modulated communication signal, based on the first baseband output signal and the second baseband output signal.

In an example, the determiner 4113 may determine the first symbol from a measurement which the determiner 4113 may perform on the first baseband output signal and the second baseband output signal. The determiner 4113 may measure the amplitude of the first baseband output signal and the second baseband output signal, and compare the amplitude of the first baseband output signal, and the amplitude of the second baseband output signal with an information related to a correspondence of a plurality of amplitude of the baseband signals with a plurality of symbols. In an example, a look-up table may include the information related to the correspondence of a plurality of amplitude of the baseband signals with a plurality of symbols.

In an example, the demodulator may include at least one analog-to-digital converter 4112 to convert the analog first baseband output signal and the second baseband output to a digital signal. In an example, the analog-to-digital converter 4112 may include a time-interleaved analog-to-digital converter. In an example, the at least one analog converter 4112 may include four time-interleaved analog-to-digital converters, and they are switched to output four symbols to achieve the high baud rate. In an example, the at least one analog-to-digital converter 4112 may convert an analog signal to an N-bit digital representation of the analog signal, where N is an integer. In an example, N-bit digital representation includes 3-bit digital representation. In the case of a differential 8 phase-shift keying, the at least one analog-to-digital converter may convert the analog signal with a 3-bit digital representation.

In an example, the output of the first low pass filter 4110 and the second low pass filter 4111 may be coupled to the at least one analog-to-digital converter. The at least one analog-to-digital converter 4112 may receive the first baseband output signal which the first low pass filter 4110 provides, and the second baseband output signal which the second low pass filter 4111 provides. The at least one analog-to-digital converter 4112 may provide the output digital signals to a determiner 4113.

In an example, the determiner 4113 may include the baseband processor. In an example, the determiner 4113 may determine the symbols received from the modulated communication signal which the transceiver receives based on the baseband output signals. In an example, the determiner 4113 may determine the first symbol based on the digital signals which the at least one analog-to-digital converter 4112 provides.

In an example, the determiner 4113 may include a look up table including information related to a plurality of symbols and a plurality of baseband output signals, or alternatively a plurality of digital signals based on the representation of the at least one analog-to-digital converter 4112. Accordingly, the determiner may determine the first symbol based on the corresponding information related to the first baseband output signal and the second baseband output signal in the look-up table.

In case the wireless communication signal includes a phase-shift keying signal, or an amplitude and phase-shift keying signal, at which a modulator provides a phase difference for each symbol with respect to a reference symbol, the determiner 4113 may further include a comparator to compare the first symbol with the reference symbol. In an example, a reference signal may include the reference symbol. In an example, the comparator may receive the baseband output signals and compare the baseband output signals with the reference symbol. In an example, the comparator may compare the first baseband output signal with a first portion of the reference symbol, and the comparator may compare the second baseband output signal with a second portion of the reference symbol. Accordingly, the comparator may obtain a first phase difference between the first baseband output signal and the reference signal, and further, the comparator may obtain a second phase difference between the second baseband output signal and the reference signal. Based on the comparison, the determiner 4113 may determine the first symbol.

FIG. 42 shows exemplarily a look-up table in accordance with various aspects of this disclosure. The first column 4201 of the look up table refers to the possible phase-shift keying symbols based on the information related to the first baseband output signal 4202, and the information related to the second baseband output signal 4203. In this example, the modulated communication signal is an 8 phase-shift keying signal, hence there are 8 possible options for the symbol. The determiner 4113 may determine the first symbol based on the amplitude of the first baseband output signal and the second baseband output signal.

Referring back to FIG. 41, in an example, the determiner 4113 may include one or more processors to implement a coordinate rotation digital computer (CORDIC) function to determine the first symbol based on the first baseband output signal and the second baseband output signal. The determiner 4113 may apply the CORDIC function to convert the information received with the first baseband output signal and the second baseband output signal to the information related to the first symbol and the second symbol. In another example, the determiner 4113 may include one or more processors to implement a Lagrange interpolation to convert the information received with the first baseband output signal and the second baseband output signal to the information related to the first symbol.

FIG. 43 shows schematically an exemplary representation of the spectrum related to the effect of the multiplication of a communication signal including phase noise and a reference signal without a phase noise. In this example, the mixer receives a communication signal which includes a phase noise from its first input terminal 4301, and a reference signal which a local oscillator may generate from its second input terminal 4302. The reference signal would not any phase noise, at least which may be similar to the phase noise of the communication signal, and the output signal which the mixer provides from its output terminal 4303 may include a phase noise as well due to the multiplication process.

FIG. 44 shows schematically an exemplary representation of the spectrum related to the effect of the multiplication of a communication signal and another communication signal. In this example, the transceiver may receive the communication signals from the same communication medium, and the mixer receives a first communication signal which includes a phase noise from its first input terminal 4401, and a second communication signal which includes a delayed first communication signal from its second input terminal 4402, and the output signal which the mixer provides from its output terminal 4403 may have decreased phase noise.

FIG. 45 shows schematically an example of a transceiver in accordance with various aspects of this disclosure. A skilled person would appreciate that the transceiver of FIG. 45 includes many similarities related to the transceiver referred to in FIG. 40 or FIG. 41. Accordingly, most of the aspects may be interchanged. In this example, the transceiver may include an antenna 4501 to receive a communication signal. The transceiver may receive a wireless communication signal via the antenna 4501.

In this example, the wireless communication signal includes an amplitude and phase-shift keying signal. In an example, the temporal difference between the first part of the wireless communication signal and the second part of the wireless communication signal is one symbol duration. Accordingly, the transceiver may receive the first part of the wireless communication signal including a first symbol after the transceiver receives the second part of the wireless communication signal including a second symbol. In this example, the wireless communication signal includes an amplitude and phase-shift keying signal.

The antenna 4501 may be coupled to a low noise amplifier 4502. The low noise amplifier 4502 may receive the wireless communication signal and provide amplification based on an amplifier configuration. The demodulator may further include a first divider 4503 to divide the amplified signal. The first divider 4503 may receive the amplified signal from an input terminal and provide divided amplified signals from its two outputs for two signal paths. At a first output path of the first divider 4503, the first divider 4503 provides the modulated communication signal to a second divider 4504. At a second output path of the first divider 4503, the first divider 4503 may provide a copy of the modulated communication signal to a delay circuit 4505.

The delay circuit 4505 may receive the modulated communication signal and it may provide a delay to the received modulated communication signal. In an example, the received modulated communication signal includes a first symbol encoded in the phase of the first part of the received modulated communication signal and a second symbol encoded in the phase of the second part of the received modulated communication symbol. In an example, the temporal difference between the first symbol and the second symbol in one symbol duration. In an example, the delay circuit 4505 may provide a delay of one symbol duration to the received modulated communication signal.

Accordingly, the delay circuit 4505 may provide a delayed modulated communication signal from its output. The delay circuit 4505 is coupled to a third divider 4506. The delay circuit 4505 provides its output which includes the delayed modulated communication signal to the third divider 4506. The third divider 4506 may receive the delayed modulated communication signal from an input terminal and provide the two copies of the delayed modulated communication signal from its two outputs for two signal paths. At a first output path of the third divider 4506, the third divider 4506 provides the delayed modulated communication signal to a first radio frequency mixer 4507.

The second divider 4504 may receive the modulated communication signal from an input terminal from the first divider 4503 and provide two copies of the received modulated communication signals from its two outputs for two signal paths. At a first output path of the second divider 4504, the second divider 4504 provides the received modulated communication signal to a fourth divider 4508.

The fourth divider 4508 receives the received modulated communication signal and provides two copies of the received modulated communication signals. At a first output path of the fourth divider 4508, the fourth divider 4508 provides the received modulated communication signal to the first radio frequency mixer 4507. At a second output path of the second divider 4505, the second divider 4505 may provide a copy of the received modulated communication signal to a phase shifter 4509.

The phase shifter 4509 may receive the received modulated communication signal which the fourth divider 4508 provides, and provide a predefined phase shift to the received modulated communication signal which the phase shifter 4509 receives. In this example, the phase shifter 4509 provides a phase shift of 90 degrees to the received modulated communication signal and obtains a shifted received modulated communication signal. The phase shifter 4509 provides the shifted delayed modulated communication signal to a second radio frequency mixer 4510.

Referring back to the second divider 4504, at a second output path of the second divider 4504, the second divider 4504 provides the received modulated communication signal to an envelope detector 4511. The envelope detector may receive the received modulated communication signal from the second divider 4504, and provide an envelope detected signal which relates to the envelope of the received modulated communication signal to a determiner 4512.

Accordingly, the first radio frequency mixer 4507 receives the modulated communication signal, which the fourth divider 4508 provides from one of its input terminals and the delayed modulated communication signal which third divider 4506 provides from another of its input terminals. The first radio frequency mixer 4507 multiplies the received modulated communication signal and the delayed modulated communication signal. In another expression, in an example the received modulated communication signal may include the first part of the received modulated communication signal, and the delayed modulated communication signal may include the second part of the received modulated communication signal.

The transceiver receives the second part of the communication signal before the first part of the communication signal. The first radio frequency mixer 4507 may provide its output of the multiplication as a first mixed signal. In an example, the first mixed signal includes a sinusoidal signal including the cosine component of the phase difference between the modulated communication signal and the delayed modulated communication signal.

The second radio frequency mixer 4510 receives the shifted received modulated communication signal which the phase shifter 4509 provides from one of its input terminals and the delayed modulated communication signal which the third divider 4506 provides from another of its input terminals. The second radio frequency mixer 4510 multiplies the shifted received modulated communication signal and the delayed modulated communication signal. The second radio frequency mixer 4510 may provide its output of the multiplication as a second mixed signal. In an example, the second mixed signal includes a sinusoidal signal including the sine component of the phase difference between the modulated communication signal and the delayed modulated communication signal, in another expression between the first part of the communication signal, and the second part of the communication signal.

In an example, the demodulator may include a first low pass filter 4513 coupled to the first radio frequency mixer 4507. In an example, the first radio frequency mixer 4507 provides the first mixed signal to the first low pass filter 4513 to filter out the high-frequency components of the first mixed signal to obtain a first baseband output signal.

In an example, the demodulator may include a second low pass filter 4514 coupled to the second radio frequency mixer 4510. In an example, the second radio frequency mixer 4508 provides the second mixed signal to the second low pass filter 4511 to filter out the high-frequency components of the second mixed signal to obtain a second baseband output signal.

In an example, the determiner 4512 may determine the symbols received from the modulated communication signal which the transceiver receives based on the baseband output signals and the envelope detected signal. In an example, the determiner 4512 may determine the first symbol which corresponds to the first part of the received modulated communication signal, which the transceiver receives after the second part of the received modulated communication signal, based on the first baseband output signal, the second baseband output signal, and the envelope detected signal.

In an example, the determiner 4512 may determine the first symbol from a measurement which the determiner 4512 may perform on the first baseband output signal and the second baseband output signal. The determiner 4512 may measure the amplitude of the first baseband output signal and the second baseband output signal, and compare the amplitude of the first baseband output signal, the amplitude of the second baseband output signal, and the amplitude of the envelope detected signal with an information related to a correspondence of a plurality of amplitude of the baseband signals and a plurality of amplitude of the envelope detected signals with a plurality of symbols. In an example, a look-up table may include the information related to the correspondence of a plurality of amplitude of the baseband signals and a plurality of the envelope detected signals with a plurality of symbols.

In an example, the demodulator may include at least one analog-to-digital converter 4515 to convert the analog first baseband output signal, the second baseband output, and the envelope detected signal to a digital signal. In an example, the analog-to-digital converter 4515 may include a time-interleaved analog-to-digital converter. In an example, the at least one analog converter 4515 may include four time-interleaved analog-to-digital converters, and they are switched to output four symbols to achieve the high baud rate. In an example, the at least one analog-to-digital converter 4512 may convert an analog signal to an N-bit digital representation of the analog signal, where N is an integer. In an example, N-bit digital representation includes 3-bit digital representation. In the case of a differential 16 amplitude and phase-shift keying, the at least one analog-to-digital converter may convert the analog signal with a 4-bit digital representation.

In an example, the output of the first low pass filter 4513 and the second low pass filter 4514 may be coupled to the analog-to-digital converter. The at least one analog-to-digital converter 4515 may receive the first baseband output signal which the first low pass filter 4513 provides, and the second baseband output signal which the second low pass filter 4514 provides. The at least one analog-to-digital converter 4515 may provide the output digital signals to the determiner 4512.

Further, the at least one analog-to-digital converter 4515 may receive the envelope detected signal which the envelope detector 4511 provides and convert the envelope detected signal to a digital signal. The at least one analog-to-digital converter 4515 may provide the digital signal to the determiner 4512. In an example, the digital signal which relates to the envelope detected signal relates to the amplitude modulation portion of the amplitude and phase-shift keying modulation.

In an example, the determiner 4512 may include the baseband processor. In an example, the determiner 4512 may determine the symbols received from the modulated communication signal which the transceiver receives based on the baseband output signals and the envelope detected signals. In an example, the determiner 4512 may determine the first symbol based on the digital signals which the at least one analog-to-digital converter 4512 provides.

In an example, the determiner 4512 may include a look up table including information related to a plurality of symbols corresponding to a plurality of baseband output signals and a plurality of envelope detected signals, or alternatively a plurality of digital signals based on the representation of the analog-to-digital converter 4512. Accordingly, the determiner may determine the first symbol based on the corresponding information related to the first baseband output signal, the second baseband output signal, and the envelope detected signal in the look-up table.

In an example, the determiner 4512 may include one or more processors to implement a coordinate rotation digital computer (CORDIC) function to determine the first symbol based on the first baseband output signal and the second baseband output signal. The determiner 4512 may apply the CORDIC function to convert the information received with the first baseband output signal and the second baseband output signal to the information related to the first symbol and the second symbol. In another example, the determiner 4512 may include one or more processors to implement a Lagrange interpolation to convert the information received with the first baseband output signal and the second baseband output signal to the information related to the first symbol.

In case of the wireless communication signal includes a phase-shift keying signal, or an amplitude and phase-shift keying signal, at which a modulator provides a phase difference for each symbol with respect to a reference symbol, the determiner 4512 may further include a comparator to compare the first symbol with the reference symbol. In an example, a reference signal may include the reference symbol. In an example, the comparator may receive the baseband output signals and compare the baseband output signals with the reference symbol. In an example, the comparator may compare the first baseband output signal with a first portion of the reference symbol, and the comparator may compare the second baseband output signal with a second portion of the reference symbol. Accordingly, the comparator may obtain a first phase difference between the first baseband output signal and the reference signal, and further, the comparator may obtain a second phase difference between the second baseband output signal and the reference signal. Based on the comparison, the determiner 4512 may determine the first symbol.

In accordance with various aspects of this disclosure, the demodulator includes an analog delay circuit, and the analog delay circuit may cause an increase at the intersymbol interference due to the analog delay that the analog delay circuit introduces. In accordance with various aspects of this disclosure, the demodulator may include a closed-loop feedback portion which may be configured to provide calibration to the delay circuit 4505 in order to reduce a possible increase of intersymbol interference which is originated from the delay circuit 4505.

Accordingly, the demodulator may include a controller. In an example, the determiner 4512 may include the controller. In an example, the determiner 4512 may determine the first symbol. In an example, the determiner 4512 may also determine the error vector magnitude related to the first symbol which the determiner 4512 determines. In an example, the term error vector magnitude refers to the distance of the determined first symbol with respect to the ideal constellation points of the modulation scheme.

In an example, the controller may identify the error vector magnitude related to the determined first symbol, and perform a calibration algorithm based on the identified error vector magnitude related to the determined first symbol. Based on the calibration algorithm, the controller may send a tuning signal to the delay circuit 4505 to adjust at least one delay setting of the delay circuit 4505.

In an example, the controller may perform a least mean-square (LMS) algorithm based on the identified error vector magnitude related to the determined first symbol. In an example, the controller may perform the least mean-square (LMS) algorithm with a cost function including the error vector magnitude information related to the determined first symbol, and arrange at least a portion of a set of parameters for the least mean-square algorithm (LMS) in accordance with the cost function including the error vector magnitude information related to the determined first symbol in order to provide the tuning signal to the delay circuit 4505.

In an example, the controller may receive a training data related to a plurality of training symbols as a reference. In an example, the controller may receive the training data from the received wireless communication channel. In an example, the transceiver may include a memory, and the memory stores a plurality of training symbols as the training data. In an example, the controller may use the training data in order to arrange the set of parameters for the least mean-square algorithm (LMS) before the transceiver receives the first symbol, and when the determiner 4512 determines the first symbol, the controller may perform the least-mean square (LMS) algorithm with the cost function including the error vector magnitude information related to the determined first symbol using the set of parameters, which the set of parameters were previously arranged with the training data. Accordingly, the controller provides a tuning signal based on the performed algorithm to tune the delay circuit 4505.

In an example, the demodulator may include a memory storing instructions; and one or more processors configured to execute the instructions to: provide a delay to a received modulated communication signal including symbols to obtain a delayed modulated communication signal, wherein a first symbol is encoded in the phase of the first part of the received modulated communication signal, and a second symbol is encoded in the phase of the second part of the received modulated communication signal; and multiply the received modulated communication signal and the delayed modulated communication signal to obtain a first mixed signal In accordance with various aspects of this disclosure, a device, in particular a communication device may include a memory, and one or more processors, such as processing circuitry 810 and memory 820 referring back to FIG. 8. The memory 820 may be implemented as one or more non-transitory computer-readable medium including one or more instructions that when executed on at least one processor cause a demodulator to provide a delay to a received modulated communication signal including symbols to obtain a delayed modulated communication signal, wherein a first symbol is encoded in the phase of the first part of the received modulated communication signal, and a second symbol is encoded in the phase of the second part of the received modulated communication signal; and multiply the received modulated communication signal and the delayed modulated communication signal to obtain a first mixed signal FIG. 35 shows schematically an example of method steps in accordance with various aspects of this disclosure. The method may include providing a delay to a received modulated communication signal including symbols to obtain a delayed modulated communication signal, wherein a first symbol is encoded in the phase of the first part of the received modulated communication signal, and a second symbol is encoded in the phase of the second part of the received modulated communication signal; and multiplying the received modulated communication signal and the delayed modulated communication signal to obtain a first mixed signal.

Various examples will be described in the following in more detail.

Example 1 includes a subject matter as an amplifier circuit. The subject matter may include: at least one amplifier stage with at least one adjustable degeneration component, the at least one amplifier stage configured to amplify a received input signal with an adjustable gain; at least one adjustable feedback component coupled to the at least one amplifier stage; and a controller coupled to the at least one amplifier stage and to the at least one adjustable feedback component and configured to adjust the at least one adjustable feedback component based on an adjustment of the at least one adjustable degeneration component.

In example 2, the subject matter of example 1, can optionally include that the controller is coupled to the at least one adjustable degeneration component, and can optionally include that the controller is configured to adjust the gain of the at least one amplifier stage by adjusting the resistance of the at least one adjustable degeneration component. In example 3, the subject matter of any one of examples 1 or 2, can optionally include that the controller is configured to increase the resistance of the at least one adjustable feedback component in response to an increase to the gain of the at least one amplifier stage.

In example 4, the subject matter of any one of examples 1 to 3, can optionally include that the controller is configured to decrease the resistance of the at least one adjustable feedback component in response to a decrease to the gain of the at least one amplifier stage. In example 5 the subject matter of any one of examples 1 to 4, can optionally include that the controller is configured to keep the input impedance of the at least one amplifier stage constant by adjusting the resistance of the at least one adjustable feedback component in response to an adjustment to the gain of the at least one amplifier stage.

In example 6, the subject matter of any one of examples 1 to 5, can optionally include that the controller is configured to keep the input impedance of the at least one amplifier stage constant by adjusting the resistance of the at least one adjustable feedback component in response to an adjustment of the at least one adjustable degeneration component. In example 7, the subject matter of any one of examples 5 or 6, can optionally include that the input impedance is kept at 60 ohms or 50 ohms.

In example 8, the subject matter of any one of examples 1 to 7, can optionally include that the at least one adjustable degeneration component includes a resistive ladder network. In example 9, the subject matter of example any one of examples 1 to 7, can optionally include that the at least one adjustable degeneration component includes a digital-to-analog converter. In example 10, the subject matter of example any one of examples 1 to 7, can optionally include that the at least one adjustable degeneration component includes at least one transistor coupled to at least one resistor.

In example 11, the subject matter of any one of examples 1 to 10, can optionally include that the at least one adjustable feedback component includes a resistive ladder network. In example 12, the subject matter of any one of examples 1 to 10, can optionally include that the at least one adjustable feedback component includes a digital-to-analog converter. In example 13, the subject matter of any one of examples 1 to 10, can optionally include that the at least one adjustable feedback component includes at least one transistor coupled to at least one resistor.

In example 14, the subject matter of any one of examples 1 to 13, can optionally include that the at least one amplifier stage includes a Complementary Metal Oxide Semiconductor (CMOS) inverter stage may include a first amplifier stage transistor, and a second amplifier stage transistor. In example 15, the subject matter of example 14, can optionally include that the at least one adjustable feedback component is coupled to the base terminals of the first amplifier stage transistor of the at least one amplifier stage, and the second amplifier stage transistor of the at least one amplifier stage.

In example 16, the subject matter of any one of examples 14 or 15, can optionally include that the at least one adjustable degeneration component is coupled between to the emitter terminals of the first amplifier stage transistor of the at least one amplifier stage, and the second amplifier stage transistor of the at least one amplifier stage. In example 17, the subject matter of any one of examples 1 to 16, can optionally include that the at least one amplifier stage includes or is formed by a differential amplifier may include a differential pair.

In example 18, the subject matter of any one of examples 1 to 17, can optionally include that the received first input signal includes a signal with central frequency of above 100 GHz. In example 19, the subject matter of any one of examples 1 to 18, can optionally include that the at least one amplifier stage includes a first amplifier stage and a second amplifier stage, the second amplifier stage configured to receive at least one output signal from the first amplifier stage.

In example 20, the subject matter of example 19, can optionally include that the second amplifier stage includes a first amplifier stage input terminal and a second amplifier stage input terminal; can optionally include that the second amplifier stage includes a differential transimpedance amplifier configured to receive a first amplifier stage input signal from the first amplifier stage input terminal, and a second amplifier stage input signal from the second amplifier stage input terminal.

In example 21, the subject matter of example 20, can optionally include that the second amplifier stage includes a first amplifier stage output terminal configured to output an amplified first amplifier stage input signal, and a second amplifier stage output terminal configured to output an amplified second amplifier stage input signal. In example 22, the subject matter of example 21, can optionally include that the second amplifier stage is capacitively neutralized.

In example 23, the subject matter of example 22, can optionally include that the second amplifier stage includes a first neutralizing capacitor coupled to the first amplifier stage input terminal of the second amplifier stage and the second amplifier stage output terminal of the second amplifier stage, and a second neutralizing capacitor coupled to the second amplifier stage input terminal of the second amplifier stage and the first amplifier stage output terminal of the second amplifier stage. In example 24, the subject matter of any one of examples 20 to 23, can optionally include that the second amplifier stage is configured to have a complex pole peaking at the frequency response of the second amplifier stage.

In example 25, the subject matter of example 24, can optionally include that the second amplifier stage includes a first peaking capacitor coupled to the first amplifier stage input terminal of the second amplifier stage, a second peaking capacitor coupled to the first amplifier stage output terminal of the second amplifier stage, a third peaking capacitor coupled to the second amplifier stage input terminal of the second amplifier stage, and a fourth peaking capacitor coupled to the second amplifier stage output terminal of the second amplifier stage.

In example 26, the subject matter of example 25, can optionally include that the first peaking capacitor, the second peaking capacitor, the third peaking capacitor and the fourth peaking capacitor are configured to interact to achieve complex pole peaking at the frequency response of the second amplifier stage. In example 27, the subject matter of any one of examples 19 to 26, can optionally include that the second amplifier stage includes a virtual ground.

In example 28, the subject matter of any one of examples 19 to 27, can optionally include that the at least one amplifier stage further includes a third amplifier stage configured to receive at least one output signal from the second amplifier stage. In example 29, the subject matter of example 28, can optionally include that the third amplifier stage includes or is formed by a buffer with additional gain. In example 30, the subject matter of example 29, can optionally include that the output of the third amplifier stage includes at least one peaking inductor coupled in series to the output of the third amplifier stage.

In example 31, the subject matter of example 30, can optionally include that the third amplifier stage includes a first amplifier stage output terminal, and a second amplifier stage output terminal, can optionally include that a first peaking inductor is coupled in series to the first amplifier stage output terminal of the third amplifier stage, and a second peaking inductor is coupled in series to the second amplifier stage output terminal of the third amplifier stage.

In example 32, the subject matter of any one of examples 28 to 31, can optionally include that the subject matter is a three-stage differential cherry-hooper amplifier.

Example 33 includes a method as the subject matter. In example 33, a subject matter for amplifying a first input signal may include: amplifying a received first input signal with an adjustable gain by at least one amplifier stage may include at least one adjustable degeneration component, can optionally include that at least one adjustable feedback component is coupled to the at least one amplifier stage; and adjusting the at least one adjustable feedback component based on an adjustment of the at least one adjustable degeneration component.

In example 34, the subject matter of example 33, can optionally include that adjusting the gain of the at least one amplifier stage includes adjusting the resistance of the at least one adjustable degeneration component. In example 35, the subject matter of any one of examples 33 or 34, further may include increasing the resistance of the at least one adjustable feedback component in response to an increase to the gain of the at least one amplifier stage.

In example 36, the subject matter of any one of examples 33 to 35, further may include decreasing the resistance of the at least one adjustable feedback component in response to a decrease to the gain of the at least one amplifier stage. In example 37, the subject matter of any one of examples 33 to 36, further may include keeping the input impedance of the at least one amplifier stage constant by adjusting the resistance of the at least one adjustable feedback component in response to an adjustment to the gain of the at least one amplifier stage.

In example 38, the subject matter of any one of examples 33 to 37, further may include keeping the input impedance of the at least one amplifier stage constant by adjusting the resistance of the at least one adjustable feedback component in response to an adjustment of the at least one adjustable degeneration component. In example 39, the subject matter of any one of examples 37 or 38, further may include keeping the input impedance at 60 ohms or 50 ohms.

In example 40, the subject matter of any one of examples 33 to 39, further may include receiving the first input signal may include a signal with central frequency of above 100 GHz. In example 41, the subject matter of any one of examples 33 to 39, can optionally include that the at least one amplifier stage includes a first amplifier stage and a second amplifier stage, the second amplifier stage receiving at least one output signal from the first amplifier stage; further may include capacitively neutralizing the second amplifier stage.

In example 42, the subject matter of example 41, further may include causing a complex pole peaking at the frequency response of the second amplifier stage. In example 43, the subject matter of any one of examples 41 or 42, further may include causing an inductive peaking at the output of a third amplifier stage, the third amplifier stage receiving at least one output signal from the second amplifier stage.

Example 44 includes one or more non-transitory computer-readable medium as the subject matter. In example 44, the subject matter may include one or more instructions that when executed on at least one processor cause an amplifying circuit to: amplify a received first input signal with an adjustable gain by at least at least one amplifier stage may include at least one adjustable degeneration component, can optionally include that at least one adjustable feedback component is coupled to the at least one amplifier stage; and adjust the at least one adjustable feedback component based on an adjustment of the at least one adjustable degeneration component.

In example 45, the subject matter of example 44, can optionally include that the instructions further include to cause the amplifying circuit to adjust the gain of the at least one amplifier stage by adjusting the resistance of the at least one adjustable degeneration component. In example 46, the subject matter of any one of examples 44 or 45, can optionally include that the instructions further include to cause the amplifying circuit to increase the resistance of the at least one adjustable feedback component in response to an increase to the gain of the at least one amplifier stage.

In example 47, the subject matter of example any one of examples 44 to 46, can optionally include that the instructions further include to cause the amplifying circuit to decrease the resistance of the at least one adjustable feedback component in response to a decrease to the gain of the at least one amplifier stage. In example 48, the subject matter of example any one of examples 44 to 47, can optionally include that the instructions further include to cause the amplifying circuit to keep the input impedance of the at least one amplifier stage constant by adjusting the resistance of the at least one adjustable feedback component in response to an adjustment to the gain of the at least one amplifier stage.

In example 49, the subject matter of example any one of examples 44 to 47, can optionally include that the instructions further include to cause the amplifying circuit to keep the input impedance of the at least one amplifier stage constant by adjusting the resistance of the at least one adjustable feedback component in response to an adjustment of the at least one adjustable degeneration component. In example 50, the subject matter of example any one of examples 48 or 49, can optionally include that the instructions further include to cause the amplifying circuit to keep the input impedance at 60 ohms or 50 ohms.

In example 51, the subject matter of example any one of examples 44 to 50, can optionally include that the instructions further include to cause the amplifying circuit to receive the first input signal may include a signal with central frequency of above 100 GHz. In example 52, the subject matter of example any one of examples 44 to 51, can optionally include that the instructions further include to cause the amplifying circuit to capacitively neutralize a second amplifier stage; can optionally include that the at least one amplifier stage includes a first amplifier stage and the second amplifier stage, the second amplifier stage is configured to receive at least one output signal from the first amplifier stage.

In example 53, the subject matter of example 52, can optionally include that the instructions further include to cause the amplifying circuit to cause a complex pole peaking at the frequency response of the second amplifier stage. In example 54, the subject matter of example any one of examples 52 or 53, can optionally include that the instructions further include to cause the amplifying circuit to cause an inductive peaking at the output of a third amplifier stage, can optionally include that the at least one amplifier stage includes the third amplifier stage, the third amplifier stage is configured to receive at least one output signal from the second amplifier stage.

Example 55 includes an amplifier circuit as the subject matter. In example 55, the subject matter may include: at least one amplifier stage for amplifying a received first input signal with an adjustable gain with at least one adjustable degeneration component; at least one adjustable feedback component coupled to the at least one amplifier stage; and a controlling means for adjusting at least one adjustable feedback component based on an adjustment of the at least one adjustable degeneration component.

In example 56, the subject matter of example 55, can optionally include that the controlling means is coupled to the at least one adjustable degeneration component for adjusting the gain of the at least one amplifier stage by adjusting the resistance of the at least one adjustable degeneration component. In example 57, the subject matter of any one of examples 55 or 56, can optionally include that the controlling means is configured to increase the resistance of the at least one adjustable feedback component in response to an increase to the gain of the at least one amplifier stage.

In example 58, the subject matter of any one of examples 55 to 57, can optionally include that the controlling means is configured to decrease the resistance of the at least one adjustable feedback component in response to a decrease to the gain of the at least one amplifier stage. In example 59, the subject matter of any one of examples 55 to 58, can optionally include that the controlling means is configured to keep the input impedance of the at least one amplifier stage constant by adjusting the resistance of the at least one adjustable feedback component in response to an adjustment to the gain of the at least one amplifier stage.

In example 60, the subject matter of any one of examples 55 to 59, can optionally include that the controlling means is configured to keep the input impedance of the at least one amplifier stage constant by adjusting the resistance of the at least one adjustable feedback component in response to an adjustment of the at least one adjustable degeneration component. In example 61, the subject matter of any one of examples 55 or 60, can optionally include that the input impedance is kept at 60 ohms or 50 ohms.

In example 62, the subject matter of any one of examples 55 to 61, can optionally include that the at least one adjustable degeneration component includes a resistive ladder network. In example 63, the subject matter of example any one of examples 55 to 61, can optionally include that the at least one adjustable degeneration component includes a digital-to-analog converter. In example 64, the subject matter of example any one of examples 55 to 61, can optionally include that the at least one adjustable degeneration component includes at least one transistor coupled to at least one resistor.

In example 65, the subject matter of any one of examples 55 to 64, can optionally include that the at least one adjustable feedback component includes a resistive ladder network. In example 66, the subject matter of any one of examples 55 to 64, can optionally include that the at least one adjustable feedback component includes a digital-to-analog converter. In example 67, the subject matter of any one of examples 55 to 64, can optionally include that the at least one adjustable feedback component includes at least one transistor coupled to at least one resistor.

In example 68, the subject matter of any one of examples 55 to 67, can optionally include that the at least one amplifier stage includes an inverter stage may include a first amplifier stage transistor, and a second amplifier stage transistor. In example 69, the subject matter of example 68, can optionally include that the at least one adjustable feedback component is coupled to the base terminals of the first amplifier stage transistor of the at least one amplifier stage, and the second amplifier stage transistor of the at least one amplifier stage.

In example 70, the subject matter of any one of examples 68 or 69, can optionally include that the at least one adjustable degeneration component is coupled between to the emitter terminals of the first amplifier stage transistor of the at least one amplifier stage, and the second amplifier stage transistor of the at least one amplifier stage. In example 71, the subject matter of any one of examples 55 to 70, can optionally include that the at least one amplifier stage includes or is formed by a differential amplifier may include a differential pair.

In example 72, the subject matter of any one of examples 55 to 71, can optionally include that the received first input signal includes a signal with central frequency of above 100 GHz. In example 73, the subject matter of any one of examples 55 to 72, can optionally include that the at least one amplifier stage includes a first amplifier stage and a second amplifier stage, the second amplifier stage for receiving at least one output signal from the first amplifier stage.

In example 74, the subject matter of example 73, can optionally include that the second amplifier stage includes a first amplifier stage input terminal and as second amplifier stage input terminal; can optionally include that the second amplifier stage includes a differential transimpedance amplifier for receiving a first amplifier stage input signal from the first amplifier stage input terminal, and a second amplifier stage input signal from the second amplifier stage input terminal.

In example 75, the subject matter of example 74, can optionally include that the second amplifier stage includes a first amplifier stage output terminal for outputting an amplified first amplifier stage input signal, and a second amplifier stage output terminal for outputting an amplified second amplifier stage input signal. In example 76, the subject matter of example 75, can optionally include that the second amplifier stage is capacitively neutralized.

In example 77, the subject matter of example 76, can optionally include that the second amplifier stage includes a first neutralizing capacitor coupled to the first amplifier stage input terminal of the second amplifier stage and the second amplifier stage output terminal of the second amplifier stage, and a second neutralizing capacitor coupled to the second amplifier stage input terminal of the second amplifier stage and the first amplifier stage output terminal of the second amplifier stage. In example 78, the subject matter of any one of examples 74 to 77, can optionally include that the second amplifier stage is configured to have a complex pole peaking at the frequency response of the second amplifier stage.

In example 79, the subject matter of example 78, can optionally include that the second amplifier stage includes a first peaking capacitor coupled to the first amplifier stage input terminal of the second amplifier stage, a second peaking capacitor coupled to the first amplifier stage output terminal of the second amplifier stage, a third peaking capacitor coupled to the second amplifier stage input terminal of the second amplifier stage, a fourth peaking capacitor coupled to the second amplifier stage output terminal of the second amplifier stage. In example 80, the subject matter of example 79, can optionally include that the first peaking capacitor, the second peaking capacitor, the third peaking capacitor and the fourth peaking capacitor are configured to interact to achieve complex pole peaking at the frequency response of the second amplifier stage.

In example 81, the subject matter of any one of examples 73 to 80, can optionally include that the second amplifier stage includes a virtual ground. In example 82, the subject matter of any one of examples 73 to 80, can optionally include that the at least one amplifier stage further includes a third amplifier stage for receiving at least one output signal from the second amplifier stage. In example 83, the subject matter of example 82, can optionally include that the third amplifier stage includes or is formed by a buffer with additional gain.

In example 84, the subject matter of example 83, can optionally include that the output of the third amplifier stage includes at least one peaking inductor coupled in series to the output of the third amplifier stage. In example 85, the subject matter of example 84, can optionally include that the third amplifier stage includes a first amplifier stage output terminal, and a second amplifier stage output terminal, can optionally include that a first peaking inductor is coupled in series to the first amplifier stage output terminal of the third amplifier stage, and a second peaking inductor is coupled in series to the second amplifier stage output terminal of the third amplifier stage.

In example 86, the subject matter of any one of examples 82 to 85, can optionally include that the subject matter is a three-stage differential cherry-hooper amplifier.

In an example 1A includes a circuitry as a subject matter. The subject matter, may include a first signal path including a first inductor, the first signal path is configured to conduct a first signal; a second signal path including a second inductor, the second signal path is configured to conduct a second signal includes a signal that is delayed by a predefined phase difference related to the first signal; and a capacitor coupled to the first signal path and the second signal path, and configured to at least one of introduce a portion of the first signal from the first signal path into the second signal path or introduce a portion of the second signal from the second signal path into the first signal path.

In example 2A, the subject matter of example 1A, can optionally include that the first signal path includes a first input terminal configured to receive the first signal. In example 3A, the subject matter of any one of examples 1A or 2A, can optionally include that the first inductor includes at least one winding, the first inductor is coupled to the first input terminal and configured to conduct the first signal. In example 4A, the subject matter of any one of examples 1A to 3A, can optionally include that the first signal path includes a first output terminal coupled to the first inductor, the first output terminal configured to provide a first conducted signal. In example 5A, the subject matter of any one of examples 1A to 4A, can optionally include that the second signal path includes a second input terminal configured to receive the second signal.

In example 6A, the subject matter of any one of examples 1A to 5A, can optionally include that the second inductor includes at least one winding, the second inductor is coupled to the second input terminal and configured to conduct the second signal. In example 7A, the subject matter of any one of examples 1A to 6A, can optionally include that the second signal path includes a second output terminal coupled to the second inductor, the second output terminal configured to provide the second conducted signal. In example 8A, the subject matter of any one of examples 6A or 7A, can optionally include that the capacitor is coupled between the at least one winding of the first inductor and the at least one winding of the second inductor.

In example 9A, the subject matter of example 8A, can optionally include that the capacitor is configured to at least one of introduce a portion of a first flowing signal flowing through the at least one winding of the first inductor into the at least one winding of the second inductor or introduce a portion of a second flowing signal flowing through the at least one winding of the second inductor into the at least one winding of the first inductor. In example 11A, the subject matter of any one of examples 8A or 9A, can optionally include that the first inductor includes a first transformer including at least one primary winding and at least one secondary winding, the second inductor includes a second transformer including at least one primary winding and at least one secondary winding.

In example 12A, the subject matter of example 10A, can optionally include that the capacitor is coupled between the at least one primary winding of the first transformer and the at least one primary winding of the second transformer. In example 13A, the subject matter of any one of examples 10A or 11A, can optionally include that the capacitor is coupled between the at least one secondary winding of the first transformer and the at least one secondary winding of the second transformer. In example 14A, the subject matter of any one of examples 10A to 13A, may further include at least one ground ring configured to counteract the impairment caused by magnetic coupling of the at least one of the first transformer or the second transformer.

In example 15A, the subject matter of any one of examples 1A to 13A, can optionally include that first inductor includes a first metal plate, and a second inductor includes a second metal plate, and the capacitor includes the first metal plate as a first conducting plate of the capacitor, the second metal plate as a second conducting plate, and a dielectric material between the first conducting plate and the second conducting plate. In example 16A, the subject matter of example 14A, can optionally include that the first metal plate is obtained by extending the first inductor and the second metal plate is obtained by extending the second inductor.

In example 17A, the subject matter of any one of examples 1A to 15A, can optionally include that the second signal includes the first signal delayed by the predefined phase difference. In example 18A, the subject matter of any one of examples 1A to 16A, may further include: at least one local oscillator configured to generate the first signal and the second signal. In example 19A, the subject matter of example 17A, can optionally include that the at least one local oscillator includes a phase-locked loop. In example 20A, the subject matter of any one of examples 7A to 18A, may further include: a first resonant network coupled to the first path and configured to match the impedance between the first input terminal and the first output terminal, and a second resonant network coupled to the second path and configured to match the impedance between the second input terminal and the second output terminal.

In example 21A, the subject matter of any one of examples 1A to 19A, can optionally include that the first signal and the second signal include sinusoidal signals, and the predefined phase difference is 90 degrees. In example 22A, the subject matter of any one of examples 1A to 20A, can optionally include that the first inductor and the second inductor are located in a proximity, such that a magnetic coupling occurs when the first signal is conducted by the first path and the second signal is conducted by the second path. In example 23A, the subject matter of any one of examples 1A to 21A, can optionally include that the capacitor has the capacitance in a range from about 8 fF to about 12 fF.

In example 24A, the subject matter of example 22A, can optionally include that the capacitor has the capacitance of 10 fF. In example 25A, the subject matter of any one of examples 1A to 23A, may further include: at least a third path, including a third inductor, the third signal path is configured to conduct a third signal that is delayed by the predefined phase difference related to the second signal; and a second capacitor coupled to the third path and one of the first signal path or the second signal path, and configured to at least one of introduce a portion of the third signal from the third signal path into the signal path which the second capacitor is coupled to other than the third signal path or introduce a portion of the signal from the signal path which the second capacitor is coupled to other than the third signal path into the third signal path.

In example 26A, the subject matter of any one of examples 1A to 23A, may further include a plurality of signal paths, each of the plurality of signal paths including an inductor, each of the plurality of signal paths are configured to conduct a signal; and a plurality of capacitors coupled to the plurality of single paths, and configured to introduce a portion of a signal from one of the plurality of signal paths to another one of the plurality of signal paths. In example 27A, the subject matter of example 25A, can optionally include that the capacitors are configured to introduce a portion of a signal from one of the plurality of signal paths to another one of the plurality of signal paths, such that each of the plurality signal paths includes a portion of a signal from at least another single path.

In example 28A, the subject matter of any one of examples 25A or 26A, can optionally include that each of the plurality of signal paths are configured to conduct a signal with a phase shift equal to N times of the phase difference between the first and second signals, where N is an integer, and N is different for each of the signals.

In example 29A, the subject matter is a method for reducing magnetic coupling between a first signal path including a first inductor and a second signal path including a second inductor including: capacitively coupling the first signal path and the second signal path by at least one of introducing a portion of the first signal conducted by the first signal path into the second signal path, or introducing a portion of the second signal conducted by the second signal path into the first signal path.

In example 30A, the subject matter of example 28A, can optionally include that the first inductor includes a first transformer including at least one primary winding and at least one secondary winding, the second inductor includes a second transformer including at least one primary winding and at least one secondary winding. In example 31A, the subject matter of example 29A, can optionally include that capacitively coupling the first signal path and the second signal path further includes capacitively coupling the at least one primary winding of the first transformer and the at least one primary winding of the second transformer. In example 32A, the subject matter of any one of examples 29A or 30A, can optionally include that capacitively coupling the first signal path and the second signal path further includes capacitively coupling the at least one secondary winding of the first transformer and the at least one secondary winding of the second transformer.

In example 33A, The subject matter is one or more non-transitory computer-readable medium including one or more instructions that when executed on at least one processor cause a circuit to: capacitively couple a first signal path and a second signal path by at least one of introducing a portion of a first signal conducted by the first signal path into the second signal path, or introducing a portion of a second signal conducted by the second signal path into the first signal path.

In example 34A, the subject matter is a circuitry. The subject matter, may include a first signal path for conducting a first signal, the first signal path including a first inductor, a second signal path for conducting a second signal, the second signal path including a second inductor, can optionally include that the second signal includes a signal that is delayed by a predefined phase difference related to the first signal; and a capacitor for at least one of introducing a portion of the first signal from the first signal path into the second signal path or introducing a portion of the second signal from the second signal path into the first signal path.

In example 35A, the subject matter of example 33A, can optionally include that the first signal path includes a first input terminal configured to receive the first signal; and can optionally include that the first inductor includes at least one winding, the first inductor is coupled to the first input terminal and configured to conduct the first signal. In example 36A, the subject matter of any one of examples 33A to 34A, can optionally include that the first signal path includes a first output terminal coupled to the first inductor, the first output terminal configured to provide a first conducted signal. In example 37A, the subject matter of any one of examples 33A to 35A, can optionally include that the second signal path includes a second input terminal configured to receive the second signal; and can optionally include that the second inductor includes at least one winding, the second inductor is coupled to the second input terminal and configured to conduct the second signal.

In example 38A, the subject matter of any one of examples 33A to 36A, can optionally include that the second signal path includes a second output terminal coupled to the second inductor, the second output terminal configured to provide the second conducted signal. In example 39A, the subject matter of any one of examples 36A or 37A, can optionally include that the capacitor is coupled between the at least one winding of the first inductor and the at least one winding of the second inductor. In example 40A, the subject matter of example 38A, can optionally include that the capacitor is configured to at least one of introduce a portion of a first flowing signal flowing through the at least one winding of the first inductor into the at least one winding of the second inductor or introduce a portion of a second flowing signal flowing through the at least one winding of the second inductor into the at least one winding of the first inductor.

In example 41A, the subject matter of any one of examples 38A or 39A, can optionally include that the first inductor includes a first transformer including at least one primary winding and at least one secondary winding, the second inductor includes a second transformer including at least one primary winding and at least one secondary winding. In example 42A, the subject matter of example 40A, can optionally include that the capacitor is coupled between the at least one primary winding of the first transformer and the at least one primary winding of the second transformer.

In example 43A, the subject matter of any one of examples 40A or 41A, can optionally include that the capacitor is coupled between the at least one secondary winding of the first transformer and the at least one secondary winding of the second transformer. In example 44A, the subject matter of any one of examples 40A to 42A, may further include at least one ground ring configured to counteract the impairment caused by magnetic coupling of the at least one of the first transformer or the second transformer. In example 45A, the subject matter of any one of examples 33A to 43A, can optionally include that first inductor includes a first metal plate, and a second inductor includes a second metal plate, and the capacitor includes the first metal plate as a first conducting plate of the capacitor, the second metal plate as a second conducting plate, and a dielectric material between the first conducting plate and the second conducting plate.

In example 46A, the subject matter of example 44A, can optionally include that the first metal plate is obtained by extending the first inductor and the second metal plate is obtained by extending the second inductor. In example 47A, the subject matter of any one of examples 33A to 45A, can optionally include that the second signal includes the first signal delayed by the predefined phase difference. In example 48A, the subject matter of any one of examples 33A to 46A, may further include: at least one local oscillator for generating the first signal and the second signal. In example 49A, the subject matter of example 47A, can optionally include that the at least one local oscillator includes a phase-locked loop.

In example 50A, the subject matter of any one of examples 40A to 48A, may further include: a first resonant network coupled to the first path and configured to match the impedance between the first input terminal and the first output terminal, and a second resonant network coupled to the second path and configured to match the impedance between the second input terminal and the second output terminal.

In example 51A, the subject matter of any one of examples 33A to 49A, can optionally include that the first signal and the second signal include sinusoidal signals, and the predefined phase difference is 90 degrees. In example 52A, the subject matter of any one of examples 33A to 50A, can optionally include that the first inductor and the second inductor are located in a proximity, such that a magnetic coupling occurs when the first signal is conducted by the first path and the second signal is conducted by the second path.

In example 53A, the subject matter of any one of examples 33A to 51A, can optionally include that the capacitor has the capacitance in a range from about 8 fF to about 12 fF. In example 54A, the subject matter of example 52A, can optionally include that the capacitor has the capacitance of 10 fF. In example 55A, The subject matter of any one of examples 33A to 53A, may further include: at least a third path for conducting a third signal that is delayed by the predefined phase difference related to the second signal, the at least a third path including a third inductor; and a second capacitor coupled to the third path and one of the first signal path or the second signal path, and the second capacitor is to at least one of introduce a portion of the third signal from the third signal path into the signal path which the second capacitor is coupled to other than the third signal path or introduce a portion of the signal from the signal path which the second capacitor is coupled to other than the third signal path into the third signal path.

In example 56A, the subject matter of any one of examples 33A to 53A, may further include: a plurality of signal paths, each of the plurality of signal paths including an inductor, each of the plurality of signal paths are to conduct a signal; and a plurality of capacitors for introducing a portion of a signal from one of the plurality of signal paths to another one of the plurality of signal paths, the plurality of capacitors coupled to the plurality of single paths.

In example 57A, the subject matter of example 55A, can optionally include that the capacitors are suitable for introducing a portion of a signal from one of the plurality of signal paths to another one of the plurality of signal paths, such that each of the plurality signal paths includes a portion of a signal from at least another single path. In example 58A, the subject matter of any one of examples 55A or 56, can optionally include that each of the plurality of signal paths are suitable for conducting a signal with a phase difference equal to N times of the phase difference between the first and second signals, where N is an integer, and N is different for each of the signals.

Example 1B includes a subject matter. The subject matter is a demodulator. The demodulator may include: at least one signal adder configured to obtain an intermediate signal by adding a received phase-modulated communication signal may include a carrier signal at a carrier frequency to a reference signal at the carrier frequency, can optionally include that the amplitude of the reference signal is about equal or greater than the amplitude of the received phase-modulated communication signal; at least one envelope detector configured to detect an envelope of the intermediate signal.

In example 2B, the subject matter of example 1B, can optionally include that the at least one envelope detector is configured to output an envelope detected signal. In example 3B, the subject matter of any one of examples 1B or 2B, can optionally include that the at least one envelope detector includes a signal squarer configured to receive the intermediate signal, and to output a square of the intermediate signal. In example 4B, the subject matter of example 3B, can optionally include that the at least one envelope detector includes a differential non-linear voltage-controlled current source coupled to a resistive load.

In example 5B, the subject matter of any one of examples 3B or 4B, can optionally include that the at least one envelope detector includes a low pass filter configured to filter the square of the intermediate signal to obtain the envelope detected signal. In example 6B, the subject matter of any one of examples 2B to 5B, may further include: at least one direct current offset removal circuit coupled to the at least one envelope detector, configured to receive the envelope detected signal and to output a signal without a direct current offset component. In example 7B, the subject matter of example 6B, may further include: at least one analog-to-digital converter to convert the output of the at least one direct current offset removal circuit to a digital baseband communication signal.

In example 8B, the subject matter of example 7B, can optionally include that the analog-digital converter includes a mixed signal equalizer. In example 9B, the subject matter of any one of examples 1B to 8B, may further include: at least one local oscillator configured to generate the reference signal at the carrier frequency. In example 10B, the subject matter of example 9B, can optionally include that the at least one local oscillator is configured to generate the reference signal with an amplitude that is in a range from about the amplitude of the received phase modulated communication signal to about five times of the amplitude of the received phase modulated communication signal.

In example 11B, the subject matter of any one of examples 7B to 10B, may further include: a splitter configured to split a received signal, and to output a first received phase-modulated communication signal and a second received phase modulated communication signal.

In example 12B, the subject matter of example 11B, can optionally include that the at least one signal adder includes a first signal adder configured to obtain a first intermediate signal by adding the first received phase-modulated communication signal to a first reference signal, and a second signal adder configured to obtain a second intermediate signal by adding the second received phase-modulated communication signal to a second reference signal. In example 13B, the subject matter of example 12B, may further include: a second oscillator configured to generate the second reference signal.

In example 14B, the subject matter of any one of examples 12B or 13B, can optionally include that the second reference signal includes a signal that is delayed by 90 degrees related to the first reference signal. In example 15B, the subject matter of example 13B, may further include: a phase shifter configured to shift the phase of the first reference signal by 90 degrees to obtain the second reference signal. In example 16B, the subject matter of any one of examples 14B or 15B, can optionally include that the at least one envelope detector includes a first envelope detector configured to detect an envelope of the first intermediate signal to obtain a first envelope detected signal and a second envelope detector configured to detect an envelope of the second intermediate signal to obtain a second envelope detected signal.

In example 17B, the subject matter of example 16B, can optionally include that the at least one DC offset removal circuit configured to receive the first envelope detected signal and the second envelope detected signal and to output an in-phase component of the received signal and a quadrature component of the received signal. In example 18B, the subject matter may include: a memory storing instructions; and one or more processors configured to execute the instructions to: obtain an intermediate signal by adding a received phase-modulated communication signal may include a carrier signal at a carrier frequency to a reference signal at the carrier frequency, can optionally include that the amplitude of the reference signal is about equal or greater than the amplitude of the received phase-modulated communication signal; to detect an envelope of the intermediate signal.

In example 20B the subject matter is a computer readable medium. The example 20B includes instructions stored thereon, that if executed by one or more processors, cause the subject matter to: obtain an intermediate signal by adding a received phase-modulated communication signal may include a carrier signal at a carrier frequency to a reference signal at the carrier frequency, can optionally include that the amplitude of the reference signal is about equal or greater than the amplitude of the received phase-modulated communication signal; to detect an envelope of the intermediate signal.

In example 21B, the subject matter of example 20B, can optionally include that the instructions further include to output an envelope detected signal. In example 22B, the subject matter of example 21B, can optionally include that the instructions further include to take a mathematical square of the intermediate signal. In example 23B, the subject matter of example 22B; can optionally include that the instructions further include to apply a low pass filter to the square of the intermediate signal to obtain the envelope detected signal.

In example 24B, the subject matter of example 23B, can optionally include that the instructions further include to remove direct current offset from the envelope detected signal. In example 25B, the subject matter of example 24B, can optionally include that the instructions further include to convert the envelope detected signal without direct current offset to a digital baseband communication signal. In example 26B, the subject matter of any one of examples 20B to 25B, can optionally include that the instructions further include to generate the reference signal at the carrier frequency.

In example 27B, the subject matter of example 26B, can optionally include that the instructions further include to generate the reference signal with an amplitude that is in a range from about the amplitude of the received phase modulated communication signal to about five times of the amplitude of the received phase modulated communication signal. In example 28B, the subject matter of any one of examples 25B to 27B, can optionally include that the instructions further include to split a received signal to obtain a first received phase-modulated communication signal and a second received phase modulated communication signal.

In example 29B, the subject matter of example 28B, can optionally include that the instructions further include to obtain a first intermediate signal by adding the first received phase-modulated communication signal to a first reference signal, and to obtain a second intermediate signal by adding the second received phase-modulated communication signal to a second reference signal.

In example 30B, the subject matter of example 29B, can optionally include that the instructions further include to generate the second reference signal. In example 31B, the subject matter of any one of examples 29B or 30B, can optionally include that the instructions further include to obtain the second reference signal which includes a signal that is delayed by 90 degrees related to the first reference signal. In example 32B, the subject matter of example 31B, can optionally include that the instructions further include to shift the phase of the first reference signal by 90 degrees to obtain the second reference signal.

In example 33B, the subject matter of any one of examples 29B to 32B, can optionally include that the instructions further include to detect an envelope of the first intermediate signal to obtain a first envelope detected signal, and to detect an envelope of the second intermediate signal to obtain a second envelope detected signal. In example 34B, the subject matter of example 33B, can optionally include that the instructions further include to output an in-phase component of the received signal and a quadrature component of the received signal.

Example 35B may be a method. In example 35B, the method may include: obtaining an intermediate signal by adding a received phase-modulated communication signal may include a carrier signal at a carrier frequency to a reference signal at the carrier frequency, can optionally include that the amplitude of the reference signal is about equal or greater than the amplitude of the received phase-modulated communication signal; detecting an envelope of the intermediate signal.

In example 36B, a subject matter may include: at least one signal adding means for obtaining an intermediate signal by adding a received phase-modulated communication signal may include a carrier signal at a carrier frequency to a reference signal at the carrier frequency, can optionally include that the amplitude of the reference signal is about equal or greater than the amplitude of the received phase-modulated communication signal; at least one envelope detecting means for detecting an envelope of the intermediate signal.

In example 1C, the subject matter is demodulator. The subject matter may include: a delay circuit configured to provide a delay to a received modulated communication signal may include symbols to obtain a delayed modulated communication signal, may further include that a first symbol is encoded in the phase of the first part of the received modulated communication signal, and a second symbol is encoded in the phase of the second part of the received modulated communication signal, a first mixer configured to multiply the received modulated communication signal and the delayed modulated communication signal to obtain a first mixed signal.

In example 2C, the subject matter of example 1C, may further include that the first symbol is encoded in the received modulated communication signal with a phase difference between the first part of the received modulated communication signal and the second part of the received modulated communication signal. In example 3C, the subject matter of example 2C, may further include that the delay circuit is configured to delay the received modulated communication signal of a temporal difference between the first part of the modulated communication signal and the second part of the modulated communication signal.

In example 4C, the subject matter of any one of examples 1C to 3C, may further including a first low-pass filter configured to filter the first mixed signal to obtain a first baseband output signal. In example 5C, the subject matter of any one of examples 1C to 4C, may further including a phase shifter configured to shift the phase of the received modulated communication signal by 90 degrees to obtain a shifted received modulated communication signal. In example 6C, the subject matter of any one of examples 1C to 4C, may further including a phase shifter configured to shift the phase of the delayed modulated communication signal by 90 degrees to obtain a shifted delayed modulated communication signal.

In example 7C, the subject matter of example 5C, may further including a second mixer configured to multiply the shifted received modulated communication signal and the delayed modulated communication signal to obtain a second mixed signal. In example 8C, the subject matter of example 6C, may further including a second mixer configured to multiply the received modulated communication signal and the shifted delayed modulated communication signal to obtain a second mixed signal. In example 9C, the subject matter of any one of examples 7C or 8C, may further including a second low-pass filter configured to filter the second mixed signal to obtain a second baseband output signal.

In example 10C, the subject matter of example any one of examples 1C to 9C, may further including a determiner configured to determine the encoded symbols based on the first baseband output signal. In example 11C, the subject matter of example 10C, may further including a determiner configured to determine the encoded symbols based on the first baseband output signal and the second baseband output signal. In example 12C, the subject matter of any one of examples 10C or 11C, may further include that the determiner is configured to determine the encoded symbols further based on a look-up table may include a plurality of symbols corresponding to a plurality of baseband output signals.

In example 13C, the subject matter of any one of examples 10C or 11C, may further include that the determiner is configured to determine the encoded symbols based on a CORDIC function, or a Lagrange interpolation function. In example 14C, the subject matter of example 10C, may further including: a comparator configured to compare the first baseband output signal to a reference signal, and to obtain a phase difference between the first baseband output signal and the reference signal. In example 15C, the subject matter of example 11C, may further including: a comparator configured to compare the first baseband output signal to a reference signal, and the second baseband output signal to the reference signal to obtain a first phase difference between the first baseband output signal and the reference signal, and a second phase difference between the second baseband output signal and the reference signal.

In example 16C, the subject matter of any one of examples 14C or 15C, may further include that the determiner is configured to determine the encoded symbols further based on a look-up table may include a plurality of symbols corresponding to a plurality of phase differences. In example 17C, the subject matter of example 16C, may further including: an envelope detector configured to detect the envelope of the received modulated communication signal and; may further include that the determiner is configured to determine the encoded symbols further based on the look up table may include the plurality of symbols corresponding to a plurality of envelope of the received modulated communication signals.

In example 18C, the subject matter of example 16C or 17C, may further including: a controller configured to receive the determined encoded symbols, and to perform a calibration algorithm for the delay circuit with a cost function of error vector magnitude of the determined encoded symbols. In example 19C, the subject matter of example 18C, may further include that the calibration algorithm includes a least mean square (LMS) algorithm with a set of parameters. In example 20C, the subject matter of example 19C, may further include that the controller is further configured to receive a training data related to a plurality of training symbols, and to arrange the set of parameters during a training mode based on the training data.

In example 21C, the subject matter of any one of examples 14C to 20C, may further include that the determiner is configured to determine the encoded symbols based on a CORDIC function, or a Lagrange interpolation function. In example 22C, the subject matter of any one of examples 10C to 21C, may further include that the determiner includes at least one analog-to-digital converter configured to convert the first baseband output signal and the second baseband output signal. In example 23C, the subject matter of example 22C, may further include that the at least one analog-to-digital converter includes a time-interleaved analog-to-digital converter.

In example 24C, the subject matter of example 22C, may further include that the at least one analog-to-digital converter includes four time-interleaved analog-to-digital converters. In example 25C, the subject matter of any one of examples 22C to 26C, may further include that the at least one analog-to-digital converter is configured to convert an analog signal to an N-bit digital representation of the analog signal, where N is an integer. In example 26C, the subject matter of any one of examples 22C to 27C, may further include that the at least one analog-to-digital converter is configured to convert an analog signal to a 3-bit digital representation of the analog signal.

In example 27C, the subject matter of any one of examples 1C to 28C, may further include that the temporal difference between the first part of the modulated communication signal and the second part of the modulated communication signal is one symbol duration. In example 28C, the subject matter of any one of examples 1C to 29C, may further include that the received modulated communication signal includes a QPSK signal. In example 29C, the subject matter of any one of examples 1C to 30C, may further include that the received modulated communication signal includes an 8-PSK signal, or an n-PSK signal, where n is greater than 8.

In example 30C, the subject matter of any one of examples 1C to 31C, may further include that the center frequency of the received modulated communication signal is above 100 GHz. In example 31C, the subject matter of any one of examples 1C to 32C, may further include that the center frequency of the received modulated communication signal is 140 GHz. In example 32C, the subject matter of example 1C to 33C, may further include that the bandwidth of the received modulated communication signal is 140/3 GHz.

In example 33C, the subject matter of any one of examples 1 to 34C, may further including a low noise amplifier configured to amplify a received signal. In example 34C, the subject matter of example 33C, may further include that the low noise amplifier is further configured to amplify the received signal, based on a signal level of the received signal. In example 35C, the subject matter of example 34C, may further include that the low noise amplifier is further configured to amplify the received signal, in case the signal level of the received signal is below a predetermined threshold level.

In example 36C, the subject matter includes a demodulator. The subject matter may include: a memory storing instructions; and one or more processors configured to execute the instructions to: provide a delay to a received modulated communication signal may include symbols to obtain a delayed modulated communication signal, may further include that a first symbol is encoded in the phase of the first part of the received modulated communication signal, and a second symbol is encoded in the phase of the second part of the received modulated communication signal; multiply the received modulated communication signal and the delayed modulated communication signal to obtain a first mixed signal.

In example 37C, the subject matter is a non-transitory computer-readable medium. The subject matter may include instructions stored thereon, that if executed by one or more processors, cause the one or more processors to: provide a delay to a received modulated communication signal may include symbols to obtain a delayed modulated communication signal, may further include that a first symbol is encoded in the phase of the first part of the received modulated communication signal, and a second symbol is encoded in the phase of the second part of the received modulated communication signal; multiply the received modulated communication signal and the delayed modulated communication signal to obtain a first mixed signal.

In example 38C, the subject matter of example 37C, may further include that the first symbol is encoded in the received modulated communication signal with a phase difference between the first part of the received modulated communication signal and the second part of the received modulated communication signal. In example 39C, the subject matter of example 38C, the instructions may further include to delay the received modulated communication signal of a temporal difference between the first part of the modulated communication signal and the second part of the modulated communication signal.

In example 40C, the subject matter of any one of examples 37C to 41C, may further include that the instructions may further include to cause the one or more processors to filter the high-frequency components of the first mixed signal to obtain a first baseband output signal. In example 41C, the subject matter of any one of examples 37C to 42C, may further include that the instructions may further include to cause the one or more processors to shift the phase of the received modulated communication signal by 90 degrees to obtain a shifted received modulated communication signal.

In example 42C, the subject matter of any one of examples 37C or 41C, may further include that the instructions may further include to cause the one or more processors to shift the phase of the delayed modulated communication signal by 90 degrees to obtain a shifted delayed modulated communication signal. In example 43C, the subject matter of example 41C, may further include that the instructions may further include to cause the one or more processors to multiply the shifted received modulated communication signal and the delayed modulated communication signal to obtain a second mixed signal.

In example 44C, the subject matter of example 42C, may further include that the instructions may further include to cause the one or more processors to multiply the received modulated communication signal and the shifted delayed modulated communication signal to obtain a second mixed signal. In example 45C, the subject matter of any one of examples 43C or 44C, may further include that the instructions may further include to cause the one or more processors to filter the high-frequency components of the second mixed signal to obtain a second baseband output signal.

In example 46C, the subject matter of example any one of examples 37C to 45C, may further include that the instructions may further include to cause the one or more processors to determine the encoded symbols based on the first baseband output signal. In example 47C, the subject matter of example 46C, may further include that the instructions may further include to compare the first baseband output signal to a reference signal, and to obtain a phase difference between the first baseband output signal and the reference signal. In example 48C, the subject matter of any one of examples 46C or 47C, may further include that the instructions may further include to determine the encoded symbols further based on a look-up table may include a plurality of symbols corresponding to a plurality of baseband output signals.

In example 49C, the subject matter of any one of examples 46C or 47C, may further include that the instructions may further include to determine the encoded symbols based on a CORDIC function, or a Lagrange interpolation function. In example 50C, the subject matter of example 45C, may further include that the instructions may further include to cause the one or more processors to determine the encoded symbols based on the first baseband output signal and the second baseband output signal. In example 51C, the subject matter of example 50C, may further include that the instructions may further include to compare the first baseband output signal to a reference signal, and the second baseband output signal to the reference signal to obtain a first phase difference between the first baseband output signal and the reference signal, and a second phase difference between the second baseband output signal and the reference signal.

In example 52C, the subject matter of any one of examples 50C or 51, may further include that the instructions may further include to determine the encoded symbols further based on a look-up table may include a plurality of symbols corresponding to a plurality of phase differences. In example 53C, the subject matter of any one of examples 50C or 51, may further include that the instructions may further include to determine the encoded symbols further based on a look-up table may include a plurality of symbols corresponding to a plurality of baseband output signals. In example 54C, the subject matter of any one of examples 52 or 53, may further include that the instructions may further include to detect the envelope of the received modulated communication signal; and may further include that the determiner is configured to determine the encoded symbols further based on the look up table may include the plurality of symbols corresponding to a plurality of envelope of the received modulated communication signals.

In example 55C, the subject matter of any one of examples 52 to 54, may further include that the instructions may further include to receive the determined encoded symbols, and to perform a calibration algorithm for the delay circuit with a cost function of error vector magnitude of the determined encoded symbols. In example 56C, the subject matter of example 55, may further include that the calibration algorithm includes a least mean square (LMS) algorithm with a set of parameters. In example 57C, the subject matter of example 56, may further include that the instructions may further include to receive a training data related to a plurality of training symbols, and to arrange the set of parameters during a training mode based on the training data.

In example 58C, the subject matter of any one of examples 48C to 57, may further include that the instructions may further include to cause the one or more processors to convert the first baseband output signal and the second baseband output signal to a first baseband digital output signal and a second baseband digital output signal. In example 59C, the subject matter of any one of examples 48C to 58, may further include that the instructions may further include to convert an analog signal to an N-bit digital representation of the analog signal, where N is an integer.

In example 60C, the subject matter of example 59, may further include that the instructions may further include to convert an analog signal to a 3-bit digital representation of the analog signal. In example 61C, the subject matter of any one of examples 37C to 60, may further include that the temporal difference between the first part of the modulated communication signal and the second part of the modulated communication signal is one symbol duration. In example 62C, the subject matter of any one of examples 37C to 61, may further include that the received modulated communication signal includes a QPSK signal.

In example 63C, the subject matter of any one of examples 37C to 62, may further include that the received modulated communication signal includes an 8-PSK signal, or an n-PSK signal, where n is greater than 8. In example 64C, the subject matter of any one of examples 37C to 63, may further include that the center frequency of the received modulated communication signal is above 100 GHz. In example 65C, the subject matter of any one of examples 37C to 64, may further include that the center frequency of the received modulated communication signal is 140 GHz.

In example 66C, the subject matter of any one of examples 37C to 65, may further include that the bandwidth of the received modulated communication signal is 140/3 GHz. In example 67C, the subject matter of any one of examples 37C to 66, may further include that the instructions may further include to cause the one or more processors to amplify a received signal.

In example 68C, the subject matter of example 67, may further include that the instructions may further include to cause the one or more processors to amplify the received signal, based on a signal level of the received signal. In example 69C, the subject matter of example 68, may further include that the instructions may further include to cause the one or more processors to amplify the received signal, in case the signal level of the received signal is below a predetermined threshold level.

In example 70C the subject matter is a method. The method may include: providing a delay to a received modulated communication signal may include symbols to obtain a delayed modulated communication signal, may further include that a first symbol is encoded in the phase of the first part of the received modulated communication signal, and a second symbol is encoded in the phase of the second part of the received modulated communication signal; multiplying the received modulated communication signal and the delayed modulated communication signal to obtain a first mixed signal.

In example 71C, the method of example 70, may further include that the first symbol is encoded in the received modulated communication signal with a phase difference between the first part of the received modulated communication signal and the second part of the received modulated communication signal. In example 72C, the subject matter of any one of examples example 70 or 71, may further including delaying the received modulated communication signal of a temporal difference between the first part of the modulated communication signal and the second part of the modulated communication signal.

In example 73C, the subject matter of any one of examples 70 to 73, may further including filtering the high-frequency components of the first mixed signal to obtain a first baseband output signal. In example 74C, the subject matter of any one of examples 70 to 73, may further including shifting the phase of the received modulated communication signal by 90 degrees to obtain a shifted received modulated communication signal. In example 75C, the subject matter of any one of examples 70 to 74, may further including shifting the phase of the delayed modulated communication signal by 90 degrees to obtain a shifted delayed modulated communication signal.

In example 76C, the subject matter of example 75, may further including multiplying the shifted received modulated communication signal and the delayed modulated communication signal to obtain a second mixed signal. In example 77C, the subject matter of example 76, may further including multiplying the received modulated communication signal and the shifted delayed modulated communication signal to obtain a second mixed signal. In example 78C, the subject matter of any one of examples 76 or 77, may further including filtering the high-frequency components of the second mixed signal to obtain a second baseband output signal.

In example 79C, the subject matter of example any one of examples 73 to 78, may further including determining the encoded symbols based on the first baseband output signal. In example 80C, the subject matter of 79, may further including determining the encoded symbols based on the first baseband output signal and the second baseband output signal. In example 81C, the subject matter of any one of examples 79 or 80, may further including determining the encoded symbols further based on a look-up table may include a plurality of symbols corresponding to a plurality of baseband output signals.

In example 82C, the subject matter of any one of examples 79 to 81, may further including determining the encoded symbols further based on a CORDIC function, or a Lagrange interpolation function. In example 83C, the subject matter of example any one of examples 80 to 82, may further including comparing the first baseband output signal to a reference signal, and to obtain a phase difference between the first baseband output signal and the reference signal. In example 84C, the subject matter of example 83, may further including comparing the first baseband output signal to a reference signal, and the second baseband output signal to the reference signal to obtain a first phase difference between the first baseband output signal and the reference signal, and a second phase difference between the second baseband output signal and the reference signal.

In example 85C, the subject matter of any one of examples 83 or 84, may further including determining the encoded symbols further based on a look-up table may include a plurality of symbols corresponding to a plurality of phase differences. In example 86C, the subject matter of any one of examples 80 to 85, may further including: detecting the envelope of the received modulated communication signal; and determining the encoded symbols further based on the look up table may include the plurality of symbols corresponding to a plurality of envelope of the received modulated communication signals.

In example 87C, the subject matter of 80 to 86, may further including: performing a calibration algorithm for the delay circuit with a cost function of error vector magnitude of the determined encoded symbols. In example 88C, the subject matter of example 87, may further include that the calibration algorithm includes a least mean square (LMS) algorithm with a set of parameters. In example 89C, the subject matter of example 88, receiving a training data related to a plurality of training symbols, and arranging the set of parameters during a training mode based on the training data.

In example 90C, the subject matter of any one of examples 79 to 89, may further including converting the first baseband output signal and the second baseband output signal to a first baseband digital output signal and a second baseband digital output signal. 91. the subject matter of example 90C, may further including converting an analog signal to an N-bit digital representation of the analog signal, where N is an integer. the subject matter of example 91C, may further including converting an analog signal to a 3-bit digital representation of the analog signal.

In example 93C, the subject matter of any one of examples 72C to 92C, may further include that the temporal difference between the first part of the modulated communication signal and the second part of the modulated communication signal is one symbol duration. The subject matter of 94C includes the subject matter of any one of examples 72C to 93C, may further include that the received modulated communication signal includes a QPSK signal. In example 95C. the subject matter of any one of examples 72C to 94C, may further include that the received modulated communication signal includes an 8-PSK signal, or an n-PSK signal, where n is greater than 8.

In example 96C, the subject matter of any one of examples 72C to 95C, may further include that the center frequency of the received modulated communication signal is above 100 GHz. In example 97C. the subject matter of any one of examples 72C to 96C, may further include that the center frequency of the received modulated communication signal is 140 GHz. In example 98C, the subject matter of any one of examples 72C to 97C, may further include that the bandwidth of the received modulated communication signal is 140/3 GHz. 99.

In example 99C the subject matter is demodulator. The subject matter may include: a delay means for providing a delay to a received modulated communication signal may include symbols to obtain a delayed modulated communication signal, may further include that a first symbol is encoded in the phase of the first part of the received modulated communication signal, and a second symbol is encoded in the phase of the second part of the received modulated communication signal; a first mixing means for multiplying the received modulated communication signal and the delayed modulated communication signal to obtain a first mixed signal.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a non-transitory computer-readable medium (e.g., a non-transitory non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

The term "antenna" or "antenna structure", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "calibration" as used herein may describe a process in which a device or a component of a device (e.g., a radiohead circuit, a transceiver chain, a component of a transceiver chain, and the like) is calibrated. Illustratively, the term calibration may describe a process in which one or more deviations of a behavior of a device or of one of its components from an expected or desired (e.g., target) behavior are corrected. Further illustratively, the term calibration may describe a process in which the operation of a device or of one of its components is aligned with a predefined or desired (e.g., target) operation of the device or of the component. By way of example, a calibration may describe a process in which nonlinearities are eliminated and/or in which mismatches are eliminated. In some aspects, a calibration may be understood as the process through which transmission (TX) and/or reception (RX) parameters and/or circuitry may be tuned to optimize TX power and signal integrity (e.g., EVM) and RX signal quality (e.g., RSSI, or signal-to-interference-plus-noise-ratio SINR).

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High-frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. An amplifier circuit comprising:
an amplifier stage with an adjustable degeneration component, the amplifier stage configured to amplify a received input signal with an adjustable gain, wherein the amplifier stage comprises a first amplifier stage and a second amplifier stage, and wherein the second amplifier stage is configured to receive an output signal from the first amplifier stage;
an adjustable feedback component coupled to the amplifier stage; and
a controller coupled to the amplifier stage and to the adjustable feedback component and configured to adjust the adjustable feedback component based on an adjustment of the adjustable degeneration component;
wherein the controller is configured to keep the input impedance of the amplifier stage constant by adjusting the resistance of the adjustable feedback component in response to an adjustment to the gain of the amplifier stage,
wherein the second amplifier stage comprises a first neutralizing capacitor coupled to a first amplifier stage input terminal of the second amplifier stage and a second amplifier stage output terminal of the second amplifier stage, and a second neutralizing capacitor coupled to a second amplifier stage input terminal of the second amplifier stage and a first amplifier stage output terminal of the second amplifier stage.

2. The amplifier circuit of claim 1,
wherein the controller is coupled to the adjustable degeneration component, and
wherein the controller is configured to adjust the gain of the amplifier stage by adjusting the resistance of the adjustable degeneration component.

3. The amplifier circuit of claim 1,
wherein the controller is configured to increase the resistance of the adjustable feedback component in response to an increase to the gain of the amplifier stage.

4. The amplifier circuit of claim 1,
wherein the controller is configured to decrease the resistance of the adjustable feedback component in response to a decrease to the gain of the amplifier stage.

5. The amplifier circuit of claim 1,
wherein the amplifier stage comprises a first amplifier stage and a second amplifier stage,
the second amplifier stage configured to receive an output signal from the first amplifier stage.

6. The amplifier circuit of claim 5,
wherein the second amplifier stage comprises a first amplifier stage input terminal and a second amplifier stage input terminal;
wherein the second amplifier stage comprises a differential transimpedance amplifier configured to receive a first amplifier stage input signal from the first amplifier stage input terminal, and a second amplifier stage input signal from the second amplifier stage input terminal.

7. The amplifier circuit of claim 6,
wherein the second amplifier stage comprises a first amplifier stage output terminal configured to output an amplified first amplifier stage input signal, and a second amplifier stage output terminal configured to output an amplified second amplifier stage input signal.

8. The amplifier circuit of claim 7,
wherein the second amplifier stage is capacitively neutralized.

9. The amplifier circuit of claim 1,
wherein the second amplifier stage comprises a first peaking capacitor coupled to the first amplifier stage input terminal of the second amplifier stage, a second peaking capacitor coupled to the first amplifier stage output terminal of the second amplifier stage, a third peaking capacitor coupled to the second amplifier stage input terminal of the second amplifier stage, and a fourth peaking capacitor coupled to the second amplifier stage output terminal of the second amplifier stage.

10. The amplifier circuit of claim 9,
wherein the first peaking capacitor, the second peaking capacitor, the third peaking capacitor, and the fourth peaking capacitor are configured to interact to achieve complex pole peaking at the frequency response of the second amplifier stage.

11. The amplifier circuit of claim 10,
wherein the amplifier stage further comprises a third amplifier stage configured to an output signal from the second amplifier stage.

12. The amplifier circuit of claim 11,
wherein the output of the third amplifier stage comprises a peaking inductor coupled in series to the output of the third amplifier stage; and
wherein the third amplifier stage comprises a first amplifier stage output terminal, and a second amplifier stage output terminal, wherein a first peaking inductor is coupled in series to the first amplifier stage output terminal of the third amplifier stage, and a second peaking inductor is coupled in series to the second amplifier stage output terminal of the third amplifier stage.

\* \* \* \* \*